US011347054B2

(12) United States Patent
Woods et al.

(10) Patent No.: US 11,347,054 B2
(45) Date of Patent: May 31, 2022

(54) SYSTEMS AND METHODS FOR AUGMENTED REALITY

(71) Applicant: Magic Leap, Inc., Plantation, FL (US)

(72) Inventors: Michael Janusz Woods, Mountain View, CA (US); Andrew Rabinovich, San Francisco, CA (US); Richard Leslie Taylor, Wellington (NZ)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/898,212

(22) Filed: Feb. 15, 2018

(65) Prior Publication Data
US 2018/0239144 A1  Aug. 23, 2018

Related U.S. Application Data

(60) Provisional application No. 62/459,802, filed on Feb. 16, 2017.

(51) Int. Cl.
*G02B 27/01* (2006.01)
*G06T 19/00* (2011.01)
*A63F 13/211* (2014.01)

(52) U.S. Cl.
CPC ........ *G02B 27/0172* (2013.01); *A63F 13/211* (2014.09); *G02B 27/017* (2013.01);
(Continued)

(58) Field of Classification Search
CPC .............. G02B 27/0172; G02B 27/017; G02B 27/0179; G02B 2027/014; G02B 2027/0138; G02B 2027/0187; A63F 13/211; A63F 13/5255; A63F 13/25; A63F 13/213; A63F 13/212; G06T 19/006
See application file for complete search history.

(56) References Cited

U.S. PATENT DOCUMENTS 6,850,221 B1   2/2005  Tickle
8,950,867 B2   2/2015  Macnamara
(Continued)

OTHER PUBLICATIONS

ARToolKit: https://web.archive.org/web/20051013062315/http://www.hitl.washington.edu:80/artoolkit/documentation/hardware.htm, archived Oct. 13, 2005.
(Continued)

*Primary Examiner* — Patrick N Edouard
*Assistant Examiner* — Joseph P Fox
(74) *Attorney, Agent, or Firm* — Knobbe, Martens, Olson & Bear, LLP

(57) ABSTRACT

Methods and systems for triggering presentation of virtual content based on sensor information. The display system may be an augmented reality display system configured to provide virtual content on a plurality of depth planes using different wavefront divergences. The system may monitor information detected via the sensors, and based on the monitored information, trigger access to virtual content identified in the sensor information. Virtual content can be obtained, and presented as augmented reality content via the display system. The system may monitor information detected via the sensors to identify a QR code, or a presence of a wireless beacon. The QR code or wireless beacon can trigger the display system to obtain virtual content for presentation.

22 Claims, 235 Drawing Sheets

(52) U.S. Cl.
CPC ........ *G02B 27/0179* (2013.01); *G06T 19/006* (2013.01); *G02B 2027/014* (2013.01); *G02B 2027/0138* (2013.01); *G02B 2027/0187* (2013.01)

(56) References Cited

U.S. PATENT DOCUMENTS

| | | | |
|---|---|---|---|
| 9,081,426 B2 | 7/2015 | Armstrong | |
| 9,215,293 B2 | 12/2015 | Miller | |
| 9,310,559 B2 | 4/2016 | Macnamara | |
| 9,348,143 B2 | 5/2016 | Gao et al. | |
| D758,367 S | 6/2016 | Natsume | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,671,566 B2 | 6/2017 | Abovitz et al. | |
| 9,740,006 B2 | 8/2017 | Gao | |
| 9,791,700 B2 | 10/2017 | Schowengerdt et al. | |
| 9,851,563 B2 | 12/2017 | Gao et al. | |
| 9,857,591 B2 | 1/2018 | Welch et al. | |
| 9,874,749 B2 | 1/2018 | Bradski et al. | |
| 10,430,985 B2 | 10/2019 | Harrises et al. | |
| 2006/0028436 A1 | 2/2006 | Armstrong | |
| 2007/0081123 A1 | 4/2007 | Lewis | |
| 2012/0127062 A1 | 5/2012 | Bar-Zeev et al. | |
| 2012/0162549 A1 | 6/2012 | Gao et al. | |
| 2013/0082922 A1 | 4/2013 | Miller | |
| 2013/0117377 A1 | 5/2013 | Miller | |
| 2013/0125027 A1 | 5/2013 | Abovitz | |
| 2013/0127980 A1* | 5/2013 | Haddick | G06F 3/013 348/14.08 |
| 2013/0208234 A1 | 8/2013 | Lewis | |
| 2013/0242262 A1 | 9/2013 | Lewis | |
| 2014/0071539 A1 | 3/2014 | Gao | |
| 2014/0139654 A1* | 5/2014 | Takahashi | G06Q 10/08 348/61 |
| 2014/0177023 A1 | 6/2014 | Gao et al. | |
| 2014/0198035 A1* | 7/2014 | Bailey | G06F 3/014 345/156 |
| 2014/0218468 A1 | 8/2014 | Gao et al. | |
| 2014/0267420 A1 | 9/2014 | Schowengerdt | |
| 2014/0306866 A1 | 10/2014 | Miller et al. | |
| 2014/0368537 A1* | 12/2014 | Salter | G06F 3/011 345/633 |
| 2015/0016777 A1 | 1/2015 | Abovitz et al. | |
| 2015/0103306 A1 | 4/2015 | Kaji et al. | |
| 2015/0178939 A1* | 6/2015 | Bradski | G06F 3/017 345/633 |
| 2015/0205126 A1* | 7/2015 | Schowengerdt | G06T 13/40 345/633 |
| 2015/0222883 A1 | 8/2015 | Welch | |
| 2015/0222884 A1 | 8/2015 | Cheng | |
| 2015/0247975 A1* | 9/2015 | Abovitz | G06F 16/7837 385/37 |
| 2015/0268415 A1 | 9/2015 | Schowengerdt et al. | |
| 2015/0301599 A1 | 10/2015 | Miller | |
| 2015/0302652 A1 | 10/2015 | Miller et al. | |
| 2015/0309263 A2 | 10/2015 | Abovitz et al. | |
| 2015/0326570 A1 | 11/2015 | Publicover et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0164883 A1* | 6/2016 | Li | H04W 12/04 726/7 |
| 2016/0247324 A1* | 8/2016 | Mullins | G06F 3/012 |
| 2016/0249989 A1* | 9/2016 | Devam | A61B 5/024 345/633 |
| 2016/0322018 A1* | 11/2016 | Peterson | G06F 3/147 |
| 2017/0053165 A1 | 2/2017 | Kaehler | |
| 2017/0161919 A1 | 6/2017 | Schroeder et al. | |
| 2017/0278486 A1* | 9/2017 | Ishikawa | G06F 3/048 |
| 2017/0337470 A1 | 11/2017 | DeTone et al. | |
| 2018/0024805 A1* | 1/2018 | Nakagawa | G06F 3/0482 709/203 |
| 2018/0053056 A1 | 2/2018 | Rabinovich et al. | |
| 2018/0359419 A1* | 12/2018 | Hu | H04N 5/23238 |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

\* cited by examiner

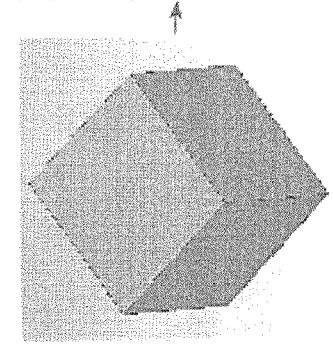
Figure 12E — ferrite rods with Plastic housing
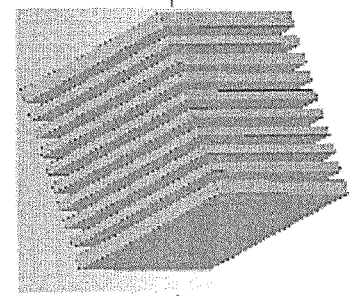
Figure 12D — Solid cube with three-axes air core
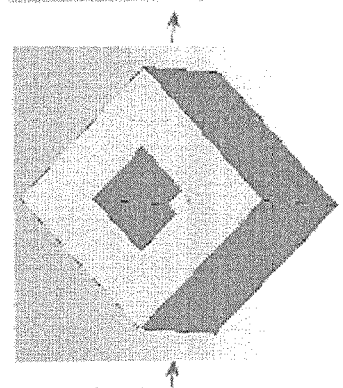
Figure 12C — Solid cube with one-axis air core
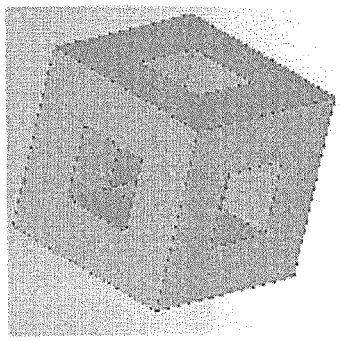
Figure 12B — Ferrite disks
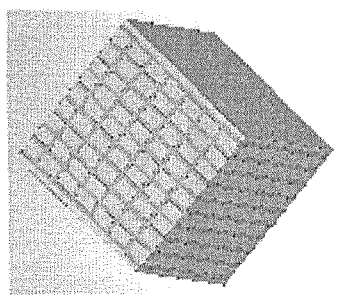
Figure 12A — Solid cube Non-multiplexed Receiver Configuration Transmitter with time domain multiplexing

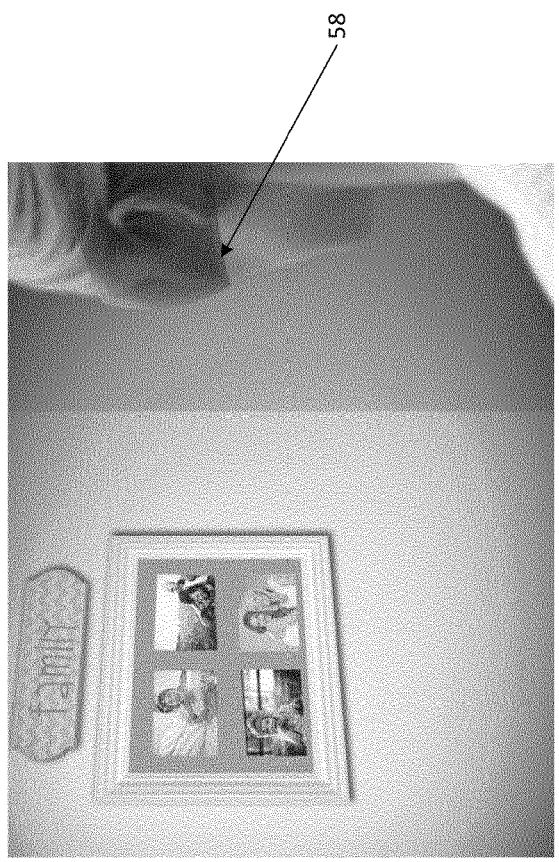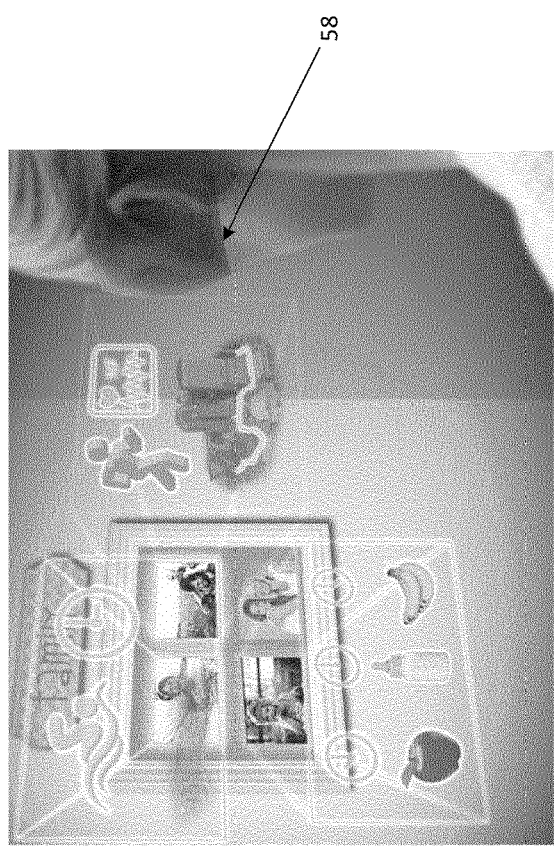
Figure 60A
Figure 60B

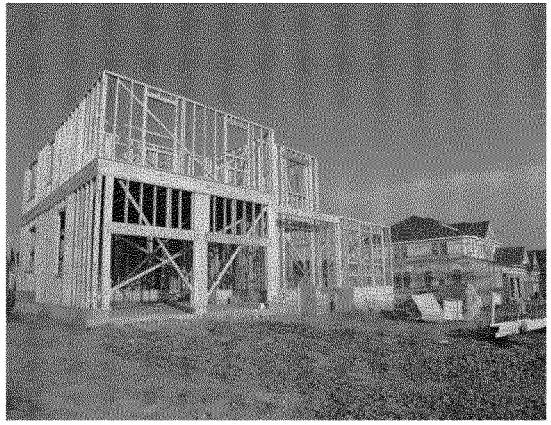
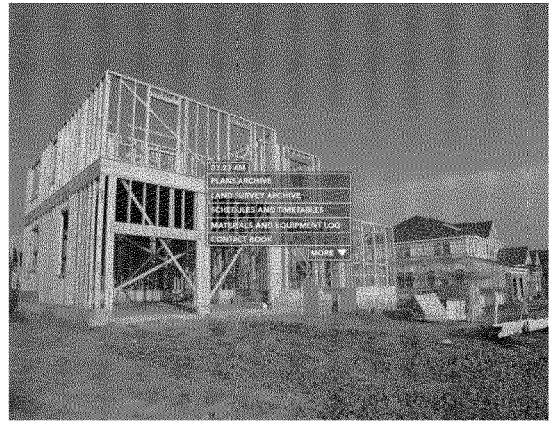
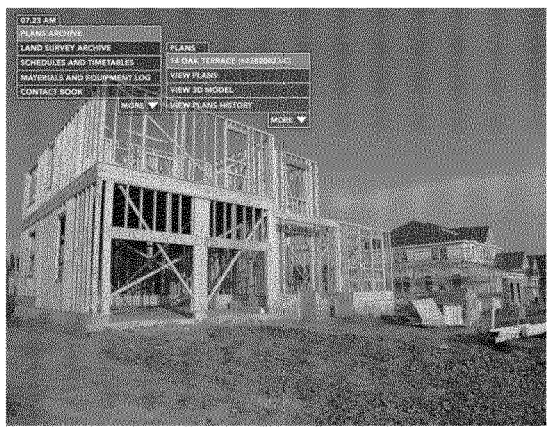
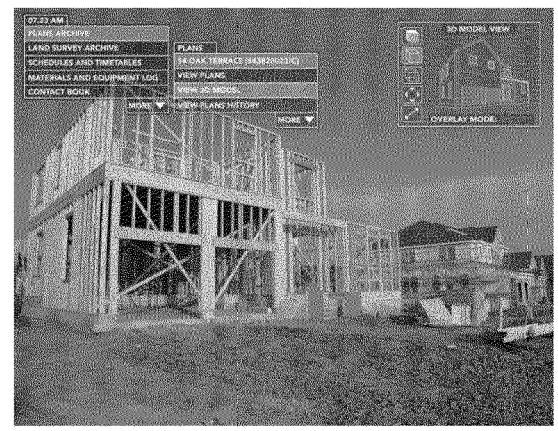
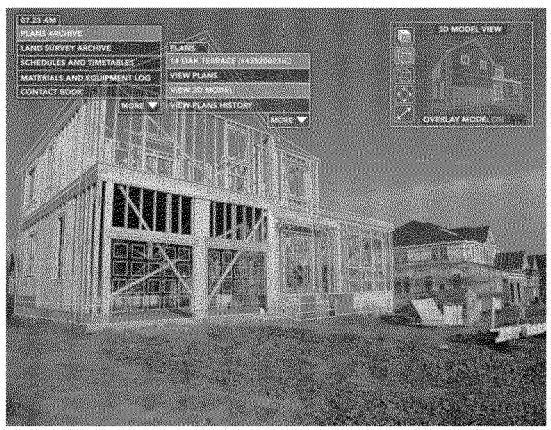
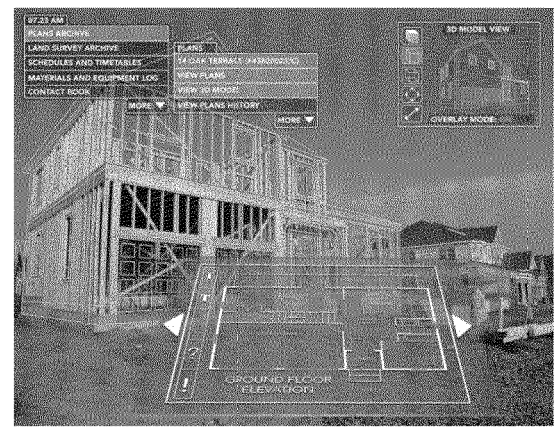
Figure 85 A

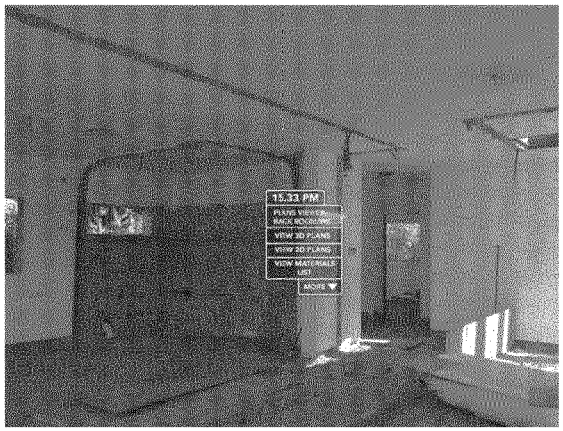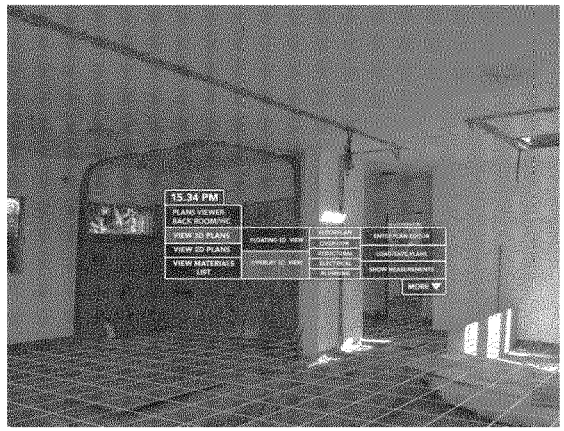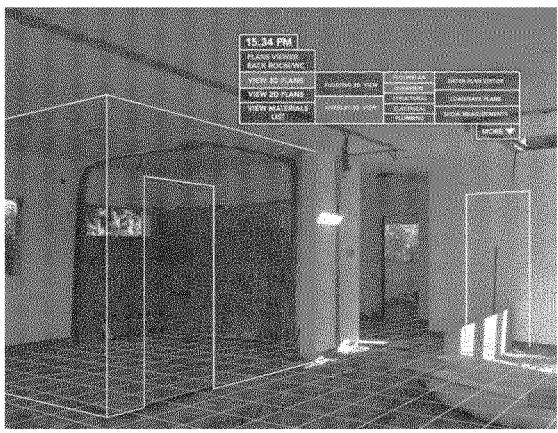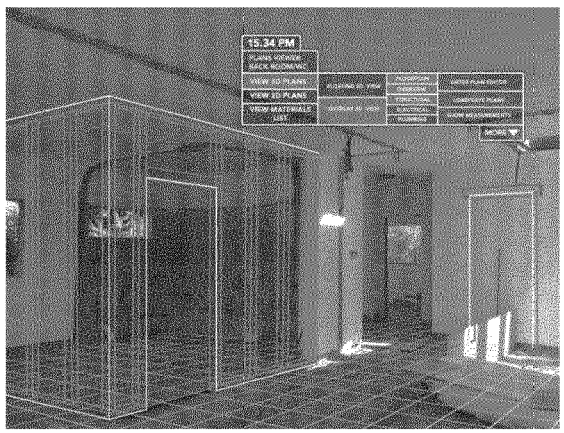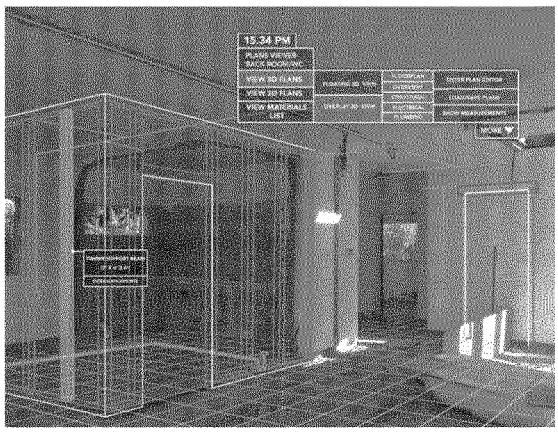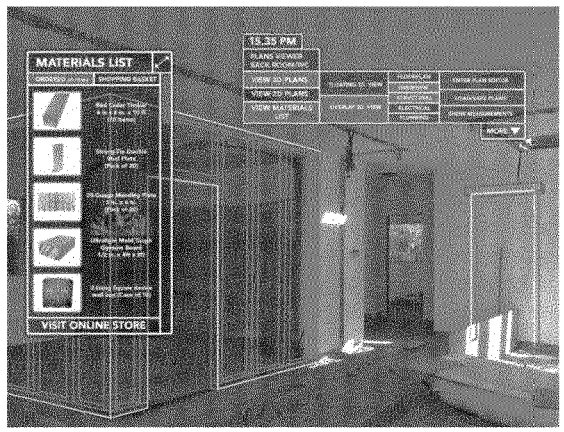
Figure 85B

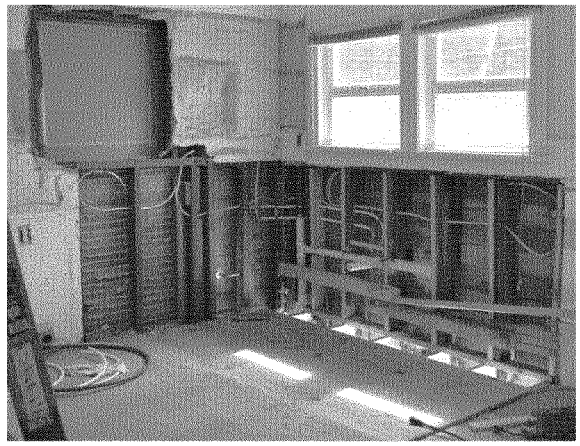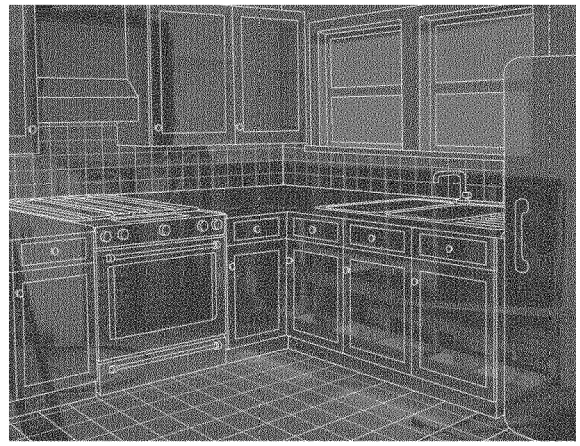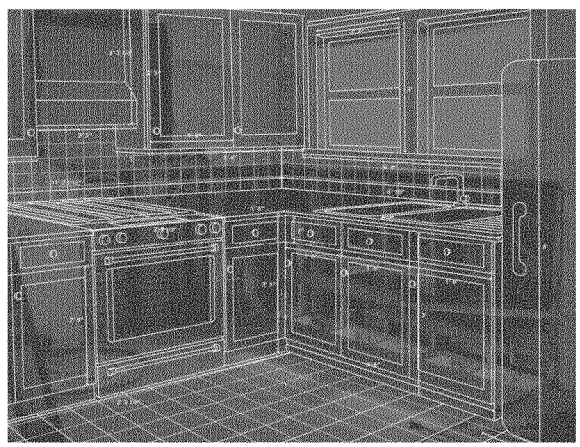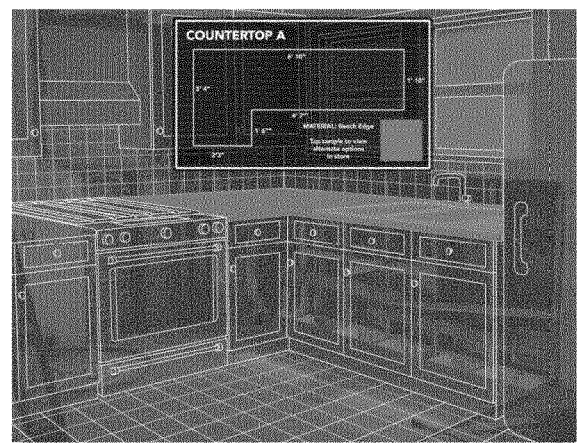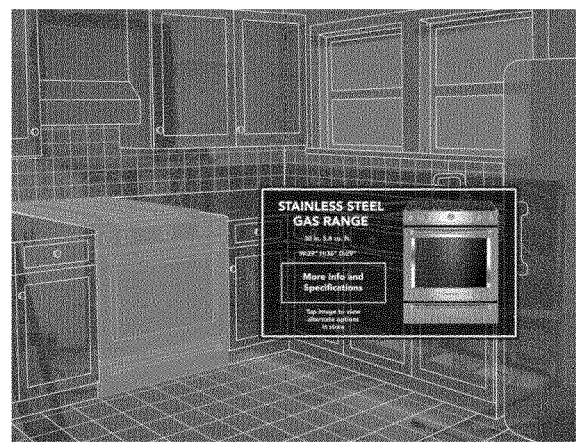
Figure 85D

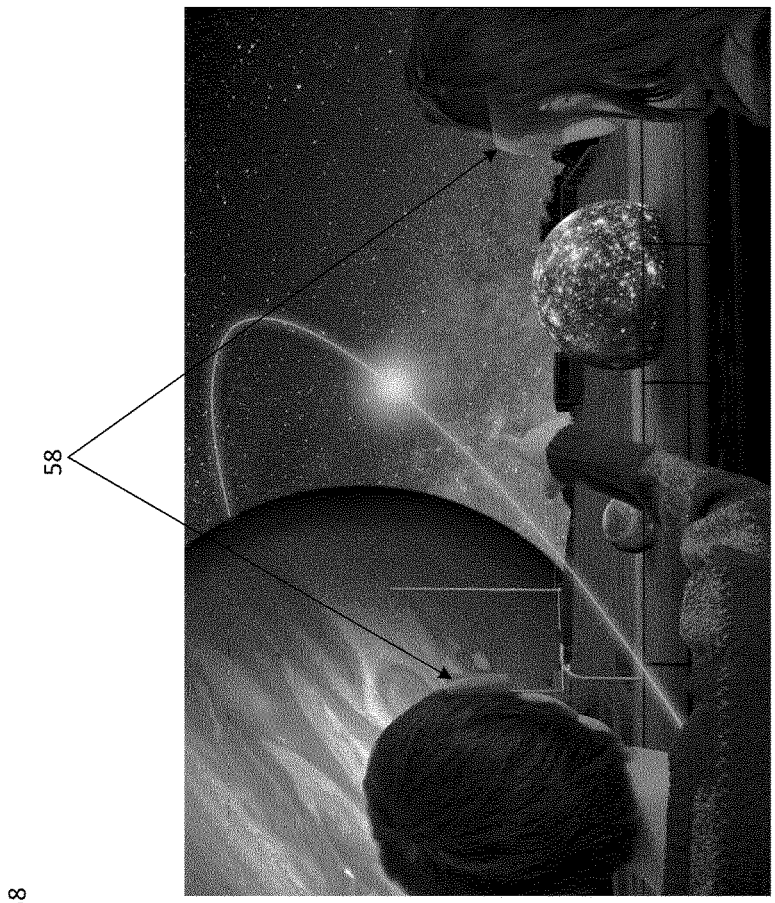
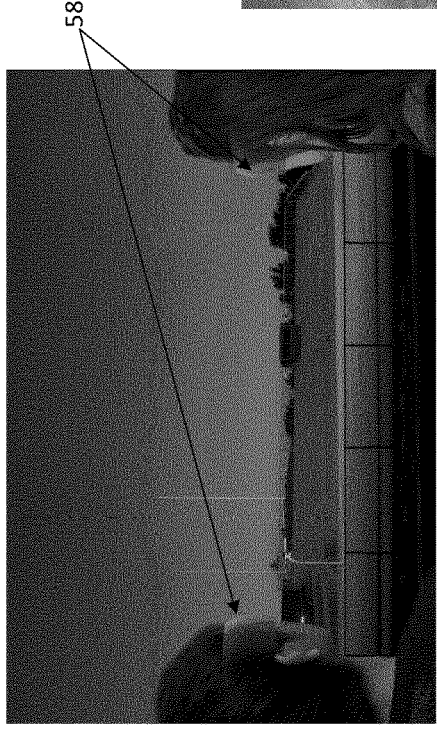
Figure 116A
Figure 116B
Figure 116C

Figure 140

SYSTEMS AND METHODS FOR AUGMENTED REALITY

PRIORITY CLAIM

This application claims priority to U.S. Provisional Patent App. No. 62/459,802 titled "SYSTEMS AND METHODS FOR AUGMENTED REALITY," which was filed on Feb. 16, 2017, and which is hereby incorporated by reference in its entirety for all purposes.

BACKGROUND

Field

The present disclosure relates to systems and methods to localize position and orientation of one or more objects in the context of augmented reality systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user.

For example, referring to FIG. 1, an augmented reality scene (4) is depicted wherein a user of an AR technology sees a real-world park-like setting (6) featuring people, trees, buildings in the background, and a concrete platform (1120). In addition to these items, the user of the AR technology also perceives that he "sees" a robot statue (1110) standing upon the real-world platform (1120), and a cartoon-like avatar character (2) flying by which seems to be a personification of a bumble bee, even though these elements (2, 1110) do not exist in the real world. As it turns out, the human visual perception system is very complex, and producing a VR or AR technology that facilitates a comfortable, natural-feeling, rich presentation of virtual image elements amongst other virtual or real-world imagery elements is challenging.

For instance, head-worn AR displays (or helmet-mounted displays, or smart glasses) typically are at least loosely coupled to a user's head, and thus move when the user's head moves. If the user's head motions are detected by the display system, the data being displayed can be updated to take the change in head pose into account.

As an example, if a user wearing a head-worn display views a virtual representation of a three-dimensional (3D) object on the display and walks around the area where the 3D object appears, that 3D object can be re-rendered for each viewpoint, giving the user the perception that he or she is walking around an object that occupies real space. If the head-worn display is used to present multiple objects within a virtual space (for instance, a rich virtual world), measurements of head pose (e.g., the location and orientation of the user's head) can be used to re-render the scene to match the user's dynamically changing head location and orientation and provide an increased sense of immersion in the virtual space.

In AR systems, detection or calculation of head pose can facilitate the display system to render virtual objects such that they appear to occupy a space in the real world in a manner that makes sense to the user. In addition, detection of the position and/or orientation of a real object, such as handheld device (which also may be referred to as a "totem"), haptic device, or other real physical object, in relation to the user's head or AR system may also facilitate the display system in presenting display information to the user to enable the user to interact with certain aspects of the AR system efficiently. As the user's head moves around in the real world, the virtual objects may be re-rendered as a function of head pose, such that the virtual objects appear to remain stable relative to the real world. At least for AR applications, placement of virtual objects in spatial relation to physical objects (e.g., presented to appear spatially proximate a physical object in two- or three-dimensions) may be a non-trivial problem. For example, head movement may significantly complicate placement of virtual objects in a view of an ambient environment. Such is true whether the view is captured as an image of the ambient environment and then projected or displayed to the end user, or whether the end user perceives the view of the ambient environment directly. For instance, head movement will likely cause a field of view of the end user to change, which will likely require an update to where various virtual objects are displayed in the field of the view of the end user. Additionally, head movements may occur within a large variety of ranges and speeds. Head movement speed may vary not only between different head movements, but within or across the range of a single head movement. For instance, head movement speed may initially increase (e.g., linearly or not) from a starting point, and may decrease as an ending point is reached, obtaining a maximum speed somewhere between the starting and ending points of the head movement. Rapid head movements may even exceed the ability of the particular display or projection technology to render images that appear uniform and/or as smooth motion to the end user.

Head tracking accuracy and latency (e.g., the elapsed time between when the user moves his or her head and the time when the image gets updated and displayed to the user) have been challenges for VR and AR systems. Especially for display systems that fill a substantial portion of the user's visual field with virtual elements, it is critical that the accuracy of head-tracking is high and that the overall system latency is very low from the first detection of head motion to the updating of the light that is delivered by the display to the user's visual system. If the latency is high, the system can create a mismatch between the user's vestibular and visual sensory systems, and generate a user perception scenario that can lead to motion sickness or simulator sickness. If the system latency is high, the apparent location of virtual objects will appear unstable during rapid head motions.

In addition to head-worn display systems, other display systems can benefit from accurate and low latency head pose detection. These include head-tracked display systems in which the display is not worn on the user's body, but is, e.g., mounted on a wall or other surface. The head-tracked display acts like a window onto a scene, and as a user moves his head relative to the "window" the scene is re-rendered to match the user's changing viewpoint. Other systems include a head-worn projection system, in which a head-worn display projects light onto the real world.

Additionally, in order to provide a realistic augmented reality experience, AR systems may be designed to be interactive with the user. For example, multiple users may play a ball game with a virtual ball and/or other virtual objects. One user may "catch" the virtual ball, and throw the ball back to another user. In another embodiment, a first user may be provided with a totem (e.g., a real bat communicatively coupled to the AR system) to hit the virtual ball. In other embodiments, a virtual user interface may be presented to the AR user to allow the user to select one of many options. The user may use totems, haptic devices, wearable components, or simply touch the virtual screen to interact with the system.

Detecting head pose and orientation of the user, and detecting a physical location of real objects in space enable the AR system to display virtual content in an effective and enjoyable manner. However, although these capabilities are key to an AR system, but are difficult to achieve. In other words, the AR system must recognize a physical location of a real object (e.g., user's head, totem, haptic device, wearable component, user's hand, etc.) and correlate the physical coordinates of the real object to virtual coordinates corresponding to one or more virtual objects being displayed to the user. This requires highly accurate sensors and sensor recognition systems that track a position and orientation of one or more objects at rapid rates. Current approaches do not perform localization at satisfactory speed or precision standards.

There, thus, is a need for a better localization system in the context of AR and VR devices.

SUMMARY

In some embodiments, a display system is provided. The display system comprises a head-mounted augmented reality display device configured to be worn by a user, and configured to present virtual content to the user. The display system comprises one or more sensors. The display system comprises one or more processors, and computer storage media storing instructions that when executed by the display system, cause the display system to perform operations. The operations comprise monitoring information detected via the sensors of the system, and based on the monitored information, triggering access to virtual content identified in the sensor information. Virtual content to be presented via the system is obtained via the triggered access, with the virtual content being presented as augmented reality content visible with an ambient environment. The virtual content is presented via the augmented reality display device.

In some other embodiments, an augmented reality display device is provided. The augmented reality display device is configured to be worn by a user and present virtual content in an ambient environment of the user. The augmented reality display device comprises a plurality of stacked waveguides forming a display area and providing a view of the ambient environment through the display area, wherein at least some waveguides of the plurality of waveguides are configured to output light with different wavefront divergence than other waveguides, each waveguide being associated with a depth at which virtual content appears in focus. The augmented reality display device comprises one or more cameras configured to obtain images of the ambient environment. The augmented reality display device comprises one or more processors. The one or more processors are configured to obtain at least one image of the ambient environment, the at least one image being determined to include a QR code. The QR code is decoded, and an indication of a network location is obtained. A request to the network location is provided for virtual content. Virtual content received in response to the request is presented via the stacked waveguides.

In yet other embodiments, a method for sharing content is provided. The method comprises receiving an activation gateway indicating an interaction of virtual content viewed by a first user. The activation gateway is transmitted to at least one second user. An acceptance of the activation gateway is received by the at least one second user. The virtual content viewed by the first user is transmitted to the at least one second user. In some embodiments, a display system comprising: a head-mounted augmented reality display device configured to be worn by a user, and configured to present virtual content to the user; one or more processors; and computer storage media storing instructions that when executed by the display system, cause the display system to perform the method for sharing content of this paragraph.

In some embodiments, a method of sharing content is provided. The method comprises receiving an activation gateway indicating an interaction of virtual content viewed by a first user. The activation gateway is transmitted to at least one second user. An acceptance of the activation gateway is received by the at least one second user. A sharing credential of the at least one second user is transmitted to enable the first user to transmit directly to the at least one second user. In some embodiments, a display system comprising: a head-mounted augmented reality display device configured to be worn by a user, and configured to present virtual content to the user; one or more processors; and computer storage media storing instructions that when executed by the display system, cause the display system to perform the method for sharing content of this paragraph.

BRIEF DESCRIPTION OF THE DRAWINGS

FIGS. 12A-12E illustrate various configurations for featuring a ferrite core coupled to an electromagnetic sensor to increase field sensitivity.

FIGS. 60A-60B and 67A-67B illustrate various aspects of a configuration wherein a user may customize presentation of images within a picture frame.

FIGS. 85A-D illustrate further embodiments of augmented reality interactions in a work setting.

FIGS. 93-98 illustrate various healthcare-related configurations.

FIG. 93 illustrates a pregnant user visualizing information regarding her fetus.

FIG. 94 illustrates presentation of virtual information in association with a scale.

FIGS. 95, 97A-97B, and 98 illustrate healthcare participants using an augmented reality head mounted component.

FIG. 96 illustrates a configuration wherein a surgeon uses an augmented reality system to conduct remotely-located manipulations.

FIGS. 111A-111B illustrate a conventional versus enhanced book reading presentation.

FIGS. 112A-112B illustrate a conventional versus enhanced story telling presentation.

FIG. 113 illustrates an embodiment wherein virtual presentation may be utilized to highlight keys to press during a piano lesson.

FIGS. 114-118 illustrate other teaching embodiments wherein augmented reality may be utilized in teaching and experiential environments.

FIGS. 119A-122C illustrate control over presentation and visualization of a user's actual space.

FIGS. 123A-123D illustrate a system embodiment being configured to interpret various geometric and/or temporal aspects of a user's functionality.

FIG. 124 illustrates selection of a user's own avatar.

FIGS. 125A and 125B illustrate gaming environments.

FIG. 126 illustrates a collaborative work environment.

FIGS. 127A and 127B illustrate two remotely-located users.

FIGS. 128A-128B illustrate a room outfitted with a motion analysis system.

FIGS. 129A-129C illustrate sensors being employed to monitor a user.

Figure 130:

FIG. 130 illustrates assisting a remote participant.

Figure 131:
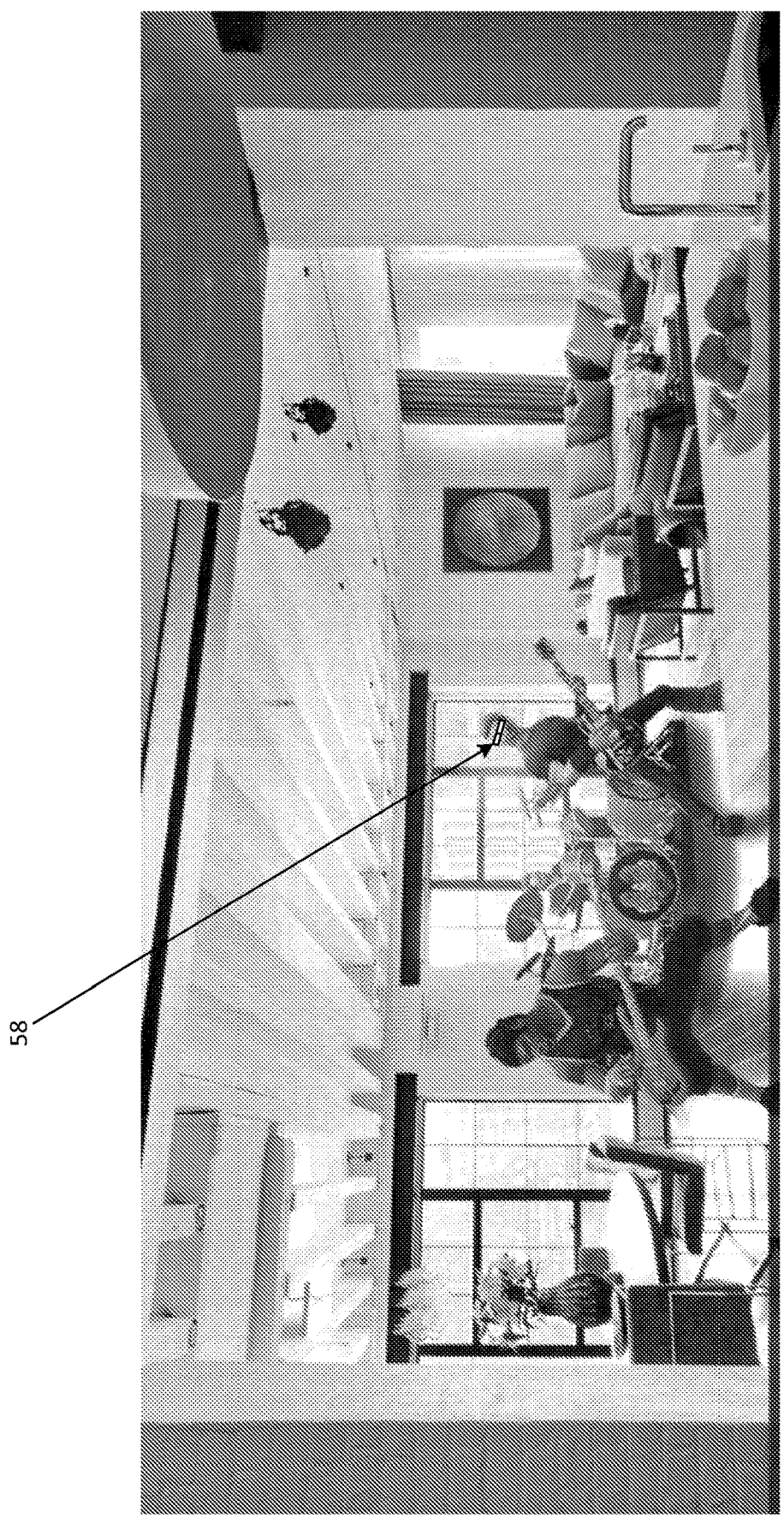

FIG. 131 shows a user in his/her local environment.

Figure 132:
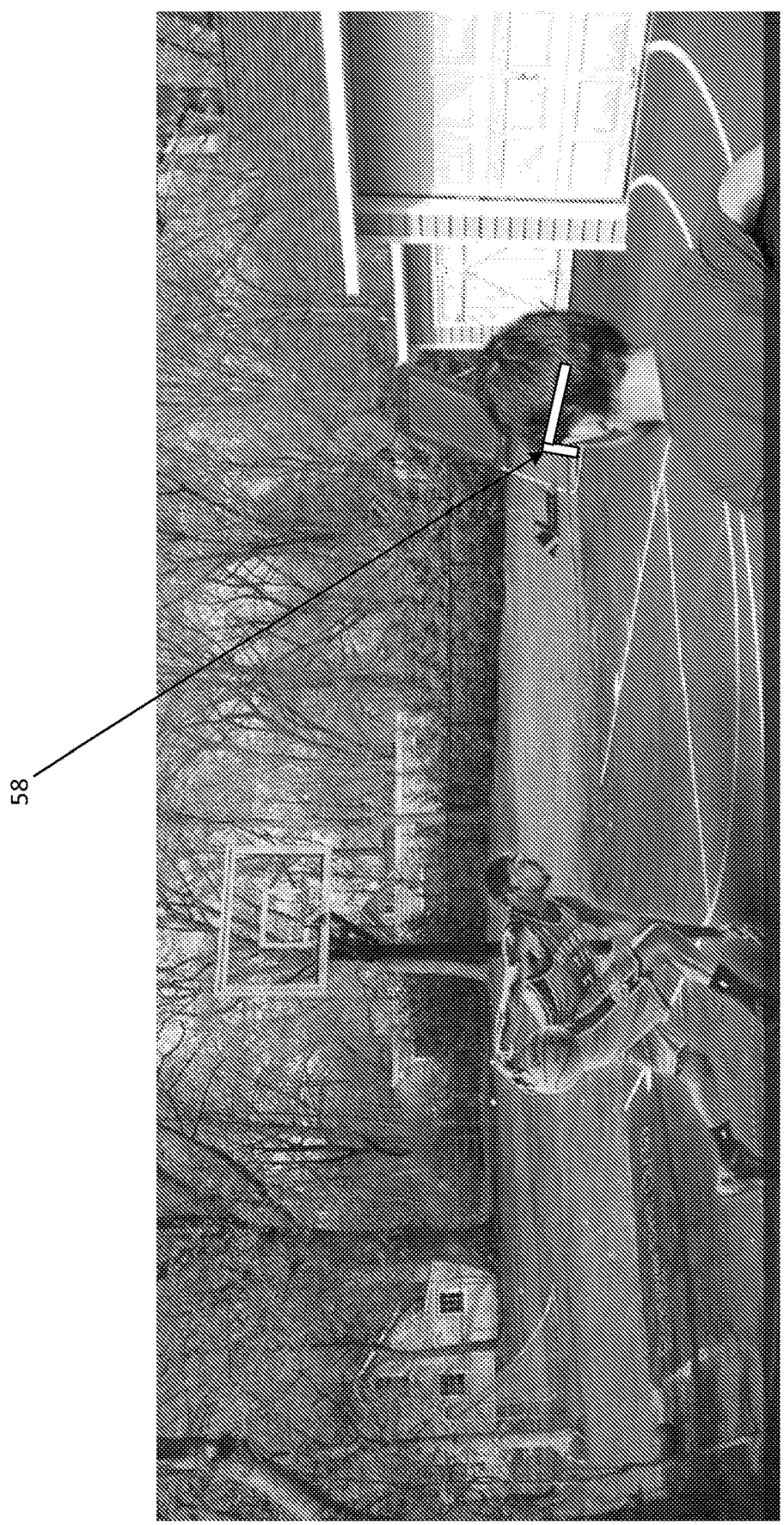

FIG. 132 illustrates two disparately located users collaborating.

Figure 133:

FIG. 133 illustrates a caregiver presented as an avatar.

Figure 134:

FIG. 134 illustrates museum visitors being presented with an avatar.

Figure 135:
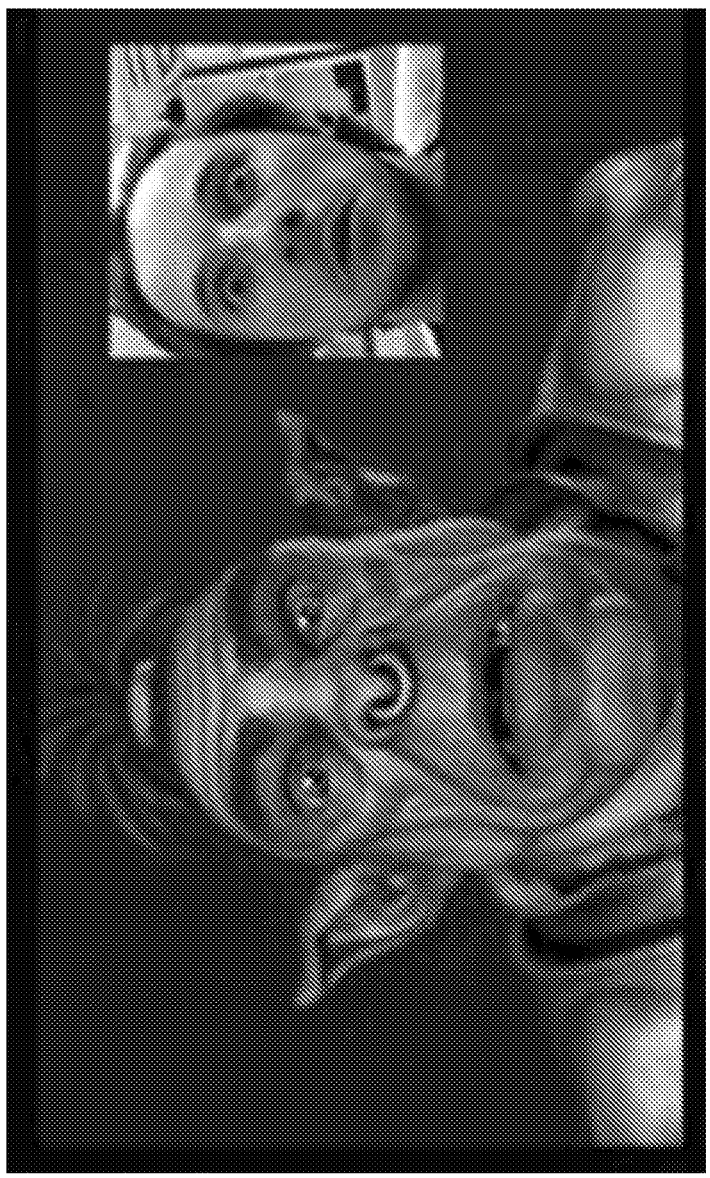

FIG. 135 illustrates a real or near-real time avatar visualization interface for users.

Figure 136:
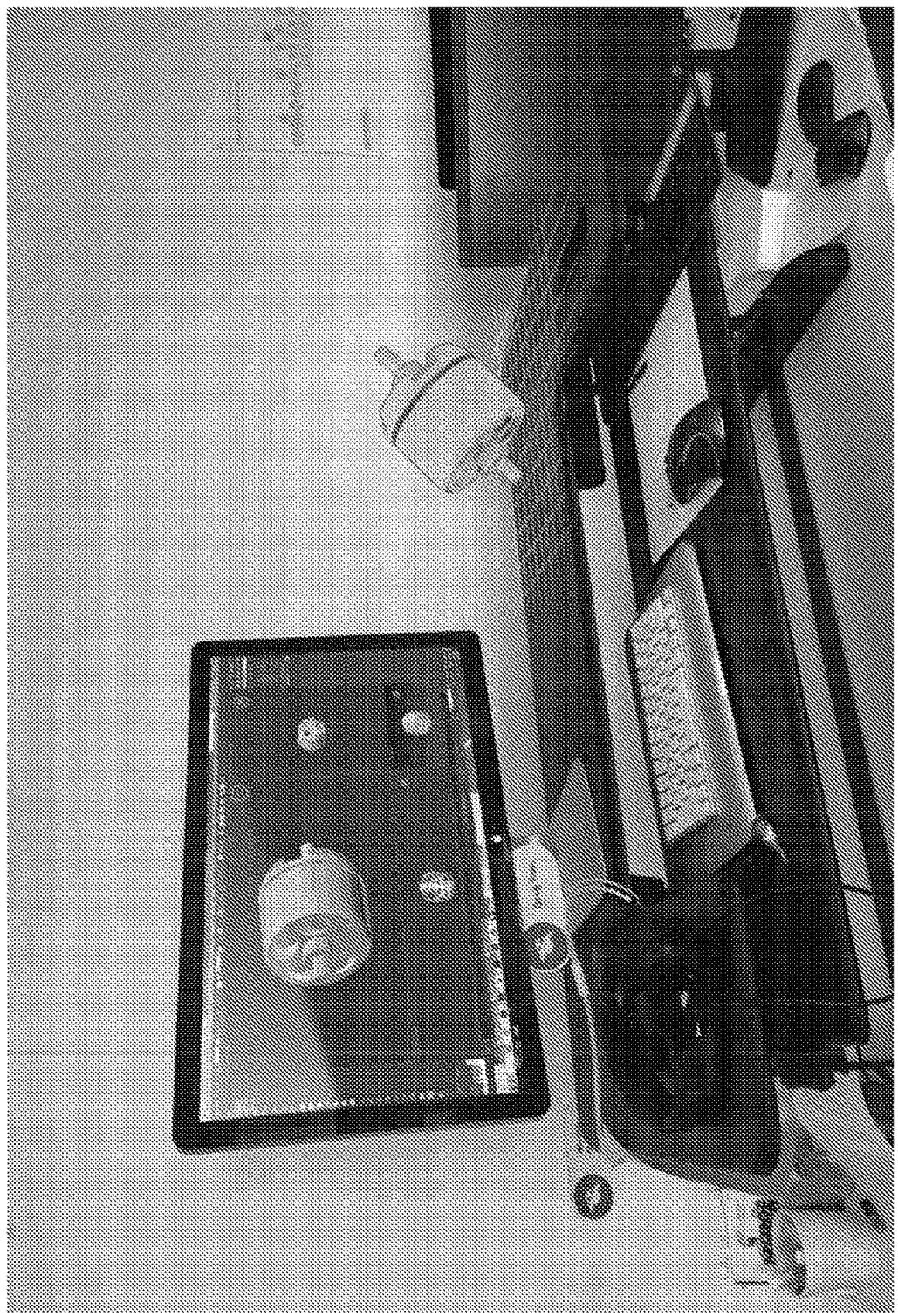

FIG. 136 illustrates a virtual reality workstation environment.

Figure 137:
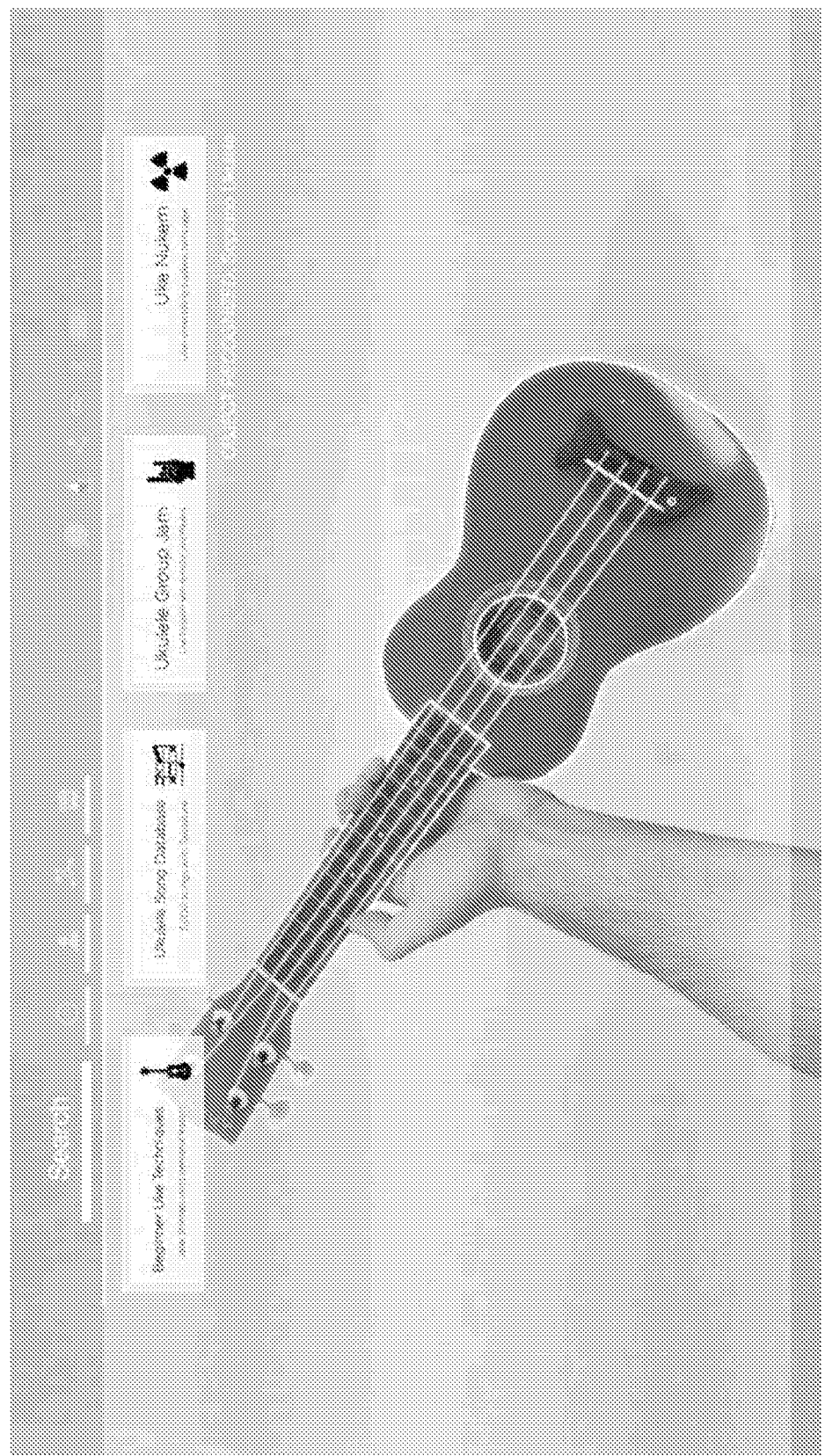

FIG. 137 illustrates an embodiment wherein virtual presentation may be utilized for a guitar lesson.

FIGS. 138A-138F illustrate various aspects of a pay configuration.

Figure 139A:
Figure 140:
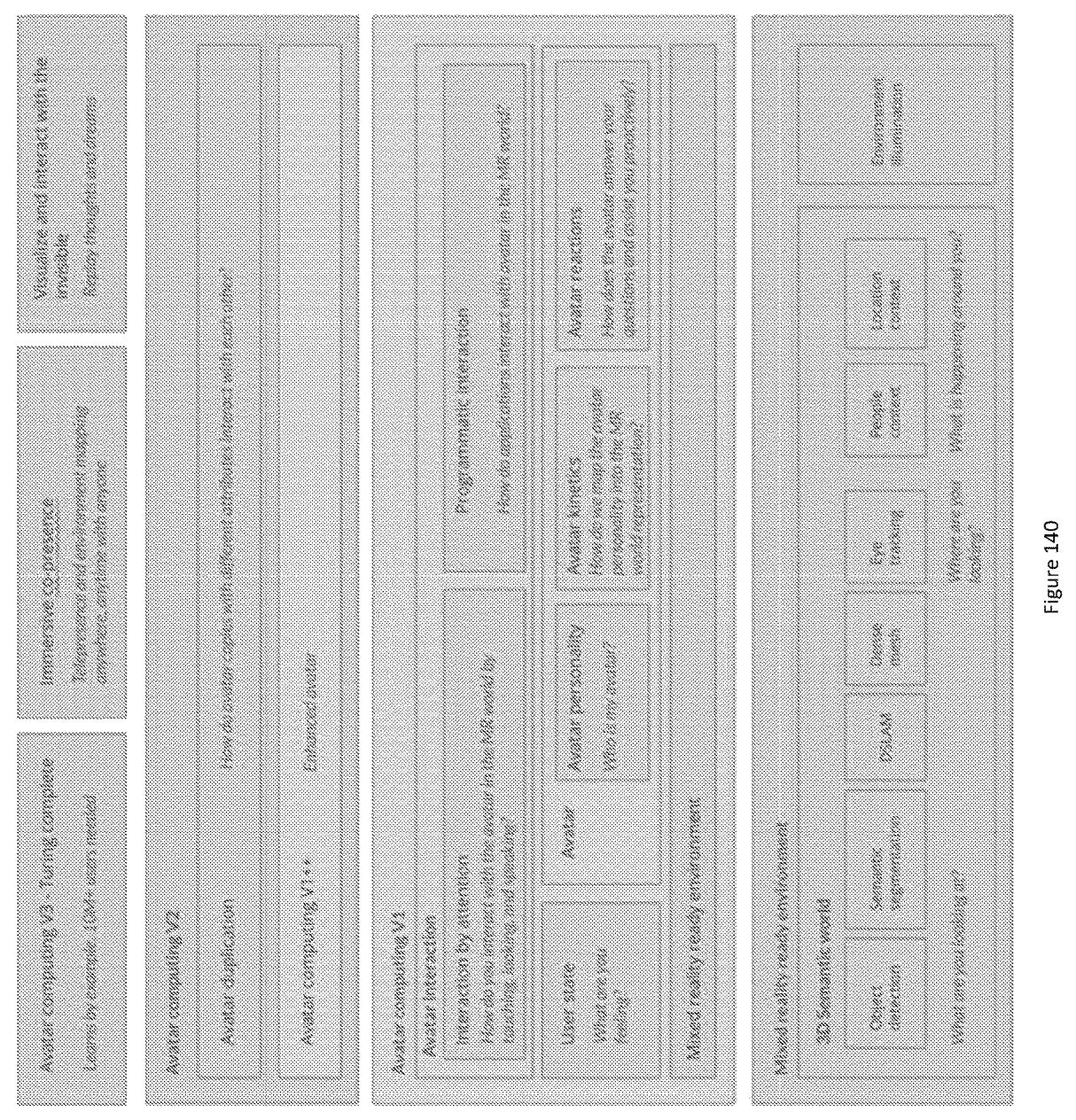

FIGS. 139A-140 illustrate presentation of a virtual avatar to assist a user in various tasks of everyday life.

Figure 141:
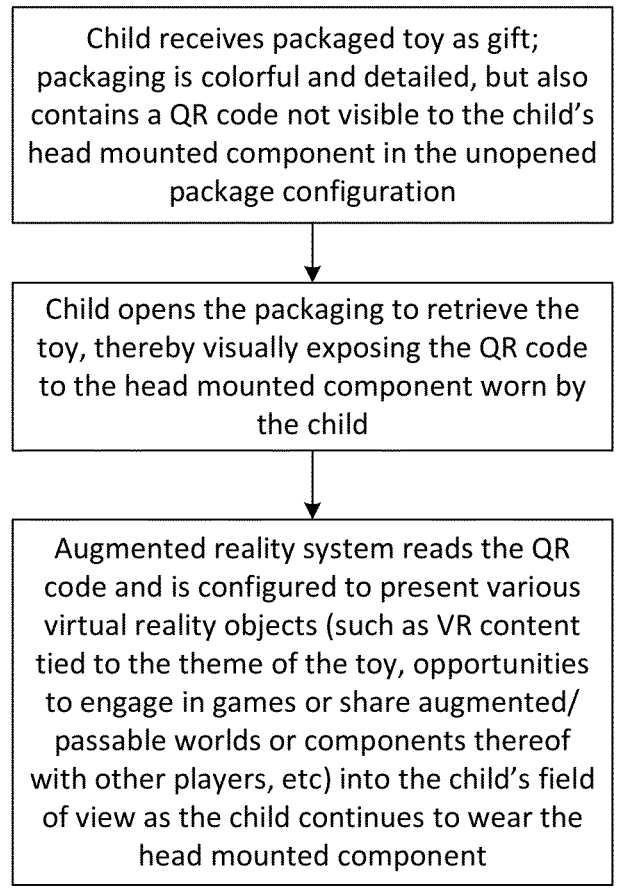

FIG. 141 illustrates an example flowchart for presenting virtual content based on a QR code.

Figure 142:
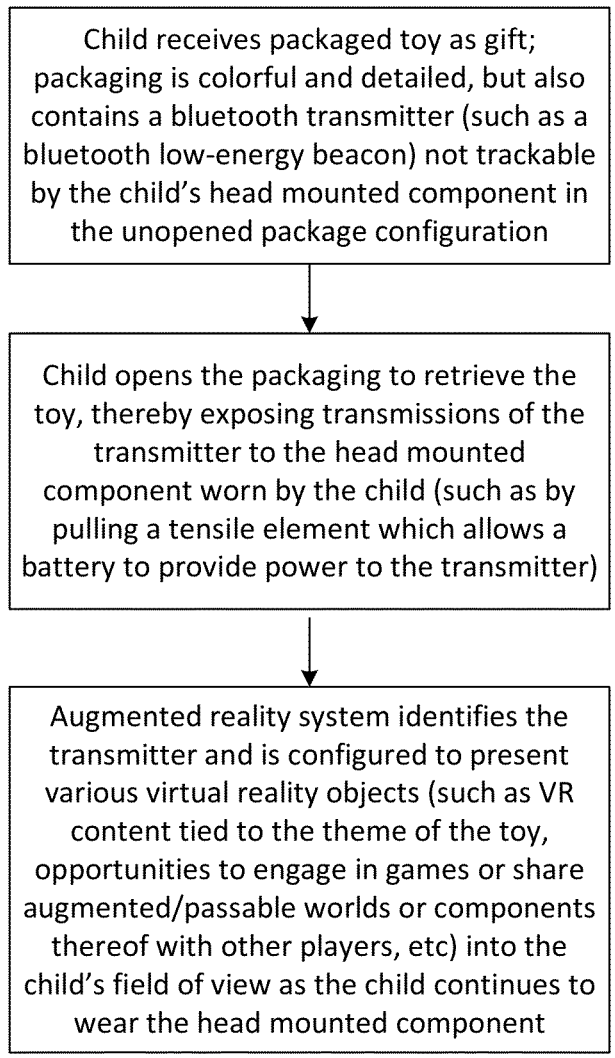

FIG. 142 illustrates an example flowchart for presenting virtual content based on a wireless transmitter.

Figure 143A:
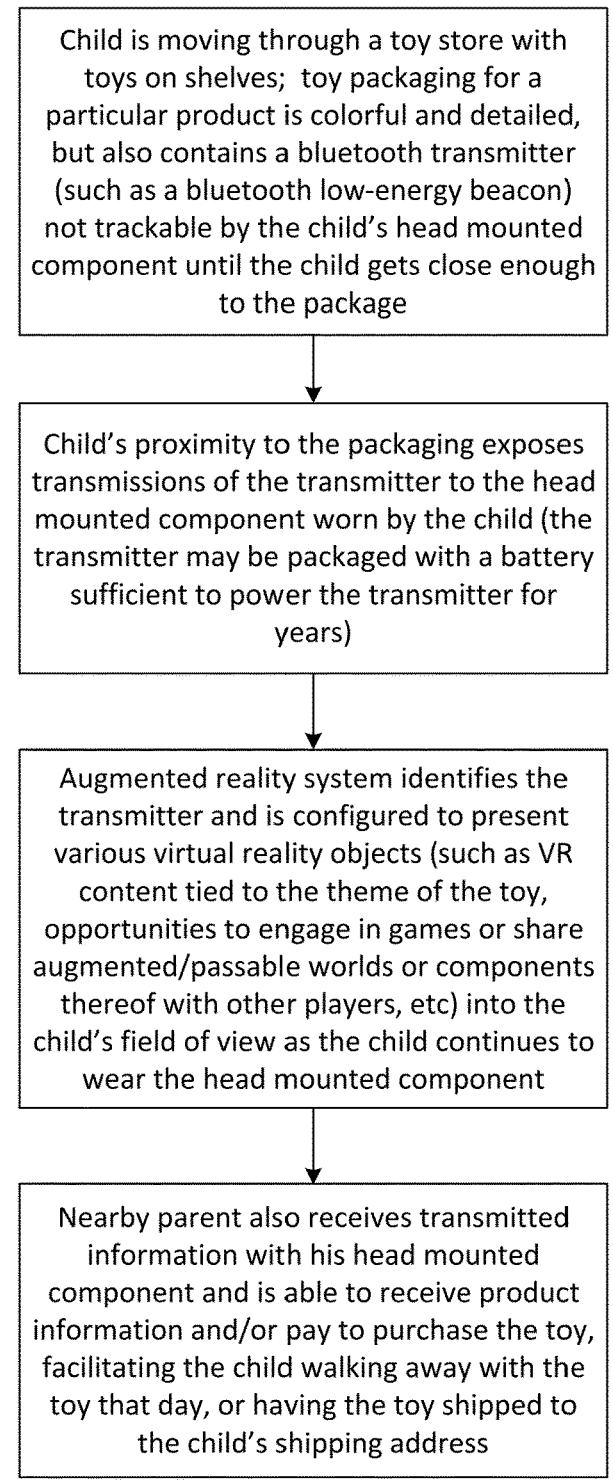

FIG. 143A illustrates an example flowchart for presenting virtual content in a store.

Figure 143B:
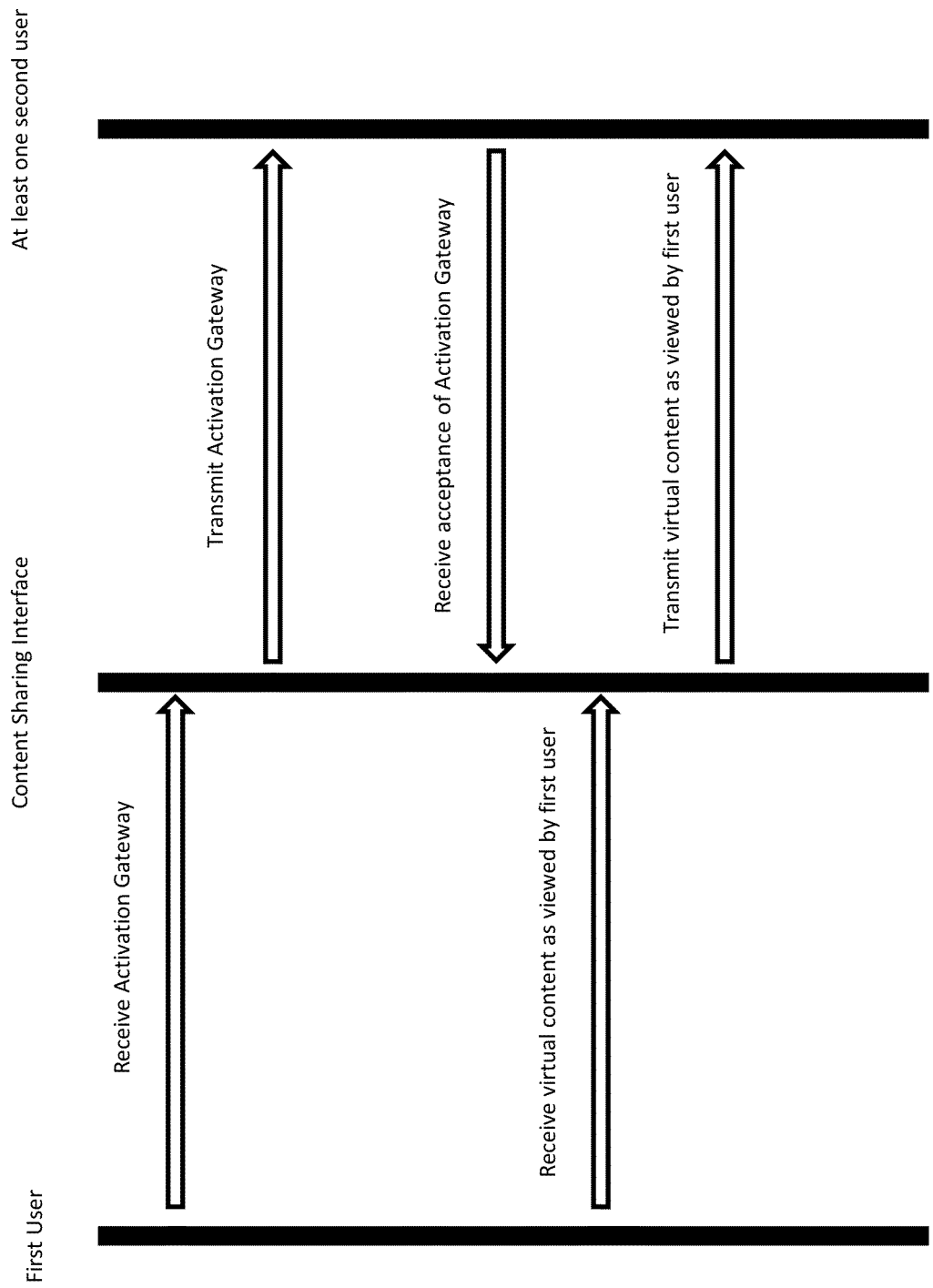
Figure 143C:
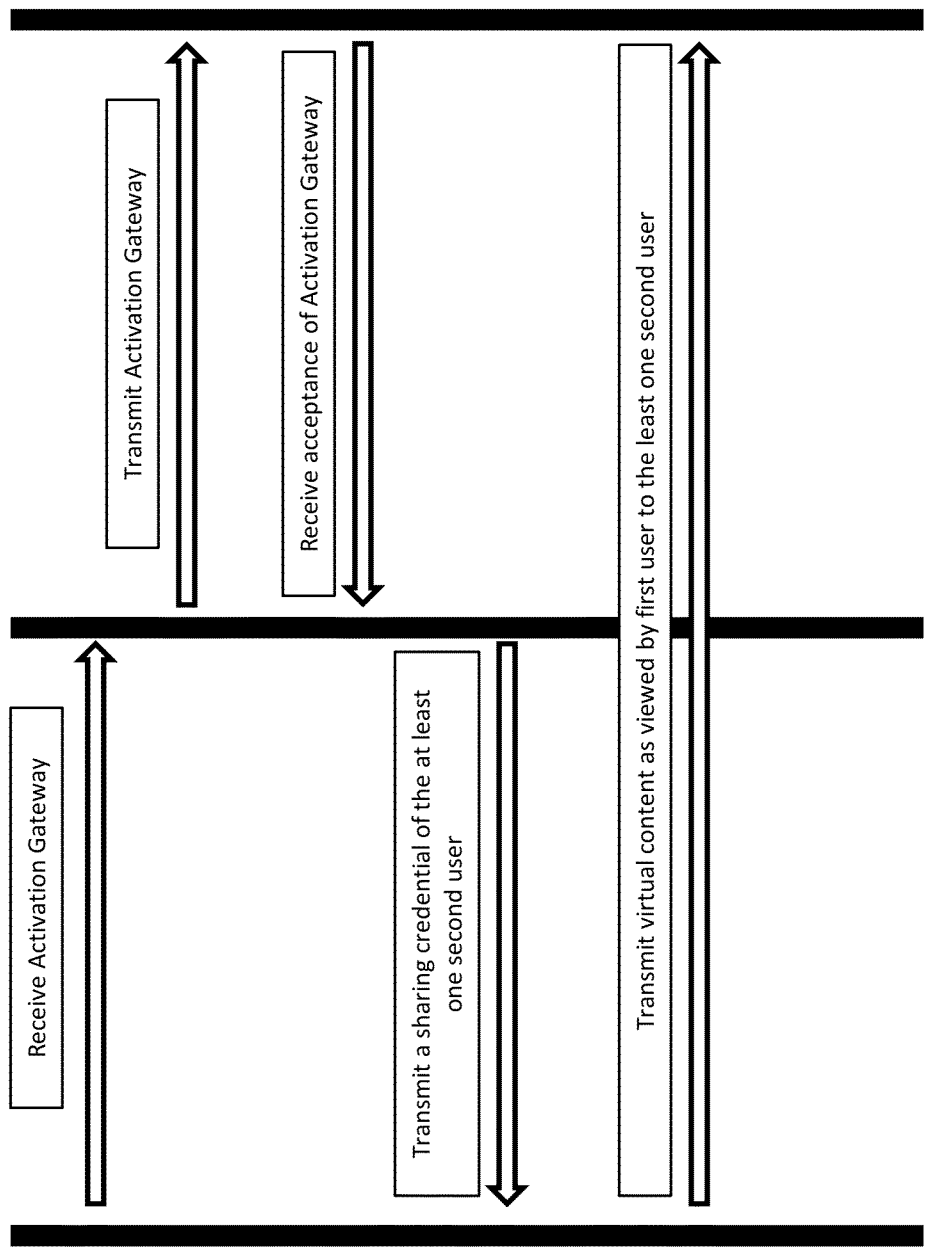

FIGS. 143B-C illustrate a method of interacting between multiple users upon a first user viewing certain content.

Figure 143D:
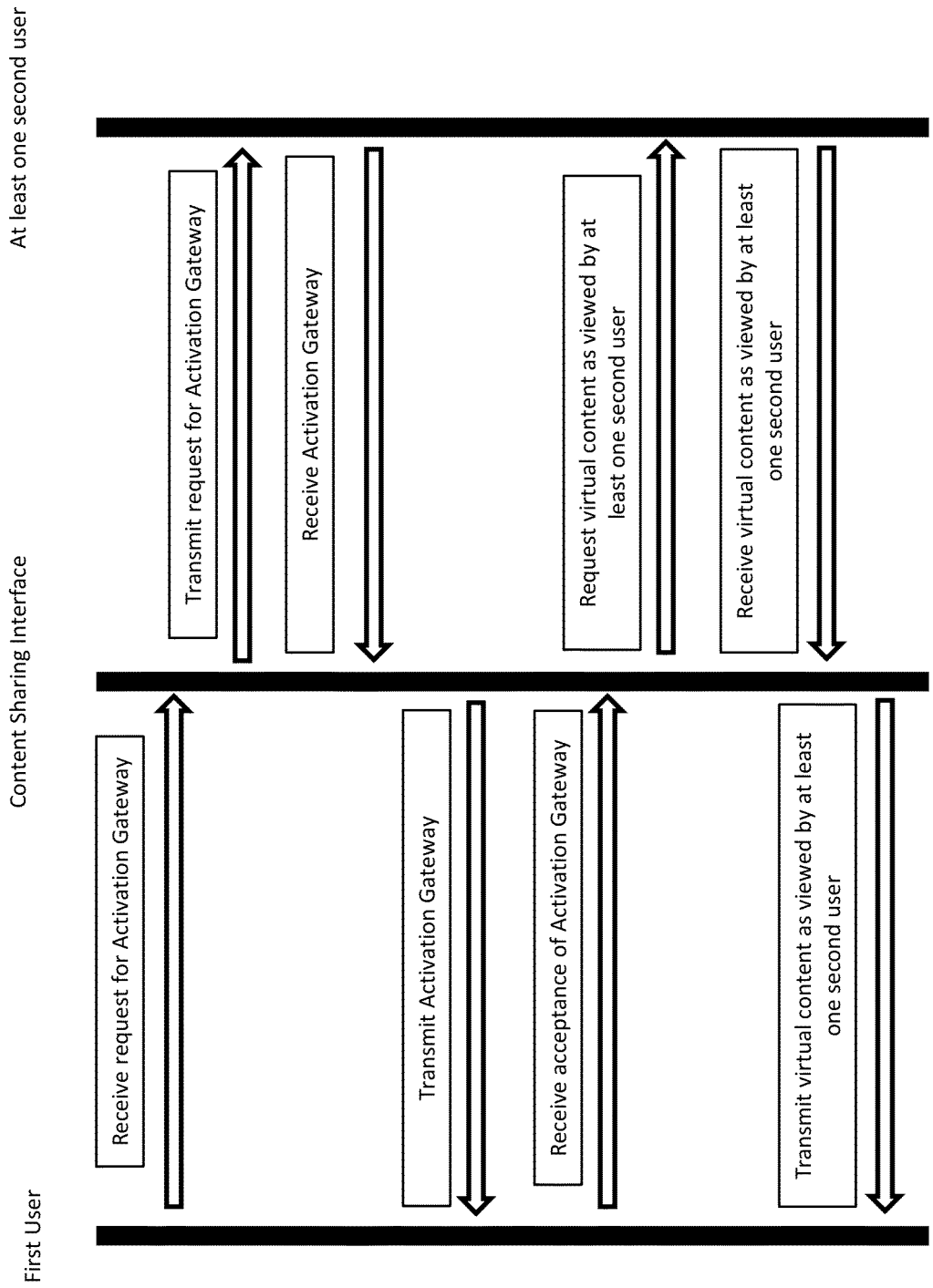
Figure 143E:
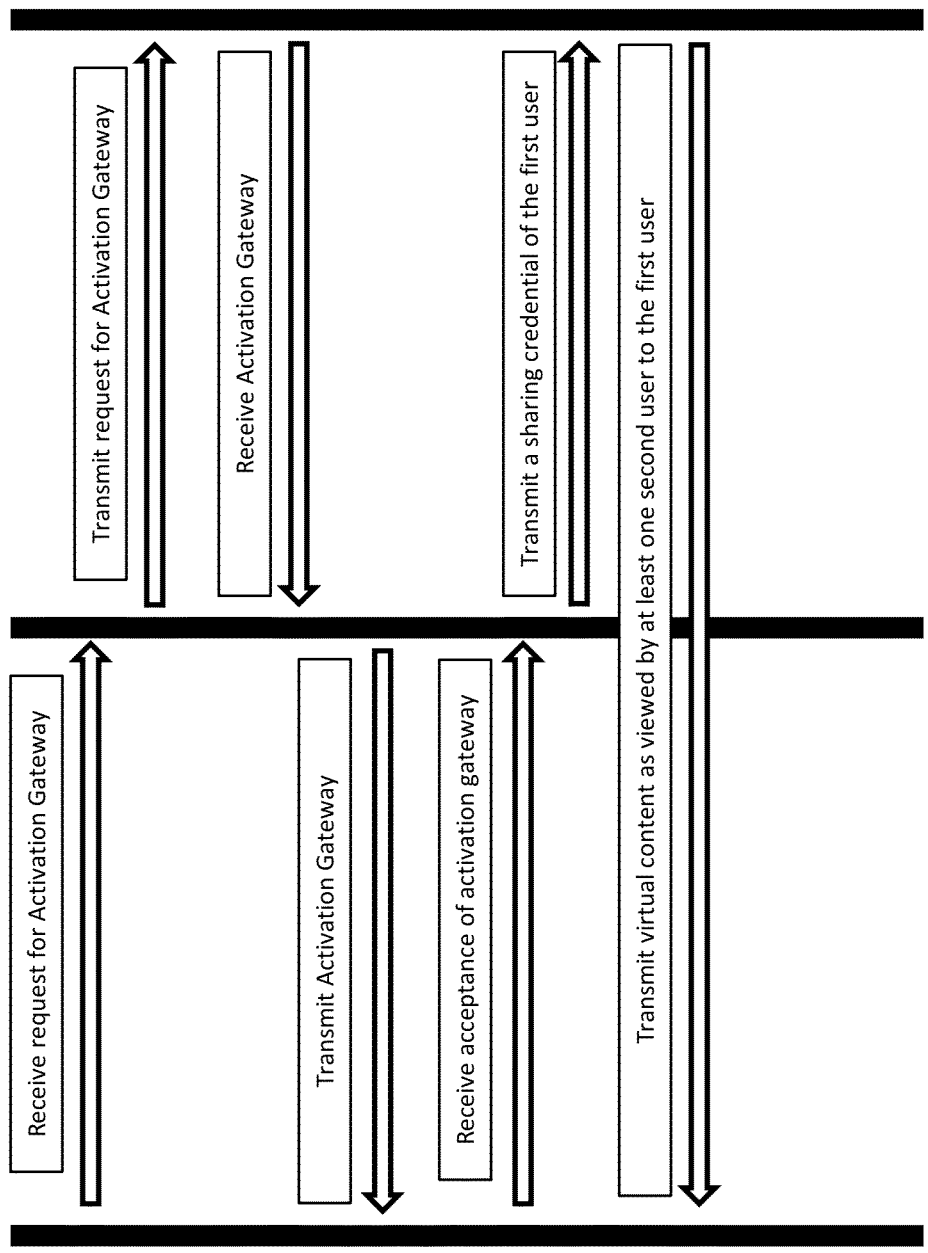

FIGS. 143D-E illustrate embodiments performing the initial steps in reverse protocol.

Figure 144:
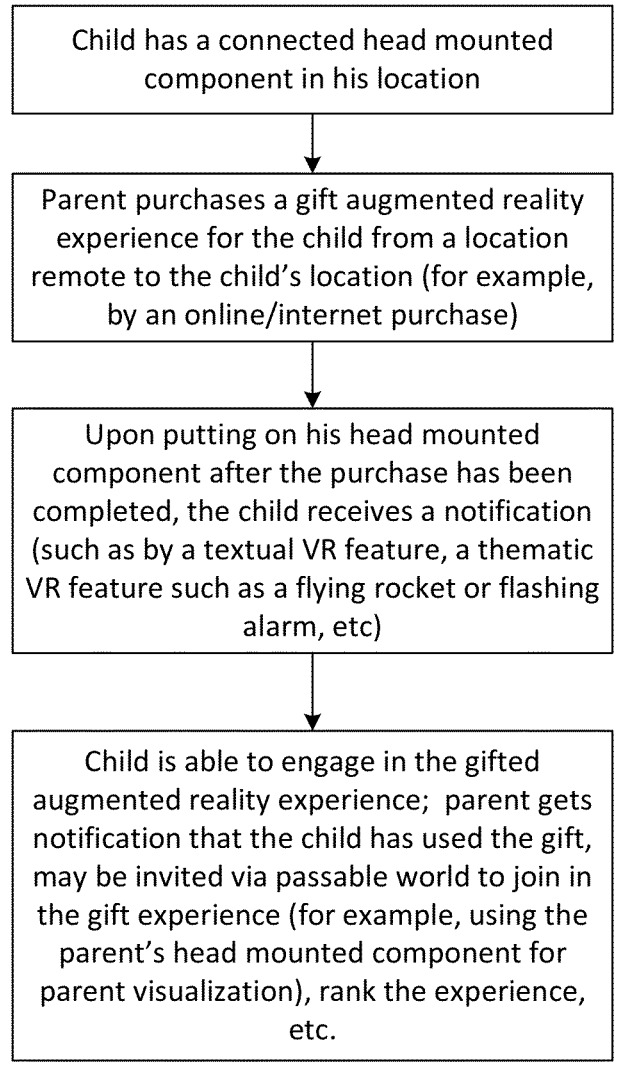

FIG. 144 illustrates an example flowchart for presenting virtual content to a parent.

Figure 145:
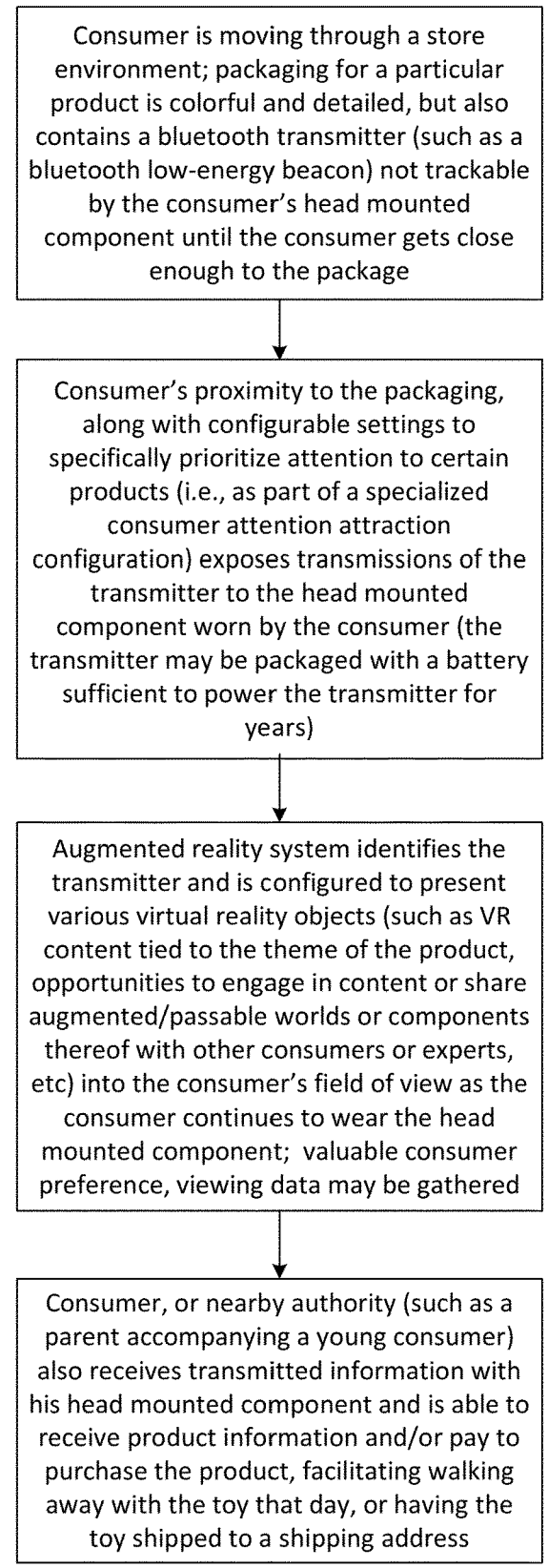

FIG. 145 illustrates an example flowchart for presenting virtual content in a store.

Figure 146:
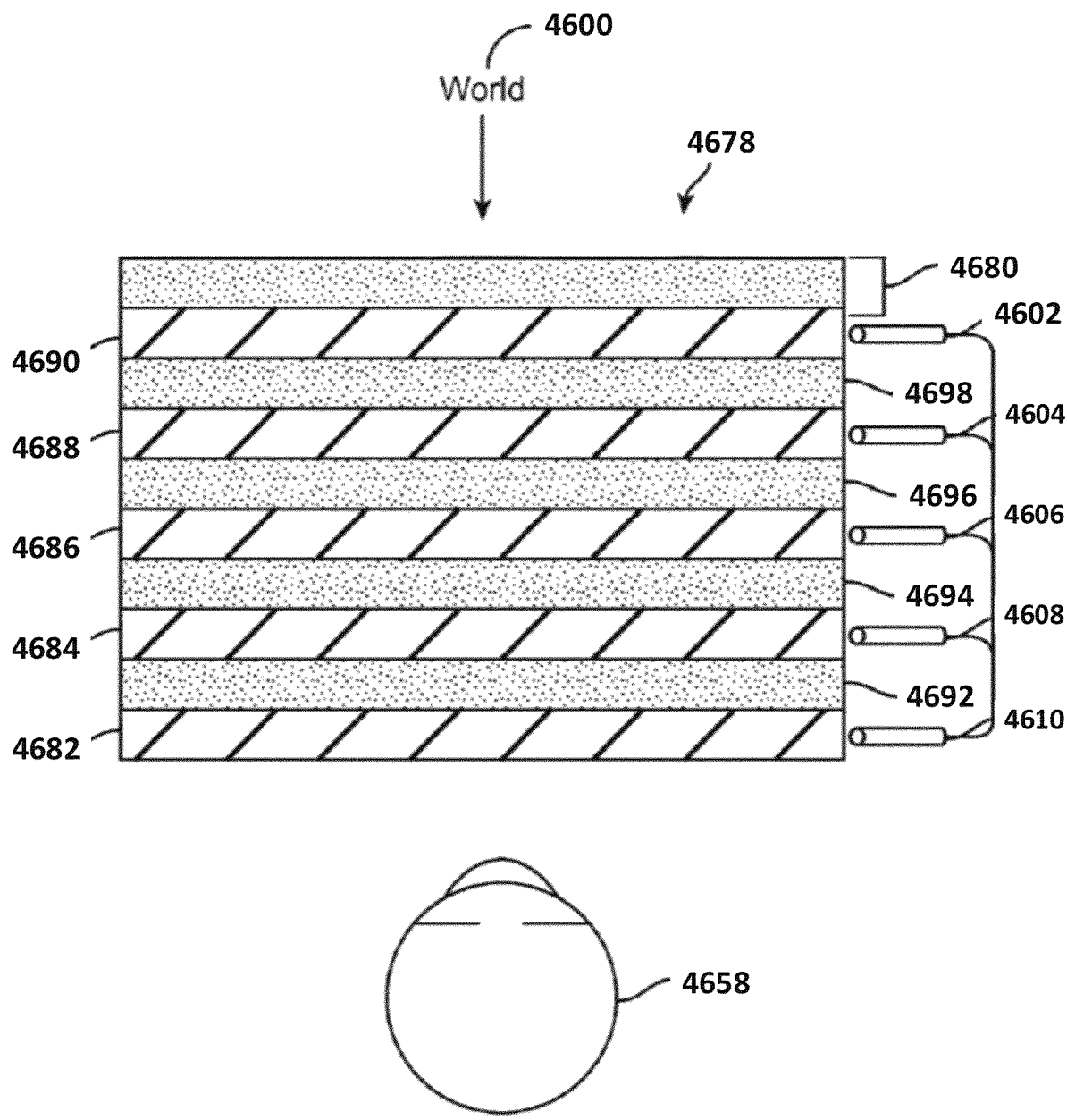

FIG. 146 illustrates a stacked waveguide assembly.

DETAILED DESCRIPTION

Referring to FIGS. 2A-2D, some general componentry options are illustrated. In the portions of the detailed description which follow the discussion of FIGS. 2A-2D, various systems, subsystems, and components are presented for addressing the objectives of providing a high-quality, comfortably-perceived display system for human VR and/or AR.

Figure 2A:
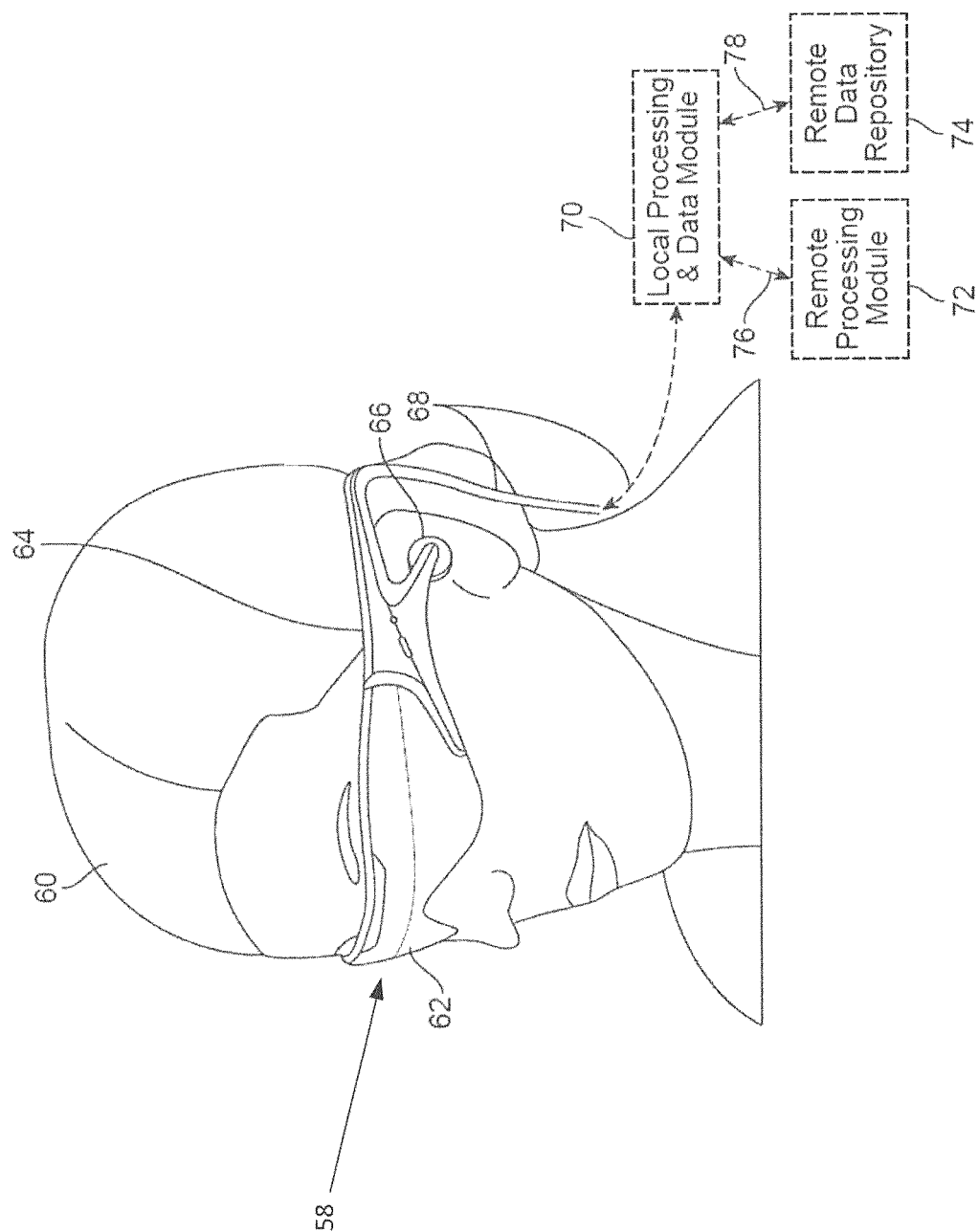
FIGS. 2A-2D illustrates an example of wearable display system.
Figure 2B:
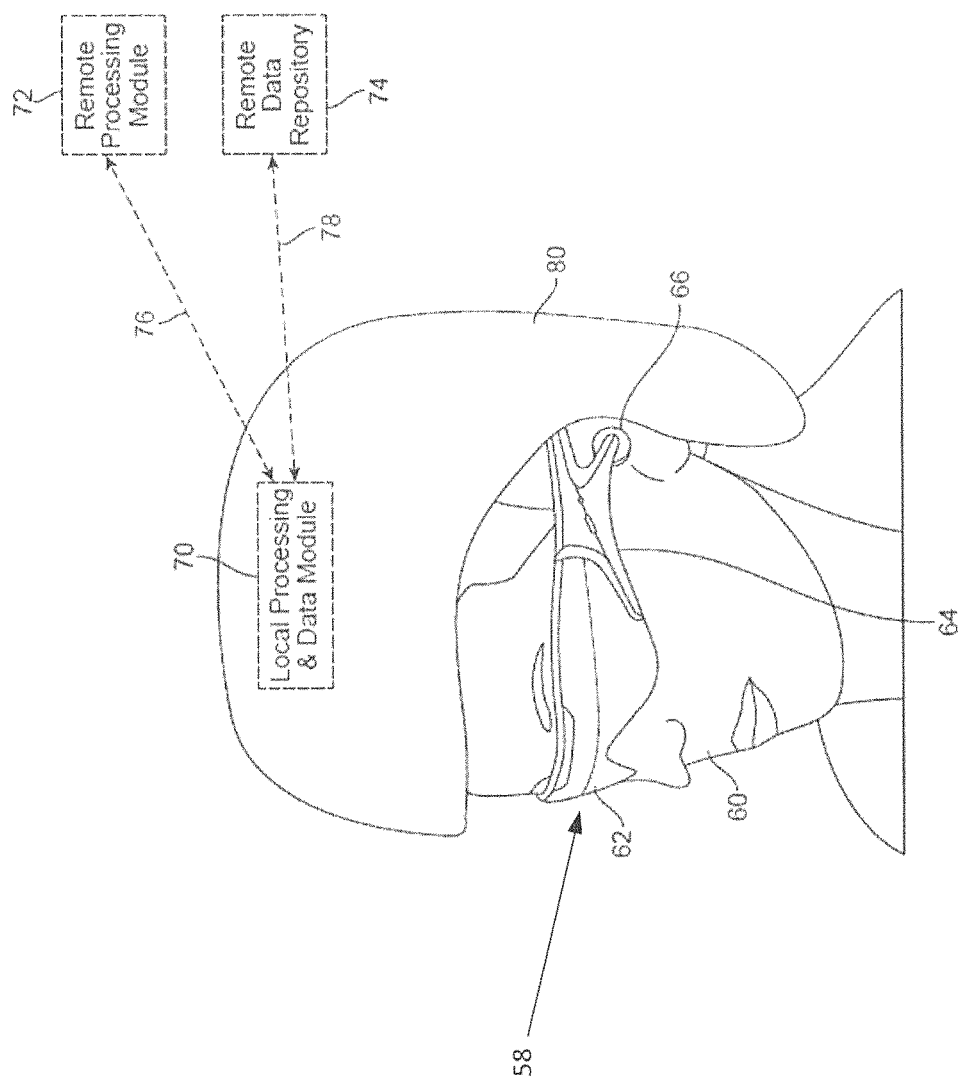
Figure 2C:
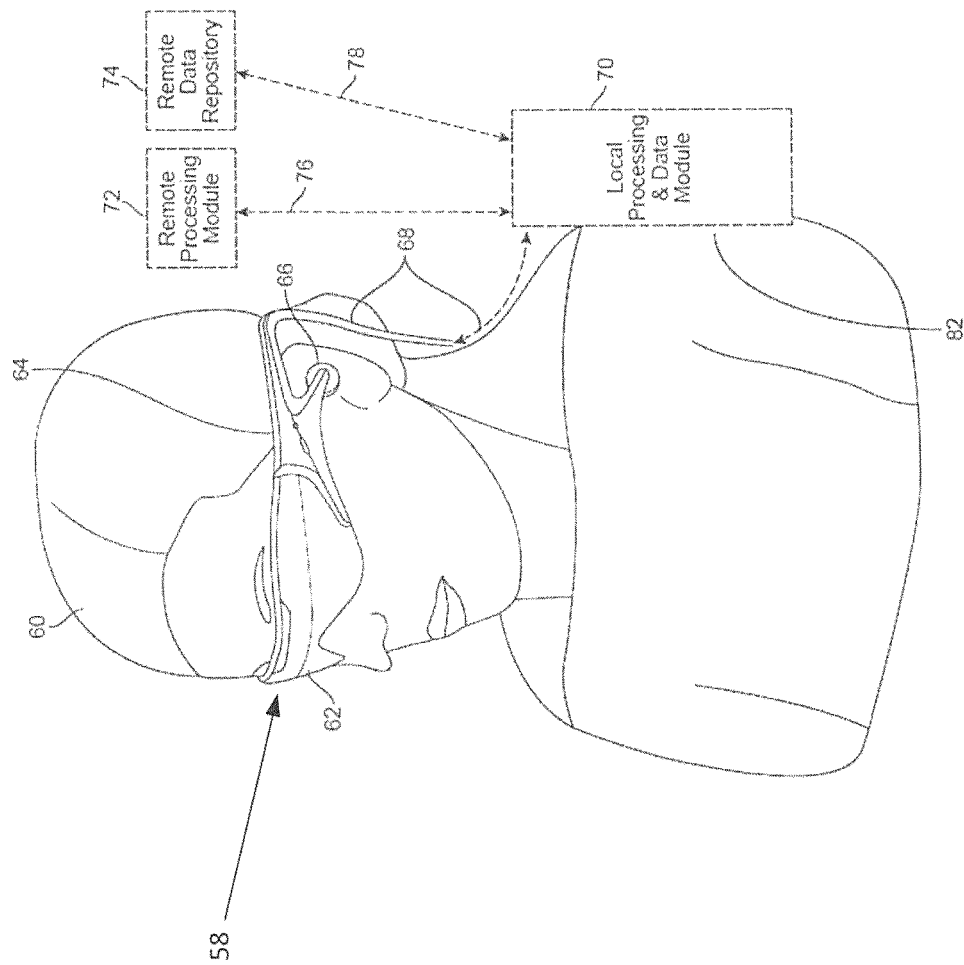
Figure 2D:
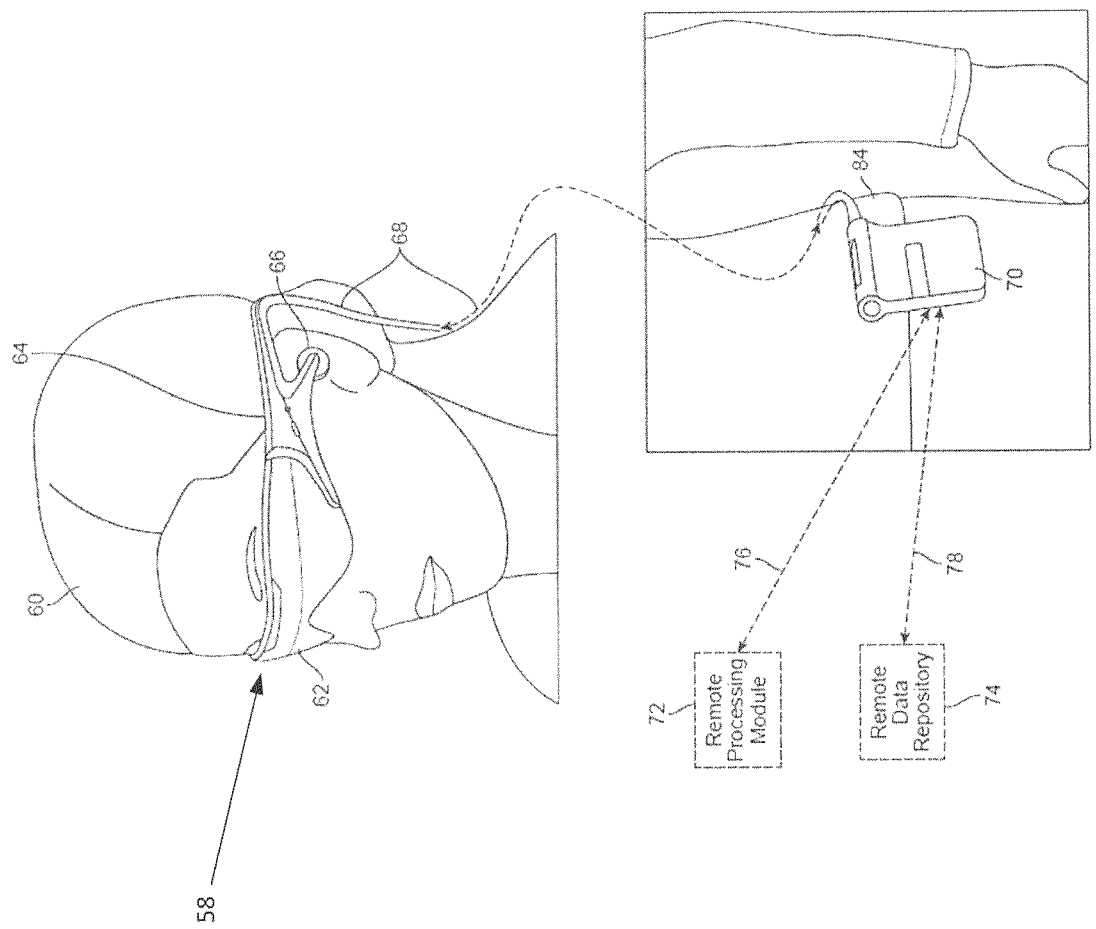

As shown in FIG. 2A, an AR system user (60) is depicted wearing head mounted component (58) featuring a frame (64) structure coupled to a display system (62) positioned in front of the eyes of the user. A speaker (66) is coupled to the frame (64) in the depicted configuration and positioned adjacent the ear canal of the user (in one embodiment, another speaker, not shown, is positioned adjacent the other ear canal of the user to provide for stereo/shapeable sound control). The display (62) is operatively coupled (68), such as by a wired lead or wireless connectivity, to a local processing and data module (70) which may be mounted in a variety of configurations, such as fixedly attached to the frame (64), fixedly attached to a helmet or hat (80) as shown in the embodiment of FIG. 2B, embedded in headphones, removably attached to the torso (82) of the user (60) in a backpack-style configuration as shown in the embodiment of FIG. 2C, or removably attached to the hip (84) of the user (60) in a belt-coupling style configuration as shown in the embodiment of FIG. 2D.

The local processing and data module (70) may comprise a power-efficient processor or controller, as well as computer storage media (e.g., digital memory), such as flash memory, both of which may be utilized to assist in the processing, caching, and storage of data a) captured from sensors which may be operatively coupled to the frame (64), such as image capture devices (such as cameras), microphones, inertial measurement units, accelerometers, compasses, GPS units, radio devices, and/or gyros; and/or b) acquired and/or processed using the remote processing module (72) and/or remote data repository (74), possibly for passage to the display (62) after such processing or retrieval. The local processing and data module (70) may be operatively coupled (76, 78), such as via a wired or wireless communication links, to the remote processing module (72) and remote data repository (74) such that these remote modules (72, 74) are operatively coupled to each other and available as resources to the local processing and data module (70).

In one embodiment, the remote processing module (72) may comprise one or more relatively powerful processors or controllers configured to analyze and process data and/or image information. In one embodiment, the remote data repository (74) may comprise a relatively large-scale digital data storage facility, which may be available through the internet or other networking configuration in a "cloud" resource configuration. In one embodiment, all data is stored and all computation is performed in the local processing and data module, allowing fully autonomous use from any remote modules.

Figure 3:
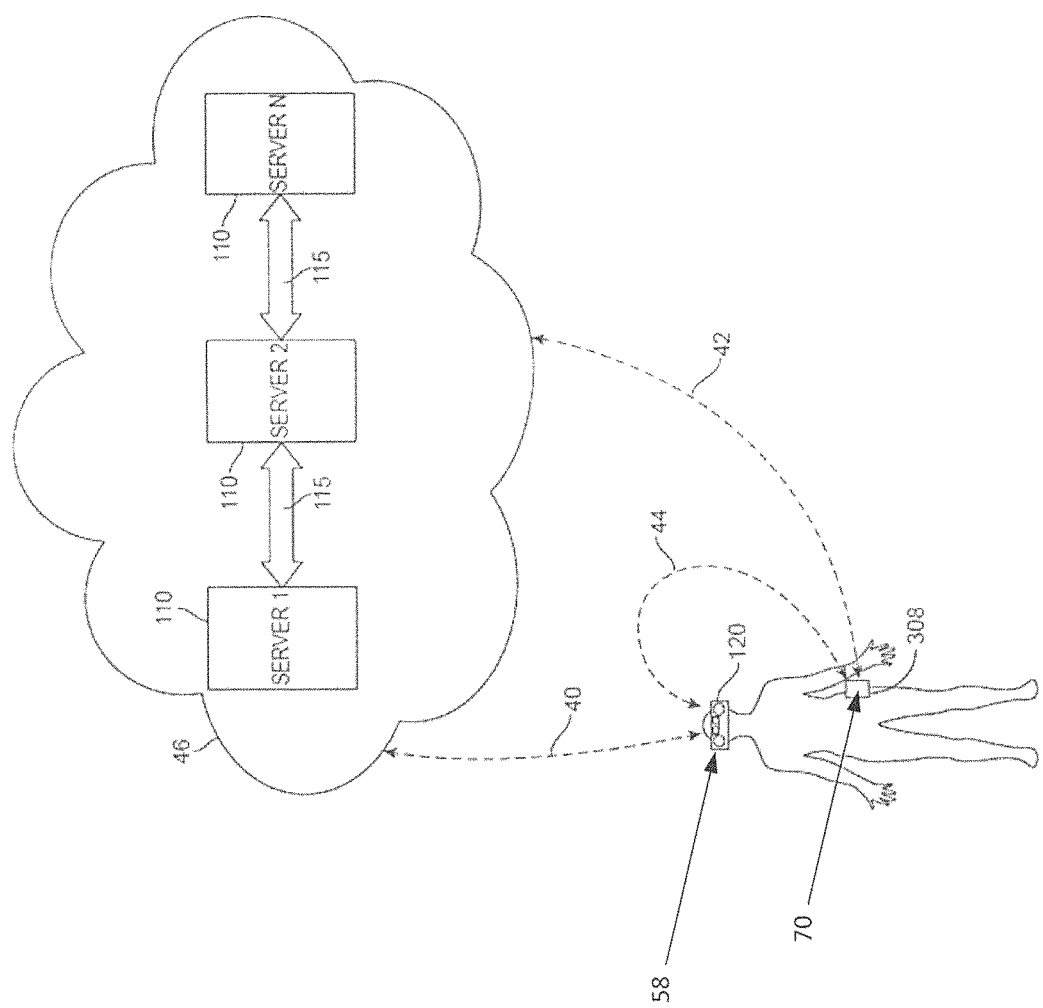
FIG. 3 is a schematic illustrating coordination between example cloud computing assets and example local processing assets.

Referring now to FIG. 3, a schematic illustrates coordination between the cloud computing assets (46) and local processing assets, which may, for example reside in head mounted componentry (58) coupled to the user's head (120) and a local processing and data module (70), coupled to the user's belt (308; therefore the component 70 may also be termed a "belt pack" 70), as shown in FIG. 3. In one embodiment, the cloud (46) assets, such as one or more server systems (110) are operatively coupled (115), such as via wired or wireless networking (wireless being preferred for mobility, wired being preferred for certain high-bandwidth or high-data-volume transfers that may be desired), directly to (40, 42) one or both of the local computing assets, such as processor and memory configurations, coupled to the user's head (120) and belt (308) as described above. These computing assets local to the user may be operatively coupled to each other as well, via wired and/or wireless connectivity configurations (44), such as the wired coupling (68) discussed below in reference to FIG. 8. In one embodiment, to maintain a low-inertia and small-size subsystem mounted to the user's head (120), primary transfer between the user and the cloud (46) may be via the link between the subsystem mounted at the belt (308) and the cloud, with the head mounted (120) subsystem primarily data-tethered to the belt-based (308) subsystem using wireless connectivity, such as ultra-wideband ("UWB") connectivity, as is currently employed, for example, in personal computing peripheral connectivity applications.

With efficient local and remote processing coordination, and an appropriate display device for a user, such as the user interface or user display system (62) shown in FIG. 2A, or variations thereof, aspects of one world pertinent to a user's current actual or virtual location may be transferred or "passed" to the user and updated in an efficient fashion. In other words, a map of the world may be continually updated at a storage location which may partially reside on the user's AR system and partially reside in the cloud resources. The map (also referred to as a "passable world model") may be a large database comprising raster imagery, 3-D and 2-D points, parametric information and other information about the real world. As more and more AR users continually capture information about their real environment (e.g., through cameras, sensors, IMUs, etc.), the map becomes more and more accurate and complete.

Figure 1:
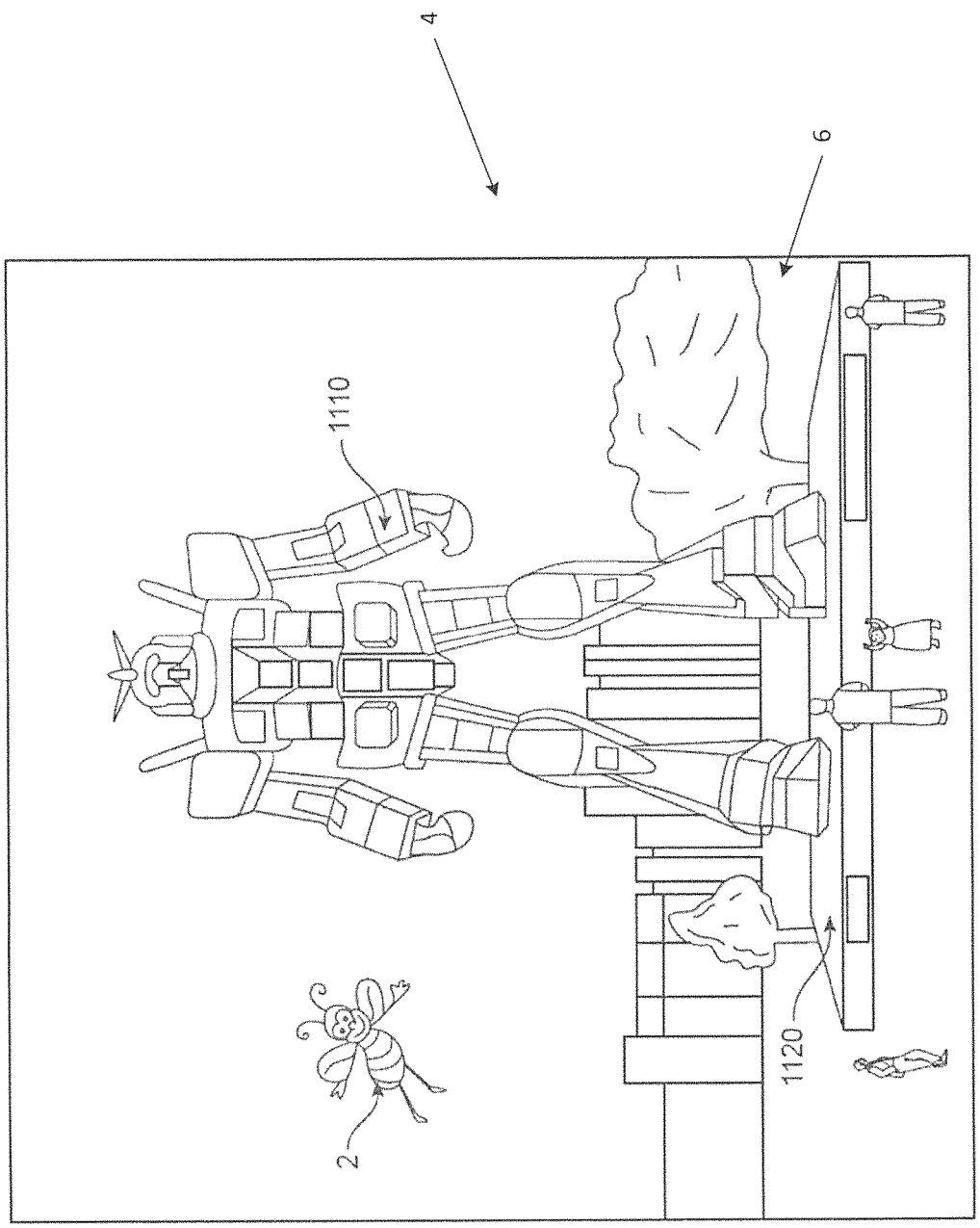
FIG. 1 illustrates a user's view of augmented reality (AR) through an AR device.

With a configuration as described above, wherein there is one world model that can reside on cloud computing resources and be distributed from there, such world can be "passable" to one or more users in a relatively low bandwidth form preferable to trying to pass around real-time video data or the like. The augmented experience of the person standing near the statue (e.g., as shown in FIG. 1) may be informed by the cloud-based world model, a subset of which may be passed down to them and their local display device to complete the view. A person sitting at a remote display device, which may be as simple as a personal computer sitting on a desk, can efficiently download that same section of information from the cloud and have it rendered on their display. Indeed, one person actually present in the park near the statue may take a remotely-located friend for a walk in that park, with the friend joining through virtual and augmented reality. The system will need to know where the street is, wherein the trees are, where the statue is—but with that information on the cloud, the joining friend can download from the cloud aspects of the scenario, and then start walking along as an augmented reality local relative to the person who is actually in the park.

3-D points may be captured from the environment, and the pose (e.g., vector and/or origin position information relative to the world) of the cameras that capture those images or points may be determined, so that these points or images may be "tagged", or associated, with this pose information. Then points captured by a second camera may be utilized to determine the pose of the second camera. In other words, one can orient and/or localize a second camera based upon comparisons with tagged images from a first camera. Then this knowledge may be utilized to extract textures, make maps, and create a virtual copy of the real world (because then there are two cameras around that are registered).

So at the base level, in one embodiment a person-worn system can be utilized to capture both 3-D points and the 2-D images that produced the points, and these points and images may be sent out to a cloud storage and processing resource. They may also be cached locally with embedded pose information (e.g., cache the tagged images); so the cloud may have on the ready (e.g., in available cache) tagged 2-D images (e.g., tagged with a 3-D pose), along with 3-D points. If a user is observing something dynamic, he may also send additional information up to the cloud pertinent to the motion (for example, if looking at another person's face, the user can take a texture map of the face and push that up at an optimized frequency even though the surrounding world is otherwise basically static). More information on object recognizers and the passable world model may be found in U.S. patent application Ser. No. 14/205,126, entitled "System and method for augmented and virtual reality", which is incorporated by reference in its entirety herein, along with the following additional disclosures, which related to augmented and virtual reality systems such as those developed by Magic Leap, Inc. of Fort Lauderdale, Fla.: U.S. patent application Ser. No. 14/641,376; U.S. patent application Ser. No. 14/555,585; U.S. patent application Ser. No. 14/212,961; U.S. patent application Ser. No. 14/690,401; U.S. patent application Ser. No. 13/663,466; and U.S. patent application Ser. No. 13/684,489.

GPS and other localization information may be utilized as inputs to such processing. Highly accurate localization of the user's head, totems, hand gestures, haptic devices etc. are crucial in displaying appropriate virtual content to the user.

One approach to achieve high precision localization may involve the use of an electromagnetic field coupled with electromagnetic sensors that are strategically placed on the user's AR head set, belt pack, and/or other ancillary devices (e.g., totems, haptic devices, gaming instruments, etc.). Electromagnetic tracking systems typically comprise at least an electromagnetic field emitter and at least one electromagnetic field sensor. The sensors may measure electromagnetic fields with a known distribution. Based on these measurements a position and orientation of a field sensor relative to the emitter is determined.

Figure 4:
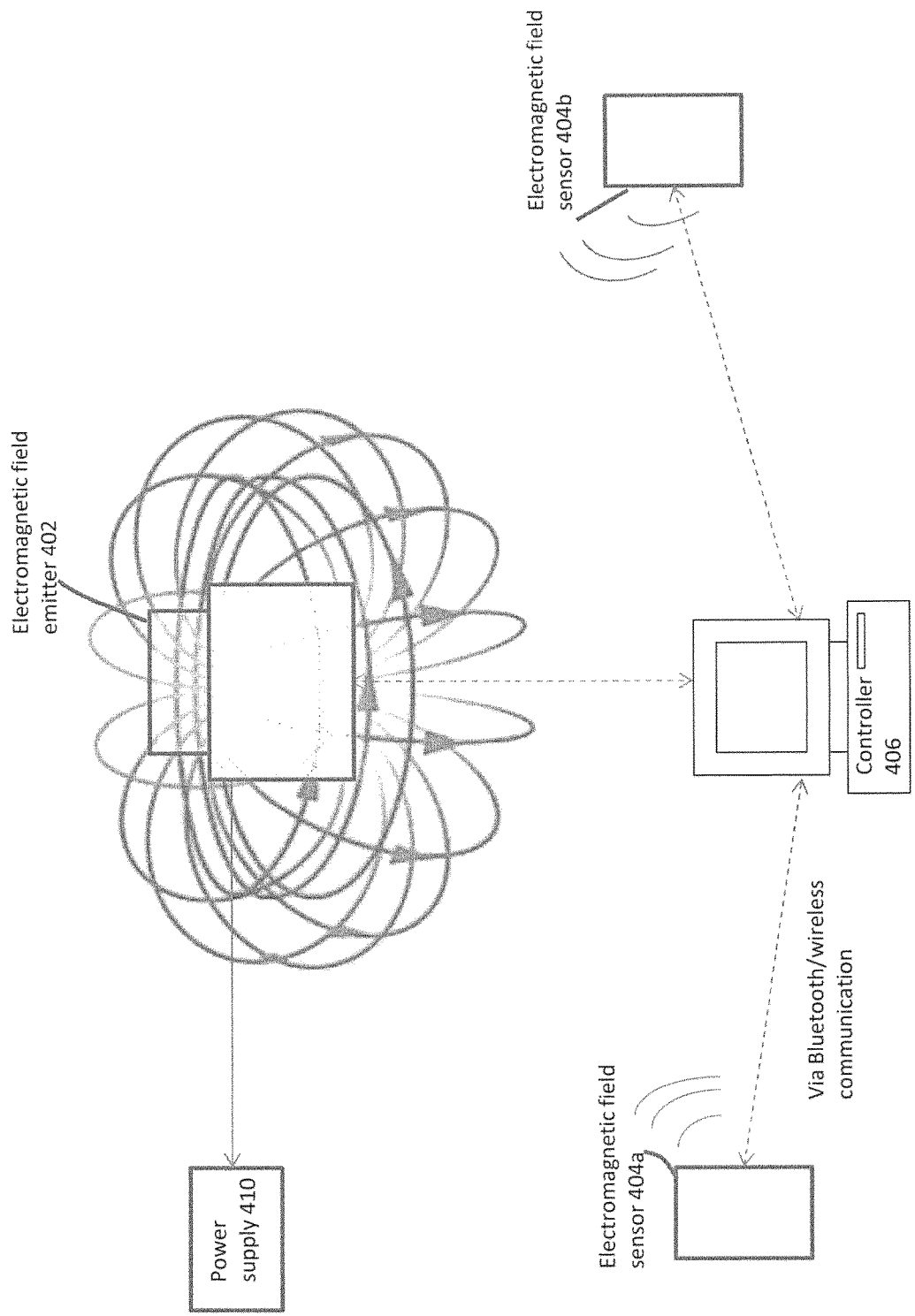
FIG. 4 illustrates an example system diagram of an electromagnetic tracking system.

Referring now to FIG. 4, an example system diagram of an electromagnetic tracking system (e.g., such as those developed by organizations such as the Biosense® division of Johnson & Johnson Corporation, Polhemus®, Inc. of Colchester, Vt., manufactured by Sixense® Entertainment, Inc. of Los Gatos, Calif., and other tracking companies) is illustrated. In one or more embodiments, the electromagnetic tracking system comprises an electromagnetic field emitter 402 which is configured to emit a known magnetic field. As shown in FIG. 4, the electromagnetic field emitter may be coupled to a power supply (e.g., electric current, batteries, etc.) to provide power to the emitter 402.

In one or more embodiments, the electromagnetic field emitter 402 comprises several coils (e.g., at least three coils positioned perpendicular to each other to produce field in the x, y and z directions) that generate magnetic fields. This magnetic field is used to establish a coordinate space. This allows the system to map a position of the sensors in relation to the known magnetic field, and helps determine a position and/or orientation of the sensors. In one or more embodiments, the electromagnetic sensors 404*a*, 404*b*, etc. may be attached to one or more real objects. The electromagnetic sensors 404 may comprise smaller coils in which current may be induced through the emitted electromagnetic field. Generally the "sensor" components (404) may comprise small coils or loops, such as a set of three differently-oriented (e.g., such as orthogonally oriented relative to each other) coils coupled together within a small structure such as a cube or other container, that are positioned/oriented to capture incoming magnetic flux from the magnetic field emitted by the emitter (402), and by comparing currents induced through these coils, and knowing the relative positioning and orientation of the coils relative to each other, relative position and orientation of a sensor relative to the emitter may be calculated.

Figure 6:
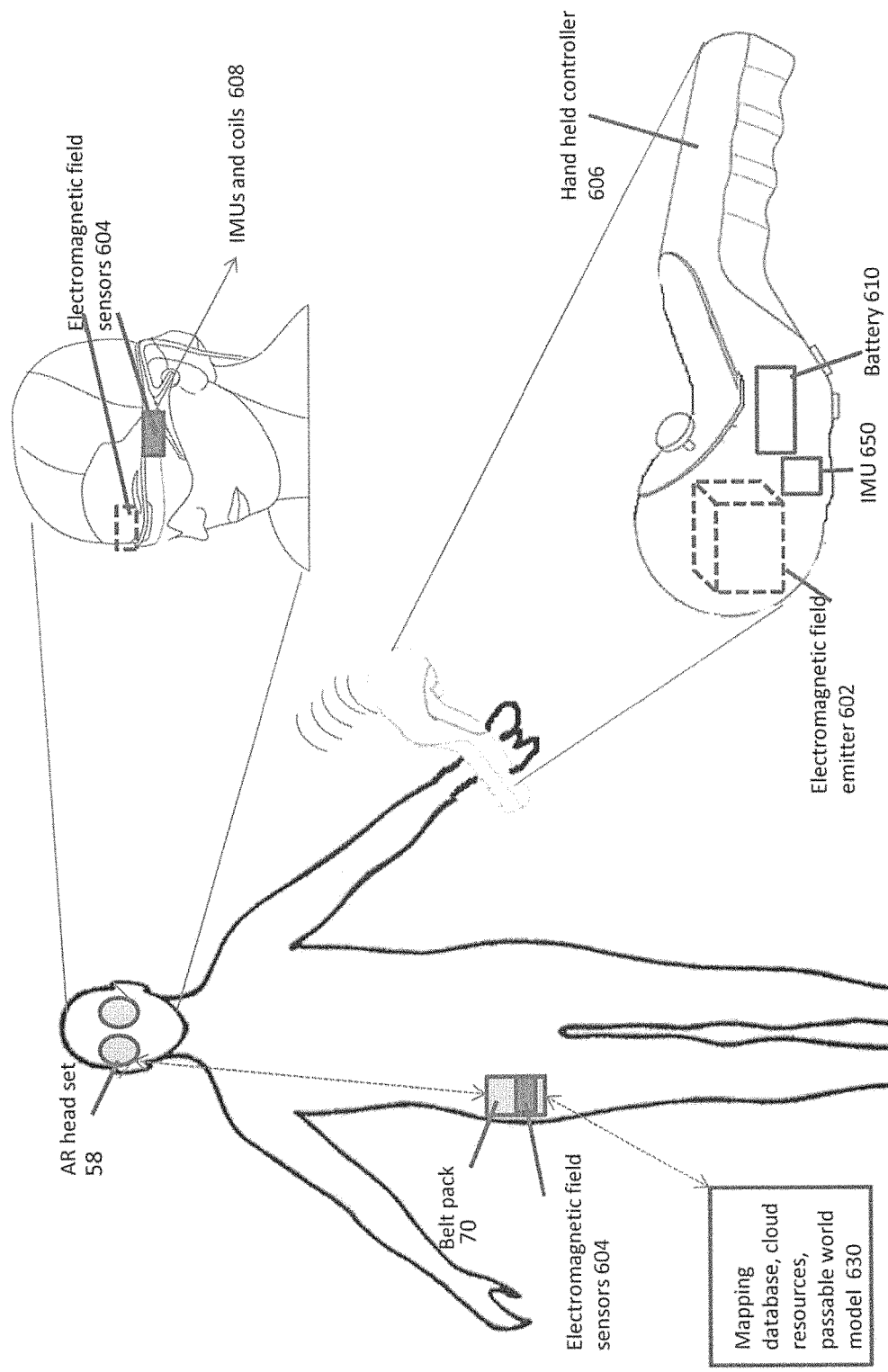
FIG. 6 illustrates an electromagnetic tracking system that may be incorporated with an AR system.

One or more parameters pertaining to a behavior of the coils and inertial measurement unit ("IMU") components operatively coupled to the electromagnetic tracking sensors may be measured to detect a position and/or orientation of the sensor (and the object to which it is attached to) relative to a coordinate system to which the electromagnetic field emitter is coupled. In one or more embodiments, multiple sensors may be used in relation to the electromagnetic emitter to detect a position and orientation of each of the sensors within the coordinate space. The electromagnetic tracking system may provide positions in three directions (e.g., X, Y and Z directions), and further in two or three orientation angles. In one or more embodiments, measurements of the IMU may be compared to the measurements of the coil to determine a position and orientation of the sensors. In one or more embodiments, both electromagnetic (EM) data and IMU data, along with various other sources of data, such as cameras, depth sensors, and other sensors, may be combined to determine the position and orientation. This information may be transmitted (e.g., wireless communication, Bluetooth®, etc.) to the controller 406. In one or more embodiments, pose (or position and orientation) may be reported at a relatively high refresh rate in conventional systems. Conventionally an electromagnetic emitter is coupled to a relatively stable and large object, such as a table, operating table, wall, or ceiling, and one or more sensors are coupled to smaller objects, such as medical devices, handheld gaming components, or the like. Alternatively, as described below in reference to FIG. 6, various features of the electromagnetic tracking system may be employed to produce a configuration wherein changes or deltas in position and/or orientation between two objects that move in space relative to a more stable global coordinate system may be tracked; in other words, a configuration is shown in FIG. 6 wherein a variation of an electromagnetic tracking system may be utilized to track position and orientation delta between a head-mounted component and a hand-held component, while head pose relative to the global coordinate system (say of the room environment local to the user) is determined otherwise, such as by simultaneous localization and mapping ("SLAM") techniques using outward-capturing cameras which may be coupled to the head mounted component of the system.

The controller 406 may control the electromagnetic field generator 402, and may also capture data from the various electromagnetic sensors 404. It should be appreciated that the various components of the system may be coupled to each other through any electro-mechanical or wireless/Bluetooth® means. The controller 406 may also comprise data regarding the known magnetic field, and the coordinate space in relation to the magnetic field. This information is then used to detect the position and orientation of the sensors in relation to the coordinate space corresponding to the known electromagnetic field.

One advantage of electromagnetic tracking systems is that they produce highly accurate tracking results with minimal latency and high resolution. Additionally, the electromagnetic tracking system does not necessarily rely on optical trackers, and sensors/objects not in the user's line-of-vision may be easily tracked.

It should be appreciated that the strength of the electromagnetic field v drops as a cubic function of distance r from a coil transmitter (e.g., electromagnetic field emitter 402). Thus, an algorithm may be required based on a distance away from the electromagnetic field emitter. The controller 406 may be configured with such algorithms to determine a position and orientation of the sensor/object at varying distances away from the electromagnetic field emitter. Given the rapid decline of the strength of the electromagnetic field as one moves farther away from the electromagnetic emitter, best results, in terms of accuracy, efficiency and low latency, may be achieved at closer distances. In typical electromagnetic tracking systems, the electromagnetic field emitter is powered by electric current (e.g., plug-in power supply) and has sensors located within 20 ft radius away from the electromagnetic field emitter. A shorter radius between the sensors and field emitter may be more desirable in many applications, including AR applications.

Figure 5:
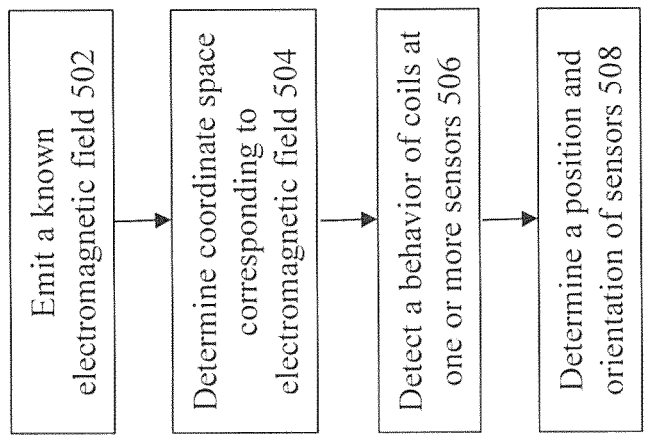
FIG. 5 illustrates an example flowchart describing a functioning of an example electromagnetic tracking system.

Referring now to FIG. 5, an example flowchart describing a functioning of a typical electromagnetic tracking system is briefly described. At 502, a known electromagnetic field is emitted. In one or more embodiments, the magnetic field emitter may generate magnetic fields each coil may generate an electric field in one direction (e.g., x, y or z). The magnetic fields may be generated with an arbitrary waveform. In one or more embodiments, each of the axes may oscillate at a slightly different frequency. At 504, a coordinate space corresponding to the electromagnetic field may be determined. For example, the control 406 of FIG. 4 may automatically determine a coordinate space around the emitter based on the electromagnetic field. At 506, a behavior of the coils at the sensors (which may be attached to a known object) may be detected. For example, a current induced at the coils may be calculated. In other embodiments, a rotation of coils, or any other quantifiable behavior may be tracked and measured. At 508, this behavior may be used to detect a position and orientation of the sensor(s) and/or known object. For example, the controller 406 may consult a mapping table that correlates a behavior of the coils at the sensors to various positions or orientations. Based on these calculations, the position in the coordinate space along with the orientation of the sensors may be determined.

In the context of AR systems, one or more components of the electromagnetic tracking system may need to be modified to facilitate accurate tracking of mobile components. As described above, tracking the user's head pose and orientation is crucial in many AR applications. Accurate determination of the user's head pose and orientation allows the AR system to display the right virtual content to the user. For example, the virtual scene may comprise a monster hiding behind a real building. Depending on the pose and orientation of the user's head in relation to the building, the view of the virtual monster may need to be modified such that a realistic AR experience is provided. Or, a position and/or orientation of a totem, haptic device or some other means of interacting with a virtual content may be important in enabling the AR user to interact with the AR system. For example, in many gaming applications, the AR system must detect a position and orientation of a real object in relation to virtual content. Or, when displaying a virtual interface, a position of a totem, user's hand, haptic device or any other real object configured for interaction with the AR system must be known in relation to the displayed virtual interface in order for the system to understand a command, etc. Conventional localization methods including optical tracking and other methods are typically plagued with high latency and low resolution problems, which makes rendering virtual content challenging in many augmented reality applications.

In one or more embodiments, the electromagnetic tracking system, discussed in relation to FIGS. 4 and 5 may be adapted to the AR system to detect position and orientation of one or more objects in relation to an emitted electromagnetic field. Typical electromagnetic systems tend to have a large and bulky electromagnetic emitters (e.g., 402 in FIG. 4), which is problematic for AR devices. However, smaller electromagnetic emitters (e.g., in the millimeter range) may be used to emit a known electromagnetic field in the context of the AR system.

Referring now to FIG. 6, an electromagnetic tracking system may be incorporated with an AR system as shown, with an electromagnetic field emitter 602 incorporated as part of a hand-held controller 606. In one or more embodiments, the hand-held controller may be a totem to be used in a gaming scenario. In other embodiments, the hand-held controller may be a haptic device. In yet other embodiments, the electromagnetic field emitter may simply be incorporated as part of the belt pack 70. The hand-held controller 606 may comprise a battery 610 or other power supply that powers that electromagnetic field emitter 602. It should be appreciated that the electromagnetic field emitter 602 may also comprise or be coupled to an IMU 650 component configured to assist in determining positioning and/or orientation of the electromagnetic field emitter 602 relative to other components. This may be especially important in cases where both the field emitter 602 and the sensors (604) are mobile. Placing the electromagnetic field emitter 602 in the hand-held controller rather than the belt pack, as shown in the embodiment of FIG. 6, ensures that the electromagnetic field emitter is not competing for resources at the belt pack, but rather uses its own battery source at the hand-held controller 606.

In one or more embodiments, the electromagnetic sensors 604 may be placed on one or more locations on the user's headset, along with other sensing devices such as one or more IMUs or additional magnetic flux capturing coils 608. For example, as shown in FIG. 6, sensors (604, 608) may be placed on either side of the head set (58). Since these sensors are engineered to be rather small (and hence may be less sensitive, in some cases), having multiple sensors may improve efficiency and precision. In one or more embodiments, one or more sensors may also be placed on the belt pack 70 or any other part of the user's body. The sensors (604, 608) may communicate wirelessly or through Bluetooth® to a computing apparatus that determines a pose and orientation of the sensors (and the AR headset to which it is attached). In one or more embodiments, the computing apparatus may reside at the belt pack 70. In other embodiments, the computing apparatus may reside at the headset itself, or even the hand-held controller 606. The computing apparatus may in turn comprise a mapping database (e.g., passable world model, coordinate space, etc.) to detect pose, to determine the coordinates of real objects and virtual objects, and may even connect to cloud resources and the passable world model, in one or more embodiments.

As described above, conventional electromagnetic emitters may be too bulky for AR devices. Therefore the electromagnetic field emitter may be engineered to be compact, using smaller coils compared to traditional systems. However, given that the strength of the electromagnetic field decreases as a cubic function of the distance away from the field emitter, a shorter radius between the electromagnetic sensors 604 and the electromagnetic field emitter 602 (e.g., about 3-3.5 ft) may reduce power consumption when compared to conventional systems such as the one detailed in FIG. 4.

This aspect may either be utilized to prolong the life of the battery 610 that may power the controller 606 and the electromagnetic field emitter 602, in one or more embodiments. Or, in other embodiments, this aspect may be utilized to reduce the size of the coils generating the magnetic field at the electromagnetic field emitter 602. However, in order to get the same strength of magnetic field, the power may be need to be increased. This allows for a compact electromagnetic field emitter unit 602 that may fit compactly at the hand-held controller 606.

Several other changes may be made when using the electromagnetic tracking system for AR devices. Although this pose reporting rate is rather good, AR systems may require an even more efficient pose reporting rate. To this end, IMU-based pose tracking may be used in the sensors. Crucially, the IMUs must remain as stable as possible in order to increase an efficiency of the pose detection process. The IMUs may be engineered such that they remain stable up to 50-100 milliseconds. It should be appreciated that some embodiments may utilize an outside pose estimator module (e.g., IMUs may drift over time) that may enable pose updates to be reported at a rate of 10-20 Hz. By keeping the IMUs stable at a reasonable rate, the rate of pose updates may be dramatically decreased to 10-20 Hz (as compared to higher frequencies in conventional systems).

If the electromagnetic tracking system can be run at a 10% duty cycle (e.g., only pinging for ground truth every 100 milliseconds), this would be another way to save power at the AR system. This would mean that the electromagnetic tracking system wakes up every 10 milliseconds out of every 100 milliseconds to generate a pose estimate. This directly translates to power consumption savings, which may, in turn, affect size, battery life and cost of the AR device.

In one or more embodiments, this reduction in duty cycle may be strategically utilized by providing two hand-held controllers (not shown) rather than just one. For example, the user may be playing a game that requires two totems, etc. Or, in a multi-user game, two users may have their own totems/hand-held controllers to play the game. When two controllers (e.g., symmetrical controllers for each hand) are used rather than one, the controllers may operate at offset duty cycles. The same concept may also be applied to controllers utilized by two different users playing a multi-player game, for example.

Figure 7:
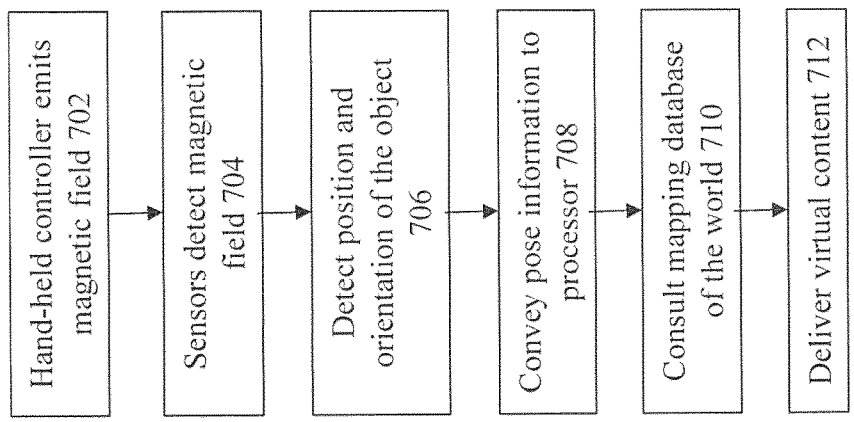
FIG. 7 illustrates an example flow chart describing the electromagnetic tracking system in the context of AR devices.

Referring now to FIG. 7, an example flow chart describing the electromagnetic tracking system in the context of AR devices is described. At 702, the hand-held controller emits a magnetic field. At 704, the electromagnetic sensors (placed on headset, belt pack, etc.) detect the magnetic field. At 706, a position and orientation of the headset/belt is determined based on a behavior of the coils/IMUs at the sensors. At 708, the pose information is conveyed to the computing apparatus (e.g., at the belt pack or headset). At 710, optionally, a mapping database (e.g., passable world model) may be consulted to correlate the real world coordinates with the virtual world coordinates. At 712, virtual content may be delivered to the user at the AR headset. It should be appreciated that the flowchart described above is for illustrative purposes only, and should not be read as limiting.

Advantageously, using an electromagnetic tracking system similar to the one outlined in FIG. 6 enables pose tracking (e.g., head position and orientation, position and orientation of totems, and other controllers). This allows the AR system to project virtual content with a higher degree of accuracy, and very low latency when compared to optical tracking techniques.

Figure 8:
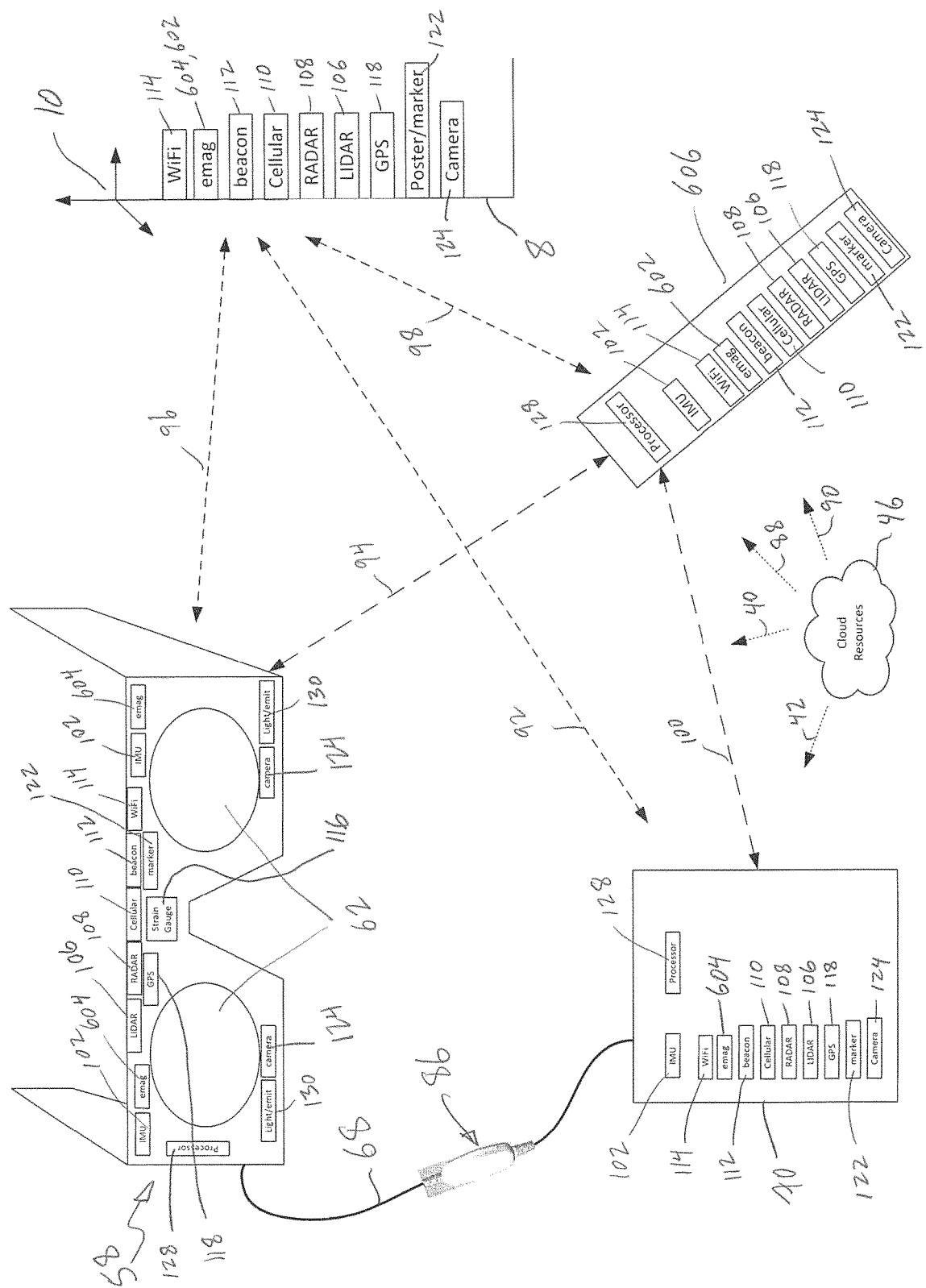
FIG. 8 illustrates a system configuration featuring example sensing components.

Referring to FIG. 8, a system configuration is illustrated wherein featuring many sensing components. A head mounted wearable component (58) is shown operatively coupled (68) to a local processing and data module (70), such as a belt pack, here using a physical multicore lead which also features a control and quick release module (86) as described below in reference to FIGS. 9A-9F. The local processing and data module (70) is operatively coupled (100) to a hand held component (606), here by a wireless connection such as low power Bluetooth®; the hand held component (606) may also be operatively coupled (94) directly to the head mounted wearable component (58), such as by a wireless connection such as low power Bluetooth®. Generally where IMU data is passed to coordinate pose detection of various components, a high-frequency connection is desirable, such as in the range of hundreds or thousands of cycles/second or higher; tens of cycles per second may be adequate for electromagnetic localization sensing, such as by the sensor (604) and transmitter (602) pairings. Also shown is a global coordinate system (10), representative of fixed objects in the real world around the user, such as a wall (8). Cloud resources (46) also may be operatively coupled (42, 40, 88, 90) to the local processing and data module (70), to the head mounted wearable component (58), to resources which may be coupled to the wall (8) or other item fixed relative to the global coordinate system (10), respectively. The resources coupled to the wall (8) or having known positions and/or orientations relative to the global coordinate system (10) may include a WiFi transceiver (114), an electromagnetic emitter (602) and/or receiver (604), a beacon or reflector (112) configured to emit or reflect a given type of radiation, such as an infrared LED beacon, a cellular network transceiver (110), a RADAR emitter or detector (108), a LIDAR emitter or detector (106), a GPS transceiver (118), a poster or marker having a known detectable pattern (122), and a camera (124). The head mounted wearable component (58) features similar components, as illustrated, in addition to lighting emitters (130) configured to assist the camera (124) detectors, such as infrared emitters (130) for an infrared camera (124); also featured on the head mounted wearable component (58) are one or more strain gauges (116), which may be fixedly coupled to the frame or mechanical platform of the head mounted wearable component (58) and configured to determine deflection of such platform in between components such as electromagnetic receiver sensors (604) or display elements (62), wherein it may be valuable to understand if bending of the platform has occurred, such as at a thinned portion of the platform, such as the portion above the nose on the eyeglasses-like platform depicted in FIG. 8. The head mounted wearable component (58) also features a processor (128) and one or more IMUs (102). Each of the components preferably are operatively coupled to the processor (128). The hand held component (606) and local processing and data module (70) are illustrated featuring similar components. As shown in FIG. 8, with so many sensing and connectivity means, such a system is likely to be heavy, power hungry, large, and relatively expensive. However, for illustrative purposes, such a system may be utilized to provide a very high level of connectivity, system component integration, and position/orientation tracking. For example, with such a configuration, the various main mobile components (58, 70, 606) may be localized in terms of position relative to the global coordinate system using WiFi, GPS, or Cellular signal triangulation; beacons, electromagnetic tracking (as described above), RADAR, and LIDIR systems may provide yet further location and/or orientation information and feedback. Markers and cameras also may be utilized to provide further information regarding relative and absolute position and orientation. For example, the various camera components (124), such as those shown coupled to the head mounted wearable component (58), may be utilized to capture data which may be utilized in simultaneous localization and mapping protocols, or "SLAM", to determine where the component (58) is and how it is oriented relative to other components.

Figure 9C:
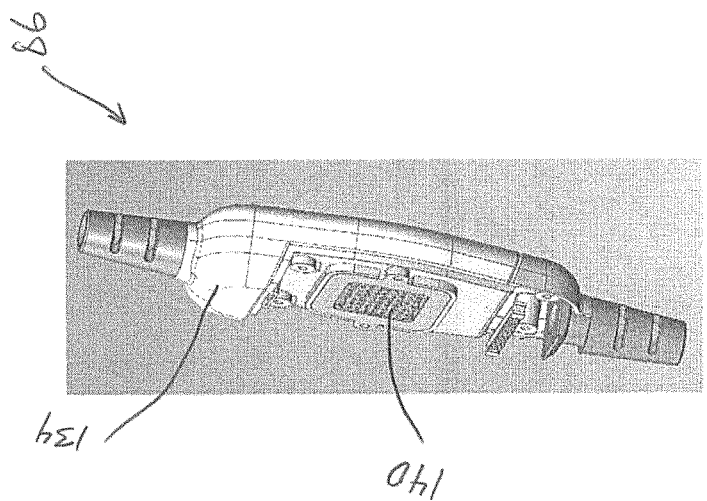
FIGS. 9A-9F illustrate various aspects of an example control and quick release module.
Figure 9B:
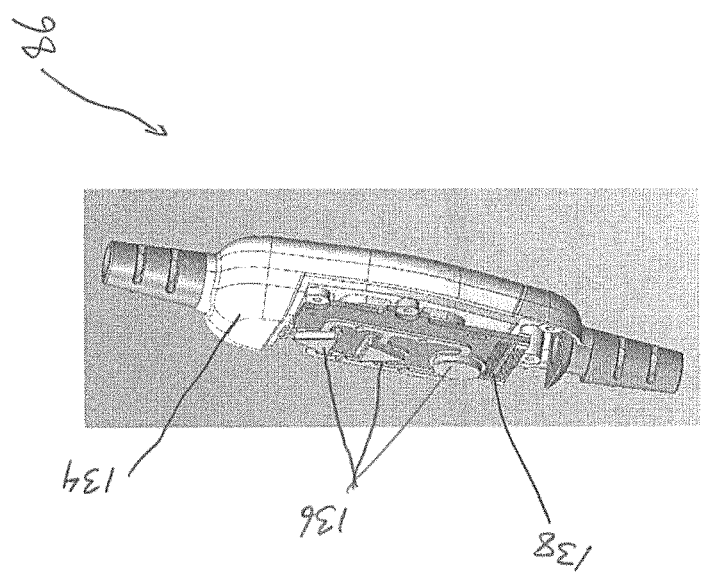
Figure 9A:
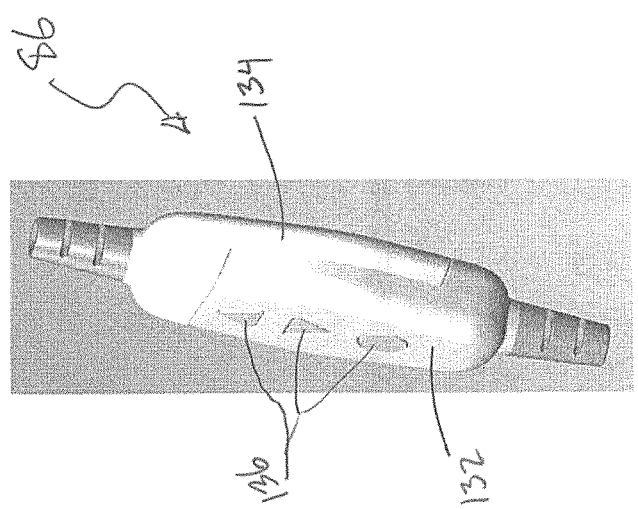
Figure 9E:
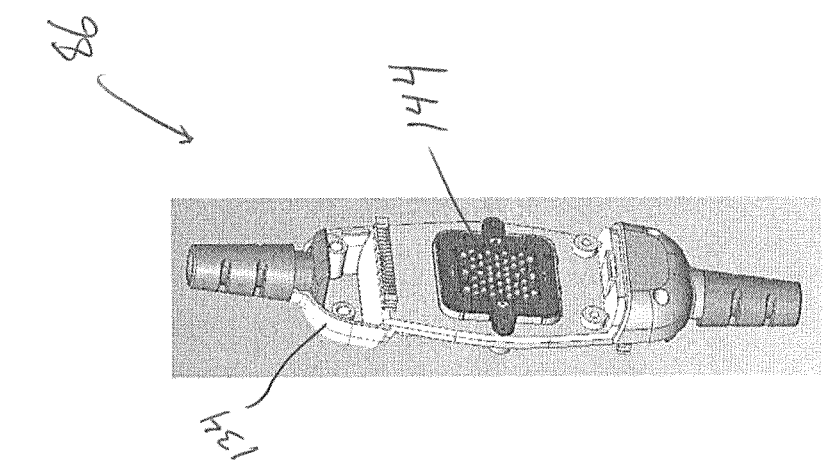
Figure 9D:
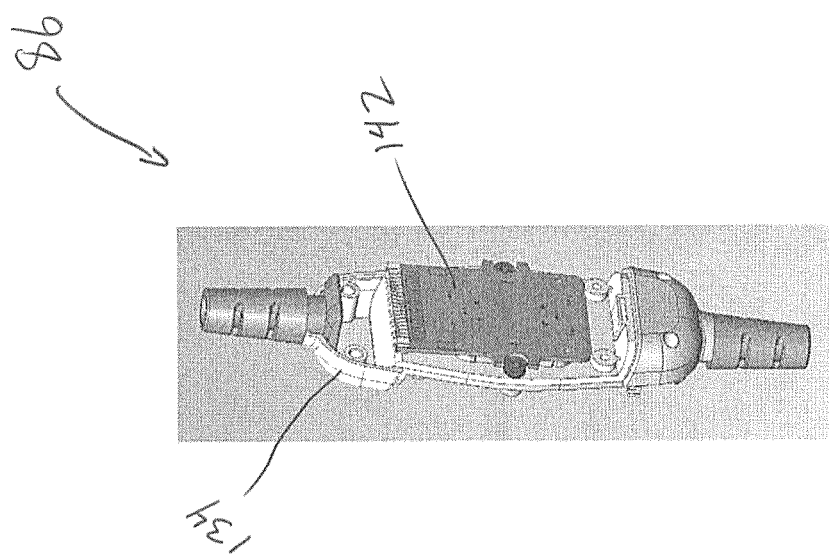
Figure 9F:
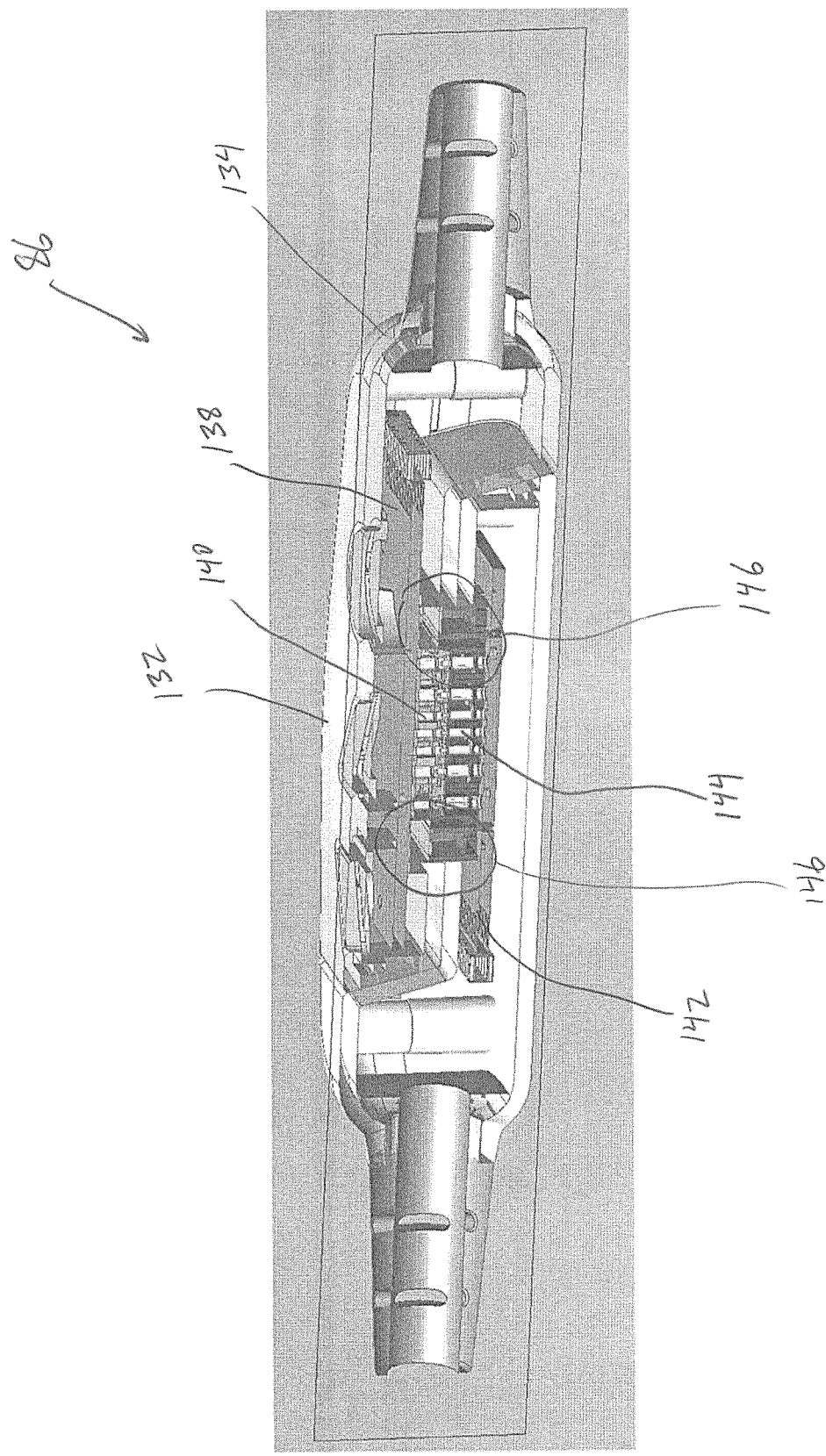

Referring to FIGS. 9A-9F, various aspects of the control and quick release module (86) are depicted. Referring to FIG. 9A, two outer housing components are coupled together using a magnetic coupling configuration which may be enhanced with mechanical latching. Buttons (136) for operation of the associated system may be included. FIG. 9B illustrates a partial cutaway view with the buttons (136) and underlying top printed circuit board (138) shown. Referring to FIG. 9C, with the buttons (136) and underlying top printed circuit board (138) removed, a female contact pin array (140) is visible. Referring to FIG. 9D, with an opposite portion of housing (134) removed, the lower printed circuit board (142) is visible. With the lower printed circuit board (142) removed, as shown in FIG. 9E, a male contact pin array (144) is visible. Referring to the cross-sectional view of FIG. 9F, at least one of the male pins or female pins are configured to be spring-loaded such that they may be depressed along each pin's longitudinal axis; the pins may be termed "pogo pins" and generally comprise a highly conductive material, such as copper or gold. When assembled, the illustrated configuration mates 46 male pins with female pins, and the entire assembly may be quick-release decoupled in half by manually pulling it apart and overcoming a magnetic interface (146) load which may be developed using north and south magnets oriented around the perimeters of the pin arrays (140, 144). In one embodiment, an approximate 2 kg load from compressing the 46 pogo pins is countered with a closure maintainance force of about 4 kg. The pins in the array may be separated by about 1.3 mm, and the pins may be operatively coupled to conductive lines of various types, such as twisted pairs or other combinations to support USB 3.0, HDMI 2.0, I2S signals, GPIO, and MIN configurations, and high current analog lines and grounds configured for up to about 4 amps/5 volts in one embodiment.

Figure 10:
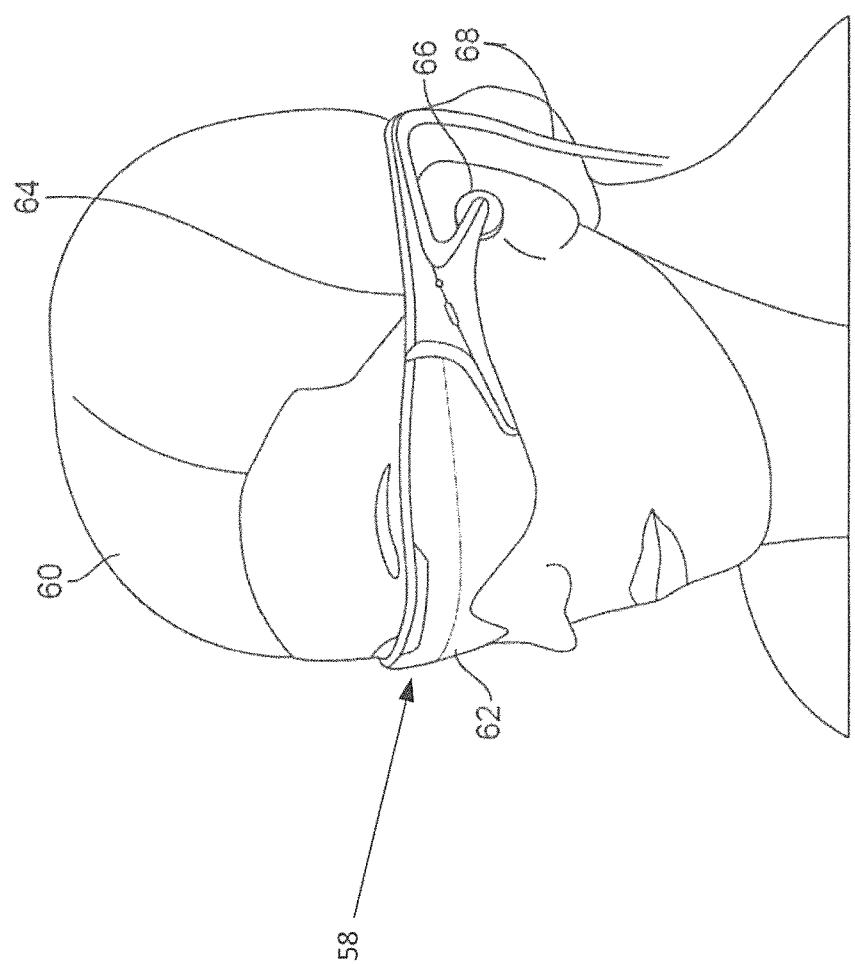
FIG. 10 illustrates a minimized component/feature set.

Referring to FIG. 10, it is helpful to have a minimized component/feature set to be able to minimize the weight and bulk of the various components, and to arrive at a relatively slim head mounted component, for example, such as that (58) featured in FIG. 10. Thus various permutations and combinations of the various components shown in FIG. 8 may be utilized.

Figure 11A:
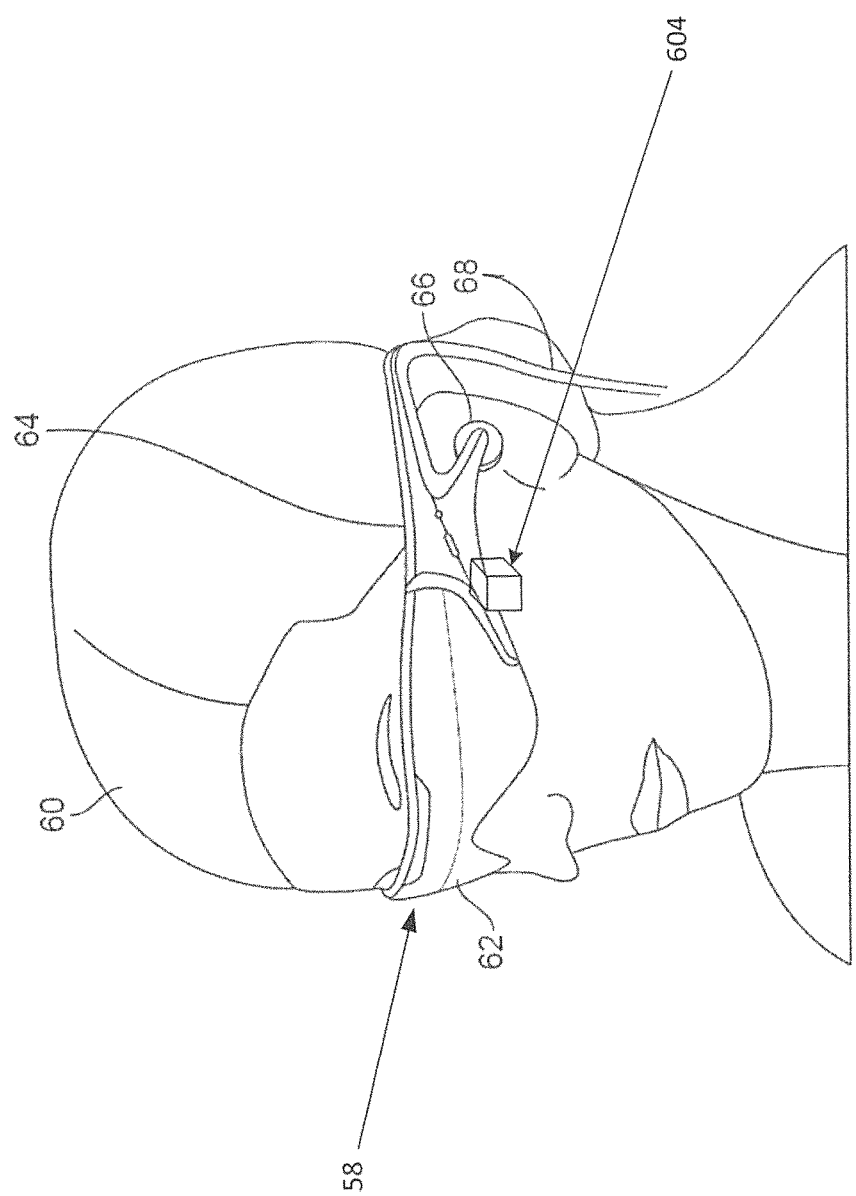
FIG. 11A illustrates an electromagnetic sensing coil assembly coupled to a head mounted component.
Figure 11B:
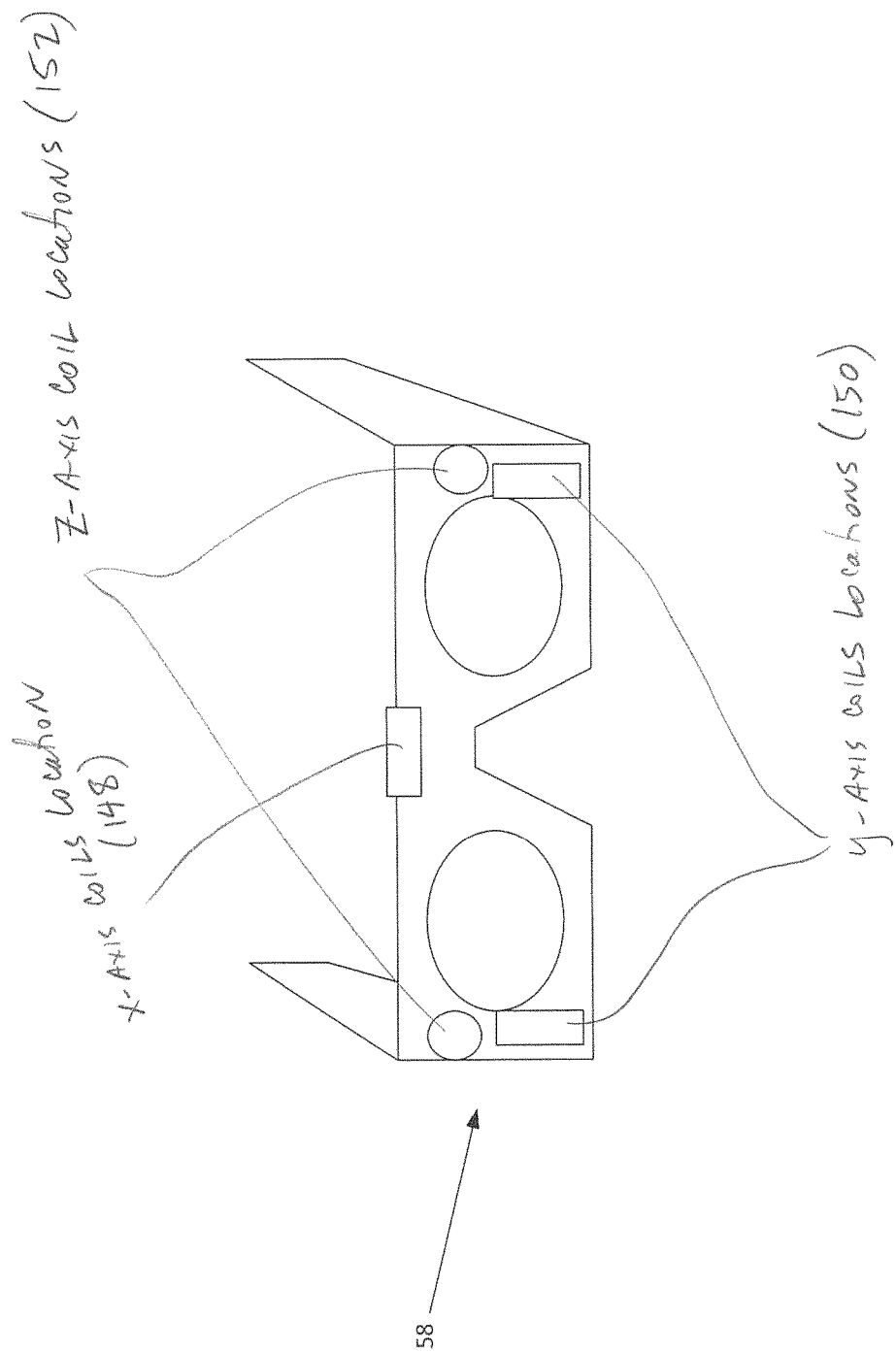
FIG. 11B illustrates individual coils integrated into example structures of the head mounted component.

Referring to FIG. 11A, an electromagnetic sensing coil assembly (604, e.g., 3 individual coils coupled to a housing) is shown coupled to a head mounted component (58); such a configuration adds additional geometry to the overall assembly which may not be desirable. Referring to FIG. 11B, rather than housing the coils in a box or single housing as in the configuration of FIG. 11A, the individual coils may be integrated into the various structures of the head mounted component (58), as shown in FIG. 11B. FIGS. 12A-12E illustrate various configurations for featuring a ferrite core coupled to an electromagnetic sensor to increase field sensitivity; the embodiments of FIGS. 12B-12E are lighter in weight than the solid core configuration of FIG. 12A and may be utilized to save mass.

Figure 13A:
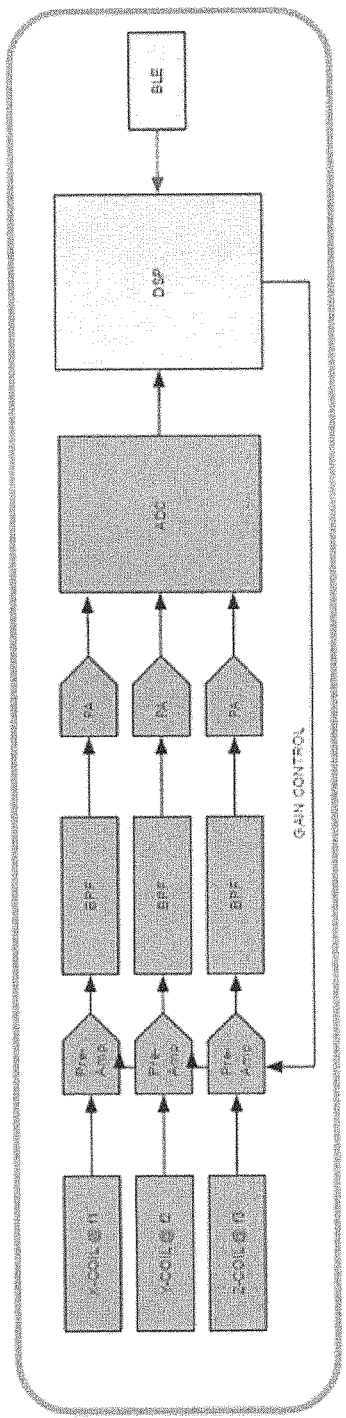
FIG. 13A illustrates a conventional local data processing configuration for a 3-coil electromagnetic receiver sensor.
Figure 13B:
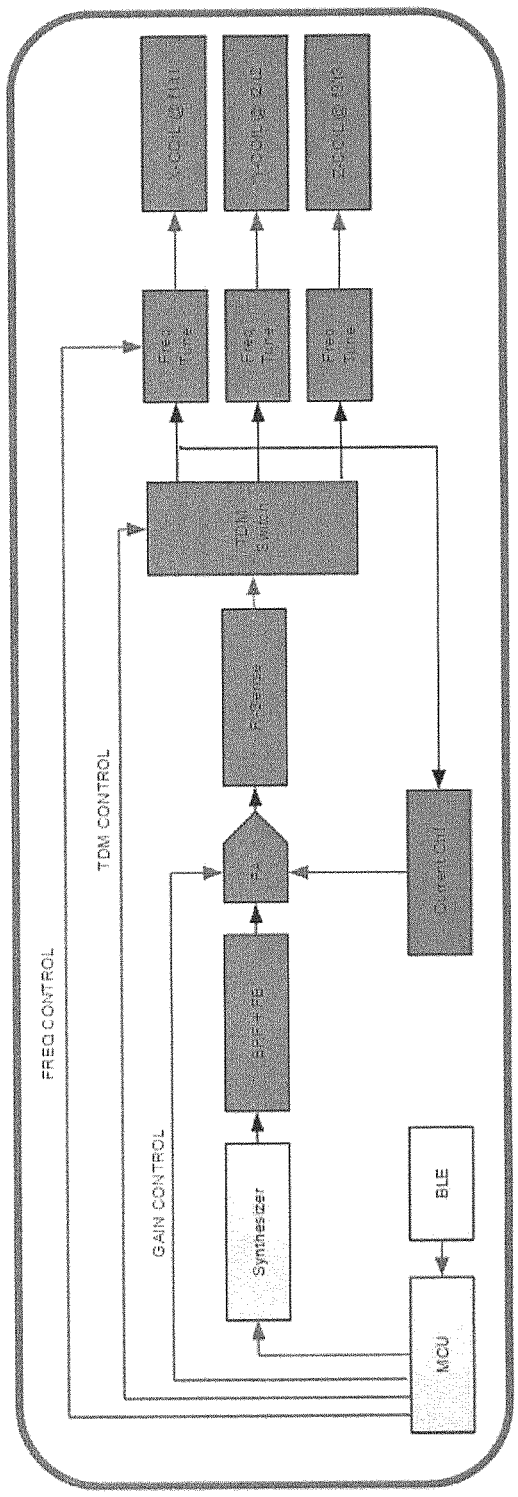
FIG. 13B illustrates a transmitter configuration utilizing time division multiplexing.
Figure 13C:
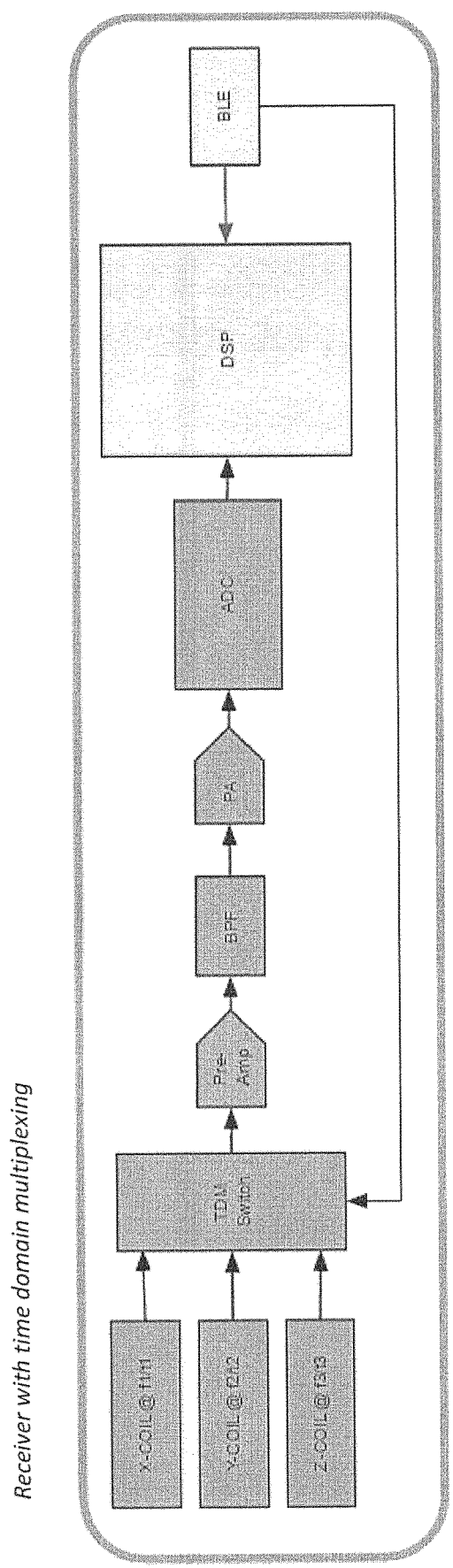
FIG. 13C illustrates a receiver configuration utilizing time division multiplexing.

Referring to FIGS. 13A-13C, time division multiplexing ("TDM") may be utilized to save mass as well. For example, referring to FIG. 13A, a conventional local data processing configuration is shown for a 3-coil electromagnetic receiver sensor, wherein analog currents come in from each of the X, Y, and Z coils, go into a pre-amplifier, go into a band pass filter, through analog-to-digital conversion, and ultimately to a digital signal processor. Referring to the transmitter configuration of FIG. 13B, and the receiver configuration of FIG. 13C, time division multiplexing may be utilized to share hardware, such that each coil sensor chain doesn't require its own amplifiers, etc. In addition to removing sensor housings, and multiplexing to save on hardware overhead, signal to noise ratios may be increased by having more than one set of electromagnetic sensors, each set being relatively small relative to a single larger coil set; also the low-side frequency limits, which generally are needed to have multiple sensing coils in close proximity, may be improved to facilitate bandwidth requirement improvements. Also, there is a tradeoff with multiplexing, in that multiplexing generally spreads out the reception of radiofrequency signals in time, which results in generally dirtier signals; thus larger coil diameter may be required for multiplexed systems. For example, where a multiplexed system may require a 9 mm-side dimension cubic coil sensor box, a nonmultiplexed system may only require a 7 mm-side dimension cubic coil box for similar performance; thus there are tradeoffs in minimizing geometry and mass.

In another embodiment wherein a particular system component, such as a head mounted component (58) features two or more electromagnetic coil sensor sets, the system may be configured to selectively utilize the sensor and emitter pairing that are closest to each other to optimize the performance of the system.

Figure 14:
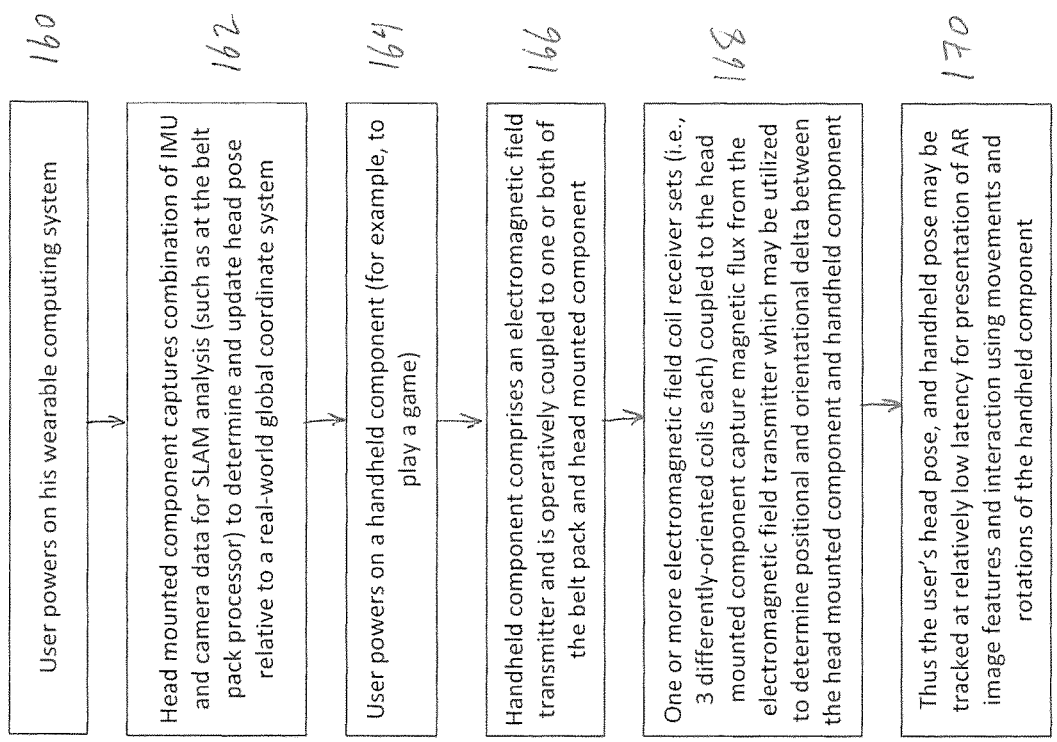
FIG. 14 illustrates a flowchart for tracking user head pose and handheld pose.

Referring to FIG. 14, in one embodiment, after a user powers up his or her wearable computing system (160), a head mounted component assembly may capture a combination of IMU and camera data (the camera data being used, for example, for SLAM analysis, such as at the belt pack processor where there may be more raw processing horsepower present) to determine and update head pose (e.g., position and orientation) relative to a real world global coordinate system (162). The user may also activate a handheld component to, for example, play an augmented reality game (164), and the handheld component may comprise an electromagnetic transmitter operatively coupled to one or both of the belt pack and head mounted component (166). One or more electromagnetic field coil receiver sets (e.g., a set being 3 differently-oriented individual coils) coupled to the head mounted component to capture magnetic flux from the transmitter, which may be utilized to determine positional or orientational difference (or "delta"), between the head mounted component and handheld component (168). The combination of the head mounted component assisting in determining pose relative to the global coordinate system, and the hand held assisting in determining relative location and orientation of the handheld relative to the head mounted component, allows the system to generally determine where each component is relative to the global coordinate system, and thus the user's head pose, and handheld pose may be tracked, preferably at relatively low latency, for presentation of augmented reality image features and interaction using movements and rotations of the handheld component (170).

Figure 15:
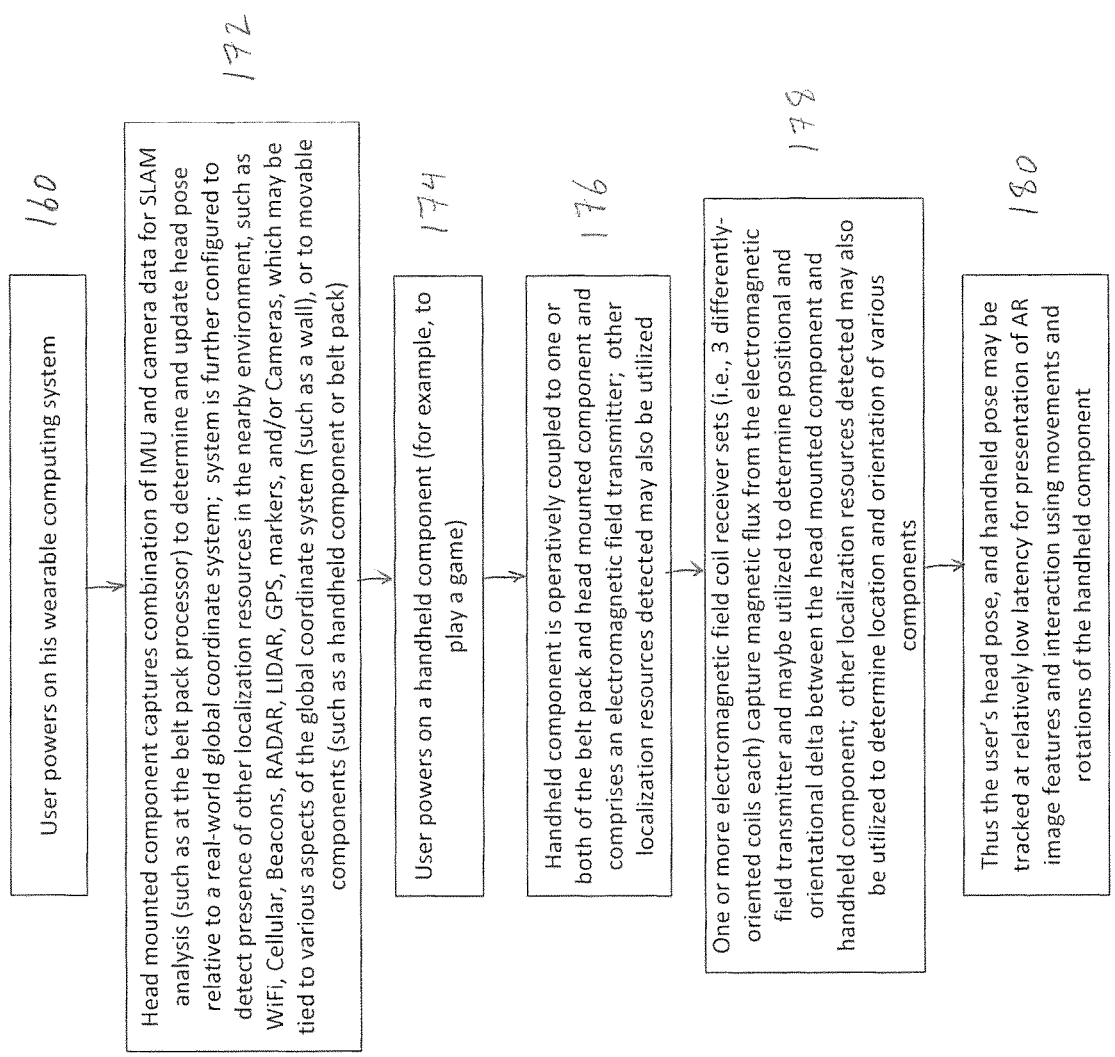
FIG. 15 illustrates another flowchart for tracking user head pose and handheld pose.

Referring to FIG. 15, an embodiment is illustrated that is somewhat similar to that of FIG. 14, with the exception that the system has many more sensing devices and configurations available to assist in determining pose of both the head mounted component (172) and a hand held component (176, 178), such that the user's head pose, and handheld pose may be tracked, preferably at relatively low latency, for presentation of augmented reality image features and interaction using movements and rotations of the handheld component (180).

Figure 16A:
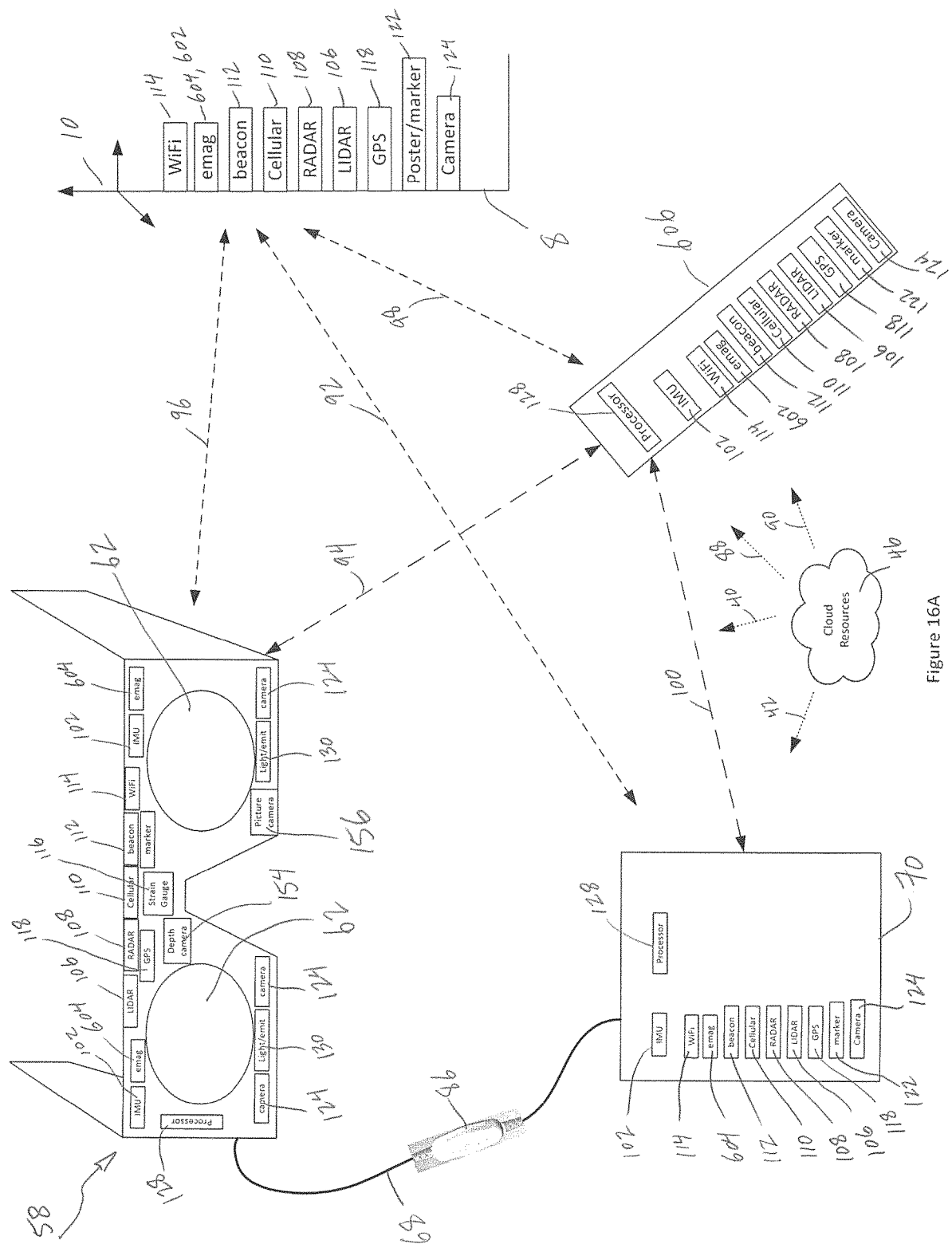
FIG. 16A illustrates a system configuration feature example sensing components, including example depth sensors.
Figure 16B:
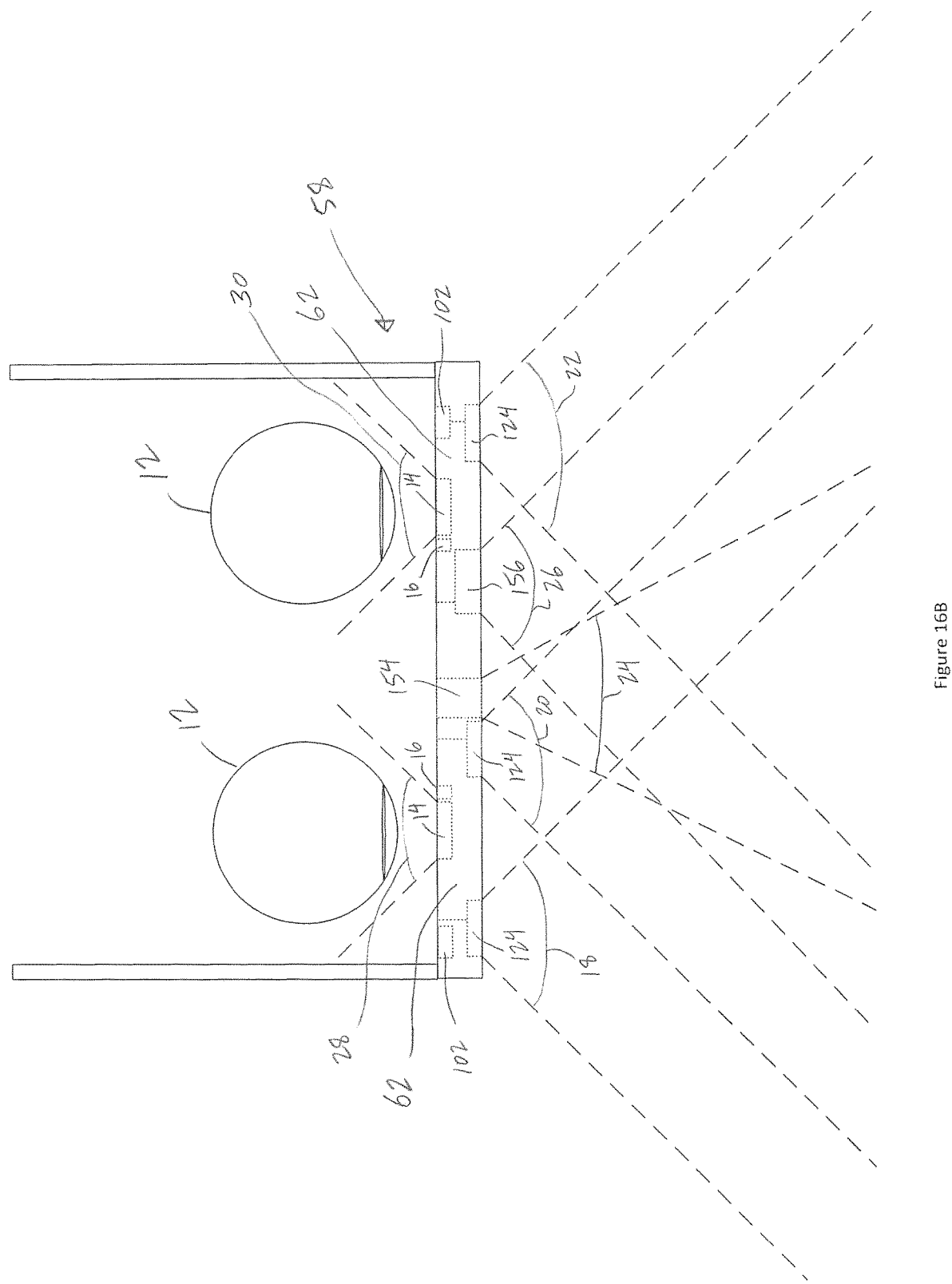
FIG. 16B illustrates a partial orthogonal view of the configuration of FIG. 16A.

Referring to FIGS. 16A and 16B, various aspects of a configuration similar to that of FIG. 8 are shown. The configuration of FIG. 16A differs from that of FIG. 8 in that in addition to a LIDAR (106) type of depth sensor, the configuration of FIG. 16A features a generic depth camera or depth sensor (154) for illustrative purposes, which may, for example, be either a stereo triangulation style depth sensor (such as a passive stereo depth sensor, a texture projection stereo depth sensor, or a structured light stereo depth sensor) or a time or flight style depth sensor (such as a LIDAR depth sensor or a modulated emission depth sensor); further, the configuration of FIG. 16A has an additional forward facing "world" camera (124, which may be a grayscale camera, having a sensor capable of 720p range resolution) as well as a relatively high-resolution "picture camera" (156, which may be a full color camera, having a sensor capable of 2 megapixel or higher resolution, for example). FIG. 16B shows a partial orthogonal view of the configuration of FIG. 16A for illustrative purposes, as described further below in reference to FIG. 16B.

Referring back to FIG. 16A and the stereo vs time-of-flight style depth sensors mentioned above, each of these depth sensor types may be employed with a wearable computing solution as disclosed herein, although each has various advantages and disadvantages. For example, many depth sensors have challenges with black surfaces and shiny or reflective surfaces. Passive stereo depth sensing is a relatively simplistic way of getting triangulation for calculating depth with a depth camera or sensor, but it may be challenged if a wide field of view ("FOV") is required, and may require relatively significant computing resource; further, such a sensor type may have challenges with edge detection, which may be important for the particular use case at hand. Passive stereo may have challenges with textureless walls, low light situations, and repeated patterns. Passive stereo depth sensors are available from manufacturers such as Intel® and Aquifi®. Stereo with texture projection (also known as "active stereo") is similar to passive stereo, but a texture projector broadcasts a projection pattern onto the environment, and the more texture that is broadcasted, the more accuracy is available in triangulating for depth calculation. Active stereo may also require relatively high compute resource, present challenges when wide FOV is required, and be somewhat suboptimal in detecting edges, but it does address some of the challenges of passive stereo in that it is effective with textureless walls, is good in low light, and generally does not have problems with repeating patterns. Active stereo depth sensors are available from manufacturers such as Intel® and Aquifi®. Stereo with structured light, such as the systems developed by Primesense, Inc.® and available under the tradename Kinect®, as well as the systems available from Mantis Vision, Inc®, generally utilize a single camera/projector pairing, and the projector is specialized in that it is configured to broadcast a pattern of dots that is known apriori. In essence, the system knows the pattern that is broadcasted, and it knows that the variable to be determined is depth. Such configurations may be relatively efficient on compute load, and may be challenged in wide FOV requirement scenarios as well as scenarios with ambient light and patterns broadcasted from other nearby devices, but can be quite effective and efficient in many scenarios. With modulated time of flight type depth sensors, such as those available from PMD Technologies®, A.G. and SoftKinetic Inc.®, an emitter may be configured to send out a wave, such as a sine wave, of amplitude modulated light; a camera component, which may be positioned nearby or even overlapping in some configurations, receives a returning signal on each of the pixels of the camera component and depth mapping may be determined/calculated. Such configurations may be relatively compact in geometry, high in accuracy, and low in compute load, but may be challenged in terms of image resolution (such as at edges of objects), multi-path errors (such as wherein the sensor is aimed at a reflective or shiny corner and the detector ends up receiving more than one return path, such that there is some depth detection aliasing. Direct time of flight sensors, which also may be referred to as the aforementioned LIDAR, are available from suppliers such as LuminAR® and Advanced Scientific Concepts, Inc.®. With these time of flight configurations, generally a pulse of light (such as a picosecond, nanosecond, or femtosecond long pulse of light) is sent out to bathe the world oriented around it with this light ping; then each pixel on a camera sensor waits for that pulse to return, and knowing the speed of light, the distance at each pixel may be calculated. Such configurations may have many of the advantages of modulated time of flight sensor configurations (no baseline, relatively wide FOV, high accuracy, relatively low compute load, etc) and also relatively high framerates, such as into the tens of thousands of Hertz. They may also be relatively expensive, have relatively low resolution, be sensitive to bright light, and susceptible to multi-path errors; they may also be relatively large and heavy.

Referring to FIG. 16, a partial top view is shown for illustrative purposes featuring a user's eyes (12) as well as cameras (14, such as infrared cameras) with fields of view (28, 30) and light or radiation sources (16, such as infrared) directed toward the eyes (12) to facilitate eye tracking, observation, and/or image capture. The three outward-facing world-capturing cameras (124) are shown with their FOVs (18, 20, 22), as is the depth camera (154) and its FOV (24), and the picture camera (156) and its FOV (26). The depth information garnered from the depth camera (154) may be bolstered by using the overlapping FOVs and data from the other forward-facing cameras. For example, the system may end up with something like a sub-VGA image from the depth sensor (154), a 720p image from the world cameras (124), and occasionally a 2 megapixel color image from the picture camera (156). Such a configuration has 4 cameras sharing common FOV, two of them with heterogeneous visible spectrum images, one with color, and the third one with relatively low-resolution depth. The system may be configured to do a segmentation in the grayscale and color images, fuse those two and make a relatively high-resolution image from them, get some stereo correspondences, use the depth sensor to provide hypotheses about stereo depth, and use stereo correspondences to get a more refined depth map, which may be significantly better than what was available from the depth sensor only. Such processes may be run on local mobile processing hardware, or can run using cloud computing resources, perhaps along with the data from others in the area (such as two people sitting across a table from each other nearby), and end up with quite a refined mapping. In another embodiment, all of the above sensors may be combined into one integrated sensor to accomplish such functionality.

Figure 17A:
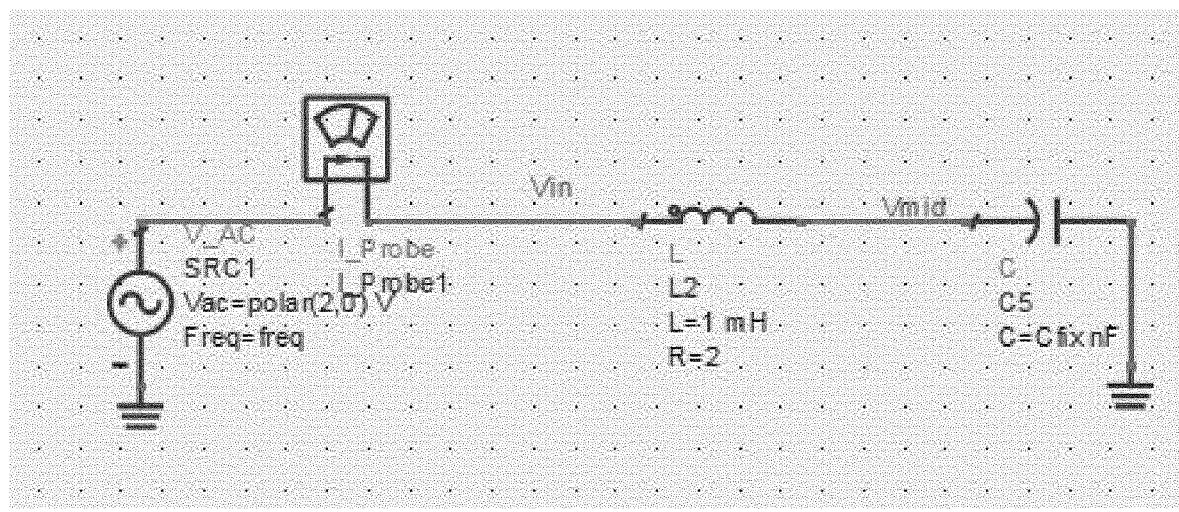
FIG. 17A illustrates an example resonant circuit used to create resonance.
Figure 17B:
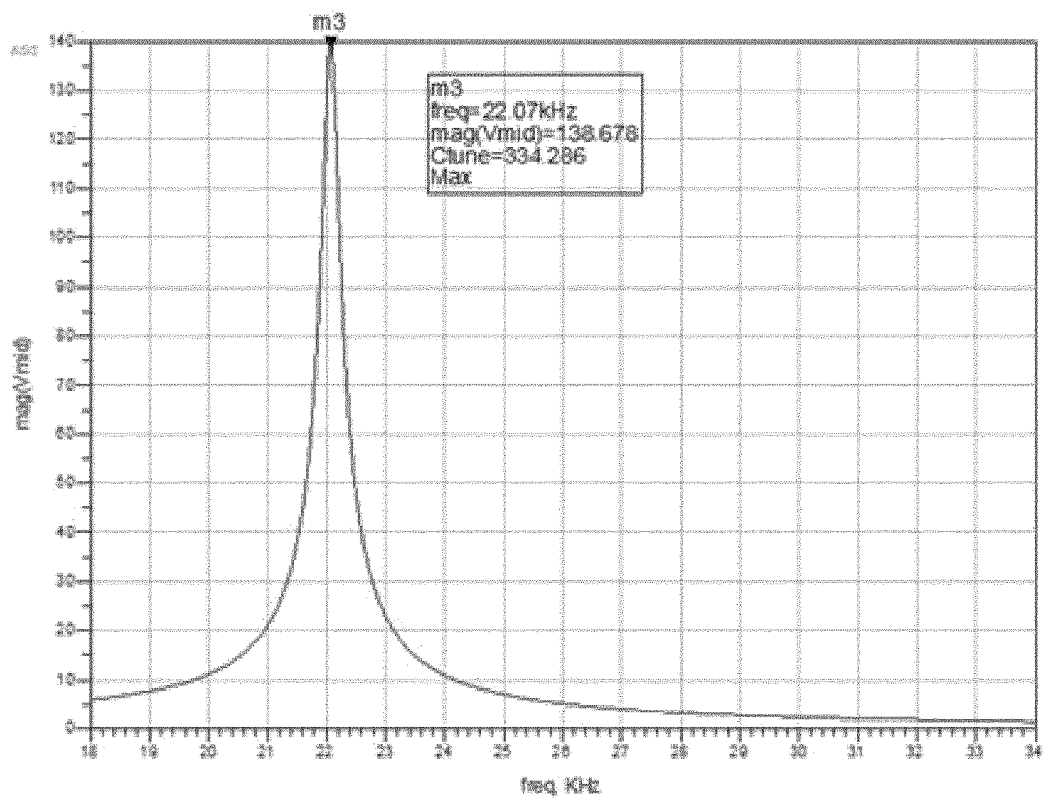
FIG. 17B illustrates simulated data.
Figure 17C:
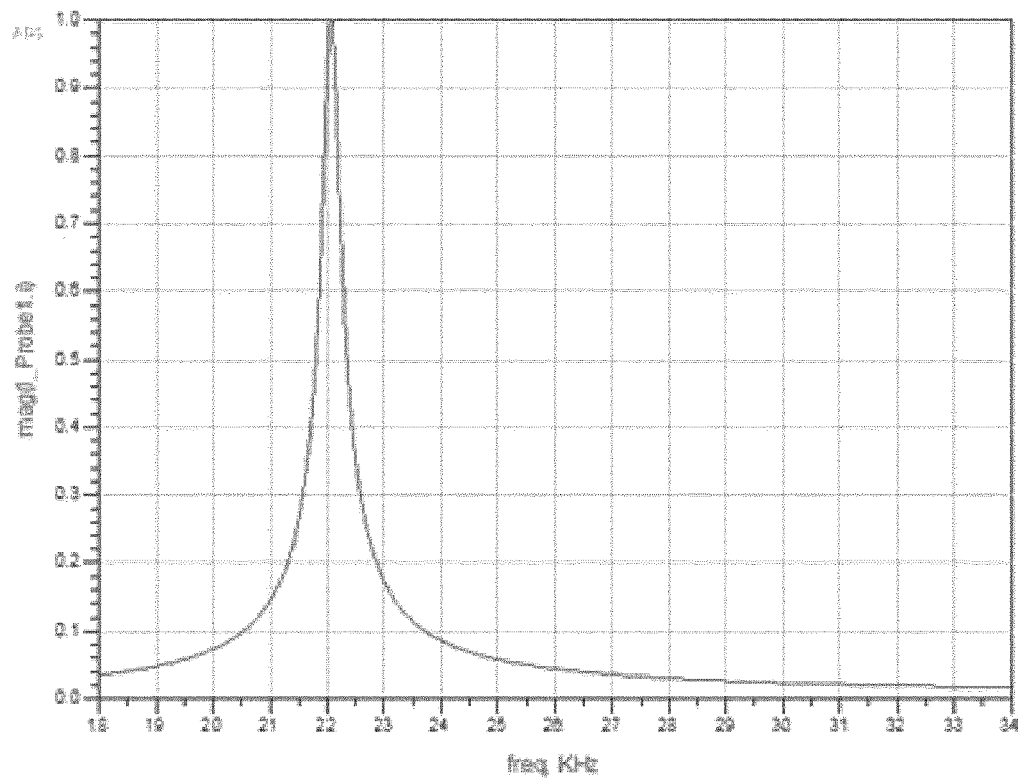
FIG. 17C illustrates example current plotted versus frequency.
Figure 17D:
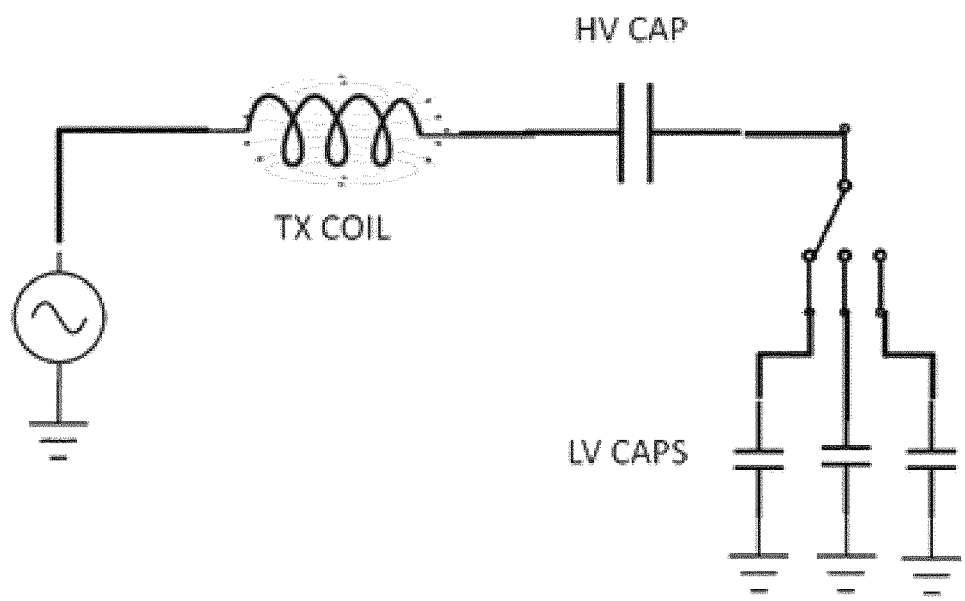
FIG. 17D illustrates an embodiment of a dynamically tunable configuration.
Figure 17E:
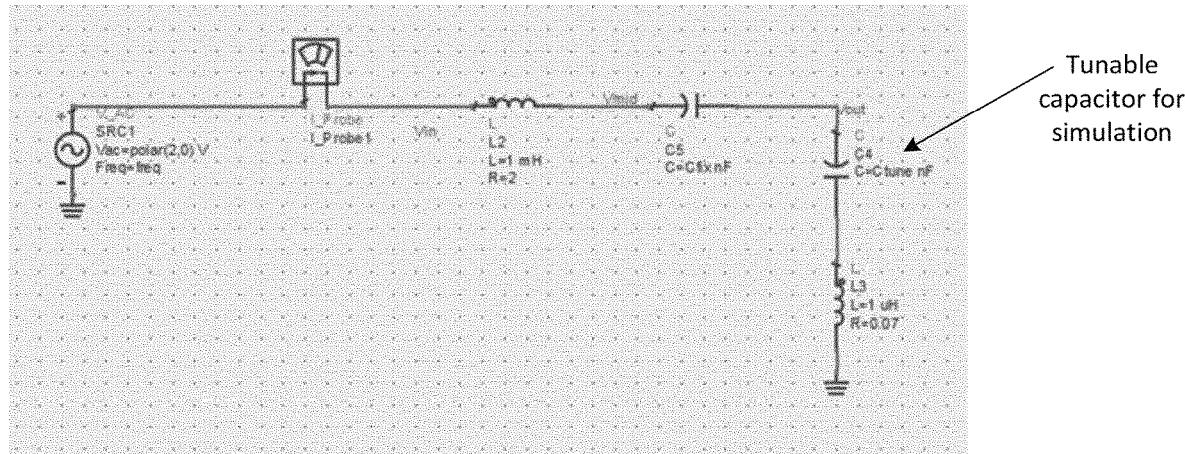
FIG. 17E illustrates an example of a tunable circuit.
Figure 17F:
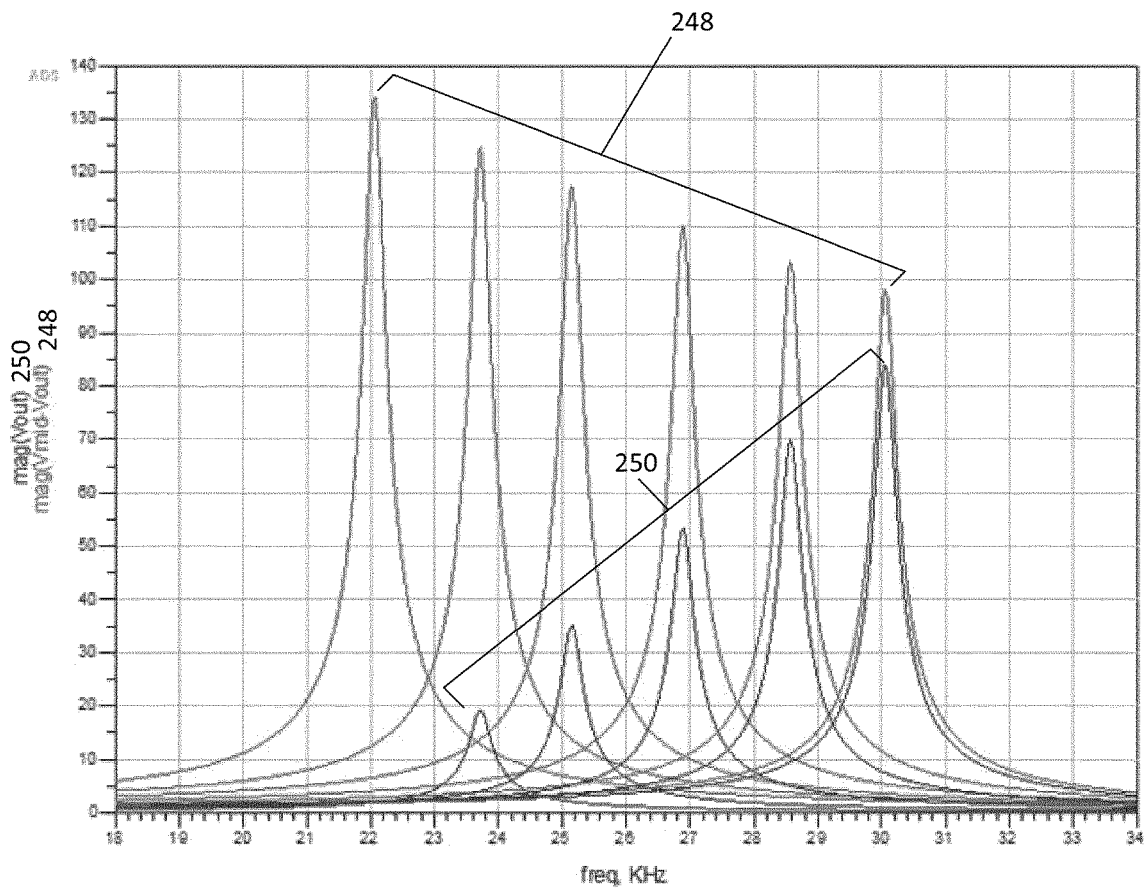
FIG. 17F illustrates simulated data.
Figure 17G:
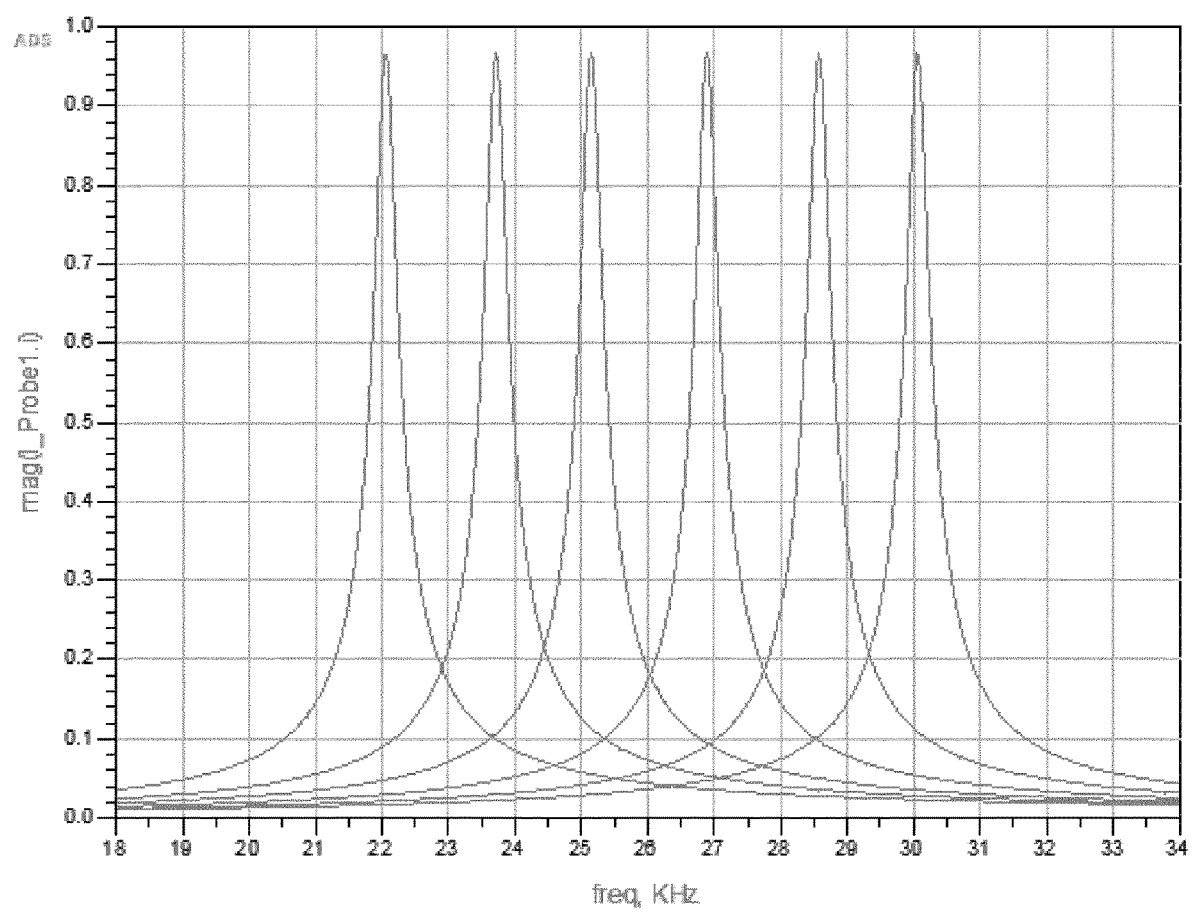
FIG. 17G illustrates example current data.

Referring to FIGS. 17A-17G, aspects of a dynamic transmission coil tuning configuration are shown for electromagnetic tracking, to facilitate the transmission coil to operate optimally at multiple frequencies per orthogonal axis, which allows for multiple users to operate on the same system. Typically an electromagnetic tracking transmitter will be designed to operate at fixed frequencies per orthogonal axis. With such approach, each transmission coil is tuned with a static series capacitance that creates resonance only at the frequency of operation. Such resonance allows for the maximum possible current flow through the coil which, in turn, maximizes the magnetic flux generated. FIG. 17A illustrates a typical resonant circuit used to create resonance. Element "L1" represents a single axis transmission coil at 1 mH, and with capacitance set to 52 nF, resonance is created at 22 kHz, as shown in FIG. 17B. FIG. 17C shows the current through the system plotted versus frequency, and it may be seen that the current is maximum at the resonant frequency. If this system is expected to operate any other frequency, the operating circuit will not be at the possible maximum. FIG. 17D illustrates an embodiment of a dynamically tunable configuration. The dynamic frequency tuning may be set to achieve resonance on the coil to get maximum current flow; an example of a tunable circuit is shown in FIG. 17E, where one capacitor ("C4") may be tuned to produce simulated data, as shown in FIG. 17F. As shown in FIG. 17F, one of the orthogonal coils of an electromagnetic tracker is simulated as "L1" and a static capacitor ("C5") is a fixed high voltage capacitor. This high voltage capacitor will see the higher voltages due to the resonance, and so its package size generally will be larger. C4 will be the capacitor which is dynamically switched with different values, and can thus see a lower maximum voltage and generally be a smaller geometric package to save placement space. L3 can also be utilized to fine tune the resonant frequency. FIG. 17F illustrates the resonance achieved with the higher plots (248) versus the lower plots (250); as C4 is varied in the simulation, the resonance is changed, and it is notable that the voltage across C5 (Vmid-Vout) is higher than that across C4 (Vout). This generally will allow for a smaller package part on C4 since multiples of this generally will be needed for the system, one per frequency of operation. FIG. 17G illustrates that the maximum current achieved follows the resonance regardless of voltage across capacitors.

Figure 18A:
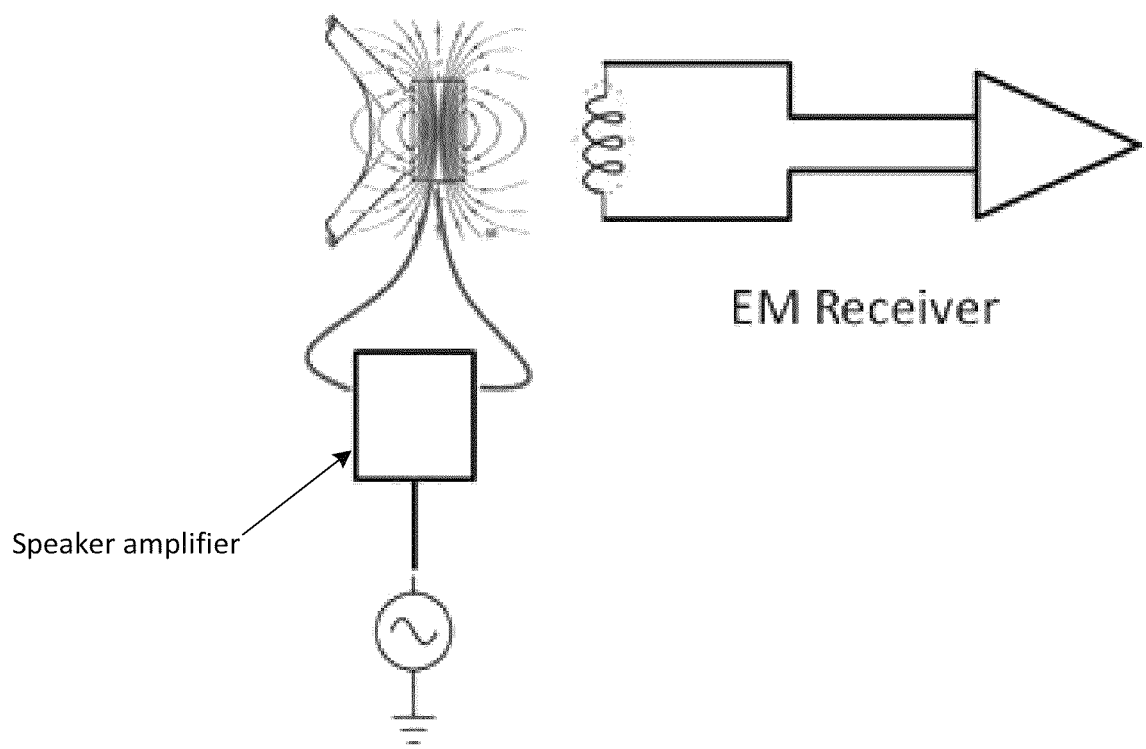
FIG. 18A illustrates example noise in usable frequencies for electromagnetic tracking systems.
Figure 18B:
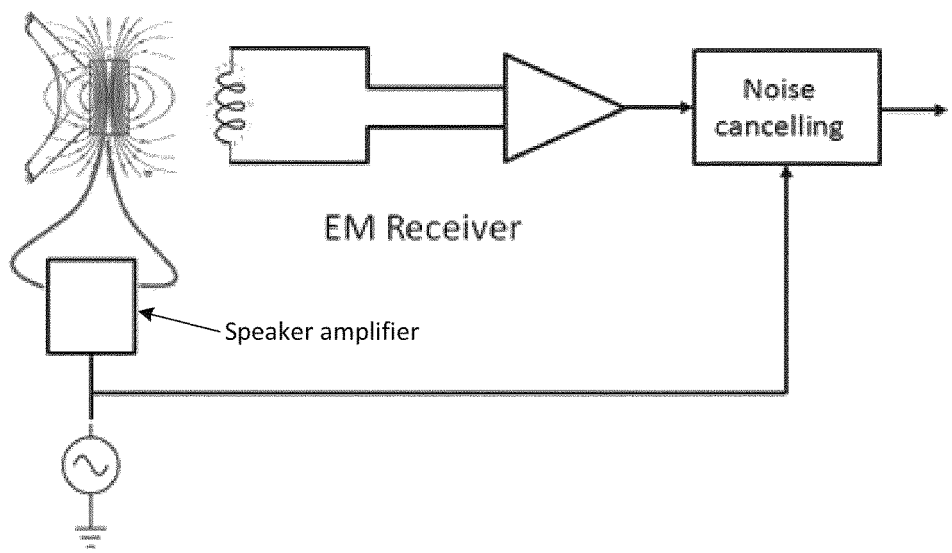
FIG. 18B illustrates a block diagram for a noise cancelling configuration for electromagnetic tracking interference.
Figure 18C:
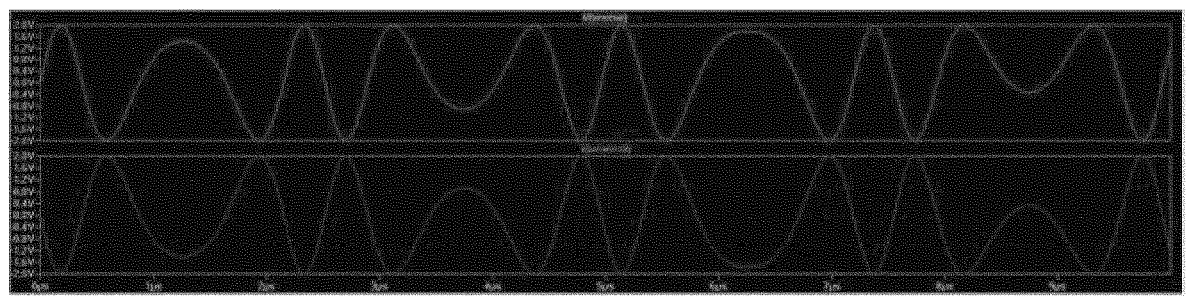
FIG. 18C illustrates a plot of an example of how a signal can be inverted and added to cancel an interferer.

Referring to FIGS. 18A-18C, an electromagnetic tracking system may be bounded to work below about 30 KHz, which is slightly higher than the audible range for human hearing. Referring to FIG. 18A, there may be some audio systems which create noise in the usable frequencies for such electromagnetic tracking systems. Further, audio speakers typically have magnetic fields and one or more coils which also may interfere with electromagnetic tracking systems. Referring to FIG. 18B, a block diagram is shown for a noise cancelling configuration for elecromagnetic tracking interference. Since the unintentional interference is a known entity, this knowledge can be used to cancel the interference and improve performance. In other words, the audio generated by the system may be utilized to eliminate the effects received by the receiver coil. The noise cancelling circuit may be configured to accept the corrupted signals from the EM amplifier as well as the signal from the audio system, and the noise cancelling system will cancel out the noise received from the audio speaker. FIG. 18C illustrates a plot to show an example of the how the signal can be inverted and added to cancel the interferer. V (vnoise), the top plot, is the noise added to the system by the audio speaker.

Figure 19:
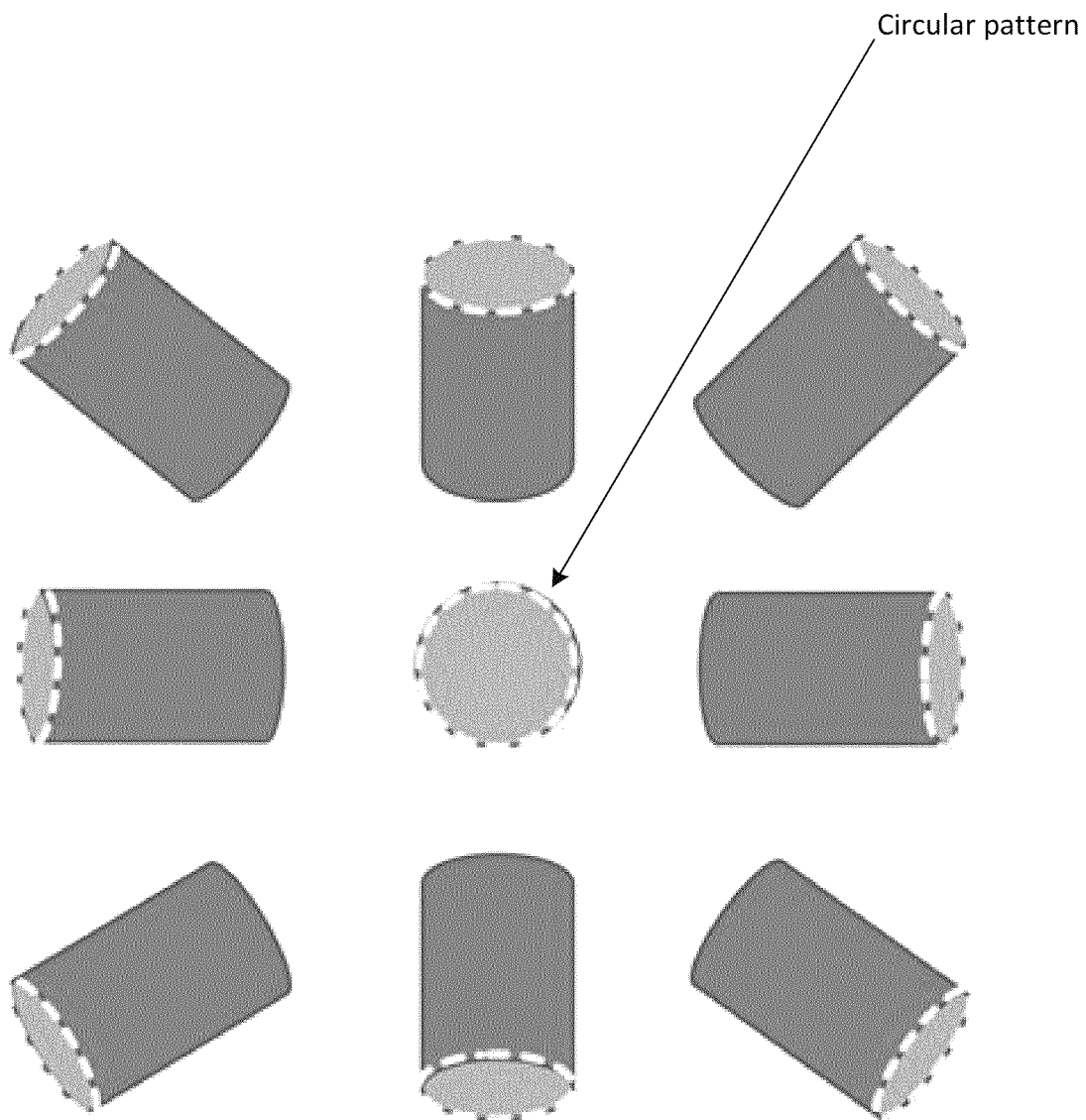
FIG. 19 illustrates a known pattern that may be utilized to assist in calibration of vision systems.

Referring to FIG. 19, in one embodiment a known pattern (such as a circular pattern) of lights or other emitters may be utilized to assist in calibration of vision systems. For example, the circular pattern may be utilized as a fiducial; as a camera or other capture device with known orientation captures the shape of the pattern while the object coupled to the pattern is reoriented, the orientation of the object, such as a hand held totem device, may be determined; such orientation may be compared with that which comes from an associated IMU device for error determination and use in calibration.

Figure 20A:
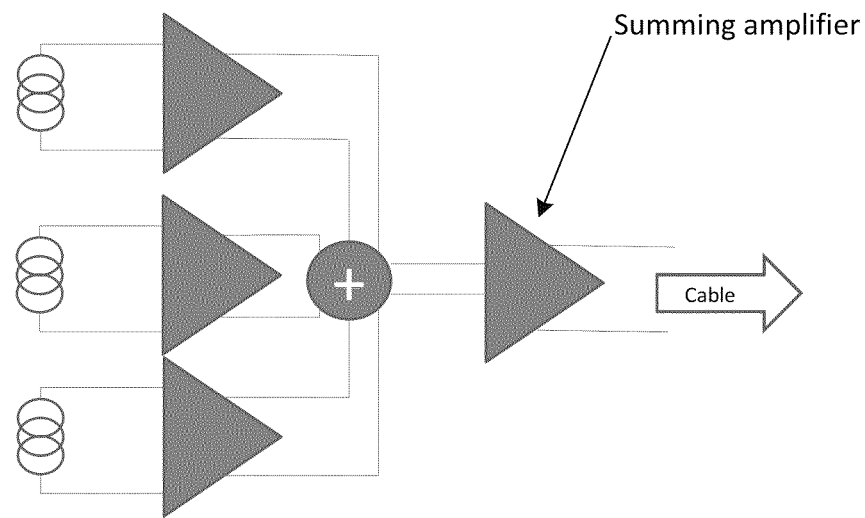
FIGS. 20A-20C illustrate a configuration with a summing amplifier to simplify circuitry between two subsystems or components of a wearable computing configuration.
Figure 20B:
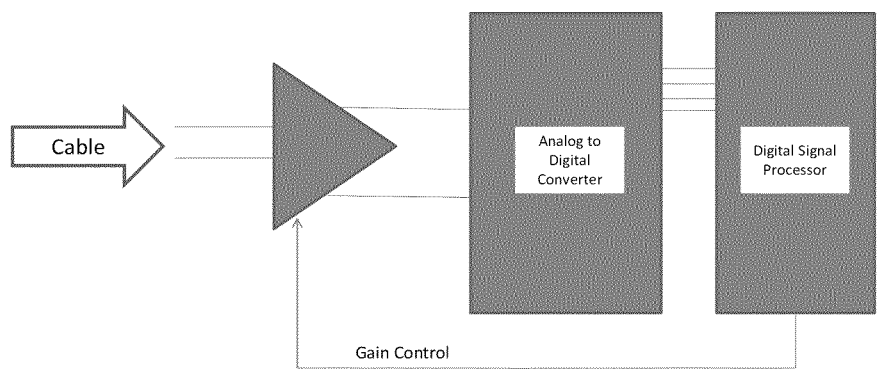
Figure 20C:
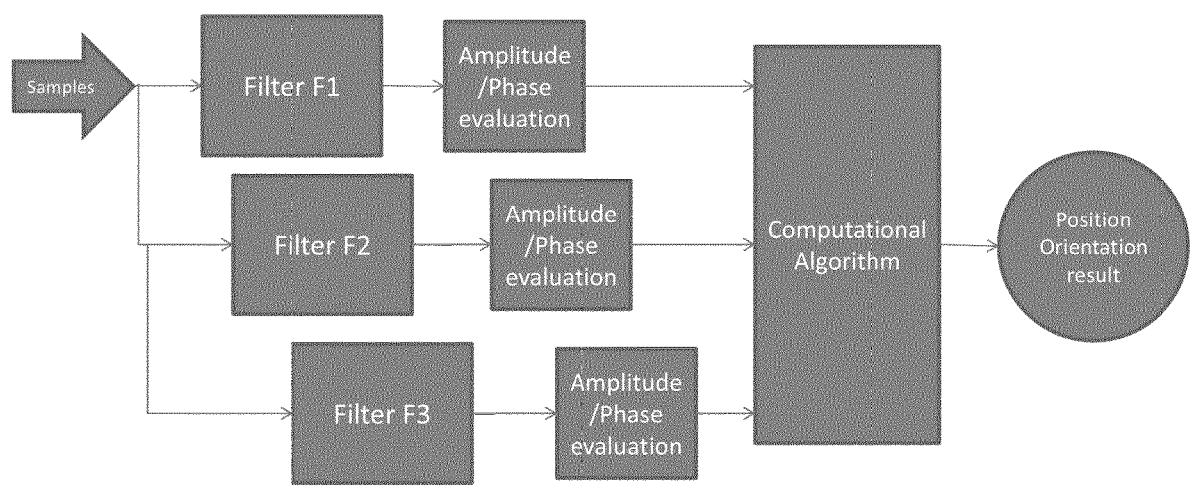

Referring to FIGS. 20A-20C, a configuration is shown with a summing amplifier to simplify circuitry between two subsystems or components of a wearable computing configuration such as a head mounted component and belt-pack component. With a conventional configuration, each of the coils (on the left of FIG. 20A) of an electromagnetic tracking sensor is associated with an amplifier, and three distinct amplified signals would be sent through the cabling to the other component. In the illustrated embodiment, the three distinct amplified signals may be directed to a summing amplifier, which produces one amplified signal that is directed down an advantageously simplified cable, each signal at a different frequency. The summing amplifier may be configured to amplify all three signals coming in; then the receiving digital signal processor, after analog-to-digital conversion, separates the signals at the other end. FIG. 20C illustrates a filter for each frequency—so the signals may be separated back out at such stage.

Figure 21:
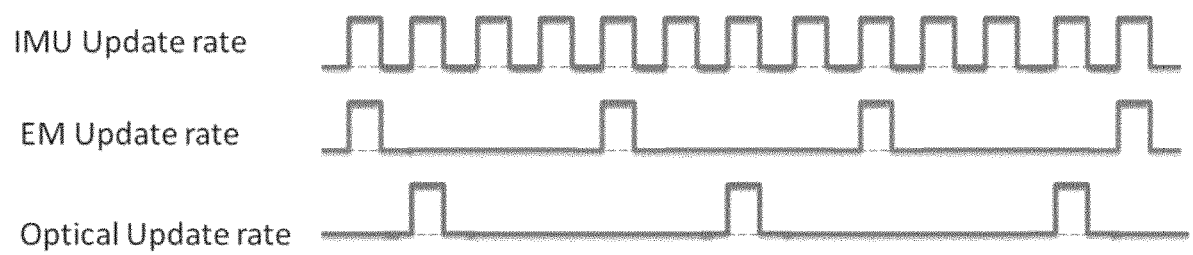
FIG. 21 illustrates electromagnetic tracking update rates.

Referring to FIG. 21, electromagnetic ("EM") tracking updating is relatively "expensive" in terms of power for a portable system, and may not be capable of very high frequency updating. In a "sensor fusion" configuration, more frequently updated localization information from another sensor such as an IMU maybe combined, along with data from another sensor, such as an optical sensor (such as a camera or depth camera), which may or may not be at a relatively high frequency; the net of fusing all of these inputs places a lower demand upon the EM system and provides for quicker updating.

Figure 22A:
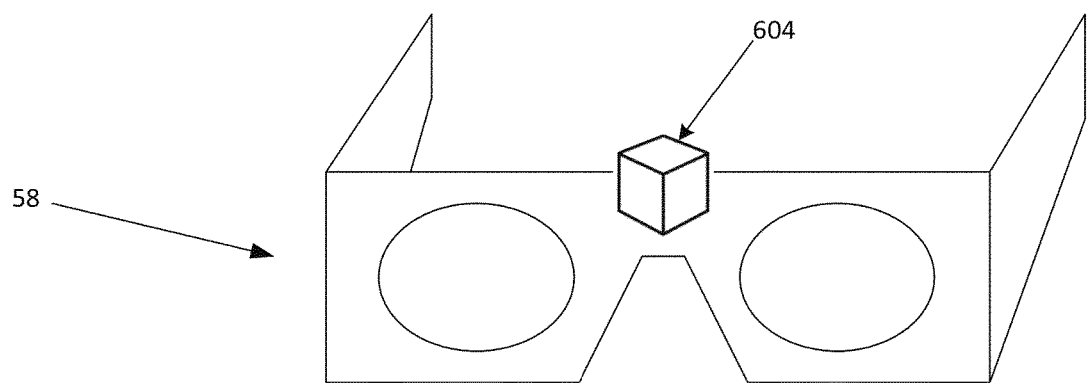
FIG. 22A illustrates a configuration with a single electromagnetic sensor device that may be coupled to a wearable component.
Figure 22B:
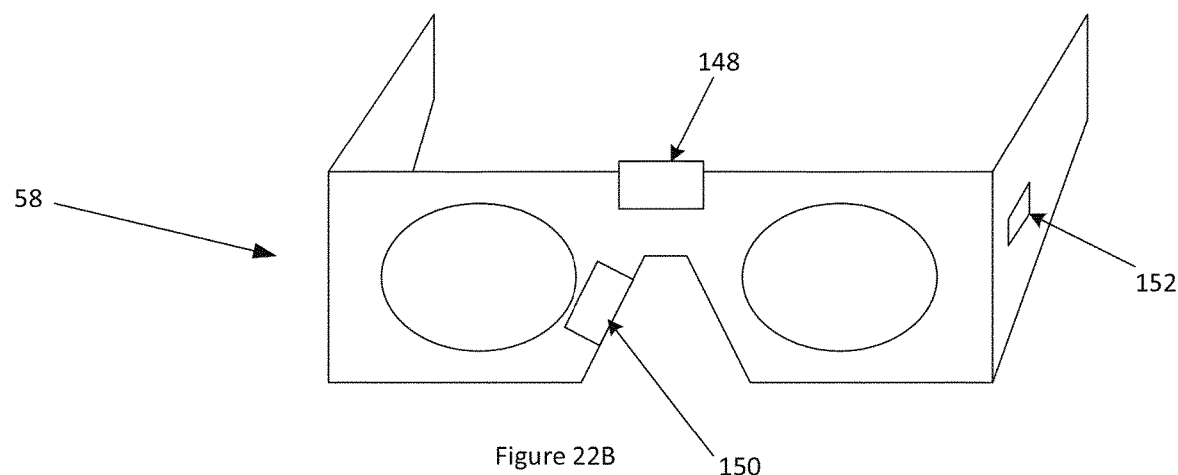
FIG. 22B illustrates another embodiment of the configuration.
Figure 22C:
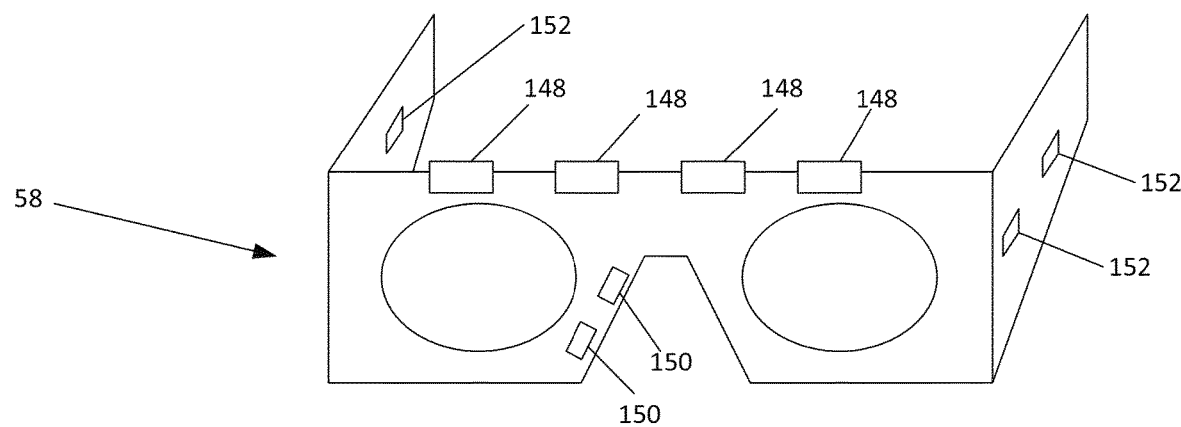
FIG. 22C illustrates another embodiment of the configuration.

Referring back to FIG. 11B, a distributed sensor coil configuration was shown. Referring to FIG. 22A, a configuration with a single electromagnetic sensor device (604), such as a box containing three orthogonal coils, one for each direction of X, Y, Z, may be coupled to the wearable component (58) for 6 degree of freedom tracking, as described above. Also as noted above, such a device may be dis-integrated, with the three sub-portions (e.g., coils) attached at different locations of the wearable component (58), as shown in FIG. 22B. Referring to FIG. 22C, to provide further design alternatives, each individual coil may be replaced with a group of similarly oriented coils, such that the overall magnetic flux for any given orthogonal direction is captured by the group (148, 150, 152) rather than by a single coil for each orthogonal direction. In other words, rather than one coil for each orthogonal direction, a group of smaller coils may be utilized and their signals aggregated to form the signal for that orthogonal direction.

Figure 23A:
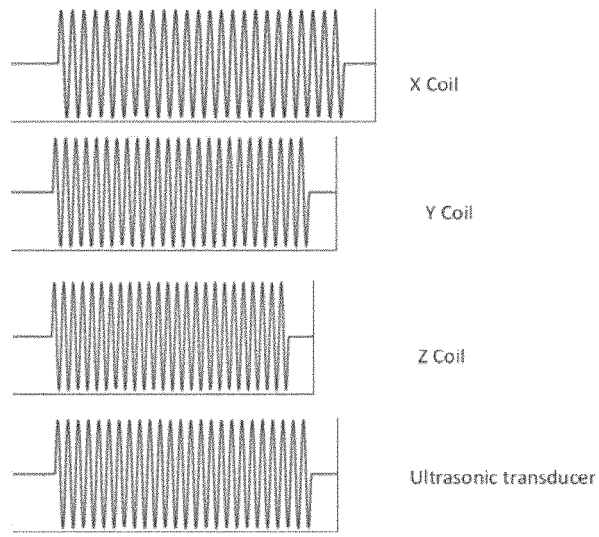
FIG. 23A illustrates coils on a transmitter being energized with a burst of sinewaves.
Figure 23B:
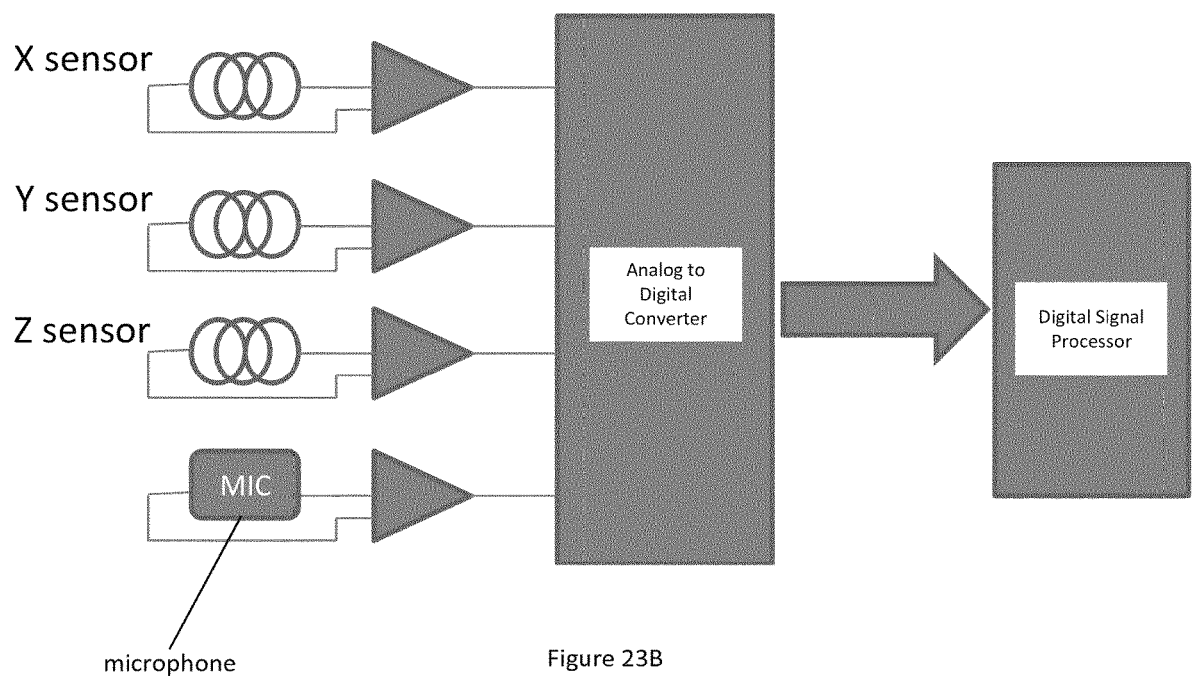
FIG. 23B illustrates a receiver being configured to receive EM waves using sensor coils.
Figure 23C:
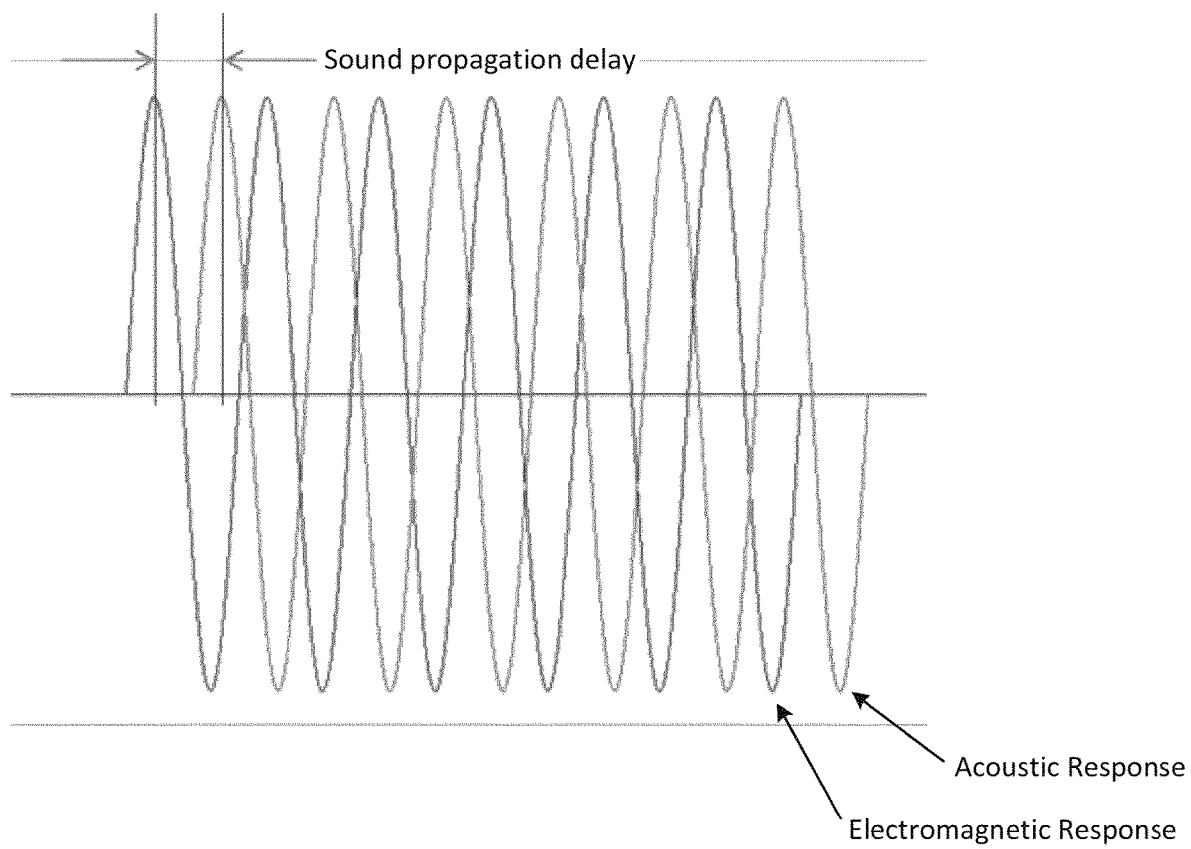
FIG. 23C illustrates an example graph.

Referring to FIGS. 23A-23C, it may be useful to recalibrate a wearable computing system such as those discussed herein from time to time, and in one embodiment, ultrasonic signals at the transmitter, along with a microphone at the receiver and acoustic time of flight calculation, may be utilized to determine sound propagation delay. FIG. 23A shows that in one embodiment, 3 coils on the transmitter are energized with a burst of sinewaves, and at the same time an ultrasonic transducer may be energized with a burst of sinewave, preferably of the same frequency as one of the coils. FIG. 23B illustrates that a receiver may be configured to receive the 3 EM waves using sensor coils, and the ultrasonic wave using a microphone device. Total distance may be calculated from the amplitude of the 3 EM signals; then time of flight may be calculated by comparing the timing of the microphone response with that of the EM coils (FIG. 23C). This may be used to calculate distance and calibrate the EM correction factors.\

Figure 24A:
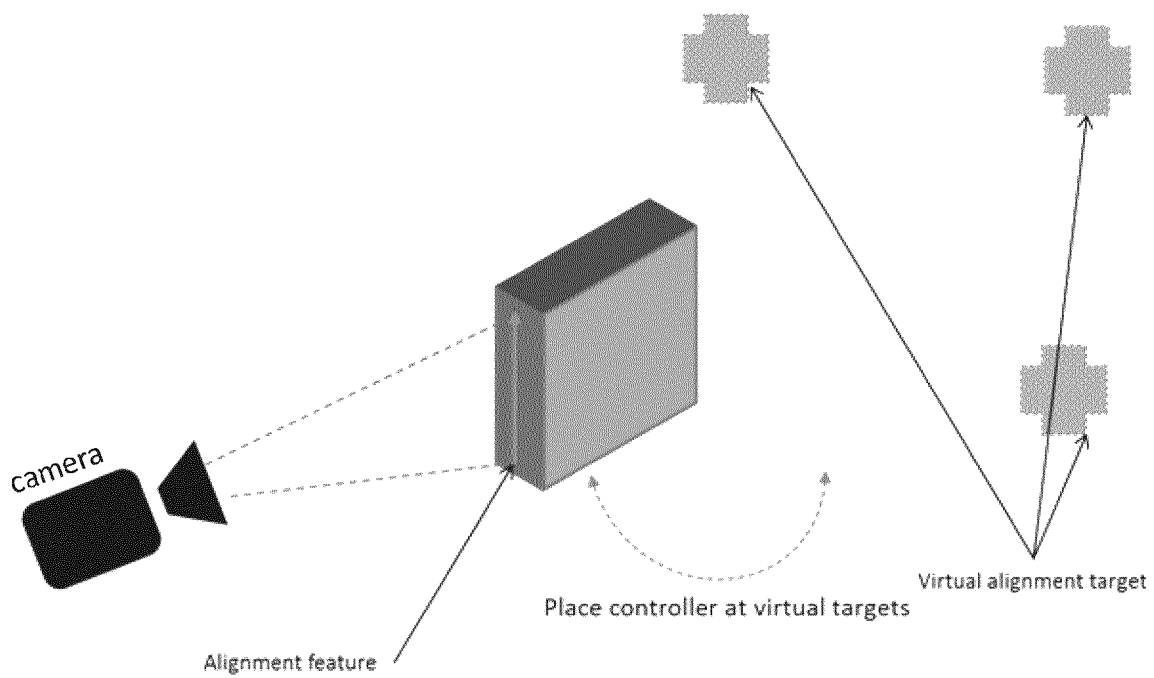
FIG. 24A illustrates an embodiment of an augmented reality system featuring a camera.

Referring to FIG. 24A, in another embodiment, in an augmented reality system featuring a camera, the distance may be calculated by measuring the size in pixels of a known-size feature on another device such as a handheld controller.

Figure 24B:
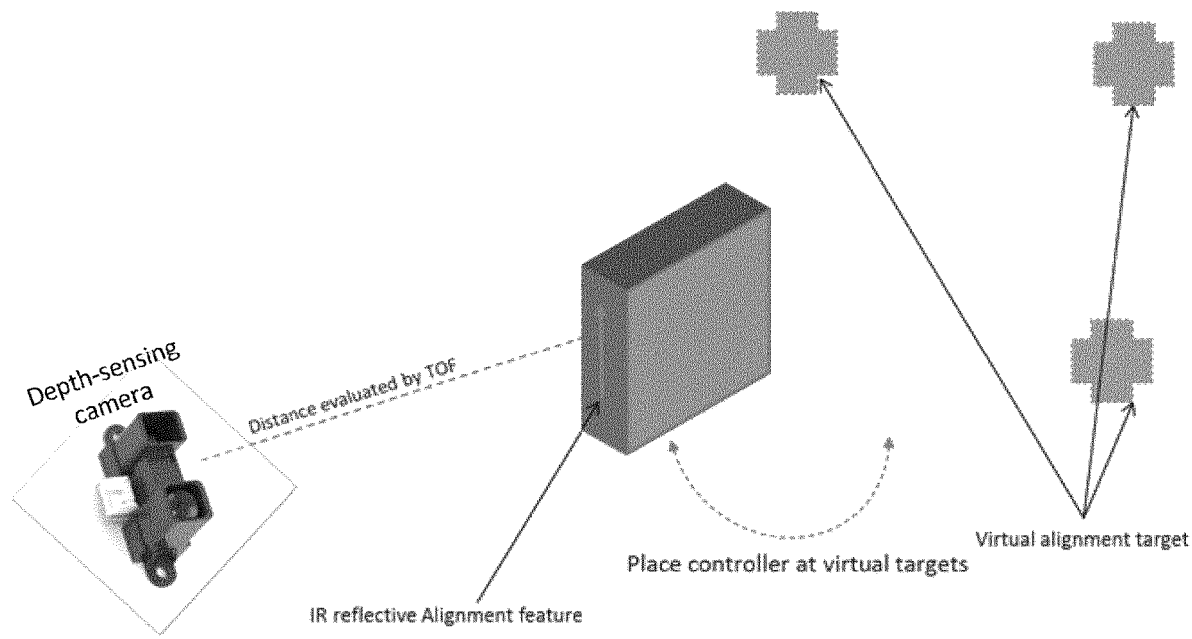
FIG. 24B illustrates an embodiment of an augmented reality system featuring a depth sensor.

Referring to FIG. 24B, in another embodiment, in an augmented reality system featuring a depth sensor, such as an infrared ("IR") depth sensor, the distance may be calculated by such depth sensor and reported directly to the controller.

Figure 24C:
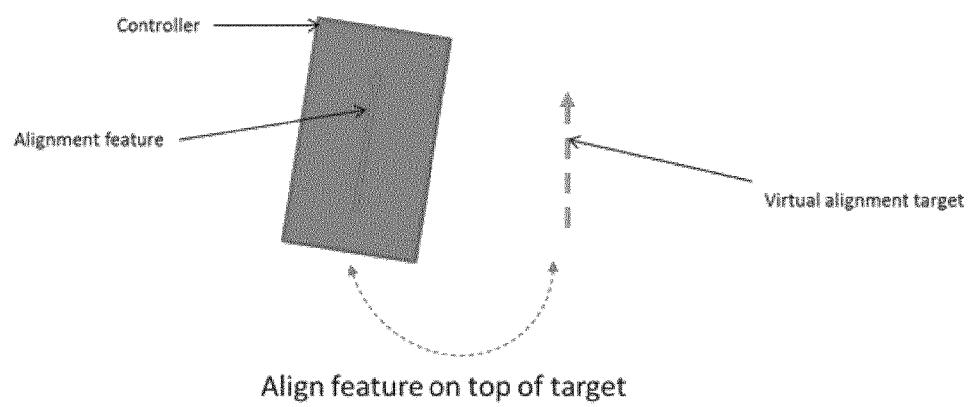
FIGS. 24C-D illustrate determining position in space.
Figure 24D:
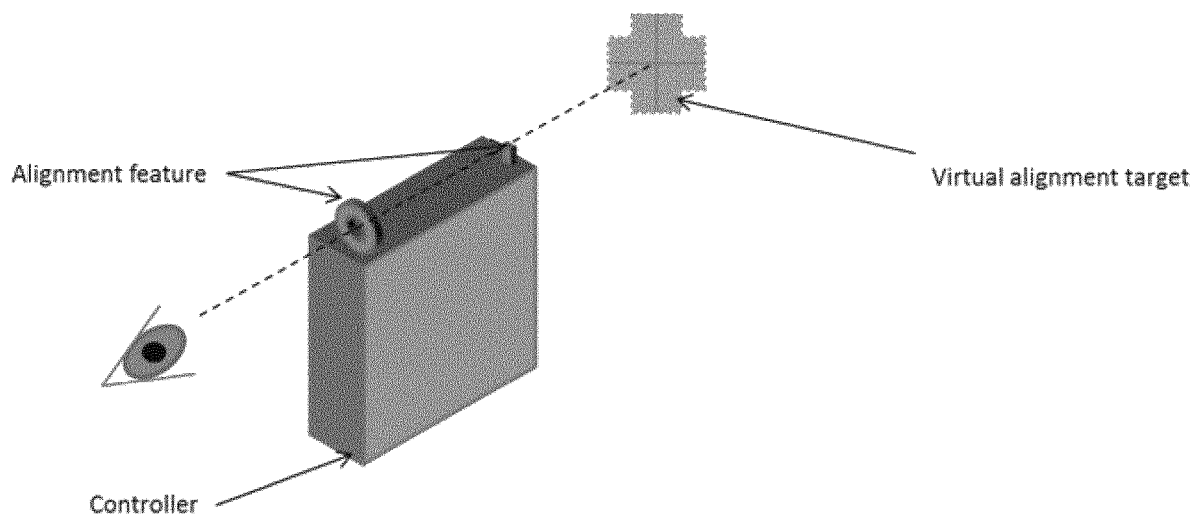

Referring to FIGS. 24C and 24D, once total distance is known, either the camera or the depth sensor can be used to determine position in space. The augmented reality system may be configured to project one or more virtual targets to the user. The user may align the controller to the targets, and the system calculates position from both the EM response, and from the direction of the virtual targets plus the previously calculated distance. Roll angle calibration may be done by aligning a known feature on the controller with a virtual target projected to the user; yaw and Pitch angle may be calibrated by presenting a virtual target to the user and having the user align two features on the controller with the target (much like sighting a rifle).

Figure 25A:
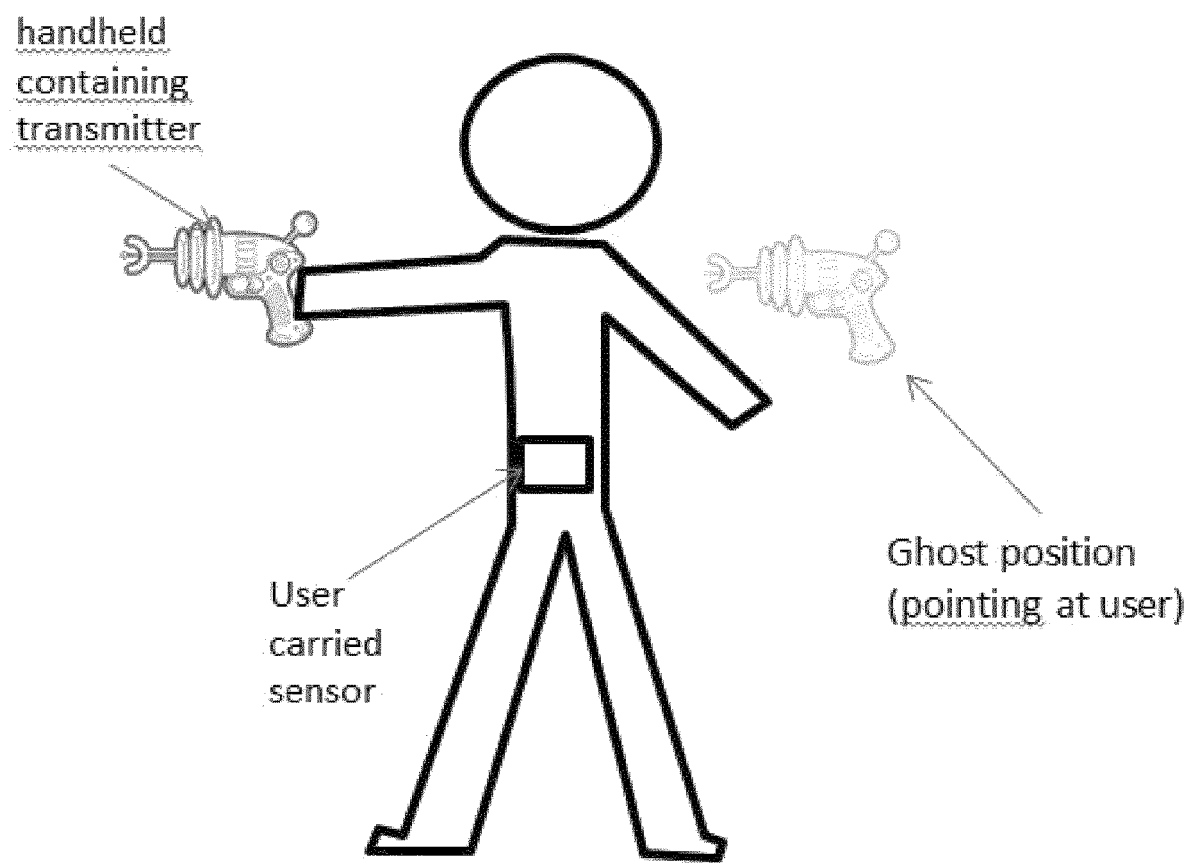
FIGS. 25A-B illustrate inherent ambiguities associated with electromagnetic tracking systems.
Figure 25B:
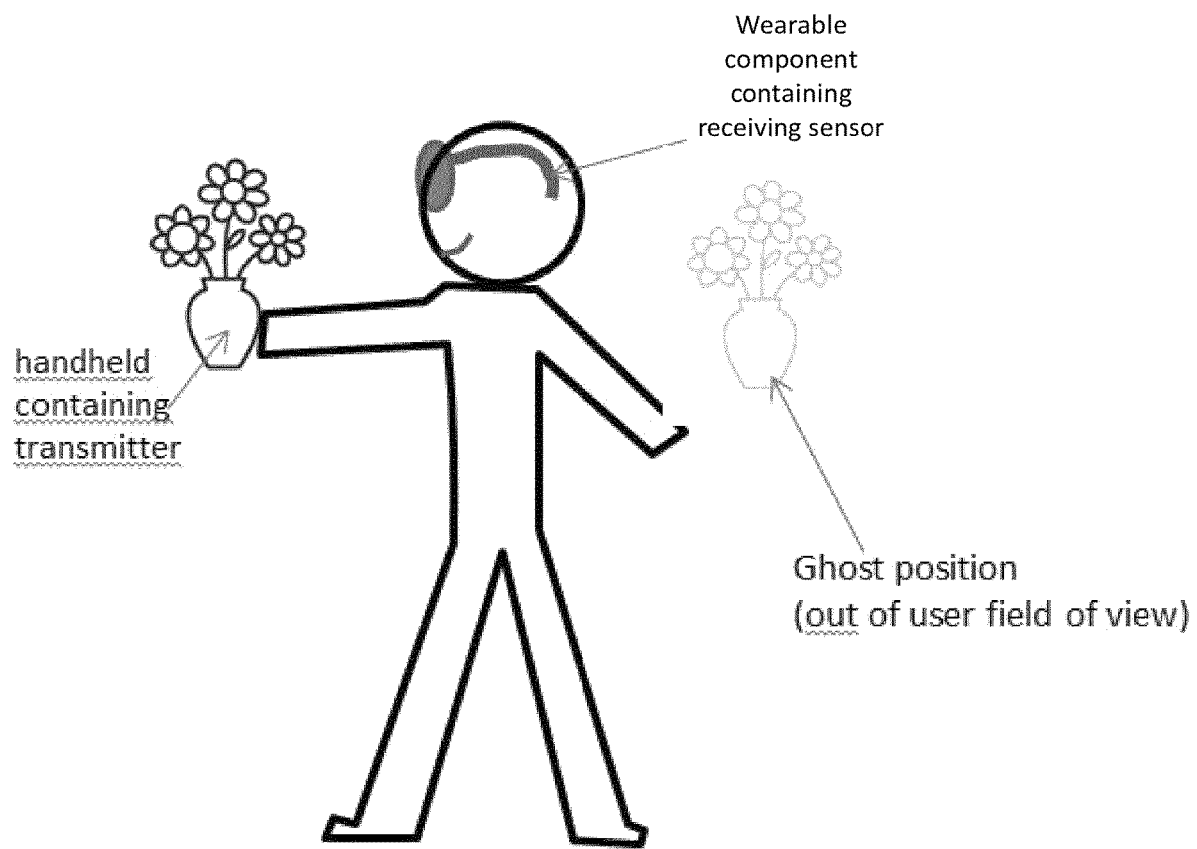

Referring to FIGS. 25A and 25B, there is an inherent ambiguity associated with EM tracking systems: a receiver would generate a similar response in two diagonally opposed locations around the transmitter. Such a challenge is particularly relevant in systems wherein both the transmitter and receiver may be mobile relative to each other.

In one embodiment, one may use an IMU sensor to see if you're on the plus or the negative side of the symmetry axis. In an embodiment such as those described above which feature world cameras and a depth camera, one can use that info to detect whether a handheld component is in the positive side or negative side of the reference axis; if the handheld is outside of the field of view of the camera and/or depth sensor, the system may be configured to decide (or the user may decide) that it must be in the 180 zone directly in back of the user, for example.

Referring back to the embodiments above wherein outward-oriented camera devices (124, 154, 156) are coupled to a system component such as a head mounted component (58), the position and orientation of the head coupled to such head mounted component (58) may be determined using information gathered from these camera devices, using techniques such as simultaneous localization and mapping, or "SLAM" techniques (also known as parallel tracking and mapping, or "PTAM" techniques). Understanding the position and orientation of the head of the user, also known as the user's "head pose", in real or near-real time (e.g., preferably with low latency of determination and updating) is valuable in determining where the user is within the actual environment around him or her, and how to place and present virtual content relative to the user and the environment pertinent to the augmented or mixed reality experience of the user. A typical SLAM or PTAM configuration involves extracting features from incoming image information and using this to triangulate 3-D mapping points, and then tracking against those 3-D mapping points. SLAM techniques have been utilized in many implementations, such as in self-driving cars, where computing, power, and sensing resources may be relatively plentiful when compared with those which might be available on board a wearable computing device, such as a head mounted component (58).

Figure 26:
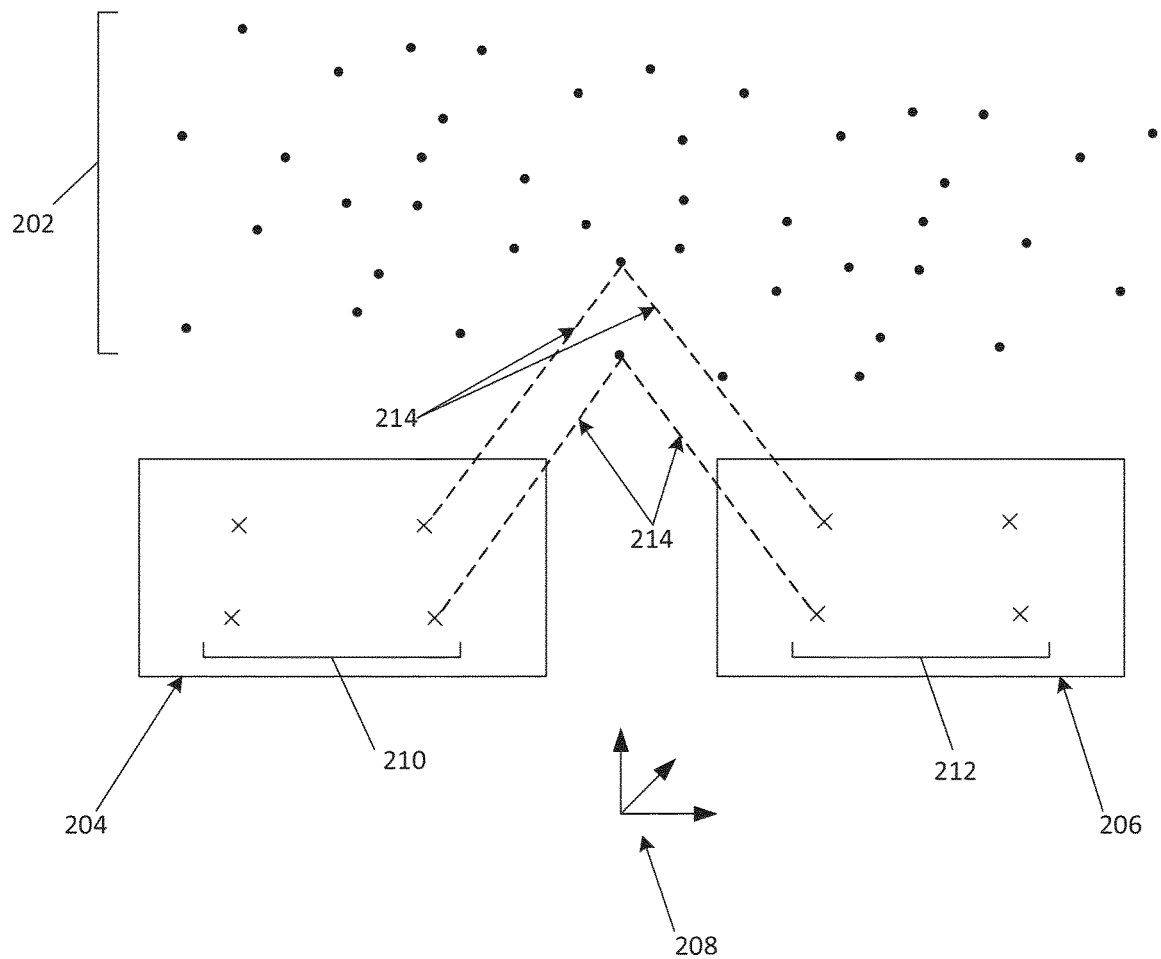
FIG. 26 illustrates a wearable computing device that comprises two outward-facing cameras.

Referring to FIG. 26, in one embodiment, a wearable computing device, such as a head mounted component (58), may comprise two outward-facing cameras producing two camera images (left—204, right—206). In one embodiment a relatively lightweight, portable, and power efficient embedded processor, such as those sold by Movidius®, Intel®, Qualcomm®, or Ceva®, may comprise part of the head mounted component (58) and be operatively coupled to the camera devices. The embedded processor may be configured to first extract features (210, 212) from the camera images (204, 206). If the calibration between the two cameras is known, then the system can triangulate (214) 3-D mapping points of those features, resulting in a set of sparse 3-D map points (202). This may be stored as the "map", and these first frames may be utilized to establish the "world" coordinate system origin (208). As subsequent image information comes into the embedded processor from the cameras, the system may be configured to project the 3-D map points into the new image information, and compare with locations of 2-D features that have been detected in the image information. Thus the system may be configured to attempt to establish a 2-D to 3-D correspondence, and using a group of such correspondences, such as about six of them, the pose of the user's head (which is, of course, coupled to the head mounted device 58) may be estimated. A greater number of correspondences, such as more than six, generally means a better job of estimating the pose. Of course this analysis relies upon having some sense of where the user's head was (e.g., in terms of position and orientation) before the current images being examined. As long as the system is able to track without too much latency, the system may use the pose estimate from the most immediately previous time to estimate where the head is for the most current data. Thus is the last frame was the origin, the system may be configured to estimate that the user's head is not far from that in terms of position and/or orientation, and may search around that to find correspondences for the current time interval. Such is a basis of one embodiment of a tracking configuration.

After moving sufficiently away from the original set of map points (202), one or both camera images (204, 206) may start to lose the map points in the newly incoming images (for example, if the user's head is rotating right in space, the original map points may start to disappear to the left and may only appear in the left image, and then not at all with more rotation). Once the user has rotated too far away from the original set of map points, the system may be configured to create new map points, such as by using a process similar to that described above (detect features, create new map points)—this is how the system may be configured to keep populating the map. In one embodiment, this process may be repeated again every 10 to 20 frames, depending upon how much the user is translating and/or rotating his head relative to his environment, and thereby translating and/or rotating the associated cameras. Frames associated with newly created mapping points may be deemed "key frames", and the system may be configured to delay the feature detection process with key frames, or alternatively, feature detection may be conducted upon each frame to try to establish matches, and then when the system is ready to create a new key frame, the system already has that associated feature detection completed. Thus, in one embodiment, the basic paradigm is to start off creating a map, and then track, track, track until the system needs to create another map or additional portion thereof.

Figure 27:
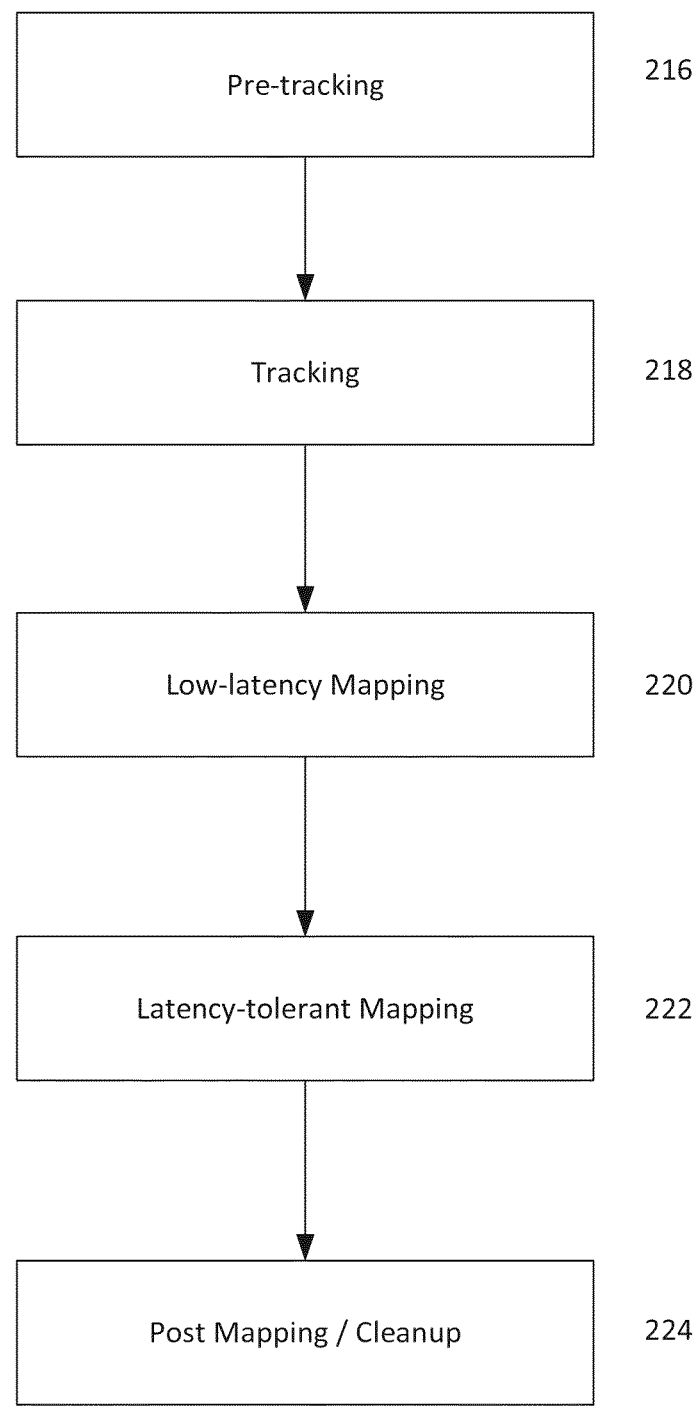
FIG. 27 illustrates a flowchart of an example process for vision based pose calculations.

Referring to FIG. 27, in one embodiment, vision based pose calculation may be split into 5 stages (pre-tracking 216, tracking 218, low-latency mapping 220, latency-tolerant mapping 222, post mapping/cleanup 224) to assist with precision and optimization for embedded processor configurations wherein computation, power, and sensing resources may be limited.

With regard to pretracking (216), the system may be configured to identify which map points project into the image before the image information arrives. In other words, the system may be configure to identify which map points would project into the image given that the system knows where the user was before, and has a sense or where the user is going. The notion of "sensor fusion" is discussed further below, but it is worth noting here that one of the inputs that the system may get from a sensor fusion module or functionality may be "post estimation" information, at a relatively fast rate, such as at 250 Hz from an inertial measurement unit ("IMU") or other sensor or device (this is a high rate relative to, say, 30 Hz, at which the vision based pose calculation operation may be providing updates). Thus there may be a much finer temporal resolution of pose information being derived from IMU or other device relative to vision based pose calculation; but it is also noteworthy that the data from devices such as IMUs tends to be somewhat noisy and susceptible to pose estimation drift, as discussed below. For relatively short time windows, such as 10-15 milliseconds, the IMU data may be quite useful in predicting pose, and, again, when combined with other data in a sensor fusion configuration, an optimized overall result may be determined.

Pose information coming from a sensor fusion module or functionality may be termed "pose prior", and this pose prior may be utilized by the system to estimate which sets of points are going to project into the current image. Thus in one embodiment, the system is configured in a "pre tracking" step (216) to pre-fetch those map points and conduct some pre-processing that helps to reduce latency of overall processing. Each of the 3-D map points may be associated with a descriptor, so that the system may identify them uniquely and match them to regions in the image. For example, if a given map point was created by using a feature that has a patch around it, the system may be configured to maintain some semblance of that patch along with the map point, so that when the map point is seen projected onto other images, the system can look back at the original image used to create the map, examine the patch correlation, and determine if they are the same point. Thus in pre-processing, the system may be configured to do some amount of fetching of map points, and some amount of pre-processing associated with the patches associated with those map points. Thus in pre-tracking (216), the system may be configured to pre-fetch map points, and pre-warp image patches (a "warp" of an image may be done to ensure that the system can match the patch associated with the map point with the current image; it's a way to make sure that the data being compared is compatible).

Referring back to FIG. 27, a tracking stage may comprise several components, such as feature detection, optical flow analysis, feature matching, and pose estimation. While detecting features in the incoming image data, the system may be configured to utilize optical flow analysis to save computational time in feature detection by trying to follow features from one or more previous images. Once features have been identified in the current image, the system may be configured to try to match the features with projected map points—this may be deemed the "feature matching" portion of the configuration. In the pre-tracking stage (216), the system preferably has already identified which map points are of interest, and fetched them; in feature mapping, they are projected into the current image and the system tries to match them with the features. The output of feature mapping is the set of 2-D to 3-D correspondences, and with that in hand, the system is configured to estimate the pose.

As the user is tracking his head around, coupled to the head mounted component (58), the system preferably is configured to identify if the user is looking at a new region of the environment or not, to determine whether a new key frame is needed. In one embodiment, such analysis of whether a new key frame is needed may be almost purely based upon geometry; for example, the system may be configured to look at the distance (translational distance; also field-of-view capture reorientation—the user's head may be close translationally but re-oriented such that completely new map points are required, for example) from the current frame to the remaining key frames. Once the system has determined that a new key frame should be inserted, the mapping stage may be started. As noted above, the system may be configured to operate mapping as three different operations (low-latency mapping, latency-tolerant mapping, post/mapping or cleanup), as opposed to a single mapping operation more likely seen in a conventional SLAM or PTAM operation.

Low-latency mapping (220), which may be thought of in a simplistic form as triangulation and creation of new map points, is a critical stage, with the system preferably configured to conduct such stage immediately, because the paradigm of tracking discussed herein relies upon map points, with the system only finding a position if there are map points available to track against. The "low-latency" denomination refers to the notion that there is no tolerance for unexcused latency (in other words, this part of the mapping needs to be conducted as quickly as possible or the system has a tracking problem).

Latency-tolerant mapping (222) may be thought of in a simplistic form as an optimization stage. The overall process does not absolutely require low latency to conduct this operation known as "bundle adjustment", which provides a global optimization in the result. The system may be configured to examine the positions of 3-D points, as well as where they were observed from. There are many errors that can chain together in the process of creating map points. The bundle adjustment process may take, for example, particular points that were observed from two different view locations and use all of this information to gain a better sense of the actual 3-D geometry. The result may be that the 3-D points and also the calculated trajectory (e.g., location, path of the capturing cameras) may be adjusted by a small amount. It is desirable to conduct these kinds of processes to not accumulate errors through the mapping/tracking process.

The post mapping/cleanup (224) stage is one in which the system may be configured to remove points on the map that do not provide valuable information in the mapping and tracking analysis. In this stage, these points that do not provide useful information about the scene are removed, and such analysis is helpful in keeping the entire mapping and tracking process scaleable.

During the vision pose calculation process, there is an assumption that features being viewed by the outward-facing cameras are static features (e.g., not moving from frame to frame relative to the global coordinate system). In various embodiments, semantic segmentation and/or object detection techniques may be utilized to remove moving objects from the pertinent field, such as humans, moving vehicles, and the like, so that features for mapping and tracking are not extracted from these regions of the various images. In one embodiment, deep learning techniques, such as those described below, may be utilized for segmenting out these non-static objects.

Referring to FIGS. 28A-28F, a sensor fusion configuration may be utilized to benefit from one source of information coming from a sensor with relatively high update frequency (such as an IMU updating gyro, accelerometer, and/or magnetometer data pertinent to head pose at a frequency such as 250 Hz) and another information source updating at a lower frequency (such as a vision based head pose measurement process updating at a frequency such as 30 Hz).

Figure 28A:
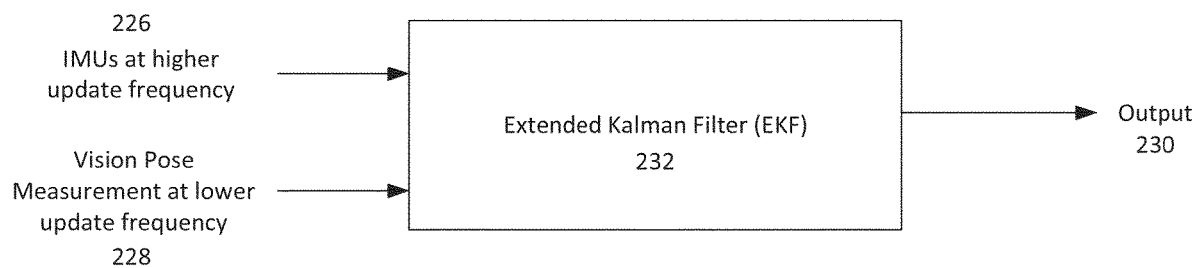
FIG. 28A illustrates use of an Extended Kalman Filter.
Figure 28B:
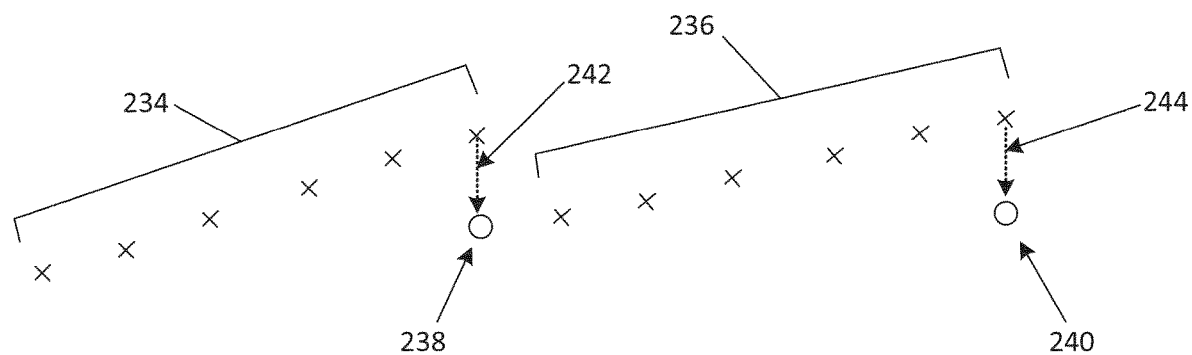
FIGS. 28B-F illustrate how data from one source at a higher update frequency may be combined with the data from another source at a lower update frequency.

Referring to FIG. 28A, in one embodiment the system may be configured to use an extended Kalman filter ("EKF", 232) and to track a significant amount of information regarding the device. For example, in one embodiment, it may account for 32 states, such as angular velocity (e.g., from the IMU gyroscope), translational acceleration (e.g., from the IMU accelerometers), calibration information for the IMU itself (e.g., coordinate systems and calibration factors for the gyros and accelerometers; the IMU may also comprise one or more magnetometers). Thus the system may be configured to take in IMU measurements at a relatively high update frequency (226), such as 250 Hz, as well as data from some other source at a lower update frequency (e.g., calculated vision pose measurement, odometry data, etc), here vision pose measurement (228) at an update frequency such as 30 Hz.

Each time the EKF gets a round of IMU measurements, the system may be configured to integrate the angular velocity information to get rotational information (e.g., the integral of angular velocity (change in rotational position over change in time) is angular position (change in angular position)); likewise for translational information (in other words, by doing a double integral of the translational acceleration, the system will get position data). With such calculation the system is configured to get 6 degree-of-freedom ("DOF") pose information from the head (translation in X, Y, Z; orientation for the three rotational axes)—at the high frequency from the IMU (e.g., 250 Hz in one embodiment). Each time an integration is done, noise is accumulated in the data; doing a double integration on the translational or rotational acceleration can propagate noise. Generally the system is configured to not rely on such data which is susceptible to "drift" due to noise for too long a time window, such as any longer than about 100 milliseconds in one embodiment. The incoming lower frequency (e.g., updated at about 30 Hz in one embodiment) data from the vision pose measurement (228) may be utilized to operate as a correction factor with the EKF (232), producing a corrected output (230).

Referring to FIGS. 28B-28F, to illustrate how the data from one source at a higher update frequency may be combined with the data from another source at a lower update frequency, a first group of points (234) from an IMU at a higher frequency, such as 250 Hz, is shown, with a point (238) coming in at a lower frequency, such as 30 Hz, from a vision pose calculation process. The system may be configured to correct (242) to the vision pose calculation point when such information is available, and then continue forward with more points from the IMU data (236) and another correction (244) from another point (240) available from the vision pose calculation process. The may be termed applying an "update" with the vision pose data to the "propagation" of data coming from the IMU, using the EKF.

Figure 28C:
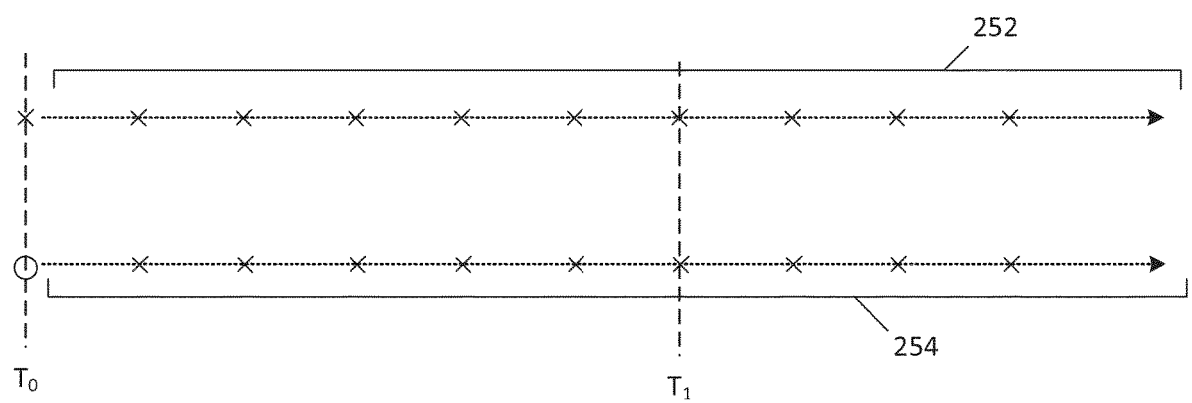
Figure 28D:
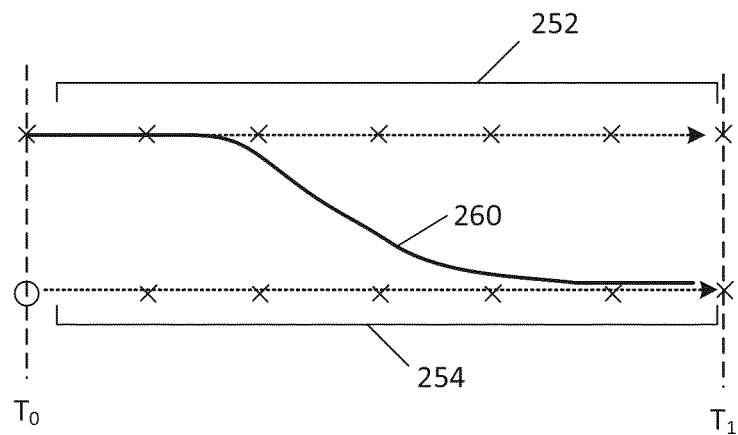
Figure 28E:
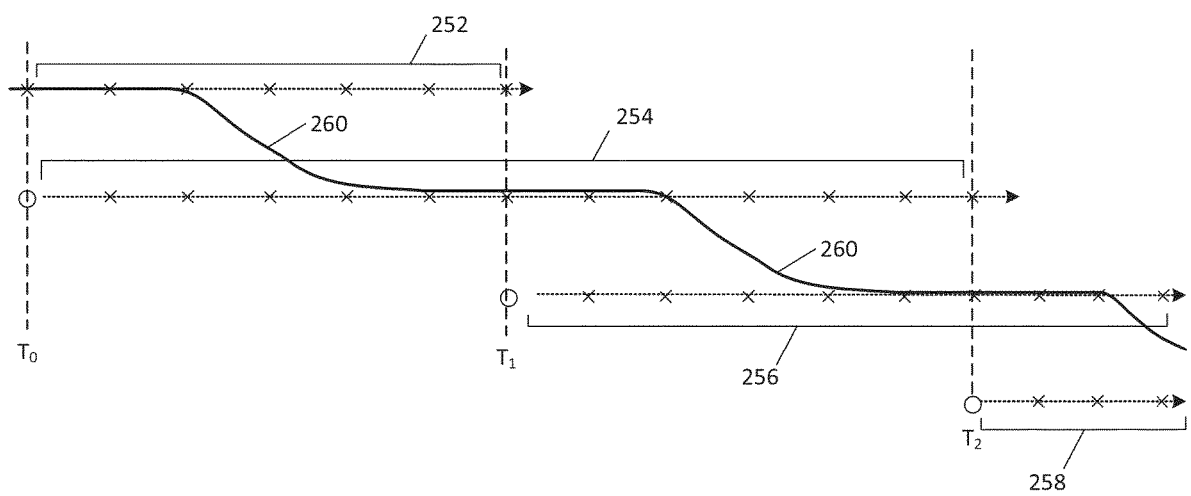
Figure 28F:
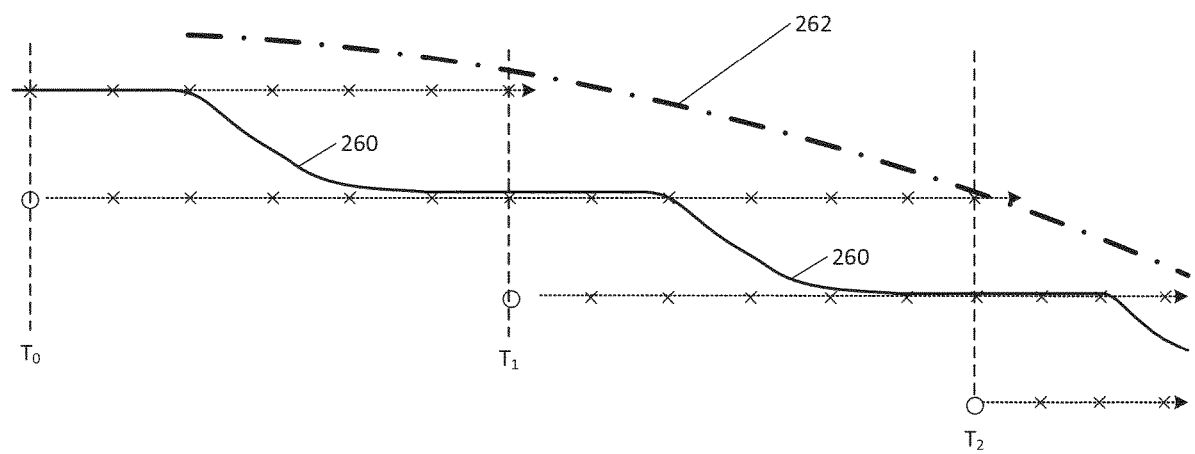

In is notable that in some embodiments, the data from the second source (e.g., such as the vision pose data) may come in not only at a lower update frequency, but also with some latency—meaning that the system preferably is configured to navigate a time domain adjustment as the information from IMU and vision pose calculation are integrated. In one embodiment, to ensure that the system is fusing in the vision pose calculation input at the correct time domain position in the IMU data, a buffer of IMU data may be maintained, to go back, to a time (say "Tx") in the IMU data to do the fusion and calculate the "update" or adjustment at the time pertinent to the input from the vision pose calculation, and then account for that in forward propagation to the current time (say "Tcurrent"), which leaves a gap between the adjusted position and/or orientation data and the most current data coming from the IMU. To ensure that there is not too much of a "jump" or "jitter" in the presentation to the user, the system may be configured to use smoothing techniques. One way to address this issue is to use weighted averaging techniques, which may be linear, nonlinear, exponential, etc., to eventually drive the fused datastream down to the adjusted path. Referring to FIG. 28C, for example, weighted averaging techniques may be utilized over the time domain between T0 and T1 to drive the signal from the unadjusted path (252; e.g., coming straight from the IMU) to the adjusted path (254; e.g., based upon data coming from the visual pose calculation process); one example is shown in FIG. 28D, wherein a fused result (260) is shown starting at the unadjusted path (252) and time T0 and moving exponentially to the adjusted path (254) by T1. Referring to FIG. 28E, a series of correction opportunities is shown with an exponential time domain correction of the fused result (260) toward the lower path from the upper path in each sequence (first correction is from the first path 252, say from the IMU, to the second path 254, say from vision based pose calculation; then continuing with the similar pattern forward, using the continued IMU data while correcting, down in this example toward successive corrected lower paths 256, 258 based upon successive points from vision pose, using each incoming vision based pose calculation point). Referring to FIG. 28F, with short enough time windows between the "updates" or corrections, the overall fused result (260) functionally may be perceived as a relatively smooth patterned result (262).

In other embodiment, rather than rely directly upon the vision pose measurement, the system may be configured to examine the derivative EKF; in other words, rather than using vision pose calculation result directly, the system uses the change in vision pose from the current time to the previous time. Such a configuration may be pursued, for example, if the amount of noise in the vision pose difference is a lot less than the amount of noise in the absolute vision pose measurement. It is preferable to not have instantaneous errors throwing off the fused result, because the output of all of this is pose, which gets sent back as the "pose prior" values to the vision system.

The external system-based "consumer" of the pose result may be termed the "Pose Service", and the system may be configured such that all other system components tap into the Pose Service when requesting a pose at any given time. The Pose Service may be configured to be a queue or stack (e.g., a buffer), with data for a sequences of time slices, one end having the most recent data. If a request of the Pose Service is the current pose, or some other pose that is in the buffer, then it may be outputted immediately; in certain configurations, the Pose Service will receive a request for: what is the pose going to be 20 milliseconds forward in time from now (for example, in a video game content rendering scenario—it may be desirable for a related service to know that it needs to be rendering something in a given position and/or orientation slightly in the future from now). In one model for producing a future pose value, the system may be configured to use a constant velocity prediction model (e.g., assume that the user's head is moving with a constant velocity and/or angular velocity); in another model for producing a future pose value, the system may be configured to use a constant acceleration prediction model (e.g. assume that the user's head is translating and/or rotating with constant acceleration). The data in the data buffer may be utilized to extrapolate where the pose will be using such models. A constant acceleration model uses a bit longer tail into the data of the buffer for prediction than does a constant velocity model, and we have found that the subject systems can predict into the range of 20 milliseconds in the future without substantial degradation. Thus the Pose Service may be configured to have a data buffer going back in time, as well as about 20 milliseconds or more going forward, in terms of data that may be utilized to output pose. Operationally, content operations generally will be configured to identify when the next frame draw is going to be coming in time (for example, it will either try to draw at a time T, or at a time T+N, the N being the next interval of updated data available from the Pose Service).

The use of user-facing (i.e., inward-facing, such as toward the user's eyes) cameras, such as those depicted in FIG. 16B (14) may be utilized to conduct eye tracking, as described, for example, in U.S. patent application Ser. No. 14/707,000 and 15/238,516, which are incorporated by reference herein in their entirety. The system may be configured to conduct several steps in eye tracking, such as first taking an image of the eye of the user; then using segmenting analysis to segment anatomy of the eye (for example, to segment the pupil, from the iris, from the sclera, from the surrounding skin); then the system may be configured to estimate the pupil center using glint locations identified in the images of the eye, the glints resulting from small illumination sources (16), such as LEDs, which may be placed around the inward-facing side of the head mounted component (58); from these steps, the system may be configured to use geometric relationships to determine an accurate estimate regarding where in space the particular eye is gazing. Such processes are fairly computationally intensive for two eyes, particularly in view of the resources available on a portable system, such as a head mounted component (58) featuring on on-board embedded processor and limited power. Deep learning techniques may be trained and utilized to address these and other computational challenges. For example, in one embodiment, a deep learning network may be utilized to conduct the segmentation portion of the aforementioned eye tracking paradigm (e.g., a deep convolutional network may be utilized for robust pixel-wise segmentation of the left and right eye images into iris, pupil, sclera, and rest classes), with everything else remaining the same; such a configuration takes one of the large computationally intensive portions of the process and makes it significantly more efficient. In another embodiment, one joint deep learning model may be trained and utilized to conduct segmentation, pupil detection, and glint detection (e.g., a deep convolutional network may be utilized for robust pixel-wise segmentation of the left and right eye images into iris, pupil, sclera, and rest classes; eye segmentation may then be utilized to narrow down the 2-D glint locations of active inward-facing LED illumination sources); then the geometry calculations to determine gaze may be conducted. Such a paradigm also streamlines computation. In a third embodiment, a deep learning model may be trained and utilized to directly estimate gaze based upon the two images of the eyes coming from the inward-facing cameras (e.g., in such an embodiment, a deep learning model solely using the pictures of the user's eyes may be configured to tell the system where the user is gazing in three dimensional space; a deep convolutional network may be utilized for robust pixel-wise segmentation of the left and right eye images into iris, pupil, sclera, and rest classes; eye segmentation may then be utilized to narrow down the 2-D glint locations of active inward-facing LED illumination sources; the 2-D glint locations along with 3-D LED locations may be utilized to detect the cornea center in 3-D; note that all 3-D locations may be in the respective camera coordinate system; then eye segmentation may also be utilized to detect the pupil center in the 2-D image using ellipse fitting; using offline calibration information, the 2-D pupil center may be mapped to a 3-D gaze point, with depth being determined during calibration; the line connecting the cornea 3-D location and the 3-D gaze point location is the gaze vector for that eye); such a paradigm also streamlines computation, and the pertinent deep network may be trained to directly predict the 3-D gaze point given the left and right images. The loss function for such deep network to perform such a training may be a simple Euclidean loss, or also include the well-known geometric constraints of the eye model.

Further, deep learning models may be included for biometric identification using images of the user's iris from the inward-facing cameras. Such models may also be utilized to determine if a user is wearing a contact lens—because the model will jump out in the Fourier transform of the image data from the inward-facing cameras.

The use of outward-facing cameras, such as those depicted in FIG. 16A (124, 154, 156) may be utilized to conduct SLAM or PTAM analysis for the determination of pose, such as the pose of a user's head relative to the environment in which he is present wearing a head-mounted component (58), as described above. Most SLAM techniques are dependent upon tracking and matching of geometric features, as described in the embodiments above. Generally it is helpful to be in a "textured" world wherein the outward-facing cameras are able to detect corners, edges, and other features; further, certain assumptions may be made about the permanence/statics of features that are detected in scenes, and it is helpful to have significant computing and power resources available for all of this mapping and tracking analysis with SLAM or PTAM processes; such resources may be in short supply with certain systems, such as some of those which are portable or wearable, and which may have limited embedded processing capabilities and power available. Deep learning networks may be incorporated into various embodiments to observe differences in image data, and based upon training and configuration, play a key role in the SLAM analysis (in the context of SLAM, the deep networks herein may be deemed "DeepSLAM" networks) of variations of the subject system.

In one embodiment, a DeepSLAM network may be utilized to estimate pose between a pair of frames captured from cameras coupled to a component to be tracked, such as the head mounted component (58) of an augmented reality system. The system may comprise a convolutional neural network configured to learn transformation of pose (for example, the pose of a head mounted component 58) and apply this in a tracking manner. The system may be configured to start looking at a particular vector and orientation, such as straight ahead at a known origin (so 0,0,0 as X, Y, Z). Then the user's head may be moved, for example, to the right a bit, then to the left a bit between frame 0 and frame 1 with the goal of seeking the pose transform or relative pose transformation. The associated deep network may be trained on a pair of images, for example, wherein we know pose A and pose B, and image A and image B; this leads to a certain pose transformation. With the pose transformation determined, one may then integrate associated IMU data (from accelerometers, gyros, etc—as discussed above) into the pose transformation and continue tracking as the user moves away from the origin, around the room, and at whatever trajectory. Such a system may be termed a "relative pose net", which as noted above, is trained based upon pairs of frames wherin the known pose information is available (the transformation is determined from one frame to the other, and based upon the variation in the actual images, the system learns what the pose transformation is in terms of translation and rotation). Deep homography estimation, or relative pose estimation, has been discussed, for example, in U.S. Patent Application Ser. No. 62/339,799, which is incorporated by reference herein in its entirety.

When such configurations are utilized to conduct pose estimation from frame 0 to frame 1, the result generally is not perfect, and the system must have a means for dealing with drift. As the system moves forward from frame 1 to 2 to 3 to 4 and estimates relative pose, there is a small amount of error brought in between each pair of frames. This error generally accumulates and becomes a problem (for example, without addressing this error-based drift, the system can end up placing the user and his or her associated system componentry in the wrong location and orientation with pose estimation. In one embodiment, the notion of "loop closure" may be applied to solve what may be termed the "relocalization" problem. In other words, the system may be configured to determine if it has been in a particular place before—and if so, then the predicted pose information should make sense in view of the previous pose information for the same location. For example, the system may be configured such that anytime it sees a frame on the map that has been seen before, it relocalizes; if the translation is off, say by 5 mm in the X direction, and the rotation is off, say by 5 degrees in the theta direction, then the system fixes this discrepancy along with those of the other associated frames; thus the trajectory becomes the true one, as opposed to the wrong one. Relocalization is discussed in U.S. Patent Application Ser. No. 62/263,529, which is incorporated by reference herein in its entirety.

It also turns out that when pose is estimated, in particular by using IMU information (e.g., such as data from associated accelerometers, gyros, and the like, as described above), there is noise in the determined position and orientation data. If such data is directly utilized by the system without further processing to present images, for example, there is likely to be undesirable jitter and instability experienced by the user; this is why in certain techniques, such as some of those described above, Kalman filters, sensor fusion techniques, and smoothing functions may be utilized. With deep network solutions, such as those described above using convolutional neural nets to estimate pose, the smoothing issue may be addressed using recurrent neural networks, or RNNs, which are akin to a long short term memory network. In other words, the system may be configured to build up the convolutional neural net, and on top of that, the RNN is placed. Traditional neural nets are feed forward in design, static in time; given an image or pair of images, they give you an answer. With the RNN, the output of a layer is added to the next input and fed back into the same layer again—which typically is the only layer in the net; can be envisioned as a "passage through time"—at each point in time, the same net layer is reconsidering a slightly temporally tuned input, and this cycle is repeated. Further, unlike feed forward nets, an RNN can receive a sequence of values as an input (e.g., sequenced over time)—and can also produce a sequence of values as output. The simple structure of the RNN with built in feedback loop that allows it to behave like a forecasting engine, and the result when combined with the convolutional neural net in this embodiment is that the system can take relatively noisy trajectory data from the convolutional neural net, push it through the RNN, and it will output a trajectory that is much smoother, much more like human motion, such as motion of a user's head which may be coupled to a head mounted component (58) of a wearable computing system.

The system may also be configured to determine depth of an object from a stereo pair of images, wherein you have a deep network and left and right images are input. The convolutional neural net may be configured to output the disparity between left and right cameras (such as between left eye camera and right eye camera on a head mounted component 58); the determined disparity is the inverse of the depth if the focal distance of the cameras is known, so the system can be configured to efficiently calculate depth having the disparity information; then meshing and other processes may be conducted without involving alternative components for sensing depth, such as depth sensors, which may require relatively high computing and power resource loads.

As regards semantic analysis and the application of deep networks to various embodiments of the subject augmented reality configurations, several areas are of particular interest and applicability, including but not limited to detection of gestures and keypoints, face recognition, and 3-D object recognition.

With regard to gesture recognition, in various embodiments the system is configured to recognize certain gestures by a user's hands to control the system. In one embodiment, the embedded processor may be configured to utilize what are known as "random forests" along with sensed depth information to recognize certain gestures by the user. A random forest model is a nondeterministic model which may require a fairly large library of parameters, and may require a relatively large processing and therefore power demand. Further, depth sensors may not always be optimally suited for reading hand gestures with certain backgrounds, such as desk or tabletops or walls which are near to the depth of the subject hand, due to noise limitations with certain depth sensors and inabilities to determine differences between, for example, 1 or 2 cm in depth accurately. In certain embodiments, random forest type of gesture recognition may be replaced with deep learning networks. One of the challenges in utilizing deep networks for such a configuration is in labelling portions of the image information, such as pixels, as "hand" or "not hand"; training and utilizing deep networks with such segmentation challenges may require doing segmentations with millions of images, which is very expensive and time consuming. To address this, in one embodiment, during training time, a thermal camera, such as those available for military or security purposes, may be coupled to the conventional outward-facing camera, such that the thermal camera essentially does the segmentation of "hand" and "no hand" itself by showing which portions of the image are hot enough to be human hand, and which are not.

With regard to face recognition, and given that the subject augmented reality system is configured to be worn in a social setting with other persons, understanding who is around the user may be of relatively high value—not only for simply identifying other nearby persons, but also for adjusting the information presented (for example, if the system identifies a nearby person as an adult friend, it may suggest that you play chess and assist in that; if the system identifies a nearby person as your child, it may suggest that you go and play soccer and may assist in that; if the system fails to identify a nearby person, or identifies them as a known danger, the user may be inclined to avoid proximity with such person). In certain embodiments, deep neural network configurations may be utilized to assist with face recognition, in a manner similar to that discussed above in relation to deep relocalization. The model may be trained with a plurality of different faces pertinent to the user's life, and then when a face comes near the system, such as near the head mounted component (58), the system can take that face image in pixel space, translate it, for example, into a 128-dimensional vector, and then use vectors as points in high dimensional space to figure out whether this person is present in your known list of people or not. In essence, the system may be configured to do a "nearest neighbor" search in that space, and as it turns out, such a configuration can be very accurate, with false positive rates running in the 1 out of 1,000 range.

With regard to 3-D object detection, in certain embodiments, it is useful to have a deep neural network incorporated which will tell the user about the space they are in from a 3-dimensional perspective (e.g., not only walls, floors, ceiling, but also objects populating the room, such as couches, chairs, cabinets, and the like—not just from a traditional 2-dimensional sense, but from a true 3-dimensional sense). For example, in one embodiment it is desirable for a user to have a model which understands the true volumic bounds of a couch in the room—so that the user knows what volume is occupied by the volume of the couch in the event that a virtual ball or other object is to be thrown, for example. A deep neural network model may be utilized to form a cuboid model with a high level of sophistication.

In certain embodiments, deep reinforcement networks, or deep reinforcement learning, may be utilized to learn effectively what an agent should be doing in a specific context, without the user ever having to directly tell the agent. For example, if a user wants to always have a virtual representation of his dog walking around the room that he is occupying, but he wants the dog representation to always be visible (e.g., not hidden behind a wall or cabinet), a deep reinforcement approach may turn the scenario into a game of sorts, wherein the virtual agent (here a virtual dog) is allowed to roam around in the physical space near the user, but during training time, a reward is given if the dog stays in acceptable locations from, say T0 to T1, and a penalty is given if the user's view of the dog becomes occluded, losts, or bumps into a wall or object. With such an embodiment, the deep network starts learning what it needs to do to win points rather than lose points, and pretty soon it knows what it needs to know to provide the desired function.

The system may also be configured to address lighting of the virtual world in a manner that approximates or matches the lighting of the actual world around the user. For example, to make a virtual perception blend in as optimally as possible with actual perception in augmented reality, lighting color, shadowing, and lighting vectoring is reproduced as realistically as possible with the virtual objects. In other words, if a virtual opaque coffee cup is to be positioned upon an actual tabletop in a room with yellow-ish tinted light coming from one particular corner of the room that creates shadowing from the real world objects on the real world table, then optimally the light tinting and shadowing of the virtual coffee cup would match the actual scenario. In certain embodiments, a deep learning model may be utilized to learn the illumination of an actual environment in which the system component is placed. For example, a model may be utilized that, given an image or sequences of images from the actual environment, learns the illumination of the room to determine factors such as brightness, hue, and vectoring by one or more light sources. Such a model may be trained from synthetic data, and from images captured from the user's device, such as from the user's head mounted component (58).

Figure 29:
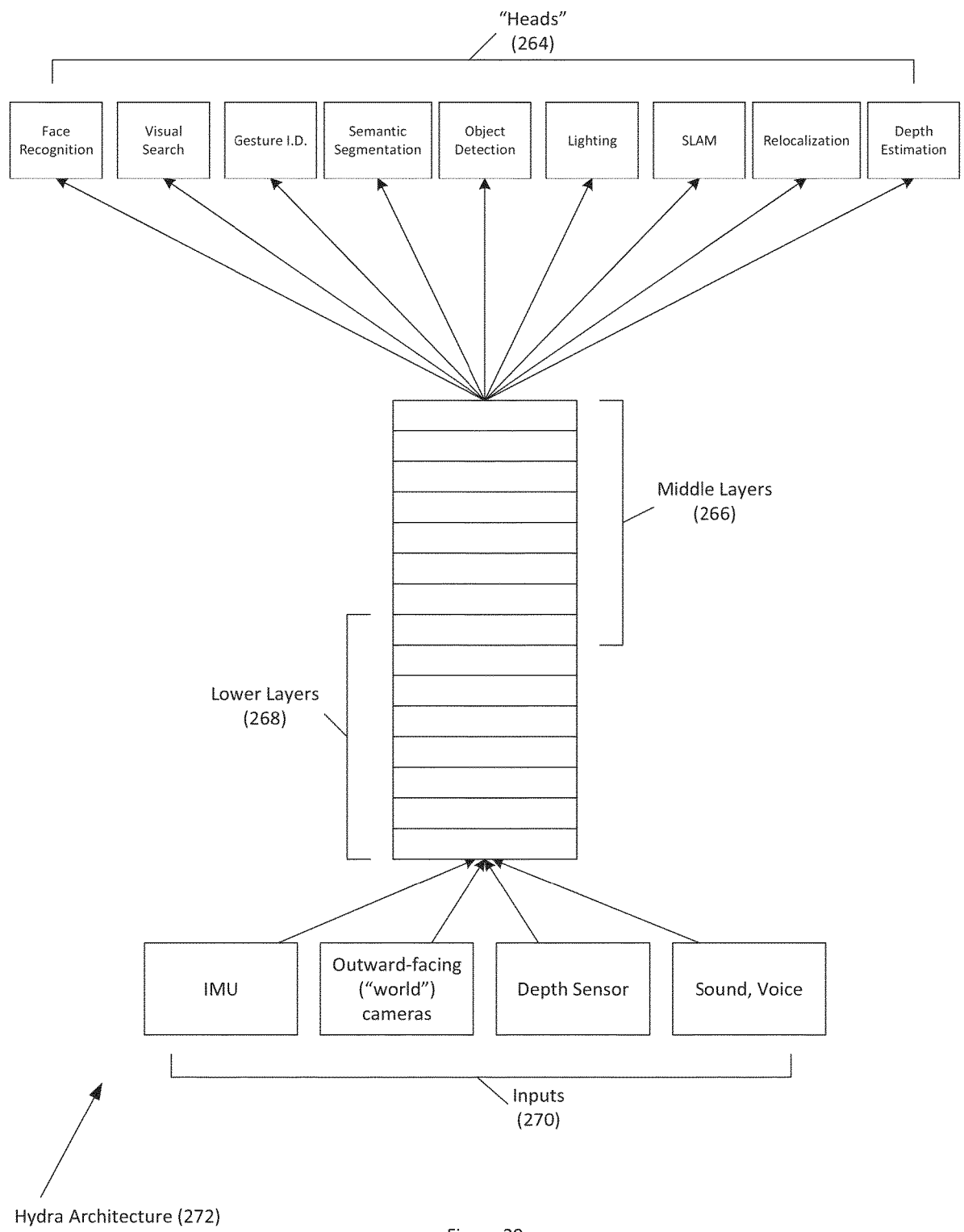
FIG. 29 illustrates a deep learning network.

Referring to FIG. 29, a deep learning network architecture which may be called a "Hydra" architecture (272) is illustrated. With such a configuration, a variety of inputs (270), such as IMU data (from accelerometers, gyros, magnetometers), outward-facing camera data, depth sensing camera data, and/or sound or voice data may be channeled to a multilayer centralized processing resource having a group of lower layers (268) which conduct a significant portion of the overall processing, pass their results to a group of middle layers (266), and ultimately to one or more of a plurality of associated "heads" (264) representing various process functionalities, such as face recognition, visual search, gesture identification, semantic segmentation, object detection, lighting detection/determination, SLAM, relocalization, and/or depth estimation (such as from stereo image information, as discussed above).

Conventionally, when using deep networks to achieve various tasks, an algorithm will be built for each task. Thus if it desired to recognize automobiles, then an algorithm will be built for that; if it is desired to recognize faces, then an algorithm will be built for that; and these algorithms may be run simultaneously. If unlimited or high levels of power and computation resource are available, then such a configuration will work well and get results; but in many scenarios, such as the scenario of a portable augmented reality system with a limited power supply and limited processing capability in an embedded processor, computing and power resources can be relatively limited, and it may be desirable to process certain aspects of the tasks together. Further, there is evidence that if one algorithm has knowledge from another, then it makes the second algorithm better. For example, if one deep network algorithm knows about dogs and cats, knowledge transfer (also termed "domain adaptation") from that may help another algorithm recognize shoes better. So there is reason to have some kind of crosstalk between algorithms during training and inference.

Further, there is a consideration related to algorithm design and modification. Preferably if further capabilities are needed relative to an initial version of an algorithm, one won't need to completely rebuild a new one from scratch. The depicted Hydra architecture (272) may be utilized to address these challenges, as well as the computing and power efficiency challenge, because as noted above, it is the case that there are common aspects of certain computing processes that can be shared. For example, in the depicted Hydra architecture (272), inputs (270), such as image information from one or more cameras, may be brought into the lower layers (268) where feature extraction on a relatively low level may be conducted. For example, Gabor functions, derivatives of Gaussians, things that basically effect lines, edges, corners, colors—these are uniform for many problems at the low level. Thus, regardless of task variation, low level feature extraction can be the same, whether it is the objective to extract cats, cars, or cows—and therefore the computation related thereto can be shared. Hydra architecture (272) is a high-level paradigm which allows knowledge sharing across algorithms to make each better, it allows for feature sharing so that computation can be shared, reduced, and not redundant, and allows one to be able to expand the suite of capabilities without having to rewrite everything—rather, new capabilities may be stacked upon the foundation with the existing capabilities.

Thus, as noted above, in the depicted embodiment, the Hydra architecture represents a deep neural network that has one unified pathway. The bottom layers (268) of the network are shared, and they extract basic units of visual primitives from input images and other inputs (270). The system may be configured to go through a few layers of convolutions to extract edges, lines, contours, junctions, and the like. The basic components that programmers used to feature-engineer, now become learned by the deep network. As it turns out, these features are useful for many algorithms, whether the algorithm is face recognition, tracking, etc. Thus once the lower computational work has been done and there is a shared representation from images or other inputs into all of the other algorithms, then there can be individual pathways, one per problem. Thus on top of this shared representation, there is a pathway that leads to face recognition that is very specific to faces, there's a pathway that leads to tracking that is very specific to SLAM, and so on for the other "heads" (264) of the architecture (272). With such an embodiment, one has all of this shared computation that allows for multiplying additions basically, and on the other hand one has very specific pathways that are on top of the general knowledge and allow one to fine tune and find answers to very specific questions.

Also of value with such a configuration is the fact that such neural networks are designed so that the lower layers (268), which are closer to the input (270), require more computation, because at each layer of computation, the system takes the original input and transforms it into some other dimensional space where typically the dimensionality of things is reduced. So once the fifth layer of the network from the bottom layer is achieved, the amount of computation may be in the range of 20 time less than what was required in the lowest level (e.g., because the input was much larger and much larger matrix multiplication was required). In one embodiment, by the time the system has extracted the shared computation, it's fairly agnostic to the problems that need to be solved. A large portion of the computation of almost any algorithm has been completed in the lower layers, so when new pathways are added for face recognition, tracking, depth, lighting, and the like, these contribute relatively little to the computational constraints—and thus such an architecture provides plenty of capability for expansion. In one embodiment, for the first few layers, they may be no pooling to retain the highest resolution data; mid layers may have pooling processes because at that point, super high resolution is not needed (for example, super high resolution is not needed to know where the wheel of a car is in a middle layer; one really just needs to know where the nut and bolt is located from the lower levels in high resolution, and then the image data can be significantly shrunk as it is passed to the middle layers for location of the wheel of the car). Further, once the network has all of the learned connections, everything is loosely wired and the connections are advantageously learned through the data. The middle layers (266) may be configured to start learning parts, for example—object parts, face features, and the like; so rather than simple Gabor functions, the middle layers are processing more complex constructs (e.g., squiggly shapes, shading, etc). Then as the process moves higher toward the top, there are split-offs into the unique head components (264), some of which may have many layers, and some of which may have few. Again, the scalability and efficiency is largely due to the fact that a large portion, such as 90%, of the processing flops are within the lower layers (268), then a small portion, such as 5% of the flops, are at the middle layers (266), and another 5% is in the heads (264).

Such networks may be pre-trained using information that already exists. For example, in one embodiment, ImageNet, a large group (in the range of 10 million) of images from a large group of classes (in the range of 1,000) may be utilized to train all of the classes. In one embodiment, once it's trained, the top layer that distinguishes the classes may be thrown out, but all of the weights learned in the training process are kept.

Figure 30A:
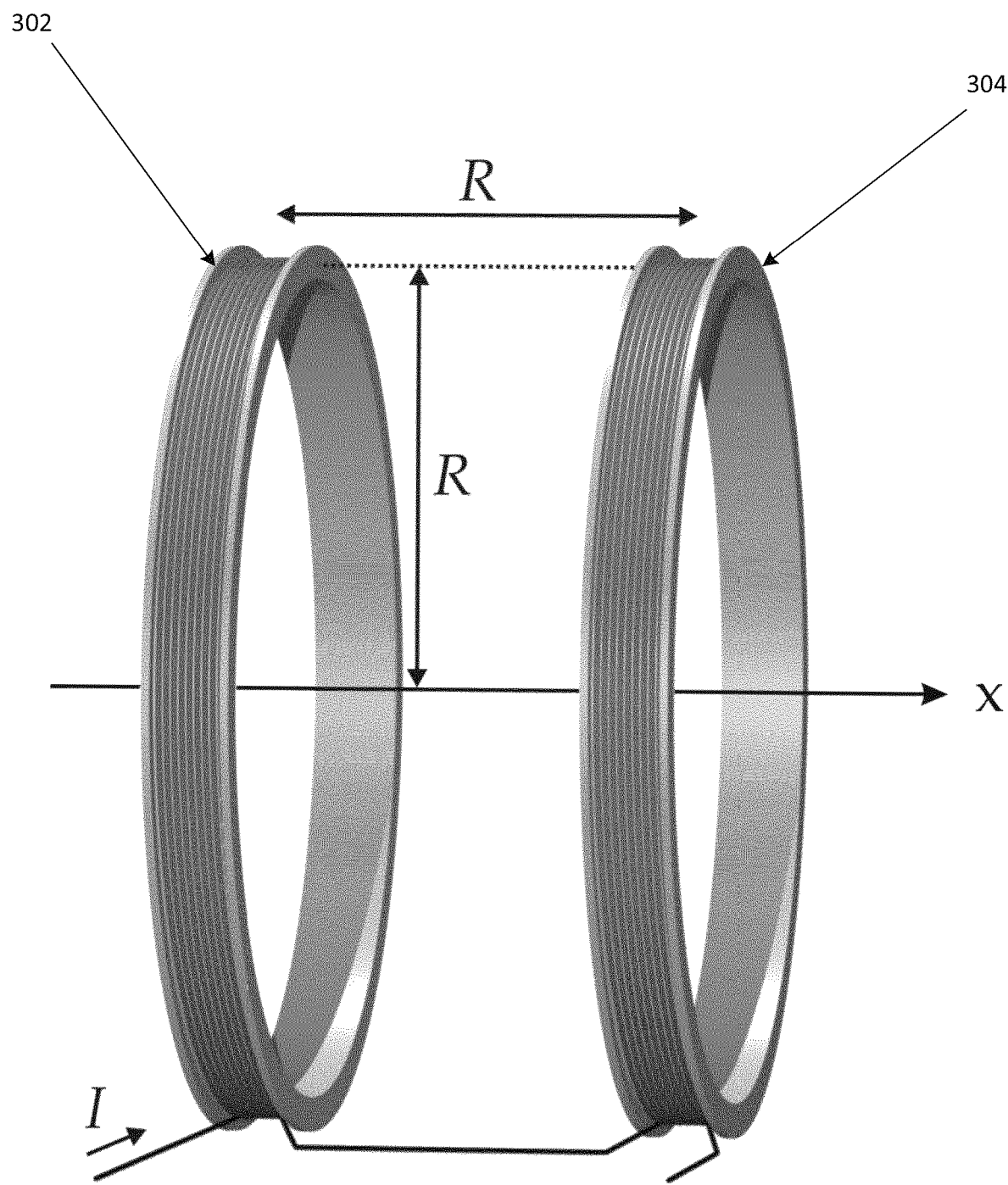
FIG. 30A illustrates a Helmholtz coil configuration.
Figure 30B:
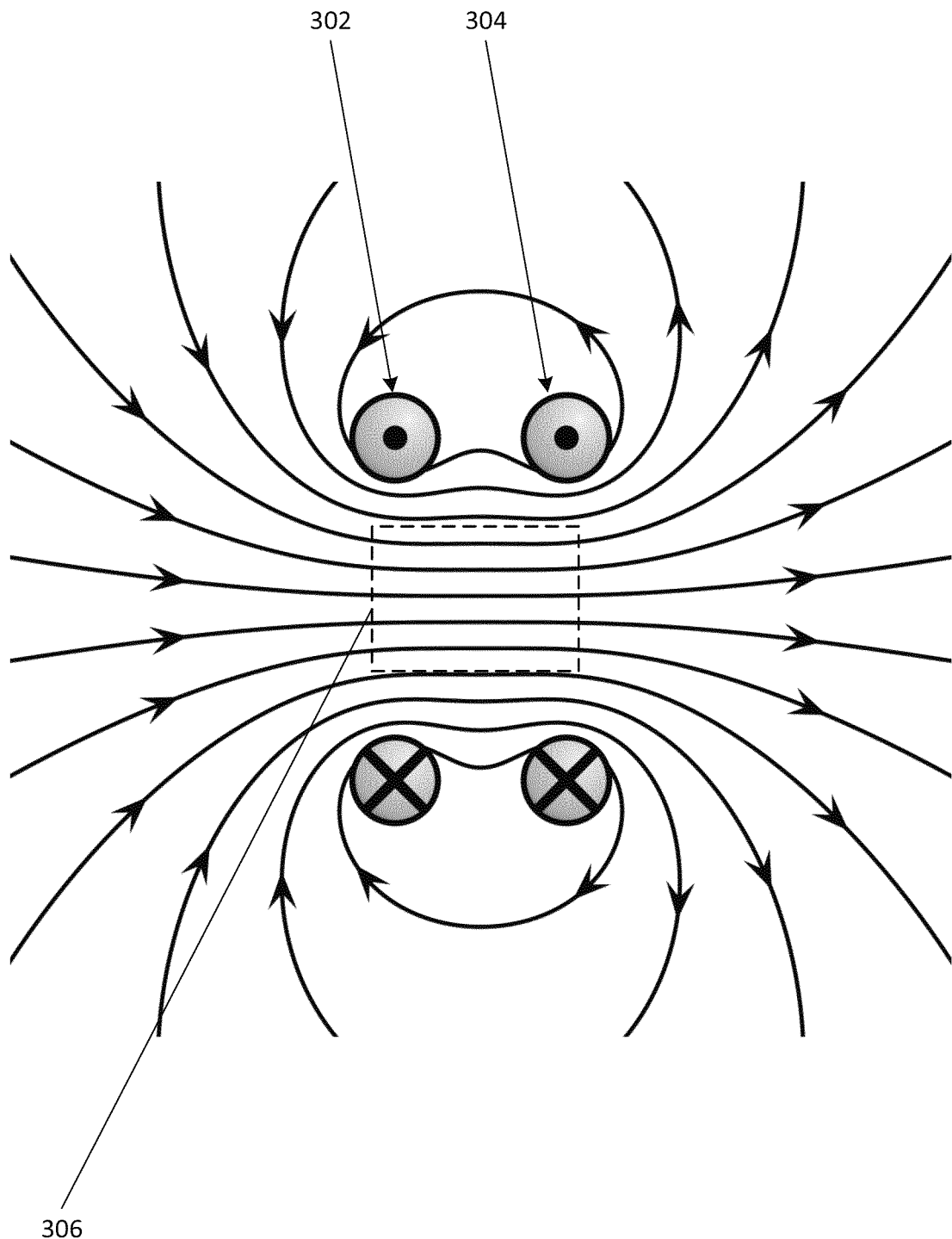
FIG. 30B illustrates an example magnetic field.
Figure 30C:
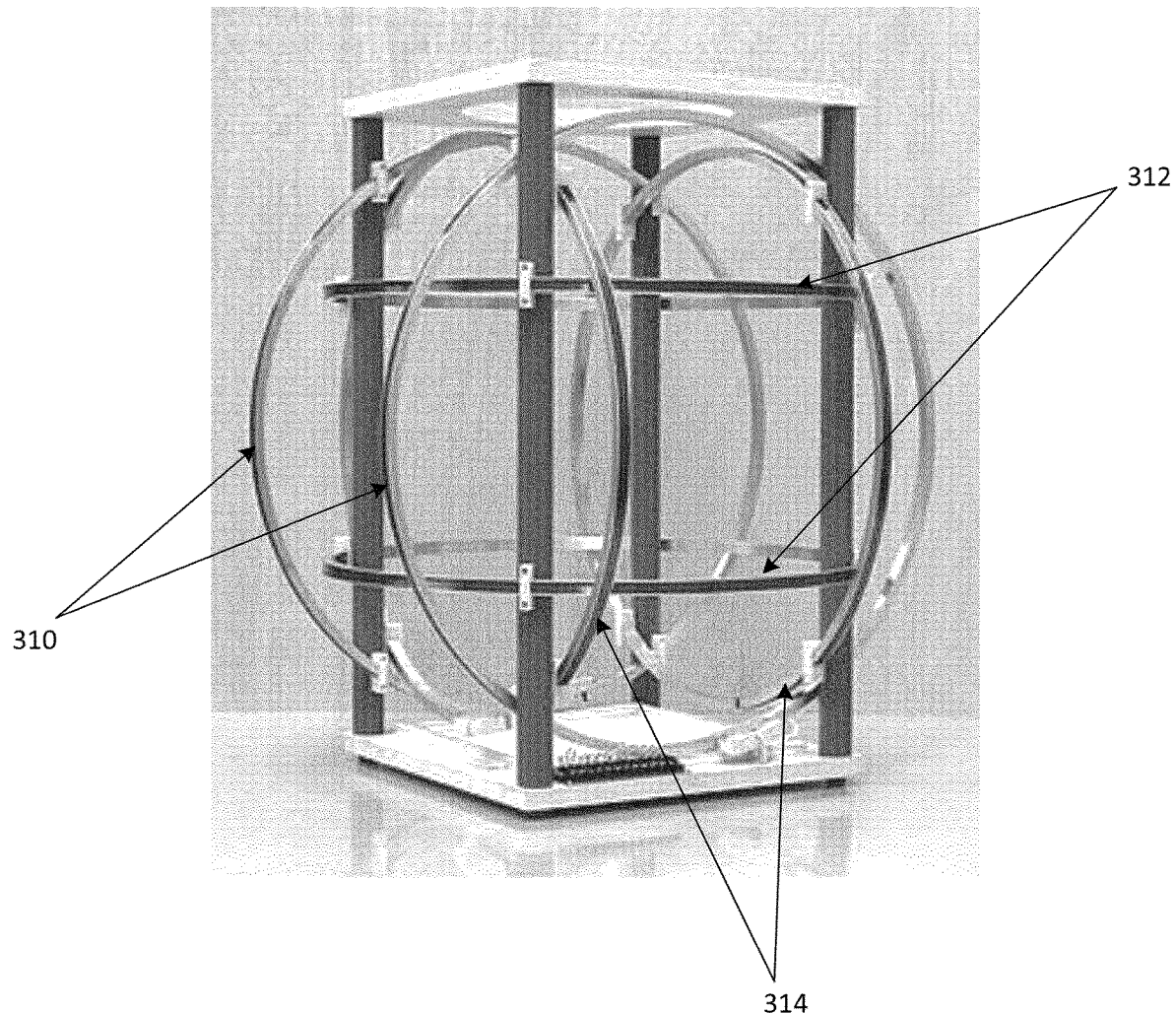
FIG. 30C illustrates a three-axis Helmholtz coil configuration.
Figure 30D:
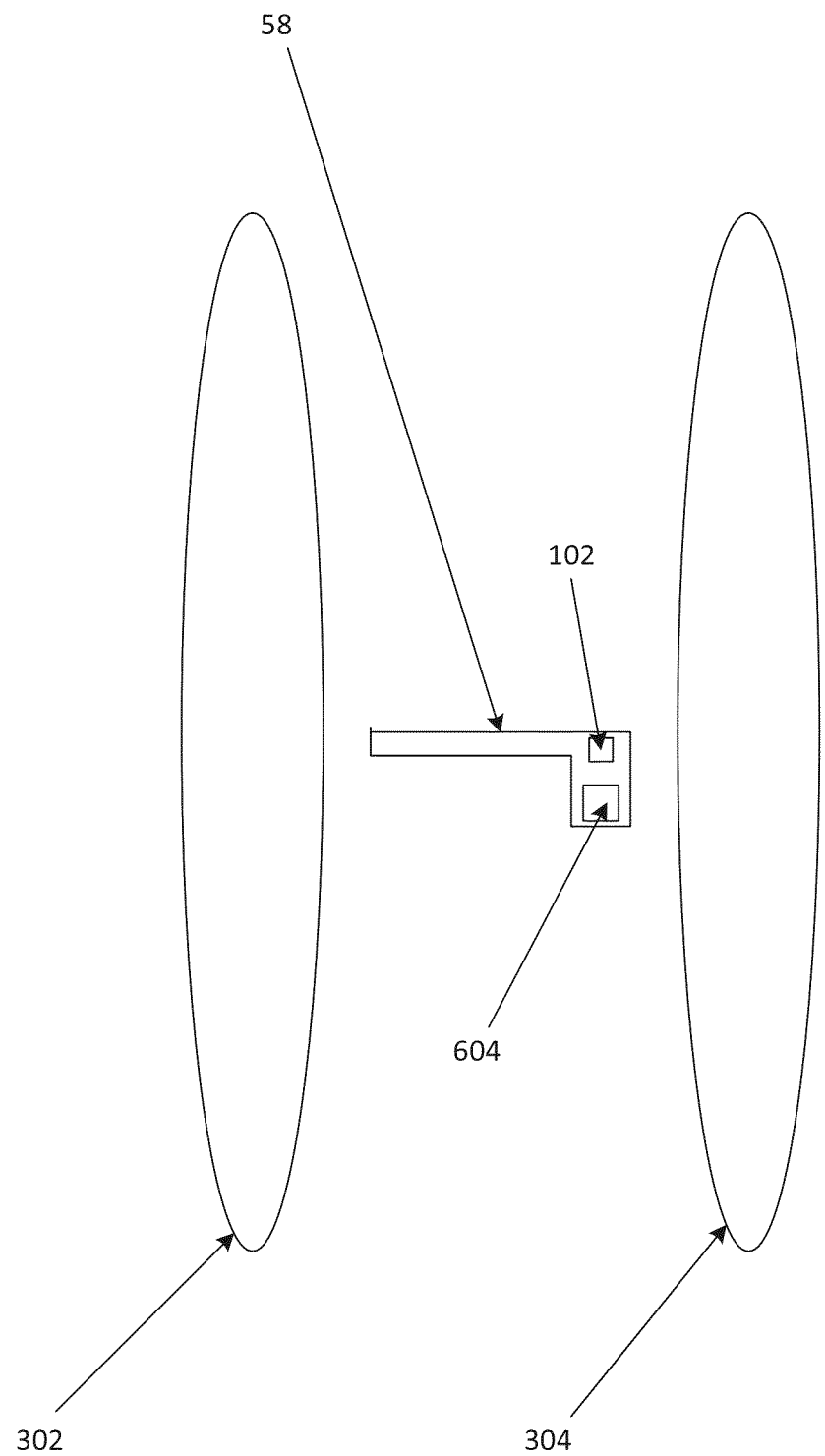
FIG. 30D illustrates a head mounted component being placed within a known magnetic field volume of a Helmholtz coil pair.

Referring to FIG. 30A, a pair of coils (302, 304) is shown in a configuration with a particular radius and spacing therebetween, which may be known as a "Helmholtz coil". Helmholtz coils come in various configuration (here a pair a round coils are shown) and are known for producing a relatively uniform magnetic field through a given volume, such as that depicted in FIG. 30B (306); magnetic field lines are shown with arrows about the cross sectional views of the coils (302, 304) of FIG. 30B. FIG. 3 illustrates a three-axis Helmholtz coil configuration wherein three pairs (310, 312, 314) are orthogonally oriented as shown. Other variations of Helmholtz or Merritt coils, such as those featuring squared coils, also may be utilized to create predictable and relatively uniform magnetic fields through given volumes. In one embodiment, a Helmholtz type coil may be utilized to assist in calibrating the orientation determining relationship between two sensors operatively coupled to a head mounted component (58) such as those described above. For example, referring to FIG. 30D, head mounted component (58) coupled to an IMU (102) and electromagnetic field sensor (604), as described above, may be placed within a known magnetic field volume of a Helmholtz coil pair (302, 304). With current applied through the coil pair (302, 304), the coils may be configured to generate magnetic fields at selectable frequencies. In one embodiment, the system may be configured to energize the coils at a direct current level to produce a directly-readable output from the magnetometer component of the IMU (102); then the coils may be energized at an alternating current level, for example, to produce a directly-readable output from the electromagnetic localization receiver coil (604). Since those applied fields in such a configuration are generated by the same physical coils (302, 304), they are registered with each other and we know that the fields must have the same orientation. Thus we may read the values from the IMU (102) and electromagnetic field sensor (604) and directly measure a calibration which may be utilized to characterize any difference in orientation readings between the two devices (102, 604) in three dimensions—thus providing a usable calibration between the two for runtime. In one embodiment, the head mounted component (58) may be electromechanically reoriented for further testing relative to the coil set (302, 304). In another embodiment, the coil set (302, 304) may be electromechanically reoriented for further testing relative to the head mounted component (58). In another embodiment, the head mounted component (58) and coil set (302, 304) may be electromechanically reorientable relative to each other. In another embodiment, a three-axis Helmholtz coil, such as that depicted in FIG. 30C, or other more sophisticated magnetic field producing coil, may be utilized to generate magnetic fields and components without the need for reorientation of the head mounted component (58) relative to the coil set (302, 304) for additional testing data.

Figure 30E:
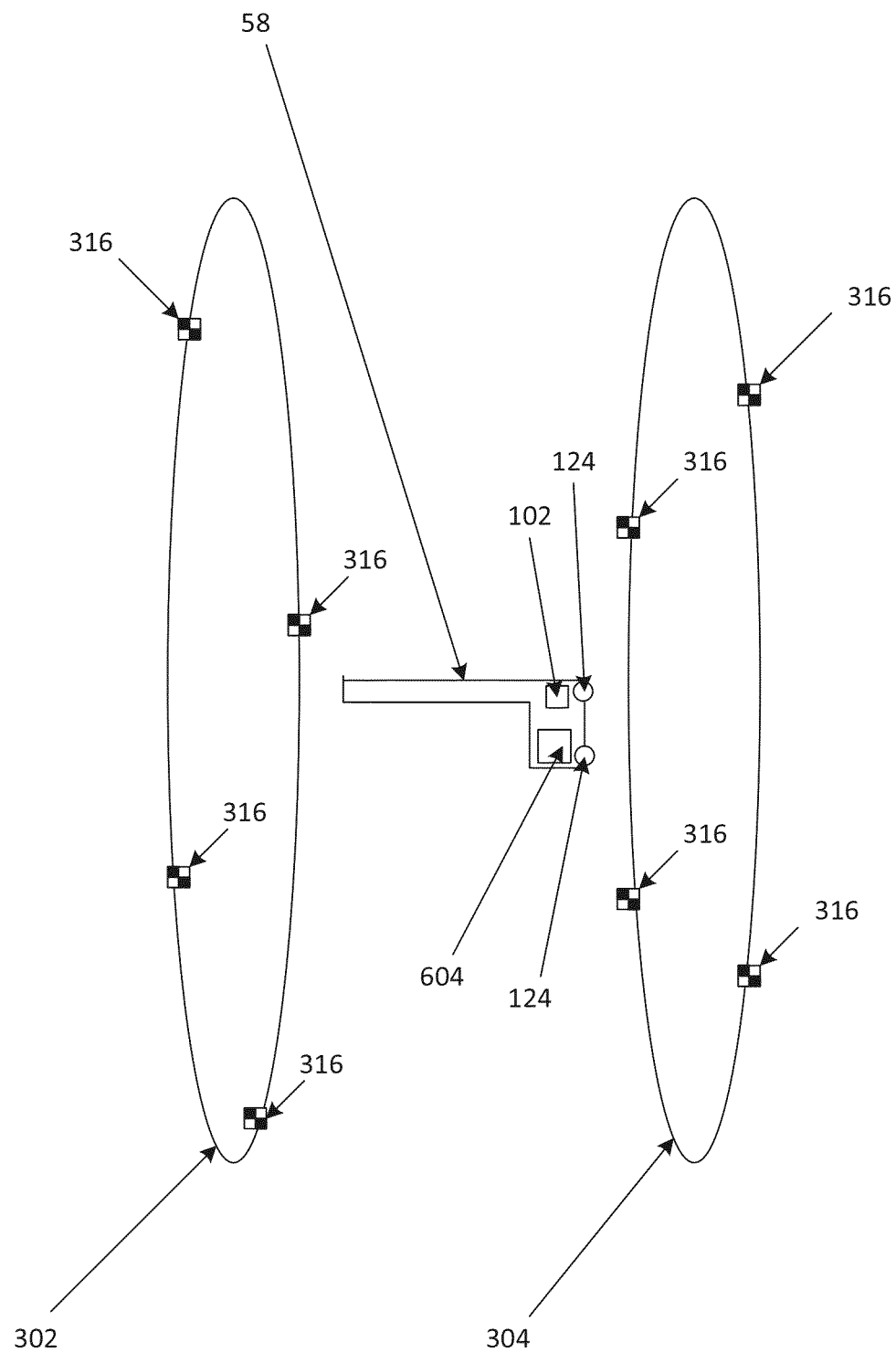
FIG. 30E illustrates optical fiducials.

Referring to FIG. 30E, the system or subsystem being utilized in such calibration configurations to produce a predictable magnetic field, such as a pair of coils (302, 304) in a Helmholtz type of configuration, may have one or more optical fiducials (316) coupled thereto, such that the one or more cameras (124) which may comprise the head mounted component (58) may view such fiducials. Such a configuration provides an opportunity to ensure that the electromagnetic sensing subsystem is aligned in a known way with the cameras. In other words, with such a configuration, one has optical fiducials physically coupled or anchored to the magnetic field generating device in a known or measured fashion (for example, an articulated coordinate measurement machine may be utilized to establish the precise X,Y,Z coordinates of each fiducial location 316); the head mounted component (58) may be placed inside of the testing volume and exposed to the magnetic field, while the cameras (124) of the head mounted component (58) observe one or more fiducials (316) and thus calibrate the extrinsics of the magnetic field sensors and the cameras (because the magnetic field generator is attached to the fiducials that the cameras are observing). The optical fiducials (316) may comprise flat features such as checkerboards, aruco markers, textured or otherwise three-dimensional features. The optical fiducials may also be dynamic, such as in a configuration wherein small displays, such as LCD displays, are utilized; they may be static and printed out; they may be etched with lasers or chemistry into a substrate material; they may comprise coatings or anodizing or other features recognizable by the cameras (124). In a factory calibration setting, a plurality of calibration systems, such as those described herein, may be located adjacent one another, and may be timed such that adjacent systems do not produce magnetic fields that would interfere with readings at an adjacent system. In one embodiment a group of calibration stations maybe time sequenced; in another embodiment every other, or every second, or every third, and so on, may be simultaneously operated to provide functional separation.

Figure 31A:
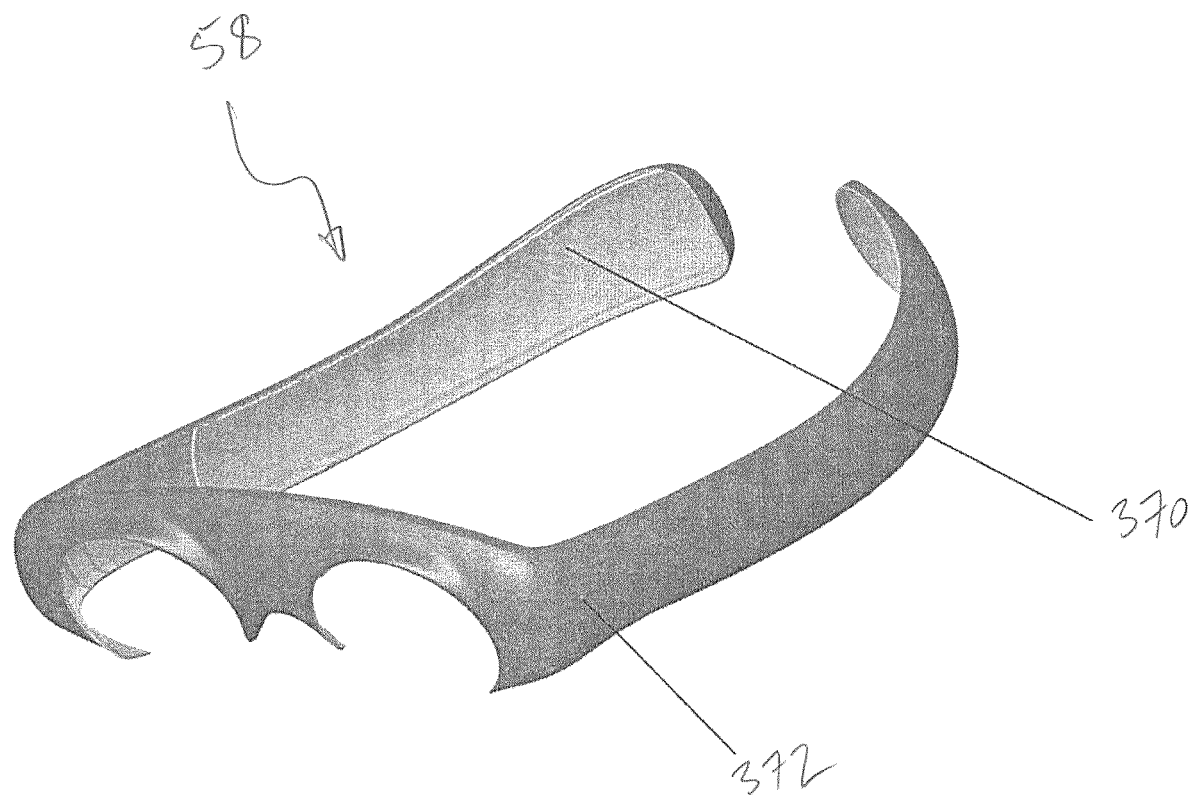
FIG. 31A illustrates an example inner structure of a head mounted wearable component.
Figure 31B:
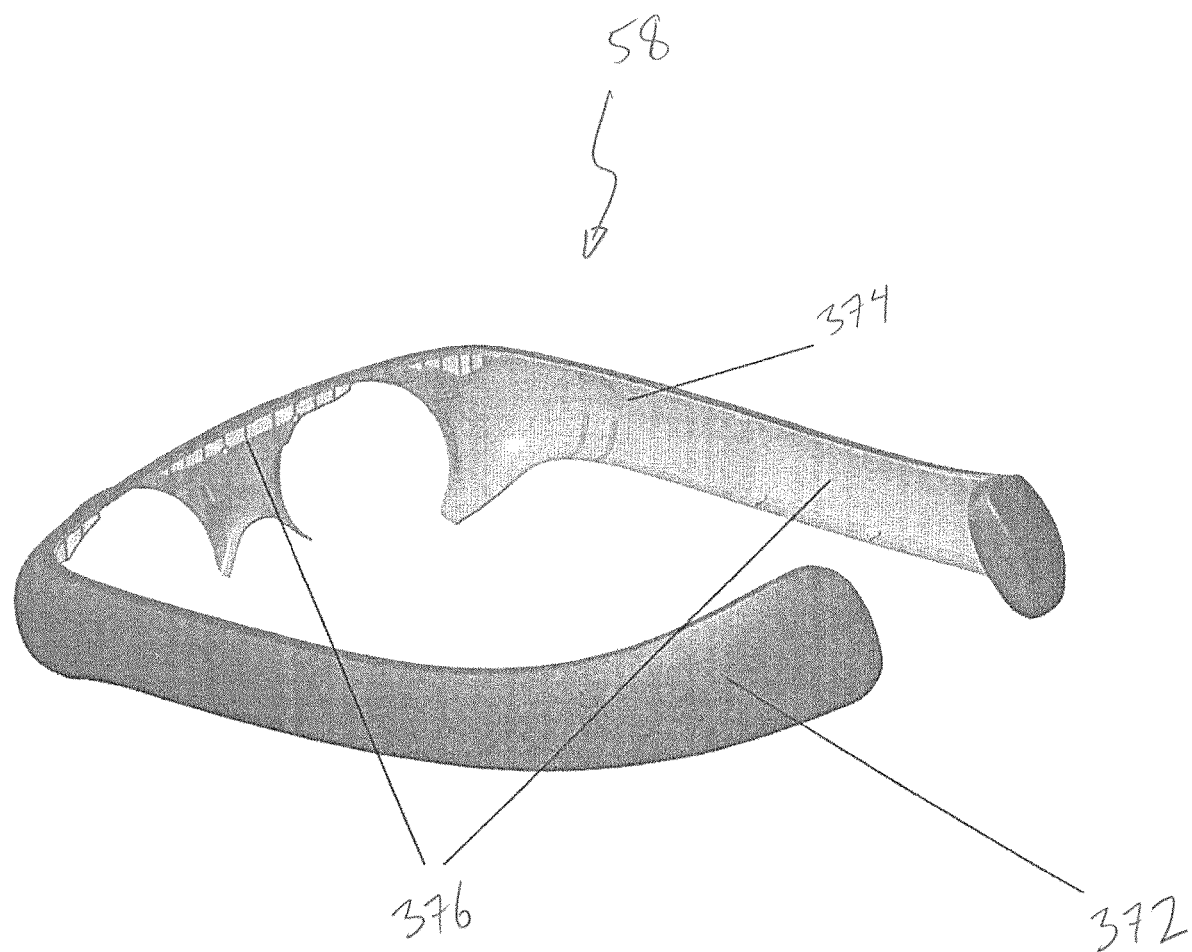
FIG. 31B illustrates an example inner structure of a head mounted wearable component.

Referring to FIGS. 31A-32C, one of the challenges with a head mounted wearable component (58) that comprises various electronic components, such as an embedded processor, is conducting heat out of the component (58) and associated subcomponents, and away from the user's head. It is also desirable to have a head mounted wearable component (58) which generally is low in mass for comfort and other ergonomic and operational advantages (for example, low inertia and moment of inertia to easily stay with the head of the user during head movement). In one embodiment, the head mounted wearable component (58) may comprise composite materials, such as carbon fiber strands and/or fabric combined with one of more matrix materials such as epoxy. Such a construct may be engineered to have specific structural moduli over various portions of the head mounted wearable component (58), and may be relatively low in mass. Referring to FIG. 31A, in one embodiment, a mechanical inner structure (370) may be created to serve in limiting deflection in select areas, and to provide mechanical means for transferring heat, while an outer shell component (372) may comprise a plurality of layers of composite material, such as that comprising fabric bound to epoxy or resin. Referring to FIG. 31B, mechanical inner structures (376) may be provided to serve as deflection limiters in select areas where relative stiffness is desired; these may also provide for a mechanical means of transferring heat. Strategic cuts or gaps (374) may be formed in various layers of the construct to serve in limiting deflection to certain areas or zones (such as in the case of what is known as a "living hinge" configuration across a portion of the construct), and to provide mechanical means for transferring heat away.

One of the challenges with certain composite materials is that while some of the materials, typically the fibers or fabric, may have relatively high thermal conductivity properties, matrix materials such as epoxy typically have low thermal conductivity properties, making an overall composite have a somewhat low thermal conductivity. For example, referring to FIG. 32A, with a conventional layered configuration of a composite member, layers of matrix (384) are combined with layers of fiber or fabric (386), and while the fiber or fabric (386) may have relatively high thermal conductivity, the matrix (384) typically has low thermal conductivity, thus preventing efficient escape or transfer of heat (380) due to the repeated and symmetric layering. A simplified heat profile map (382) across the composite construct from the source of heat (380), with more heat being transferred closer to the source, as would be expected.

Figure 32A:
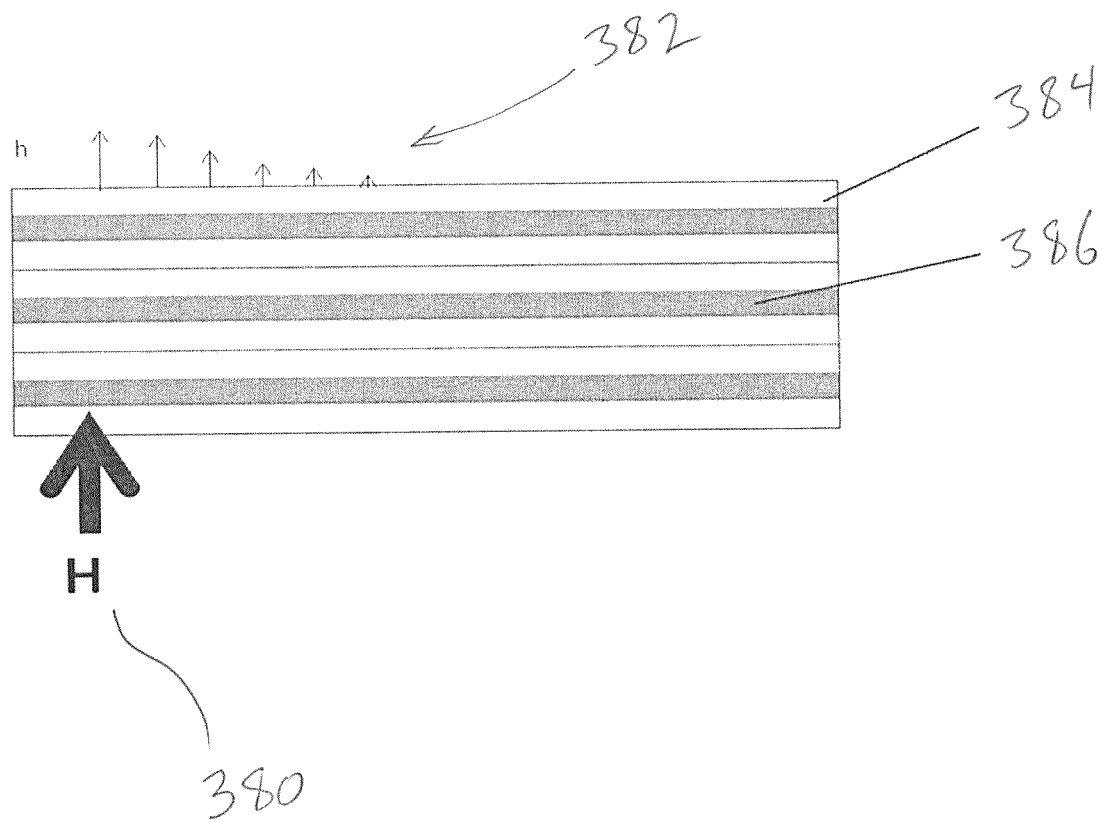
FIG. 32A illustrates a layered configuration of a composite member.
Figure 32B:
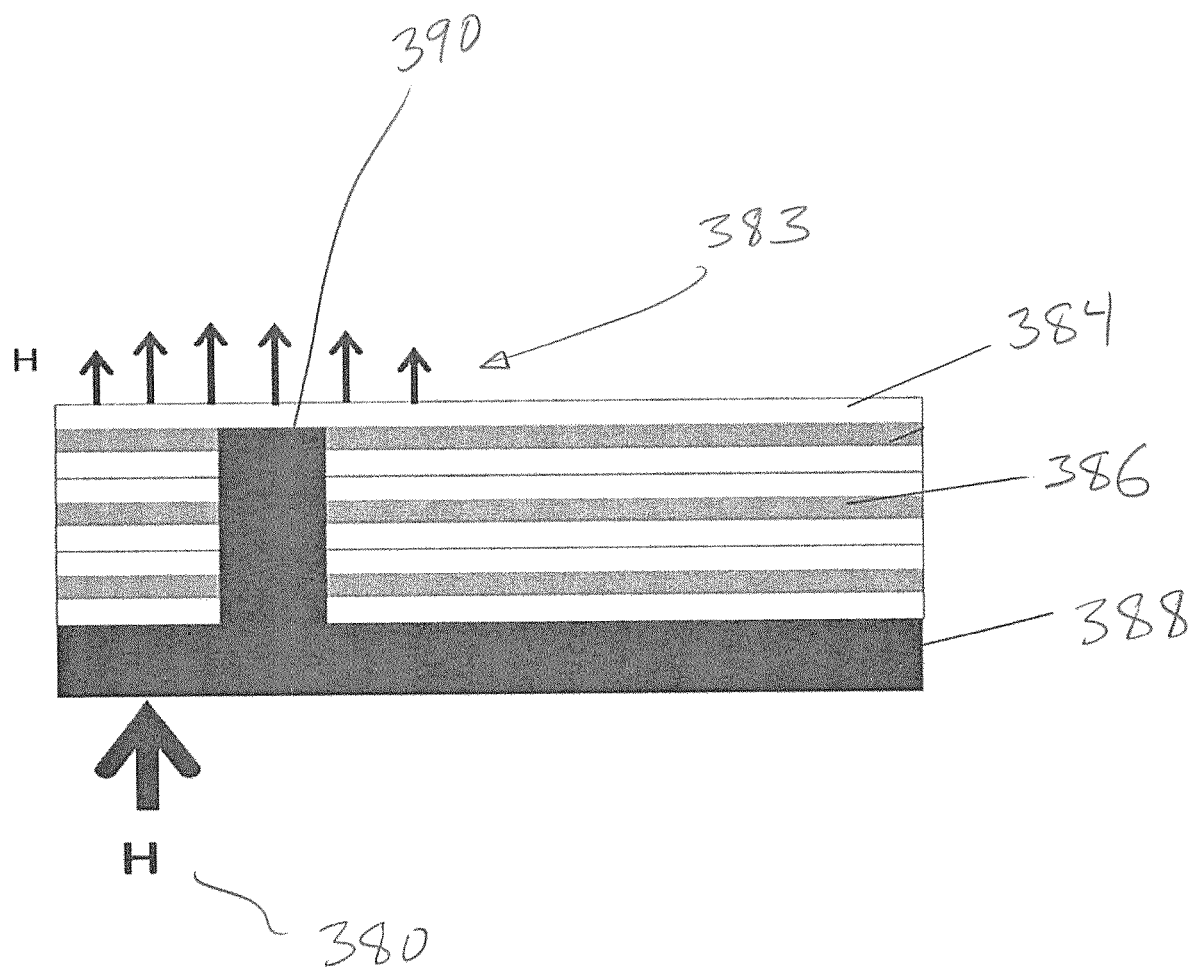
FIG. 32B-C illustrate asymmetries of various types that may be engineered into composite constructs to transfer heat.
Figure 32C:
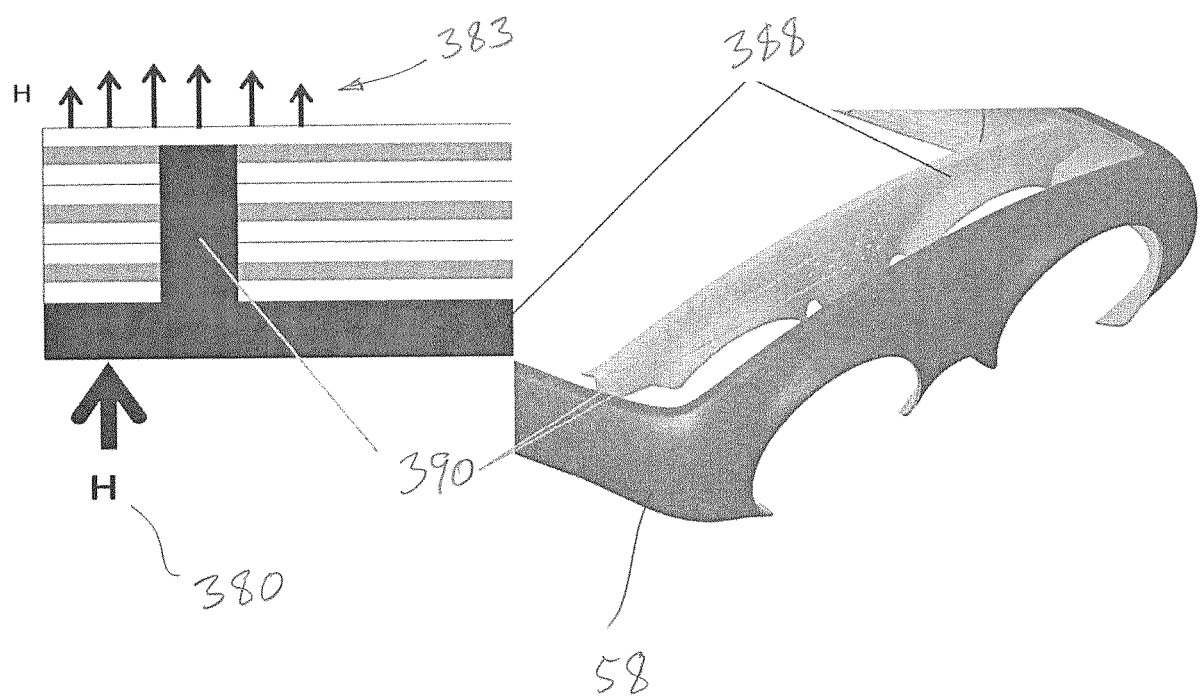

Referring to FIGS. 32B and 32C, asymmetries of various types may be engineered into composite constructs to more optimally transfer heat across, and at specified geometric positions. For example, referring to FIG. 32B, an internal mechanical structure (388) having a relatively high thermal conductivity is shown extending across a substantial portion of the composite construct at a specified "thermal via" (390) location to specifically focus heat transfer from the source (380) across the composite structure at such location (refer, for example, to the sample heat profile plot 383). FIG. 32C illustrates an implementation of such a configuration with an internal mechanical structure (388) which may be exposed to relatively high heat (380), such as from an embedded processor, camera, or other exothermic component; such heat may be directed away from such component using a thermal via (390) which may comprise a relatively high thermal conductivity material. Suitable materials for relatively high thermal conductivity fibers or fabrics include carbon fiber (thermal conductivity between about 21 and 180 W/mk, the units representing watts per meter kelvin); high modulus mesophase pitch carbon fiber, in the fiber direction (500 W/mk). Glass has a thermal conductivity of about 1 W/mk. Typical epoxy matrix materials have relatively low thermal conductivity, as noted above (between about 0.5 and 1.5 W/mk), although certain other components may be added to epoxy matrix to increase the thermal conductivity. For example, in various embodiments carbon nanotube material (theoretical thermal conductivity of 3,500 W/mk) may be added; and/or Graphene (theoretical thermal conductivity of 5,020 W/mk); and/or diamond (thermal conductivity of 2,500 W/mk); and/or metallic components, such as aluminum, copper, gold, or silver (210 W/mK, 398 W/mk, 315 W/mk, 428 W/mk, respectively), may be added to a matrix material (e.g., to be combined with a fiber or fabric in a composite configuration, and/or to be utilized as a thermal via structure) to improve its over thermal conductivity to assist in moving heat away from the device and away from the user's head.

In another embodiment, strands or leads of electrically conductive material may be layered into an overall composite structure to provide not only enhanced thermal conductivity, but also electrical conductivity, to function as a power, signal, or other lead that is built or integrated into such structure. The engineered composite structures disclosed herein may be hand-manufactured layer by layer, or may be robotically constructed. In one embodiment, a mold may be created, into which the various layers of fiber and/or fabric, and matrix material, may be placed for combination and curing. In one embodiment, a powder coating layer maybe placed first against the mold, and last against the other side of the mold, such that upon removal of the cured component, both sides of such component are powder coated. Powder coating or other coating, sealing, or painting materials may be specifically selected for relatively high thermal conductivity, to facilitate in the exiting of heat away from such componentry.

As described above in reference to FIGS. 11A and 11B, and FIGS. 22A-22C, various components may be coupled to a head mounted wearable component (58). In various embodiments, such components may be physically integrated within the layers of a composite such that they are embedded within such components. For example, in one embodiment, it may be desirable to have one or more copper loop magnetic flux capturing circuits embedded at specific positions adjacent an outer surface for electromagnetic tracking. In another embodiment, it may be desirable to have one or more conductive leads functioning as a radiofrequency antenna, and it may be desirable for specific absorption rate ("SAR") reasons to position such antenna, whether it is a transmitter or receiver, on the opposite side of such component relative to the user's skin. In another embodiment, the fiber and/or fabric positioning may be specifically engineered to provide annular structural enhancement around locations of apertures to be created within a construct, such as for a camera lens or other device.

In one embodiment, the various thermal components may be specifically engineered to not only move heat away from certain components and away from the user, but also to eliminate certain conventional components such as air vents, fans, and the like.

Figure 33:
FIG. 33 illustrates a subject system that may be configured to assist a user in virtually experiencing a map of the solar system in an indoor environment.
Figure 34A:
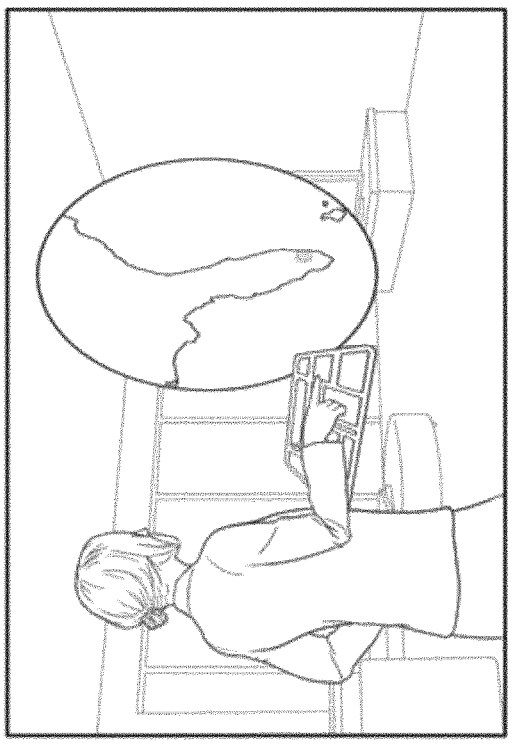
FIGS. 34A-D illustrate virtually experiences for mapping, teaching, and "Street View"® type of functionalities.
Figure 34B:
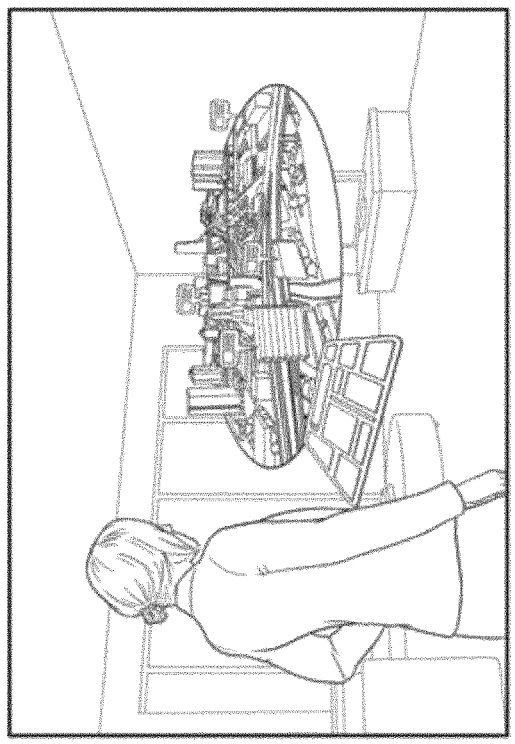
Figure 34C:
Figure 34D:
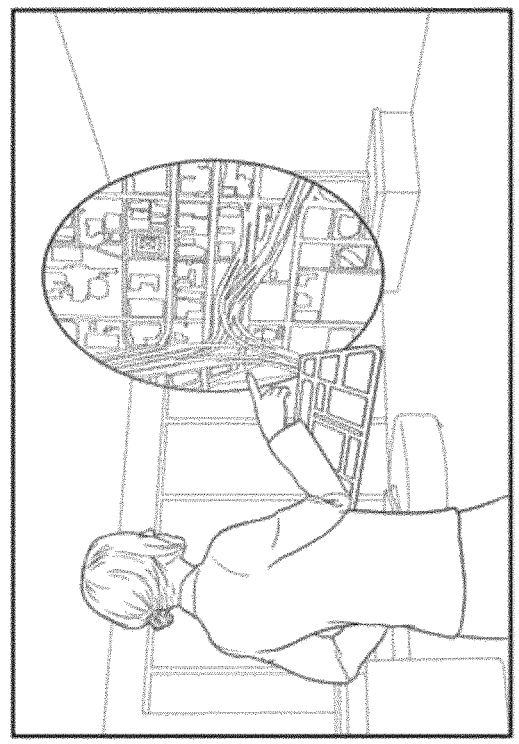

Referring to FIGS. 33-140, various embodiments are illustrated featuring various aspects of the aforementioned system configurations, such that augmented reality, or "mixed reality" may be utilized to assist with various aspects of modern life of the user.

Figure 35A:
FIGS. 35A-35B illustrate various features of example driving assistance configurations.
Figure 35B:
Figure 36:
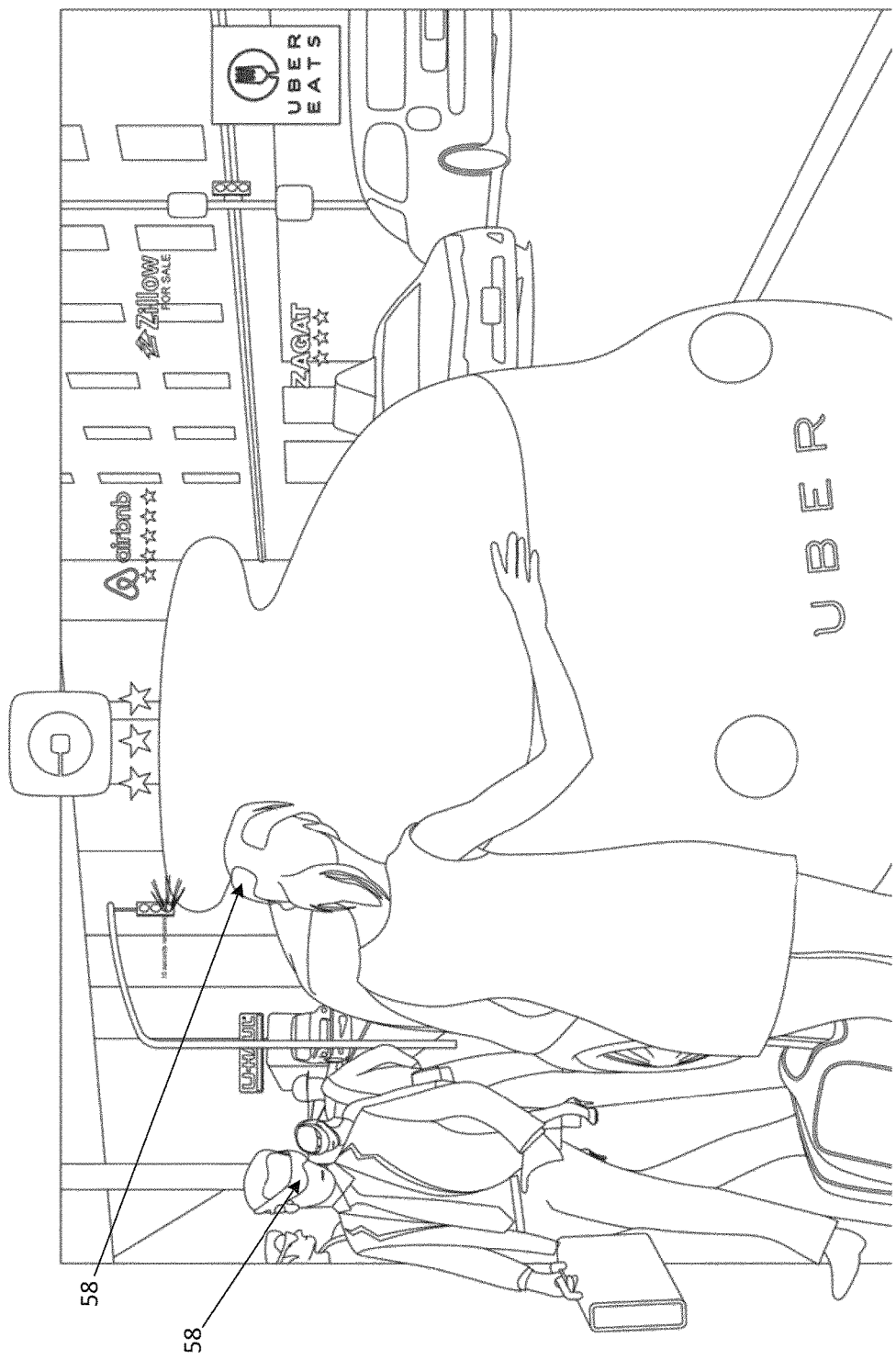
FIG. 36 illustrates a street use scenario with various users wearing head mounted system components.
Figure 37:
FIG. 37 illustrates an embodiment featuring virtual highlighting of a selected route.
Figure 38:
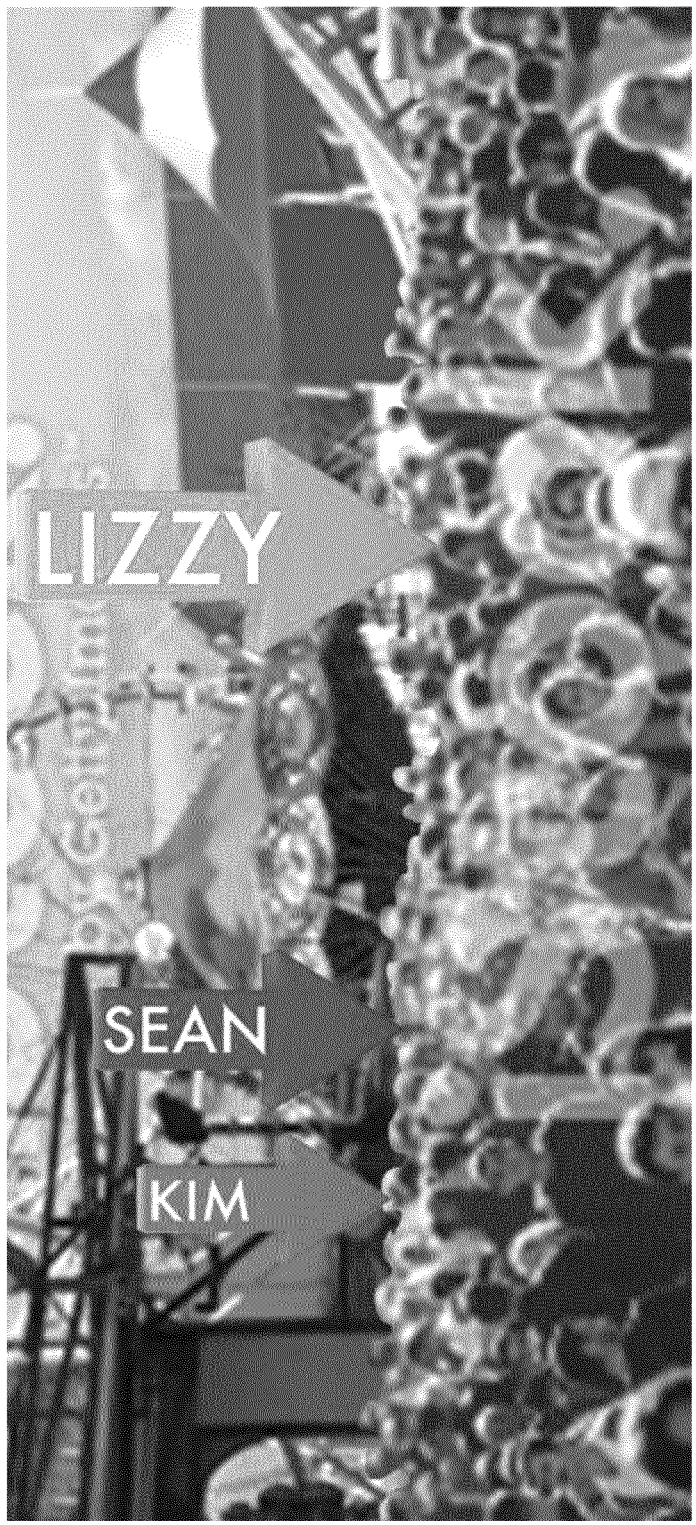
FIG. 38 illustrates an embodiment featuring virtual location assistance pertinent to identified friends of a user who may be in a crowd and otherwise difficult to visualize.
Figure 39A:
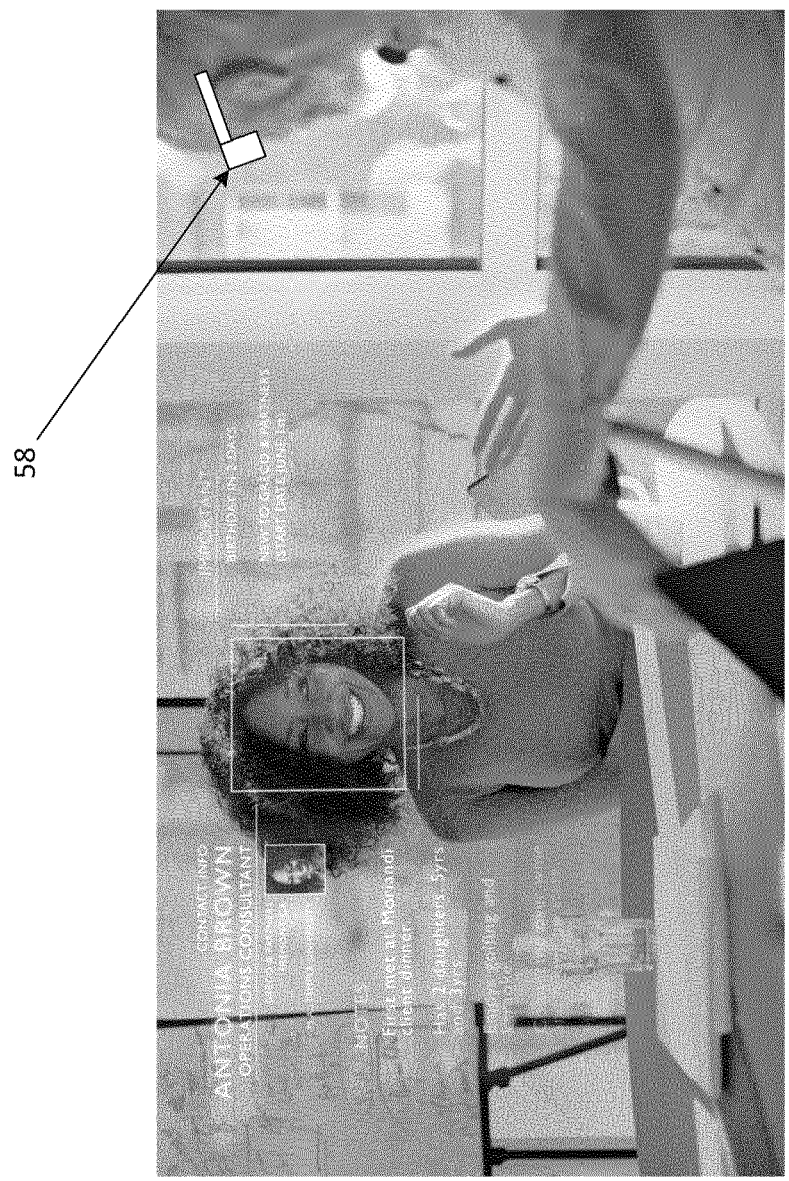
FIGS. 39A-39D illustrate various users wearing head mounted components in indoor environments.
Figure 39B:
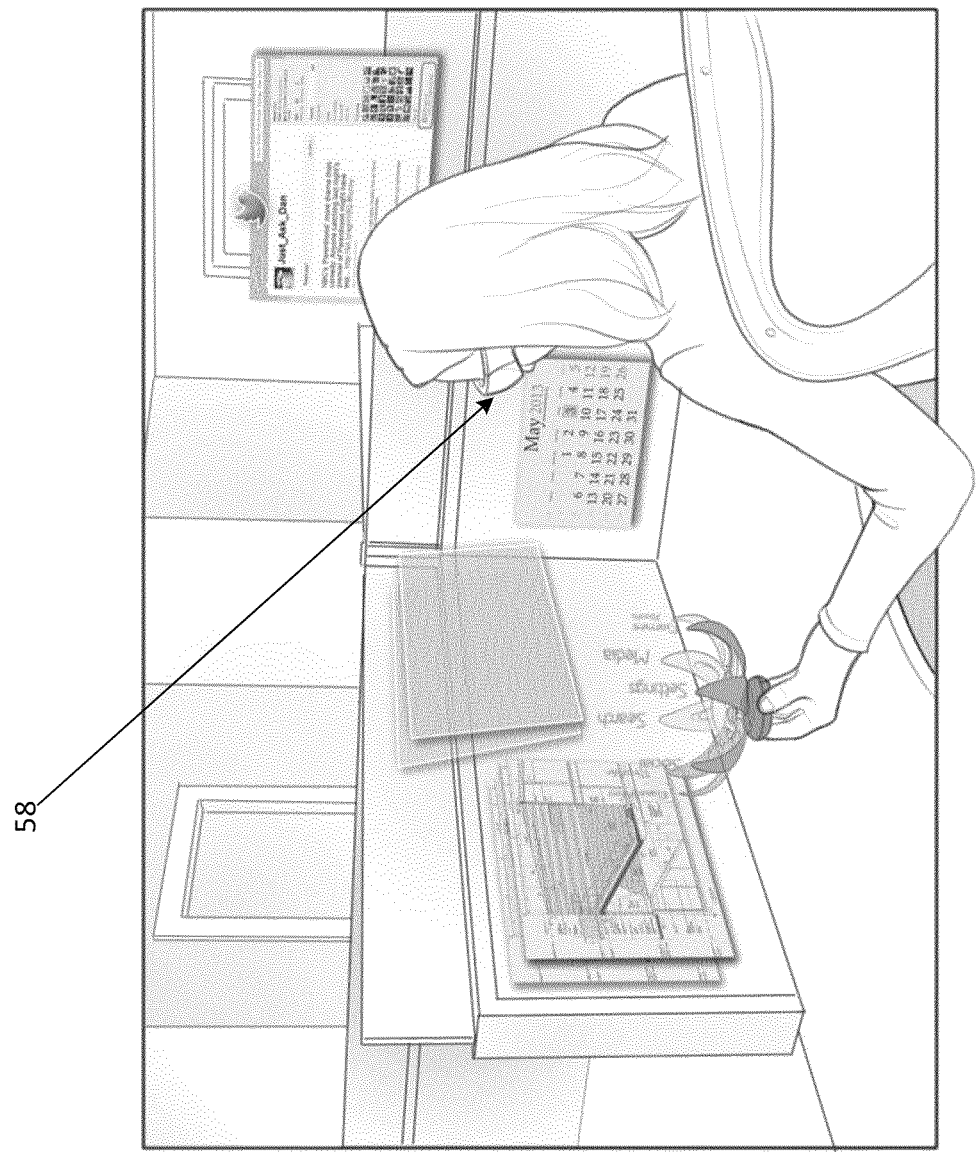
Figure 39C:
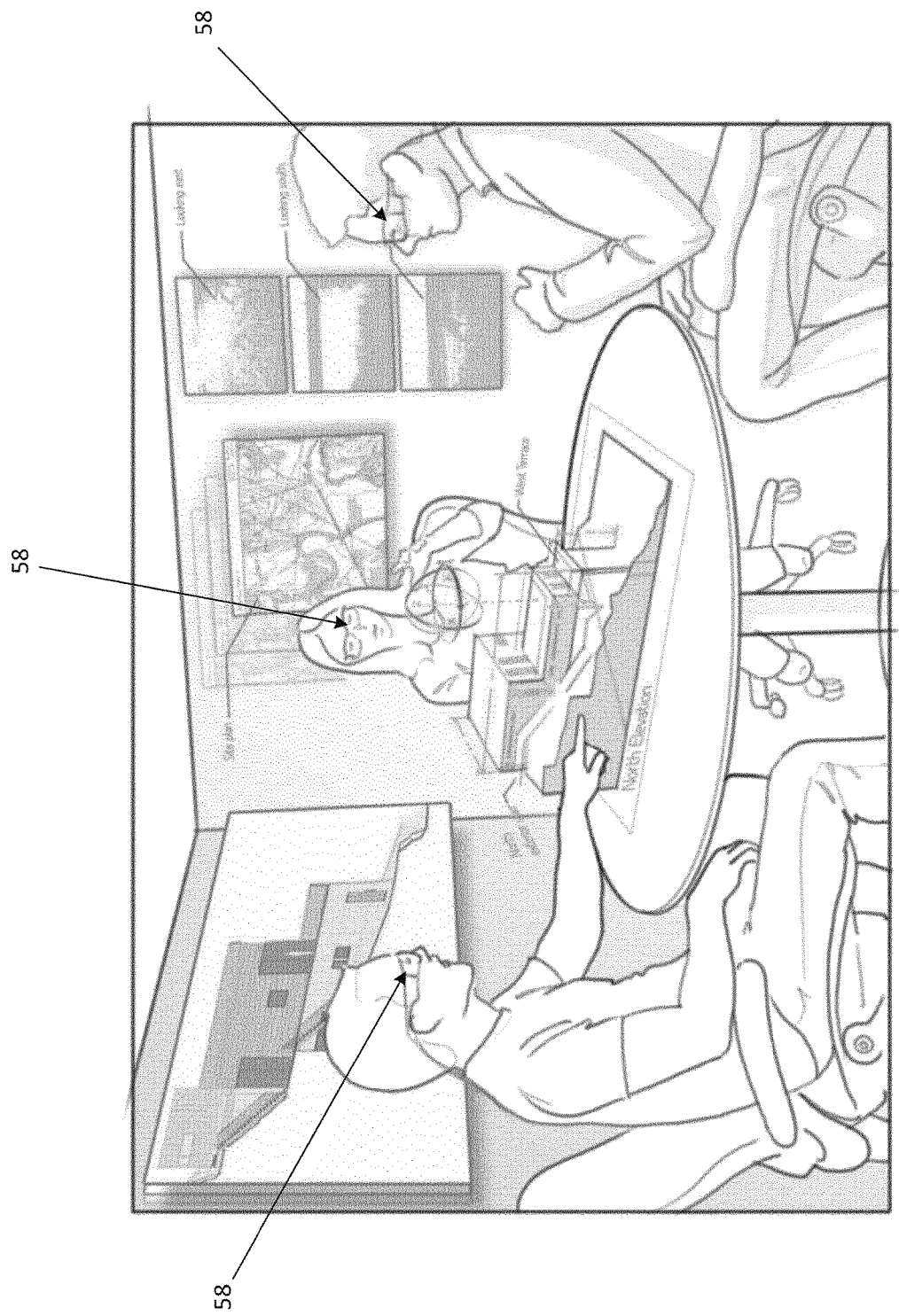
Figure 39D:
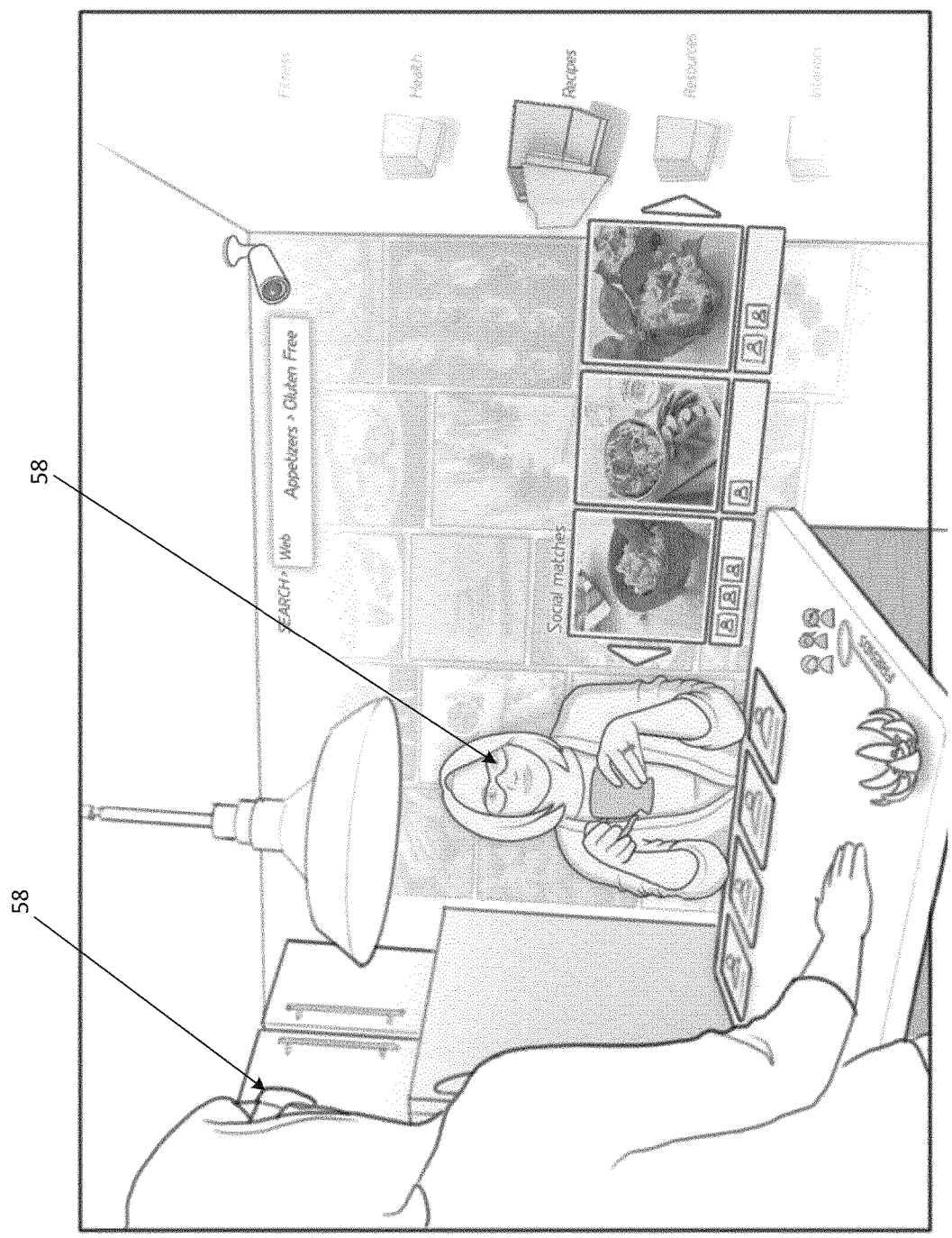

For example, referring to FIG. 33, in one embodiment, a subject system may be configured to assist a user in virtually experiencing a map of the solar system in an indoor environment. Such a configuration may be used for mapping, teaching, navigation, and the like. Similar configurations are shown in FIGS. 34A-34D and may be utilized for mapping, teaching, and "Street View"® type of functionalities, amongst many others. FIGS. 35A-35B illustrate various features of example driving assistance configurations, with virtual presentation of vehicle, music control, and other functionalities. FIG. 36 illustrates a street use scenario with various users wearing head mounted system components (58) to navigate their lives and be able to take advantage of computing, such as the identification of restaurants, hotels, and other features with virtually-presented cues. FIG. 37 illustrates an embodiment featuring virtual highlighting (e.g., by presenting a haze upon other viewable items) of a selected route, along with navigation information presented as a virtual display element in the augmented reality system configuration. FIG. 38 illustrates an embodiment featuring virtual location assistance pertinent to identified friends of a user who may be in a crowd and otherwise difficult to visualize. FIGS. 39A-39D illustrate various users wearing head mounted components (58) in indoor environments to be able to utilize computing to experience enhanced visualization and collaboration, such as by presentation of various virtual features, such as planar displays, three-dimensional virtual objects, passable world components (e.g., such as portions of a room or hand held objects), avatars of specific persons, and the like.

Figure 40:
FIG. 40 illustrates various sensors in various locations within a space to assist in locating and monitoring a person or other objects.

Referring to FIG. 40, certain aspects of a given indoor environment may be configured to feature various sensors, such as cameras, in various locations within a space, to assist in locating and monitoring a person or other objects. Certain embodiments feature adjustable mounting devices which may incorporate magnetic mounting interfaces for cameras and other devices.

Figure 41A:
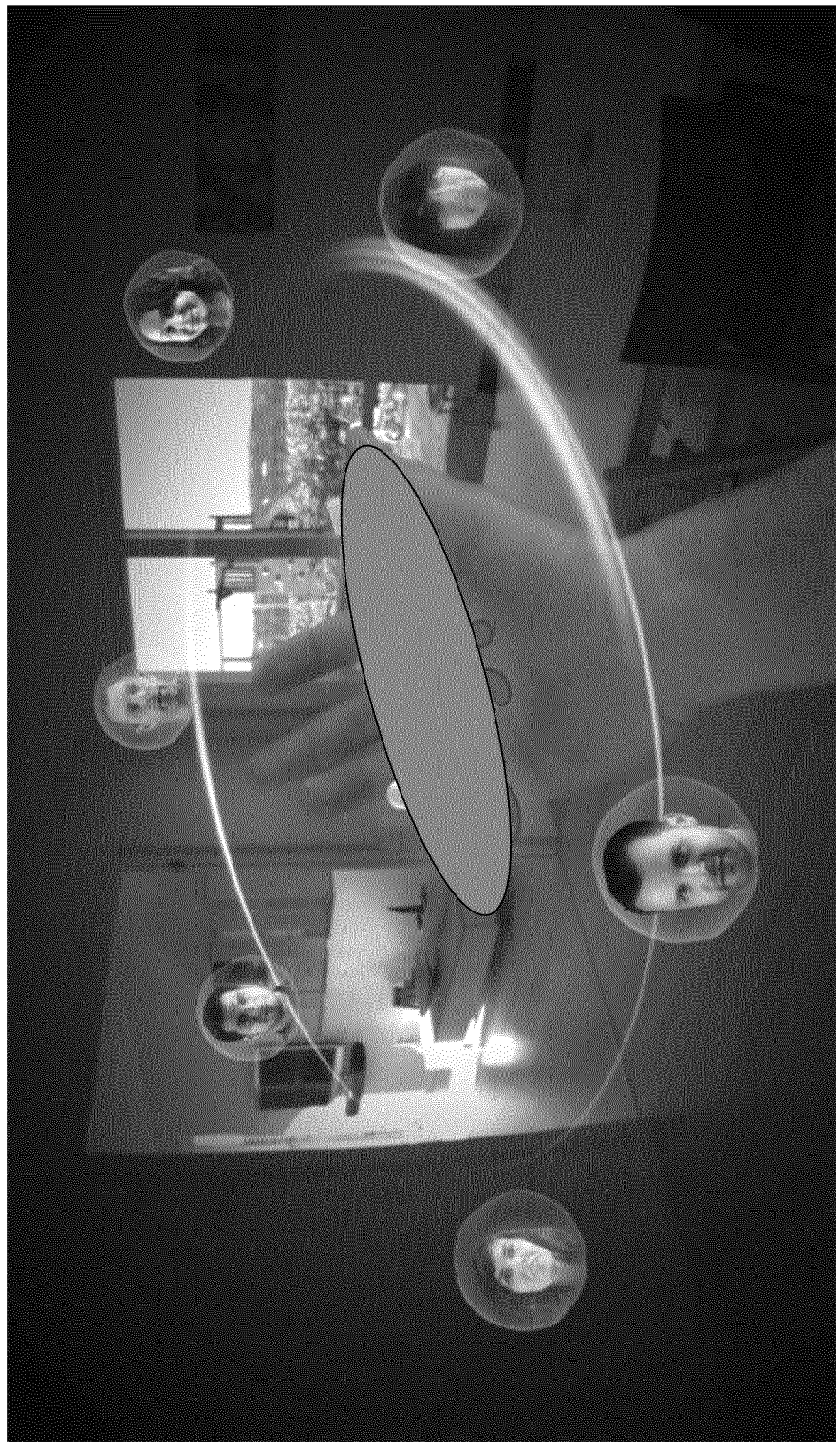
FIGS. 41A-41C illustrate one embodiment of an audio and/or video conferencing configuration.
Figure 41B:
Figure 41C:
Figure 42A:
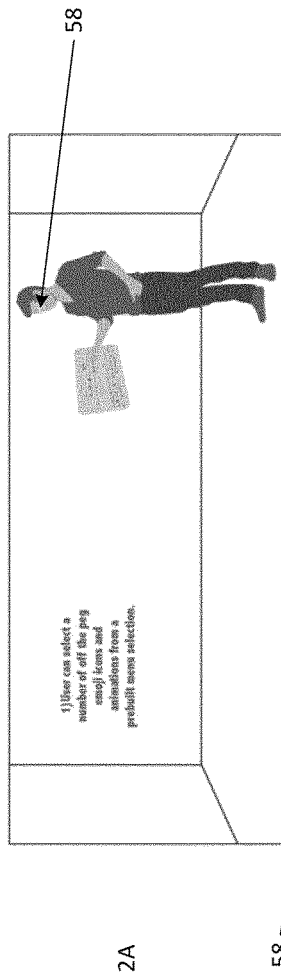
FIGS. 42A-42D illustrate aspects of an "emojibomb" functionality.
Figure 42B:
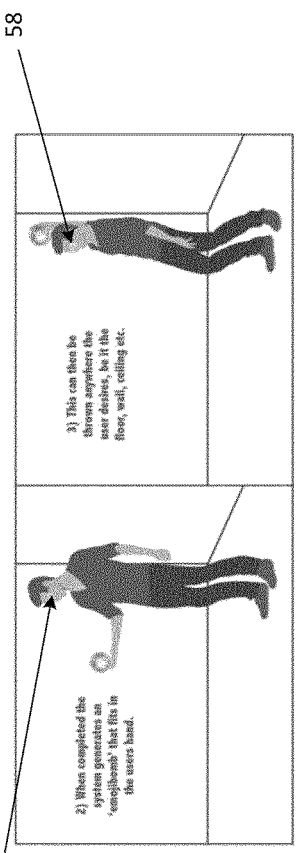
Figure 42C:
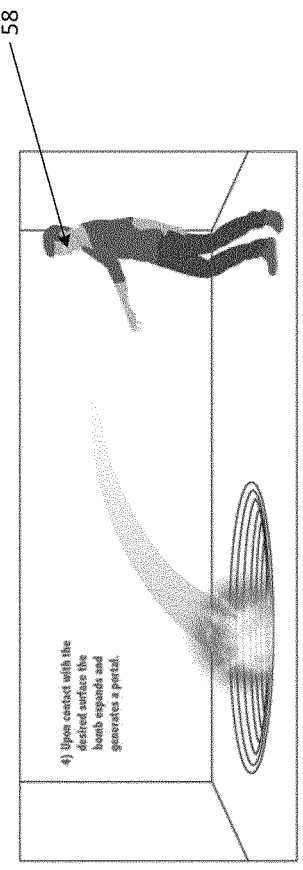
Figure 42D:
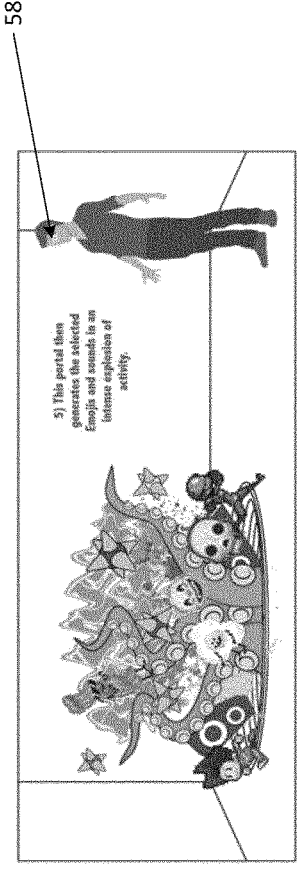
Figure 43A:
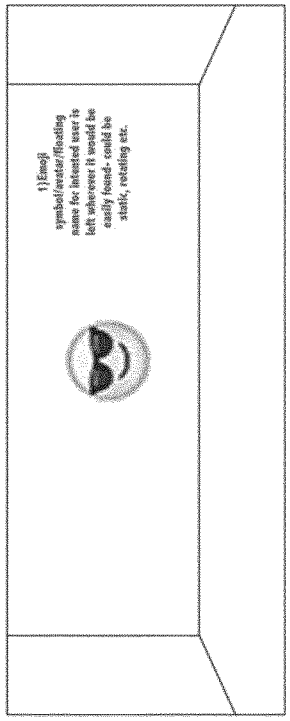
FIGS. 43A-43D illustrate images or features presented in three dimensions to users.
Figure 43B:
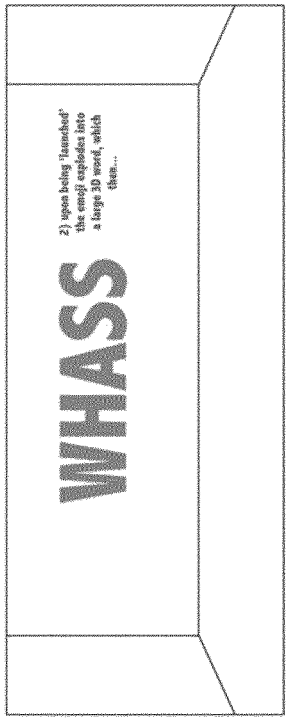
Figure 43C:
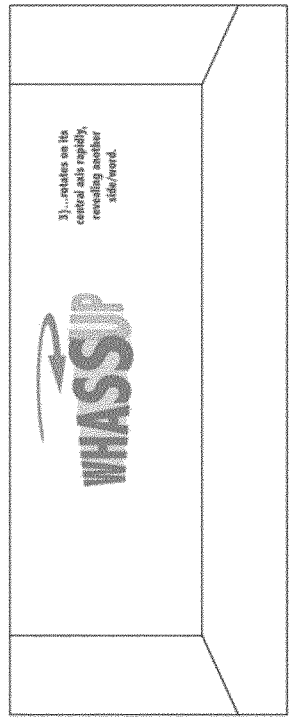
Figure 43D:
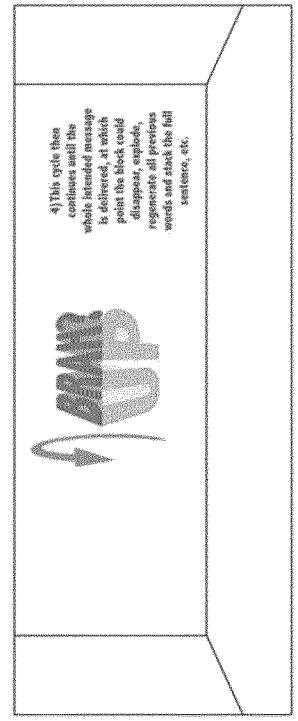
Figure 44A:
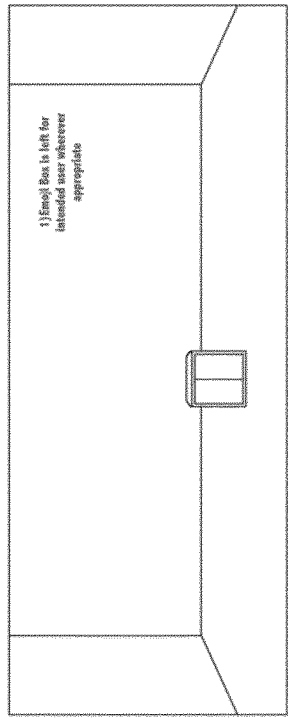
FIGS. 44A-44D illustrate aspects of an "emojibomb" functionality.
Figure 44B:
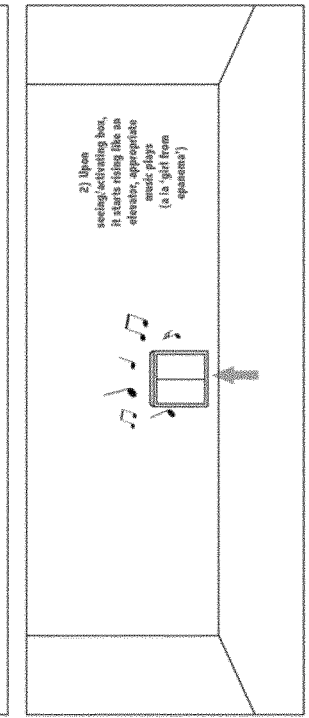
Figure 44C:
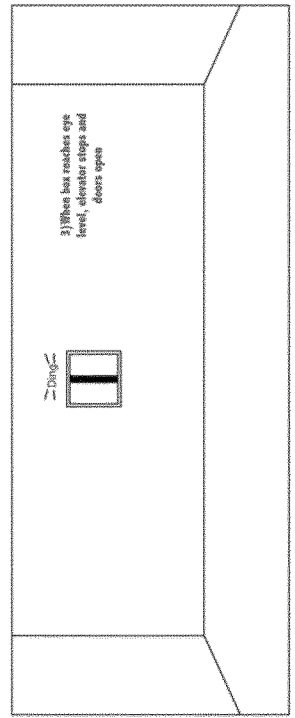
Figure 44D:
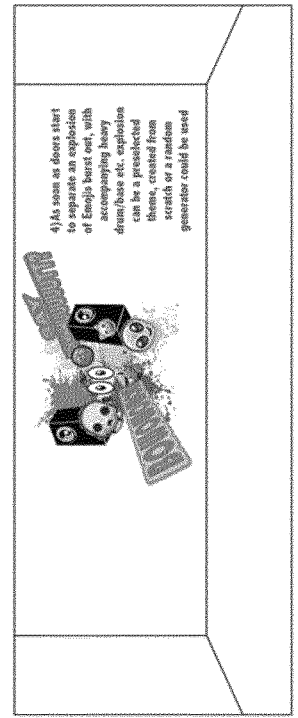
Figure 45A:
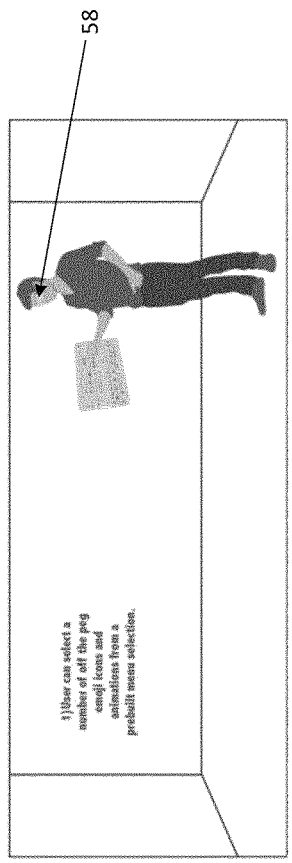
FIGS. 45A-45D illustrate aspects of a "multiple emojibomb".
Figure 45B:
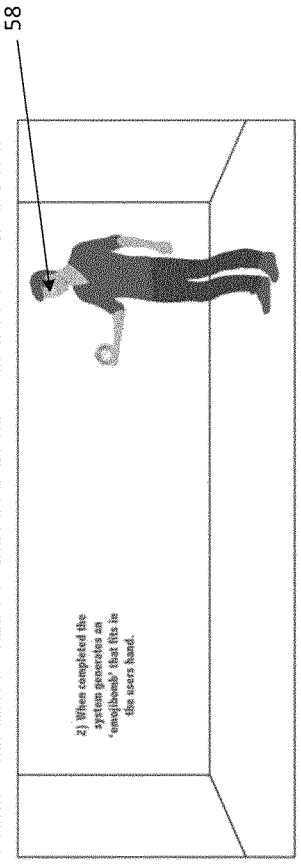
Figure 45C:
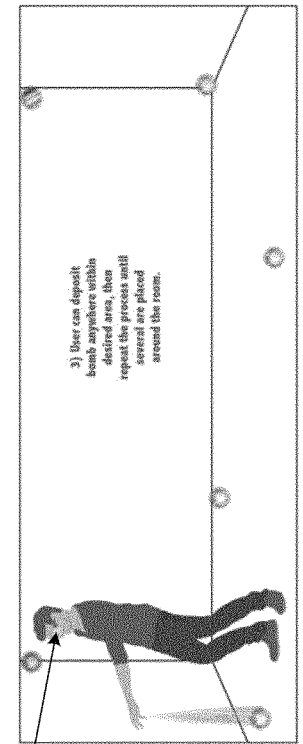
Figure 45D:
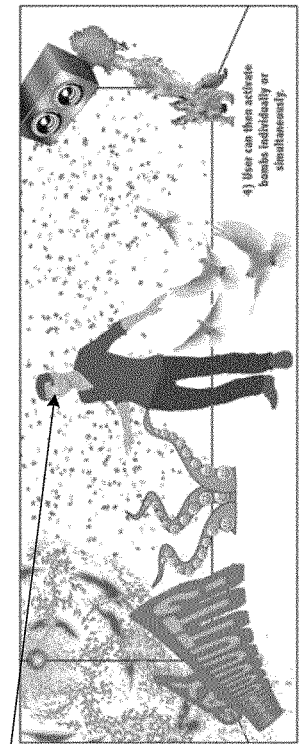
Figures 46A, 46B, 46C, 46D:
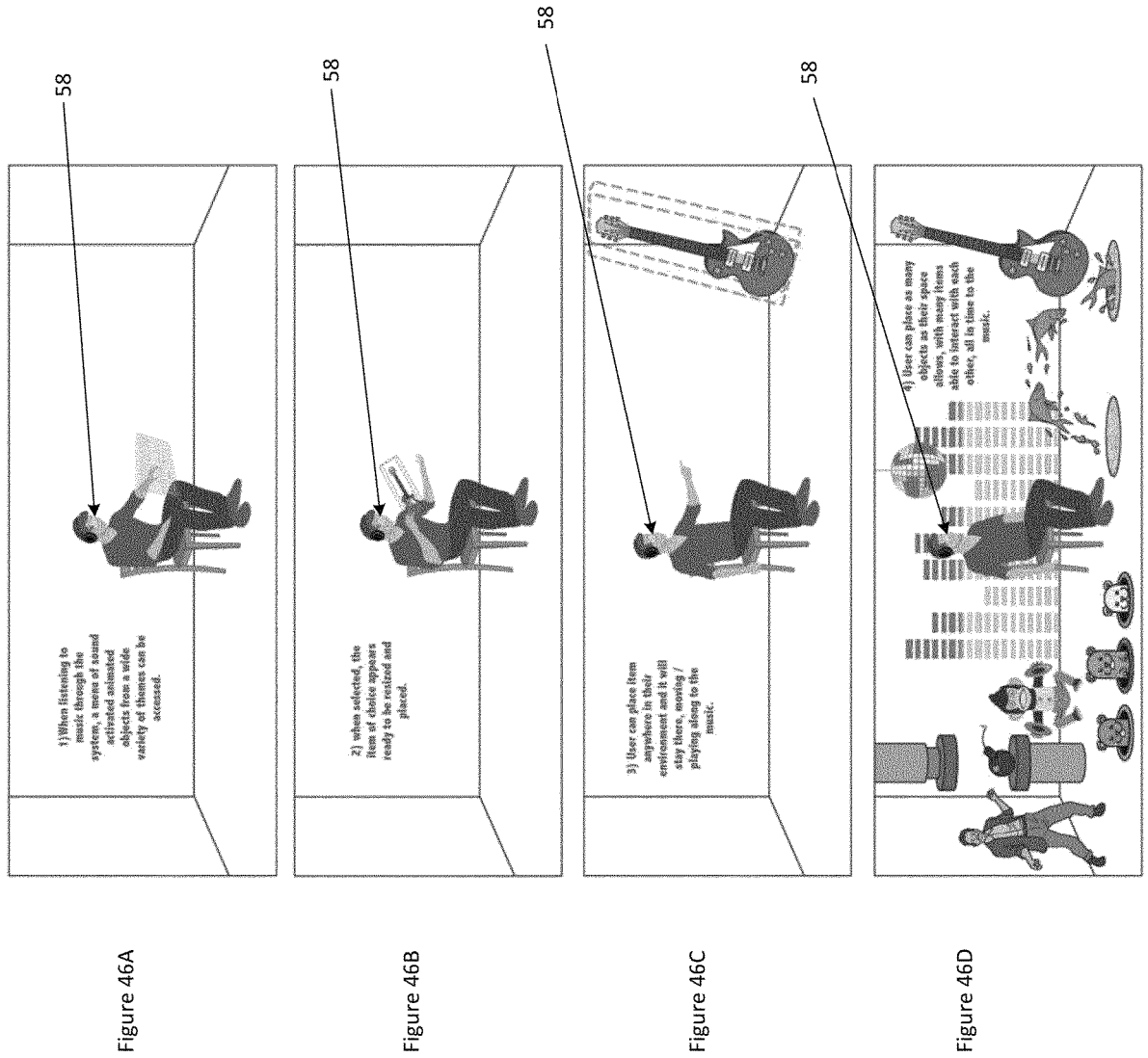
FIGS. 46A-46D illustrate aspects of a music listening and engagement functionality.
Figure 47A:
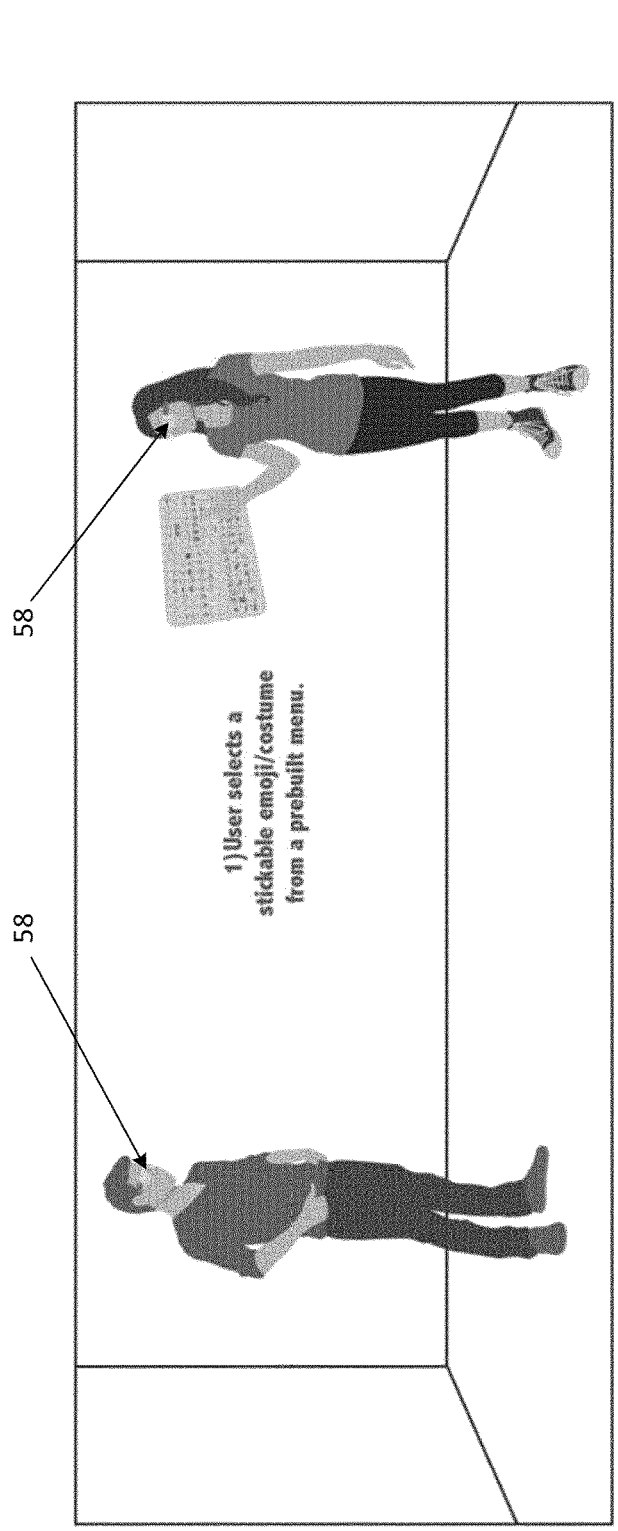
FIGS. 47A-47B and 48A-48B illustrate being able to select a person and virtually associate or "stick" certain images or artwork to that person.
Figure 47B:
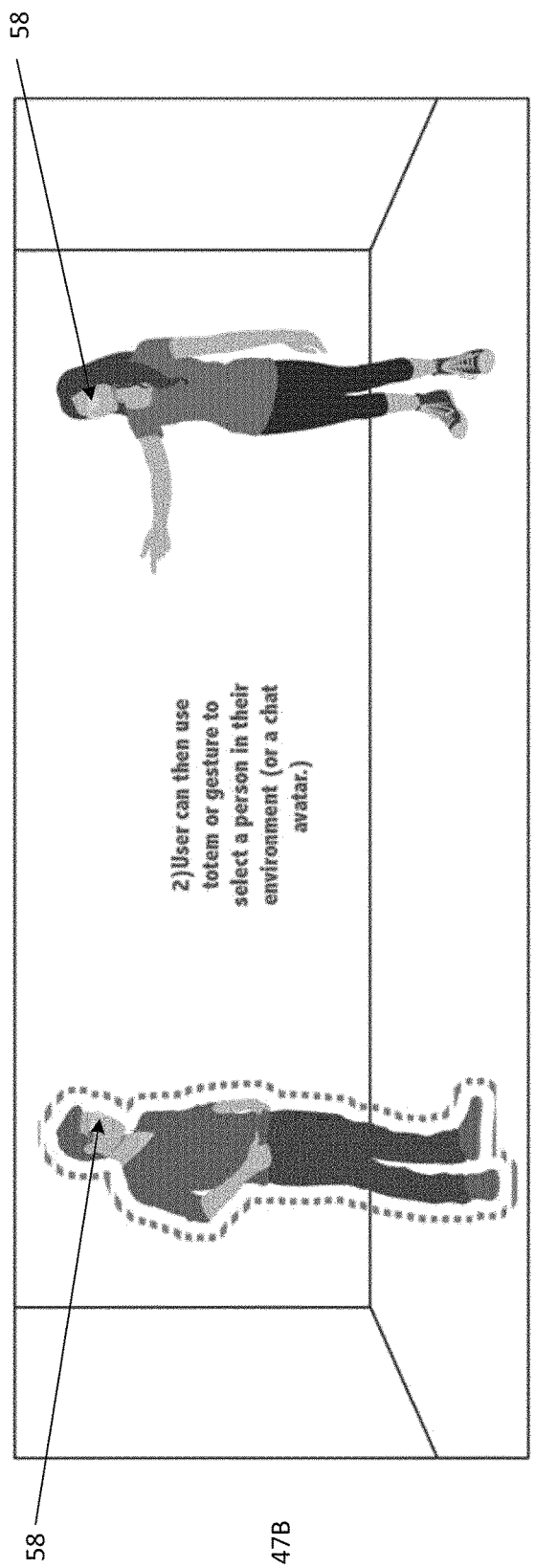

FIGS. 41A-41C illustrate one embodiment of an audio and/or video conferencing configuration which may be operated by a user having a head mounted system to start a conferencing app, select his conferencing counterparty, and engage in a discussion, all through the subject wearable system configuration.

Figure 48A:
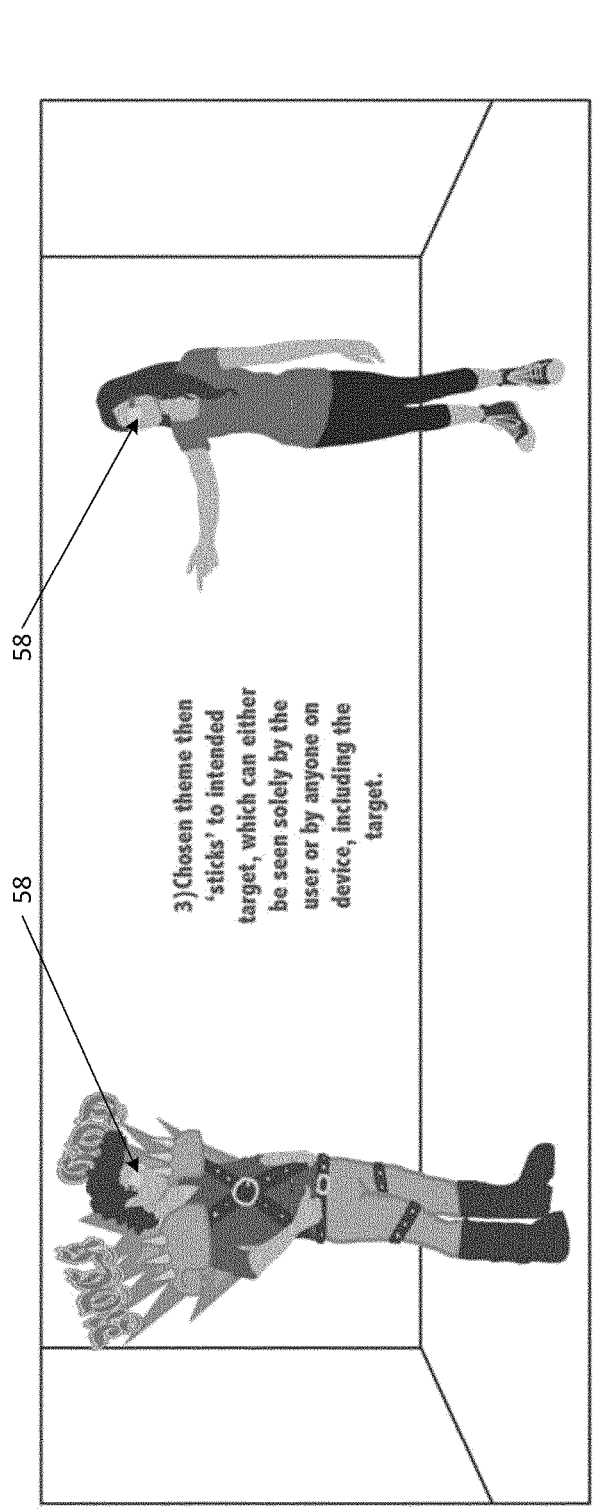
Figure 48B:
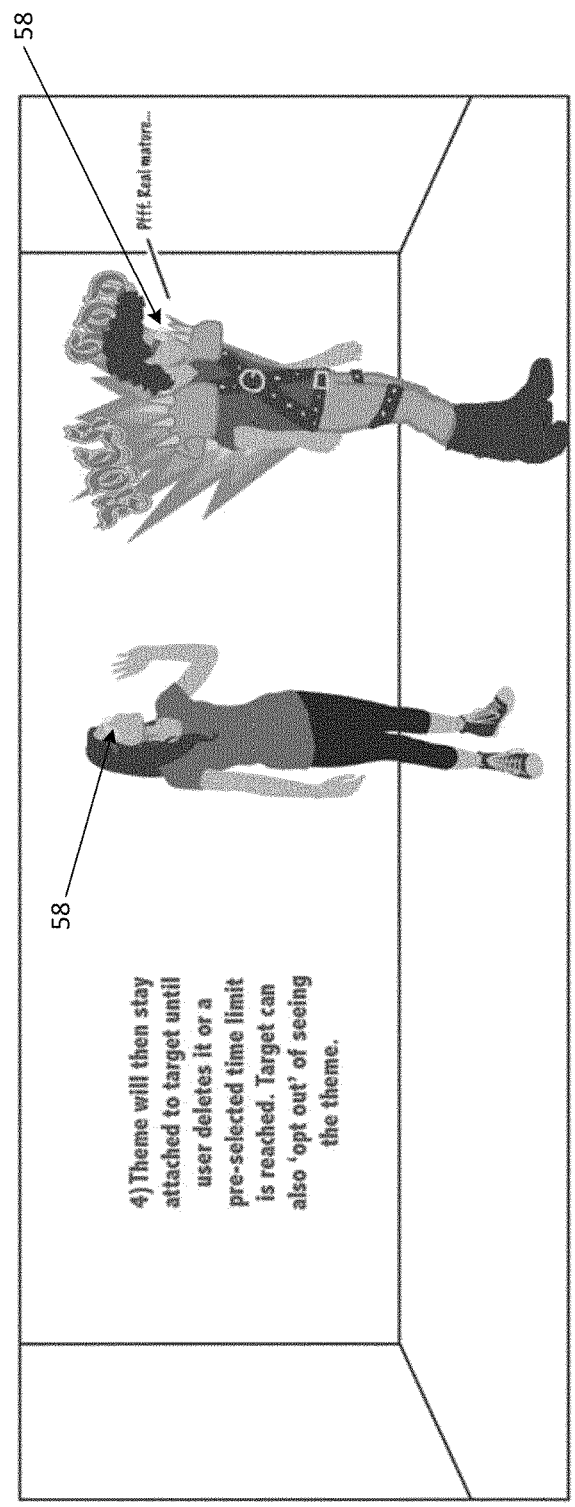

FIGS. 42A-42D illustrate aspects of an "emojibomb" functionality which may be utilized for entertainment, collaboration, or the like. Referring to FIGS. 43A-43D, various images or feature thereof, such as emojis, may be configured to be presented in three dimensions to users, and also be dynamic (e.g., to move, rotate, change size, change color, etc). FIGS. 44A-44D illustrate aspects of an "emojibomb" functionality which may be utilized for entertainment, collaboration, or the like. FIGS. 45A-45D illustrate aspects of a "multiple emojibomb" functionality which may be utilized for entertainment, collaboration, or the like. FIGS. 46A-46D illustrate aspects of a music listening and engagement functionality which may be utilized for entertainment, collaboration, or the like. Referring to FIGS. 47A-47B and 48A-48B, in one embodiment, one user may be able to select another person and virtually associate or "stick" certain images or artwork to that person, as shown in FIGS. 48A-48B.

Figure 49:
FIG. 49 illustrates a user wearing a head mounted component to interpret and translate sign language.
Figure 50B:
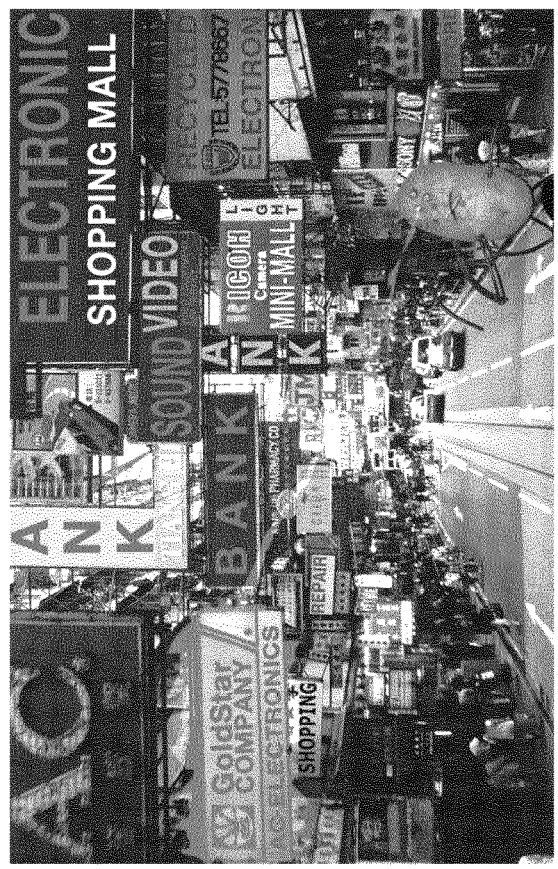
FIGS. 50A-50B illustrate translation being utilized to assist a user in understanding signage in the local environment.
Figure 50A:

Referring to FIG. 49, a user wearing a head mounted component (58) may benefit from system functionality configured to interpret and translate sign language presented in front of the user, such as by a person approaching at a counter in a hotel concierge environment. As shown in FIGS. 50A-50B, translation may also be utilized to assist a user in understanding signage in the local environment.

Figure 51:
FIG. 51 illustrates a pair of users wearing their head mounted components to experience a virtually-presented three-dimensional movie presentation.
Figure 52A:
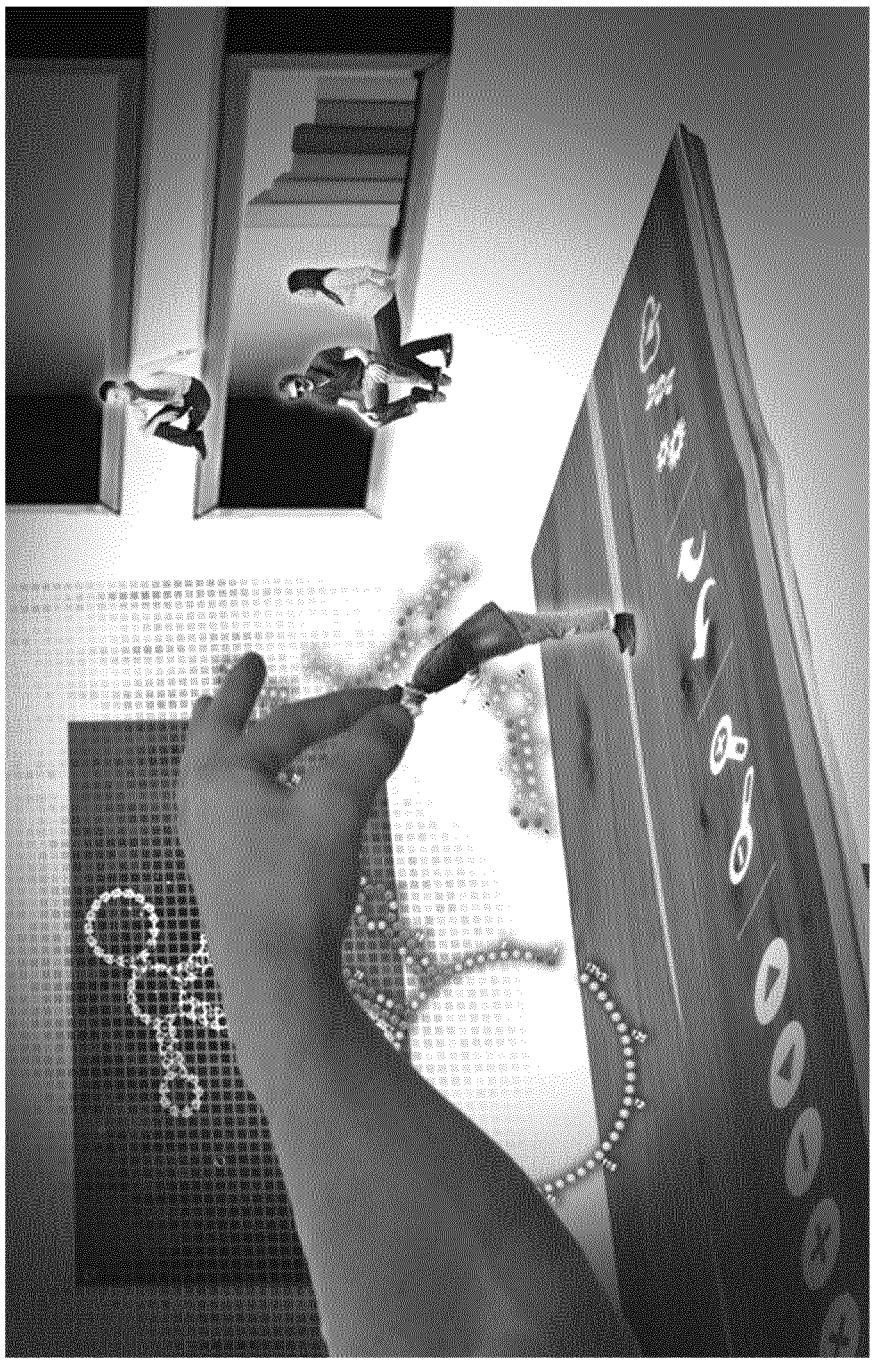
FIGS. 52A-52E illustrate embodiments wherein users wearing head mounted components are able to experience highly augmented visual presentations.
Figure 52B:
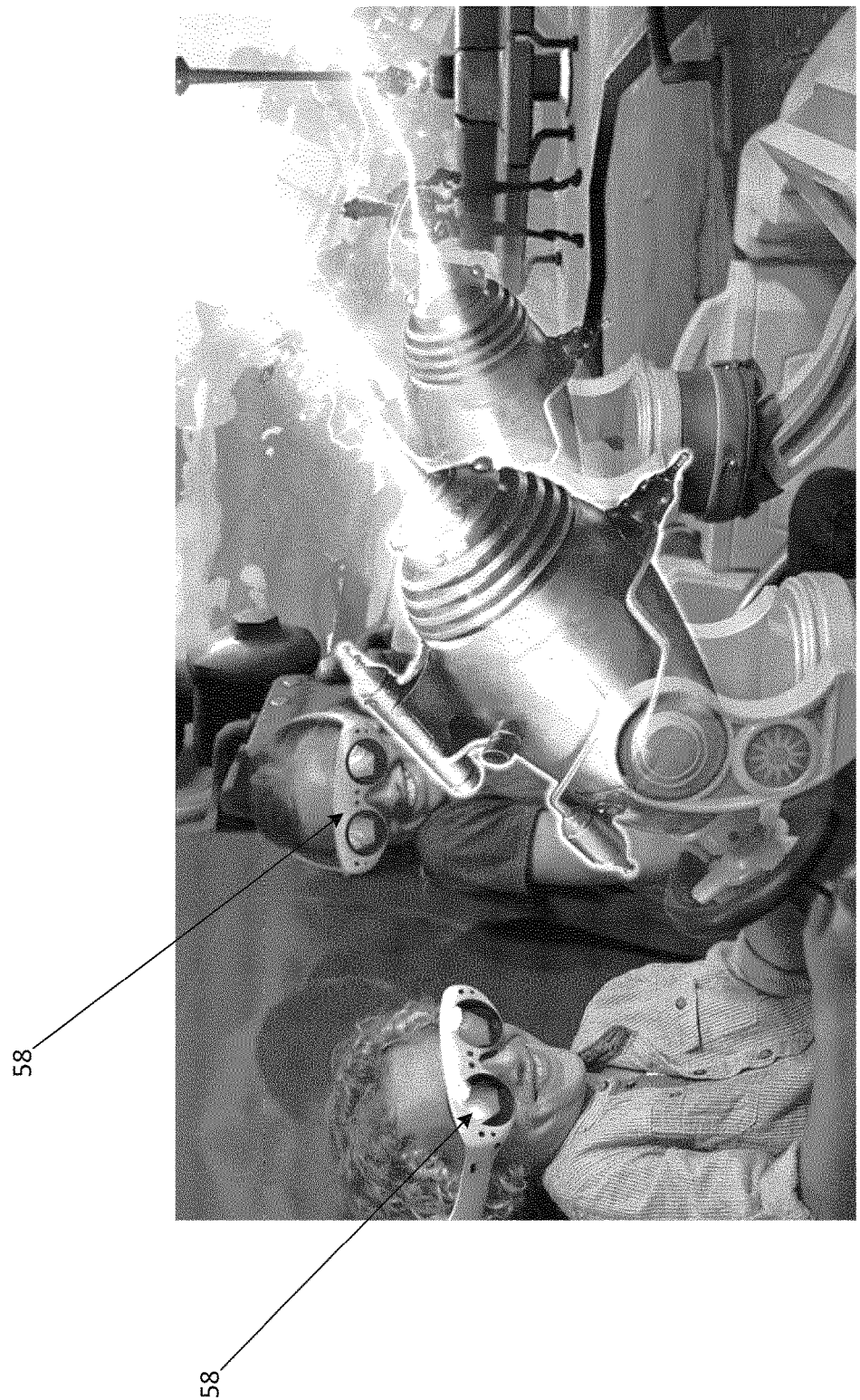
Figure 52C:
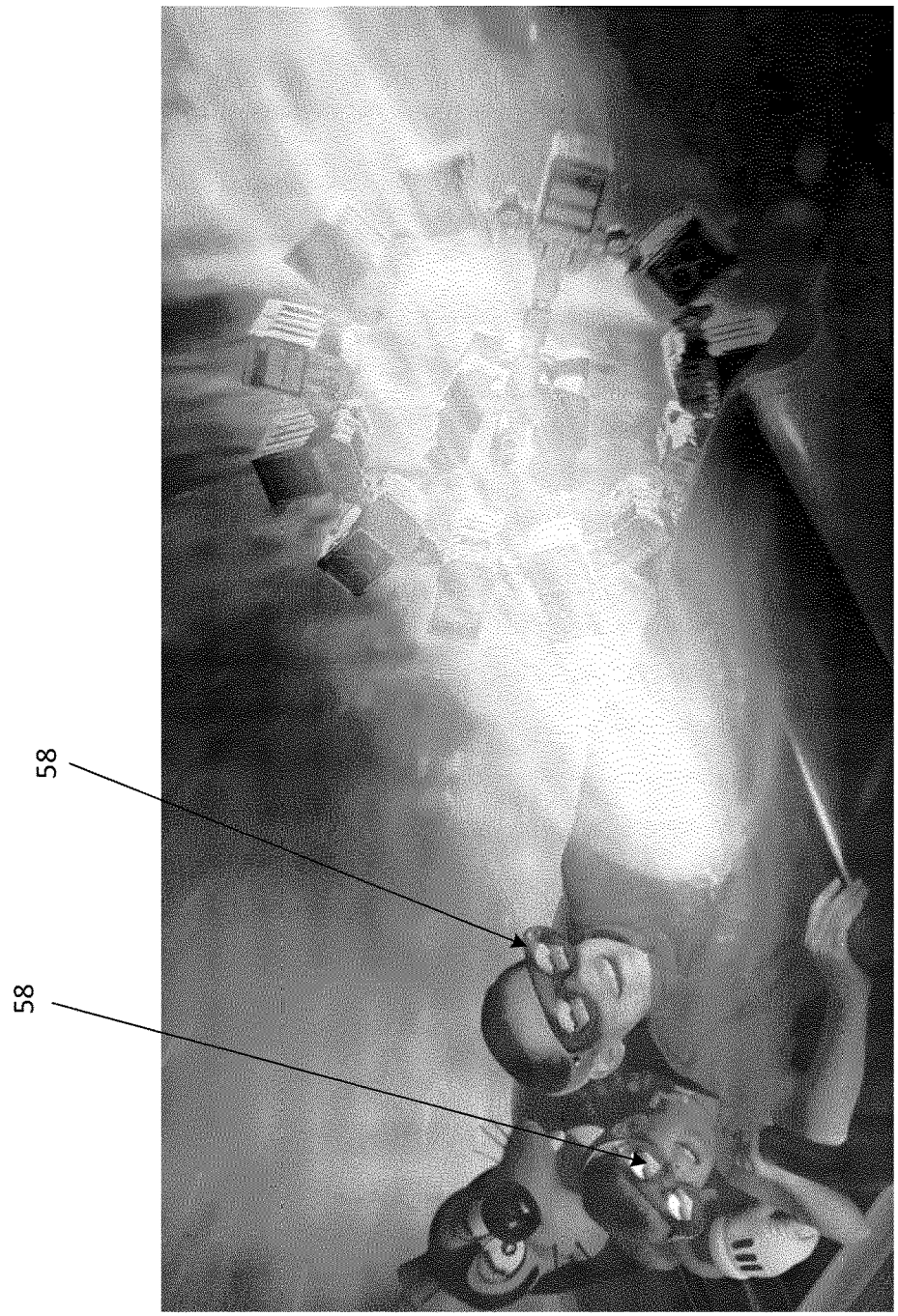
Figure 52D:
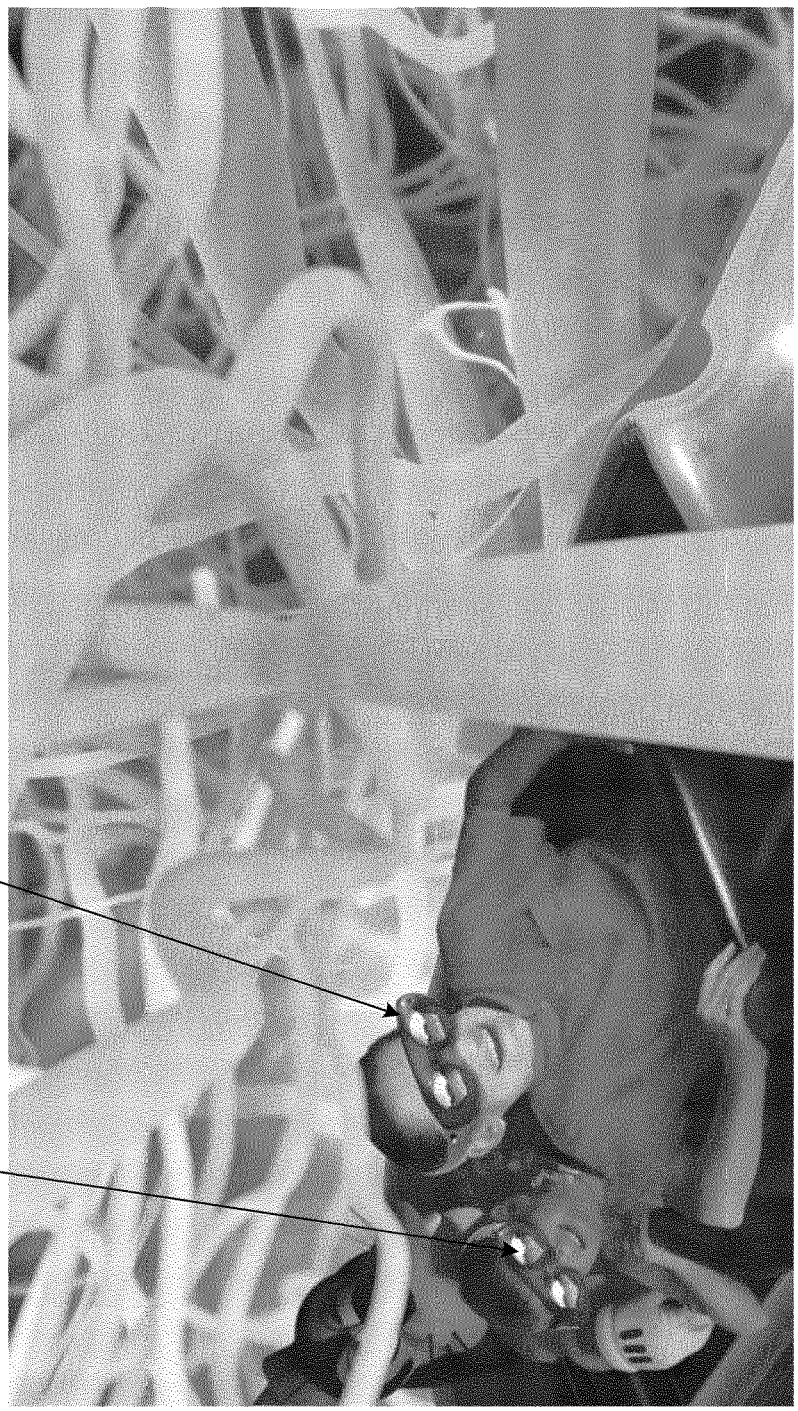
Figure 52E:
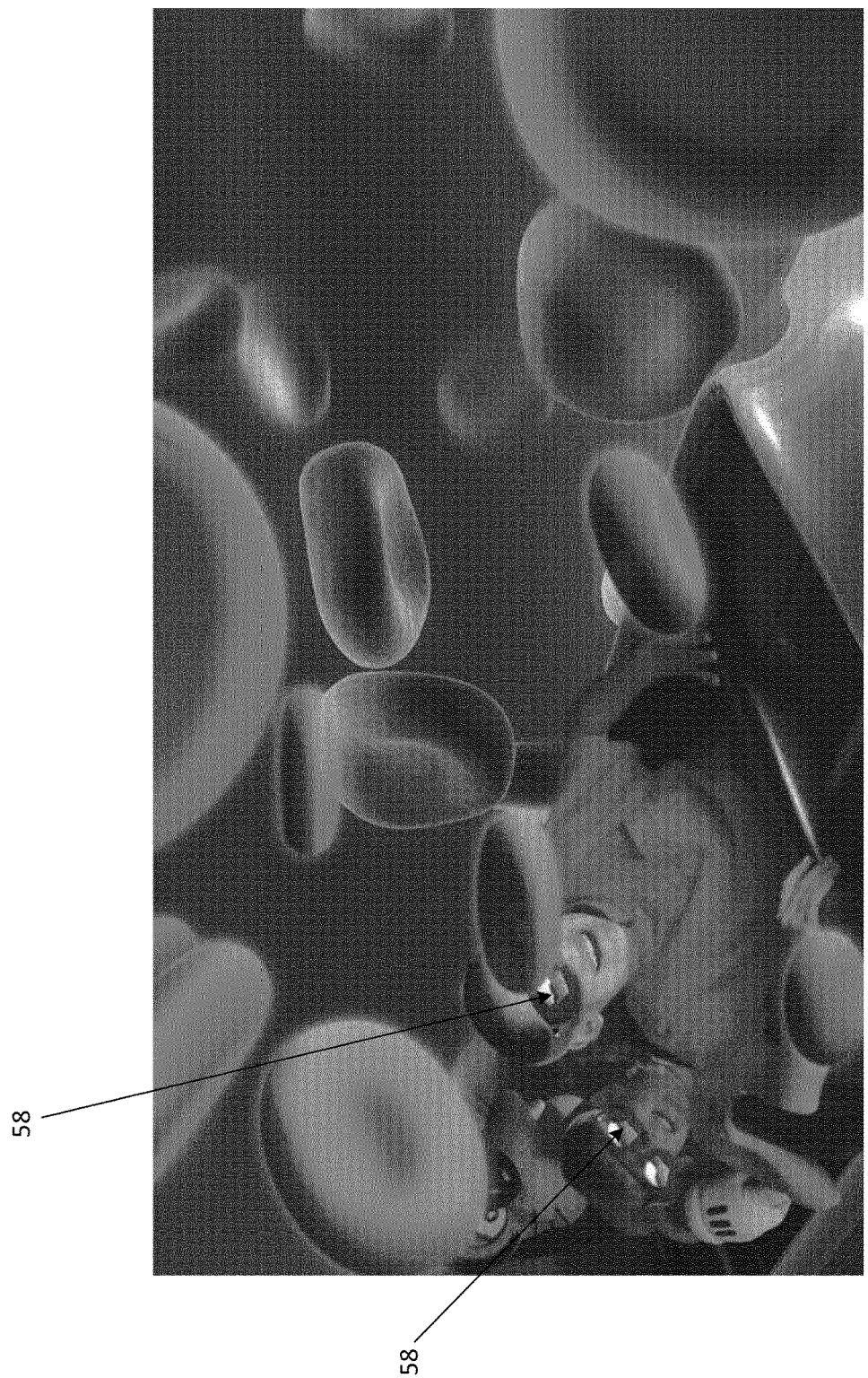
Figure 53:
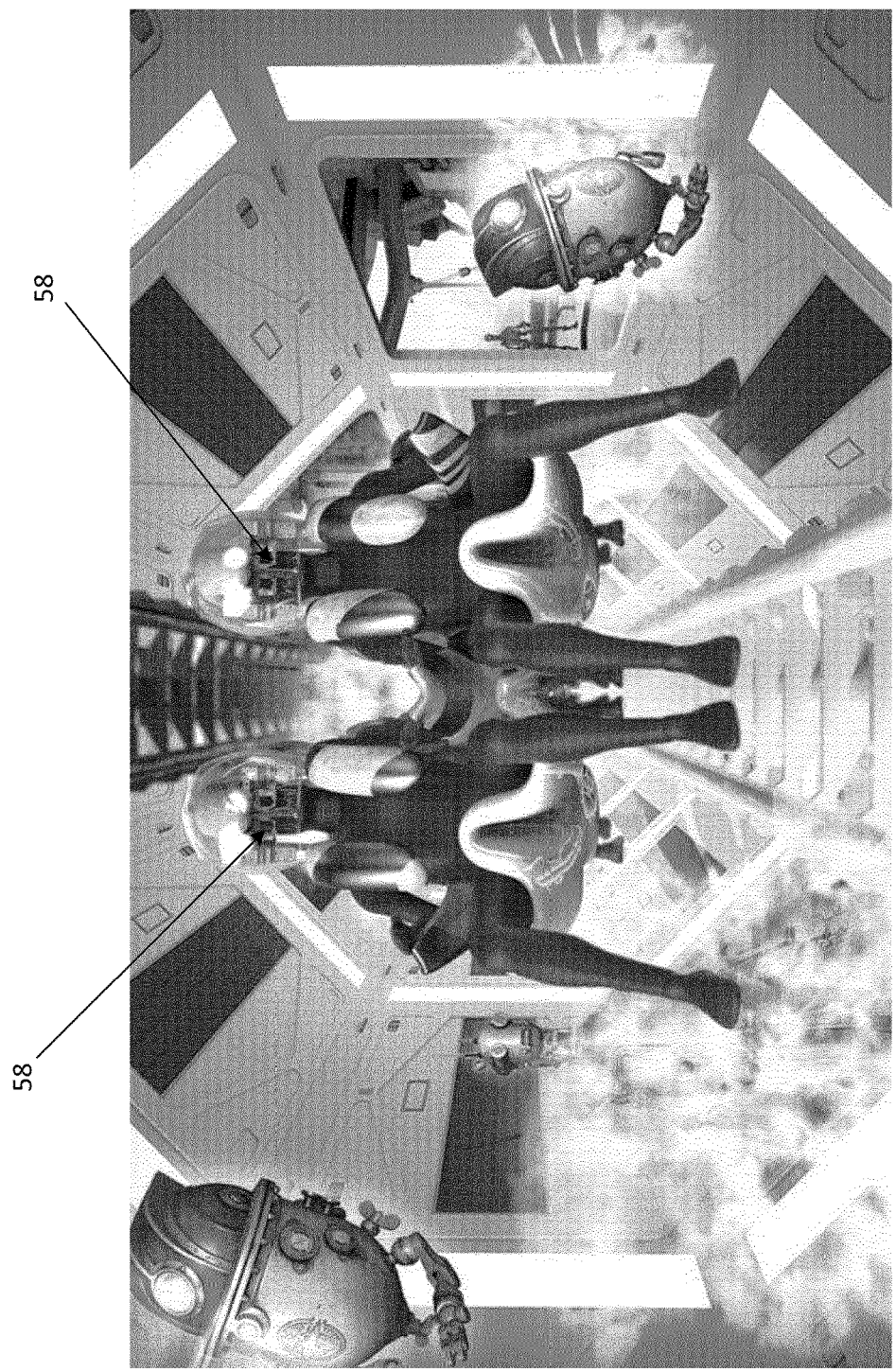
FIG. 53 illustrates a theme park configuration.
Figure 54:
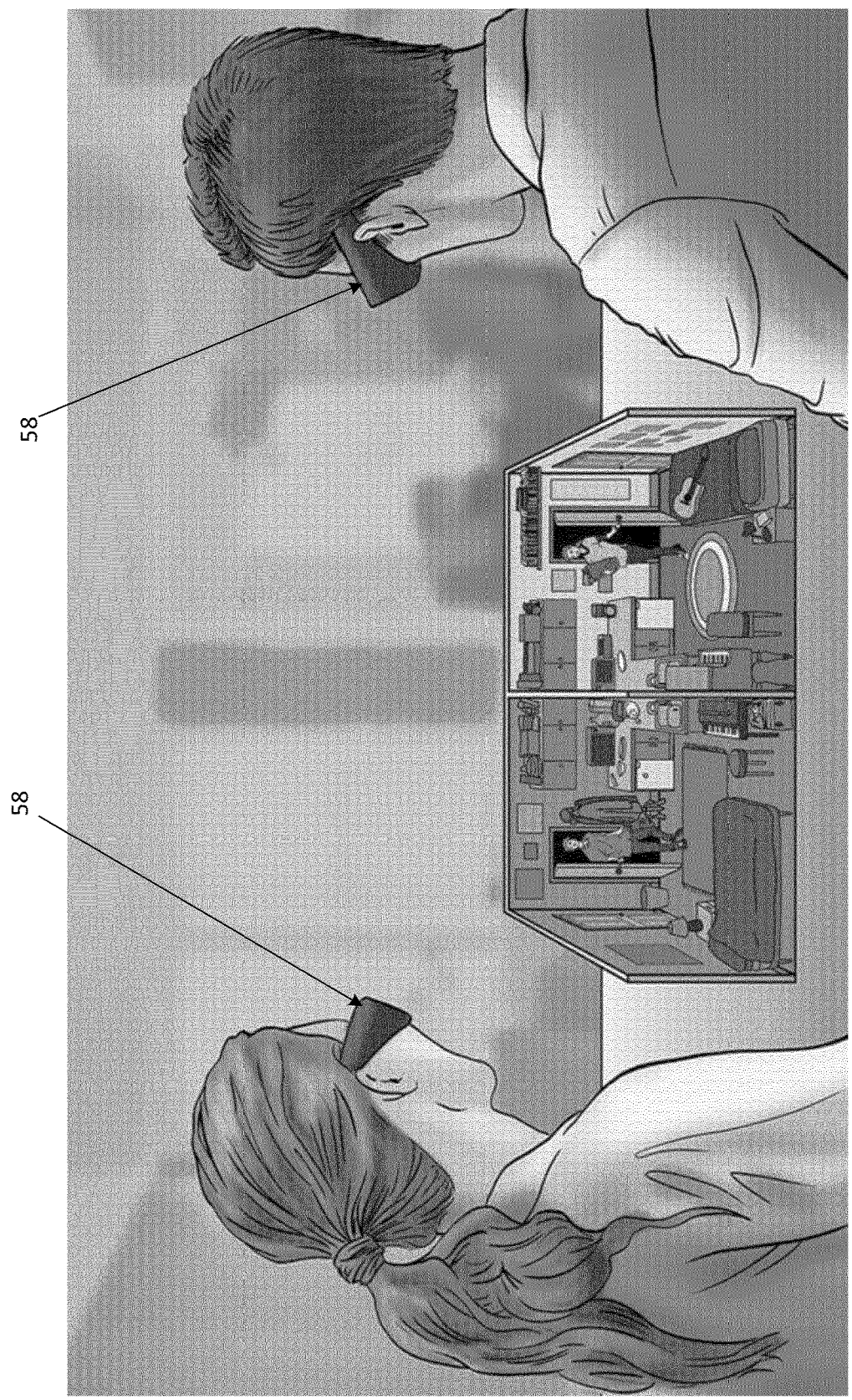
FIG. 54 illustrates a couple wearing head mounted components that are able to enjoy a tabletop presentation of a theater show.
Figure 55B:
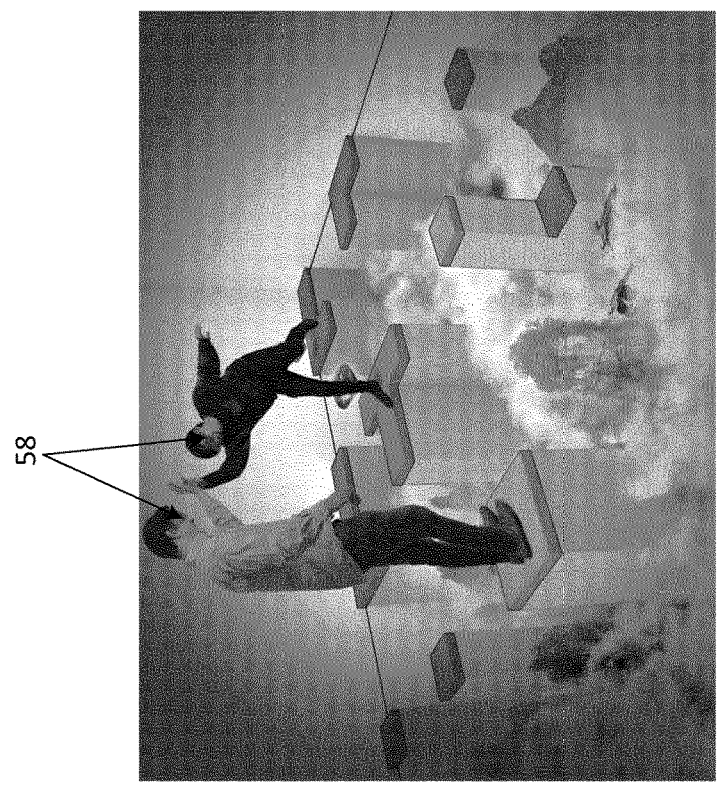
FIGS. 55A-55B illustrates a configuration wherein users with their head mounted components are able to step between room features.
Figure 55A:
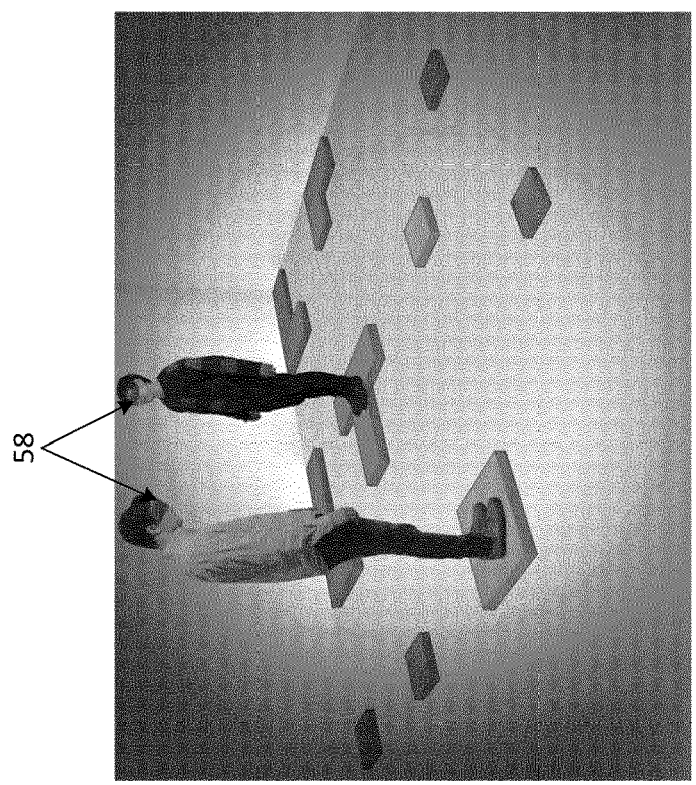
Figure 56A:
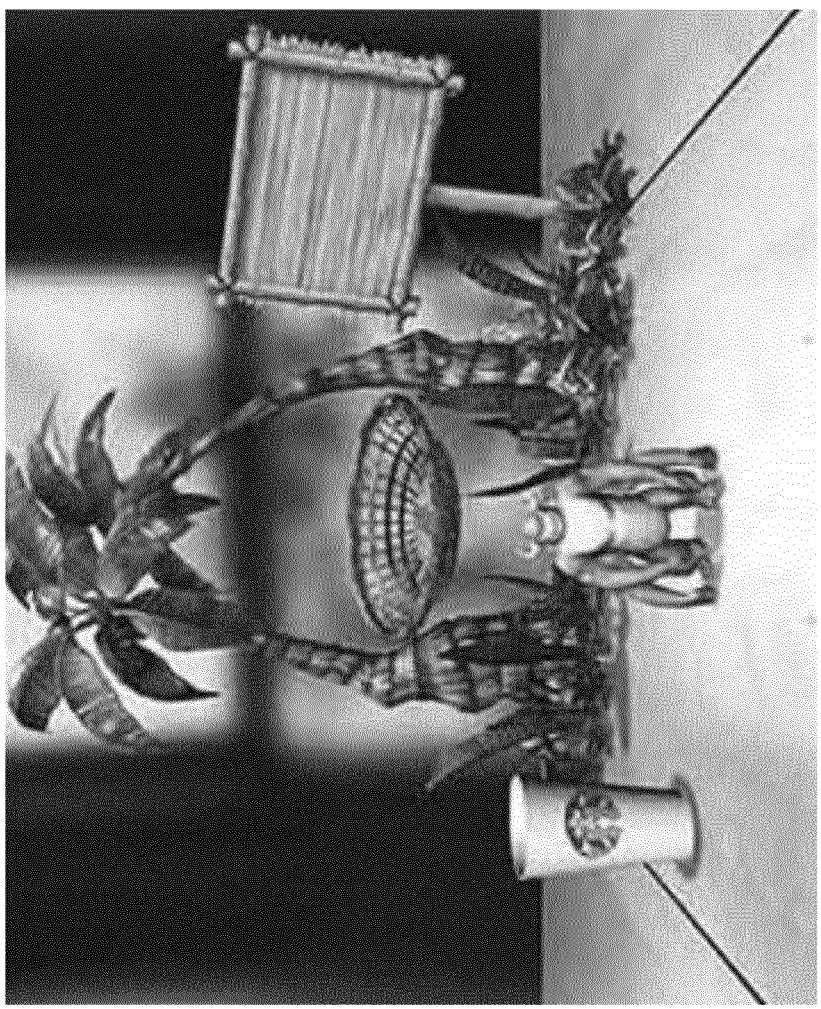
FIGS. 56A-56H illustrate various gaming instantiations.
Figure 56B:
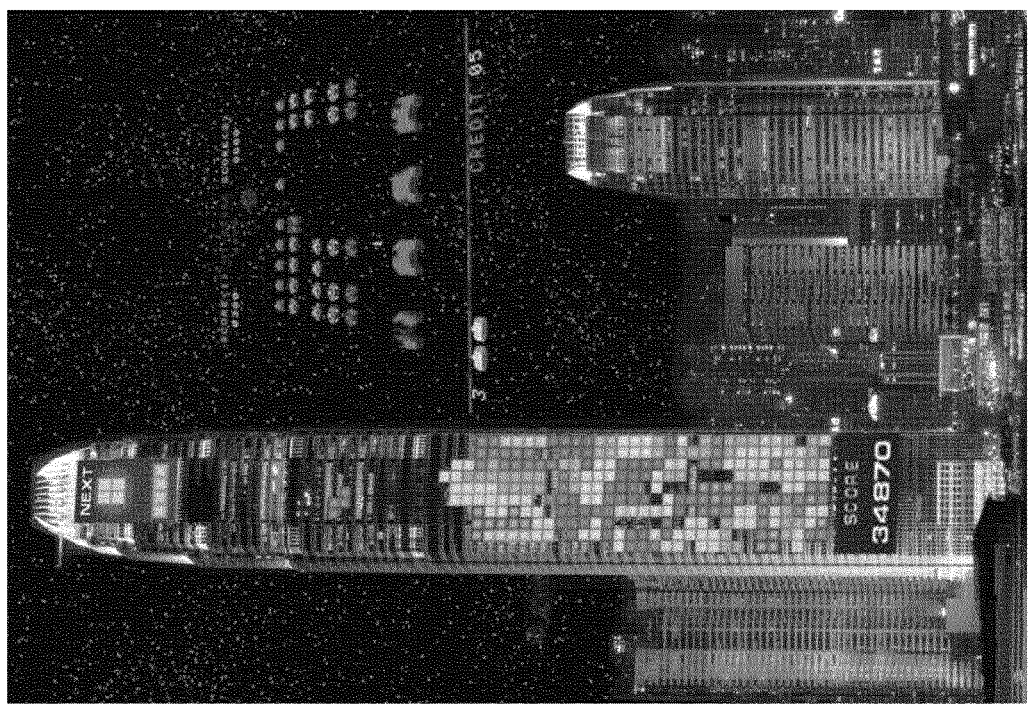
Figure 56C:
Figure 56D:
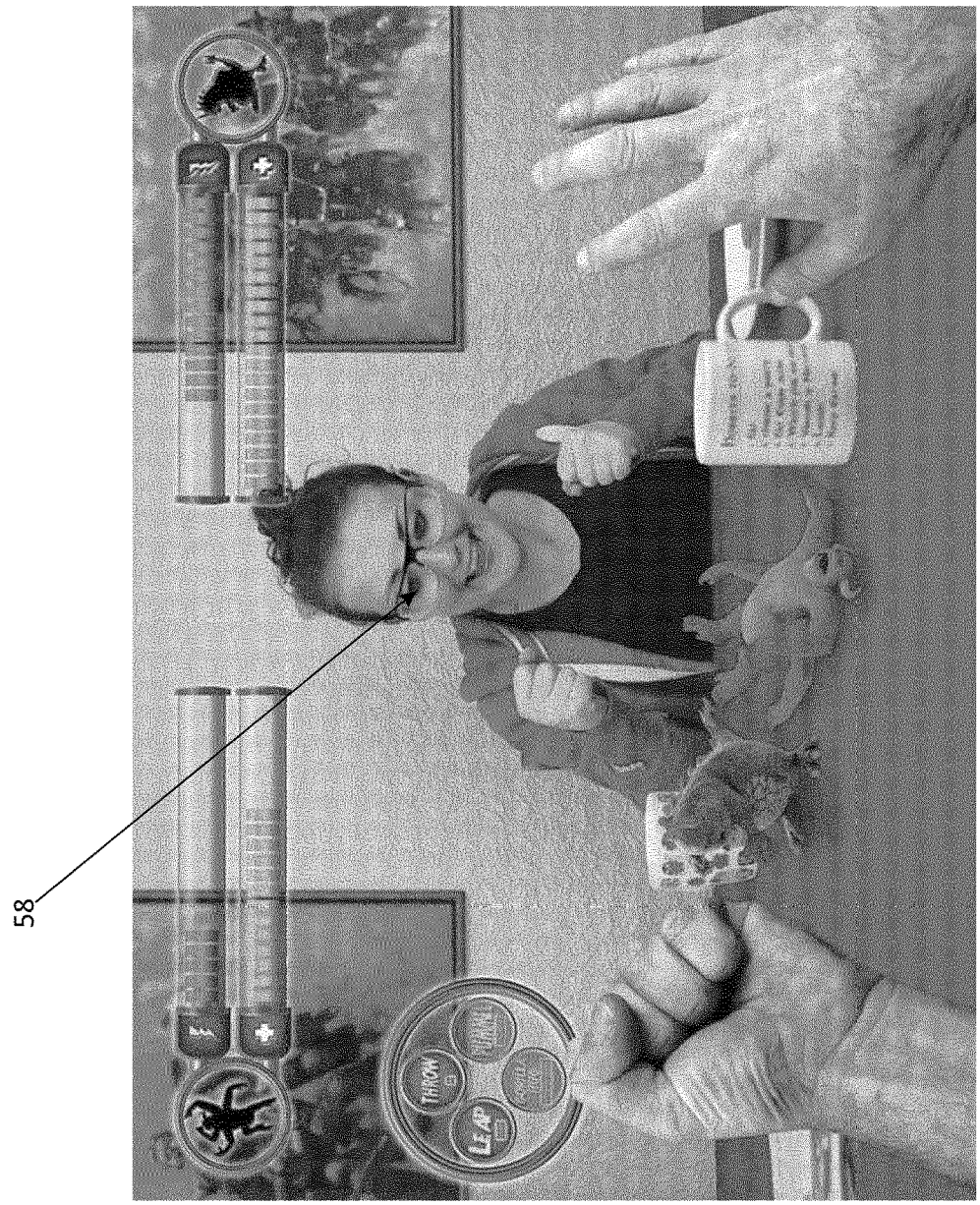
Figure 56E:
Figure 56F:
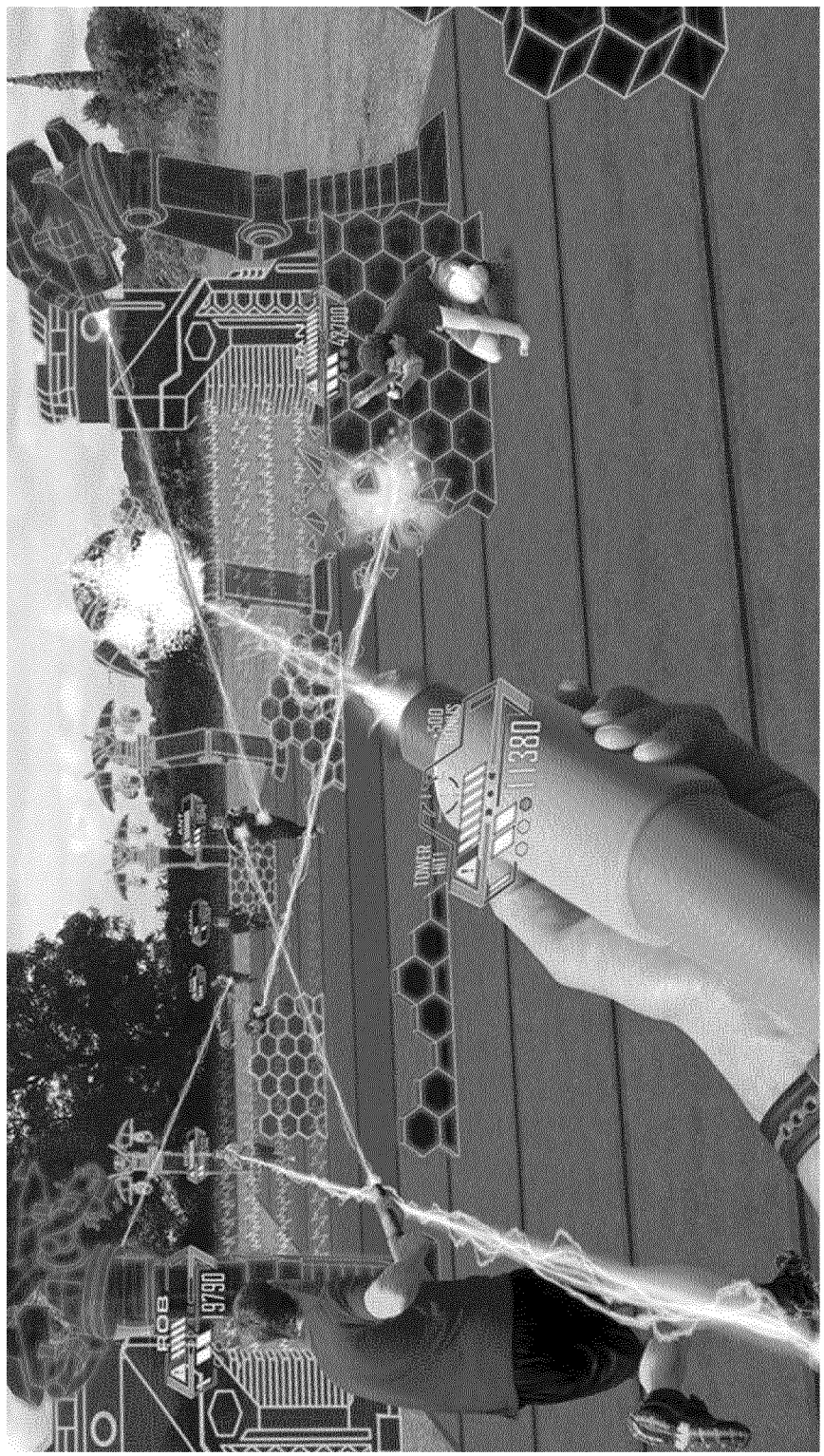
Figure 56G:
Figure 56H:
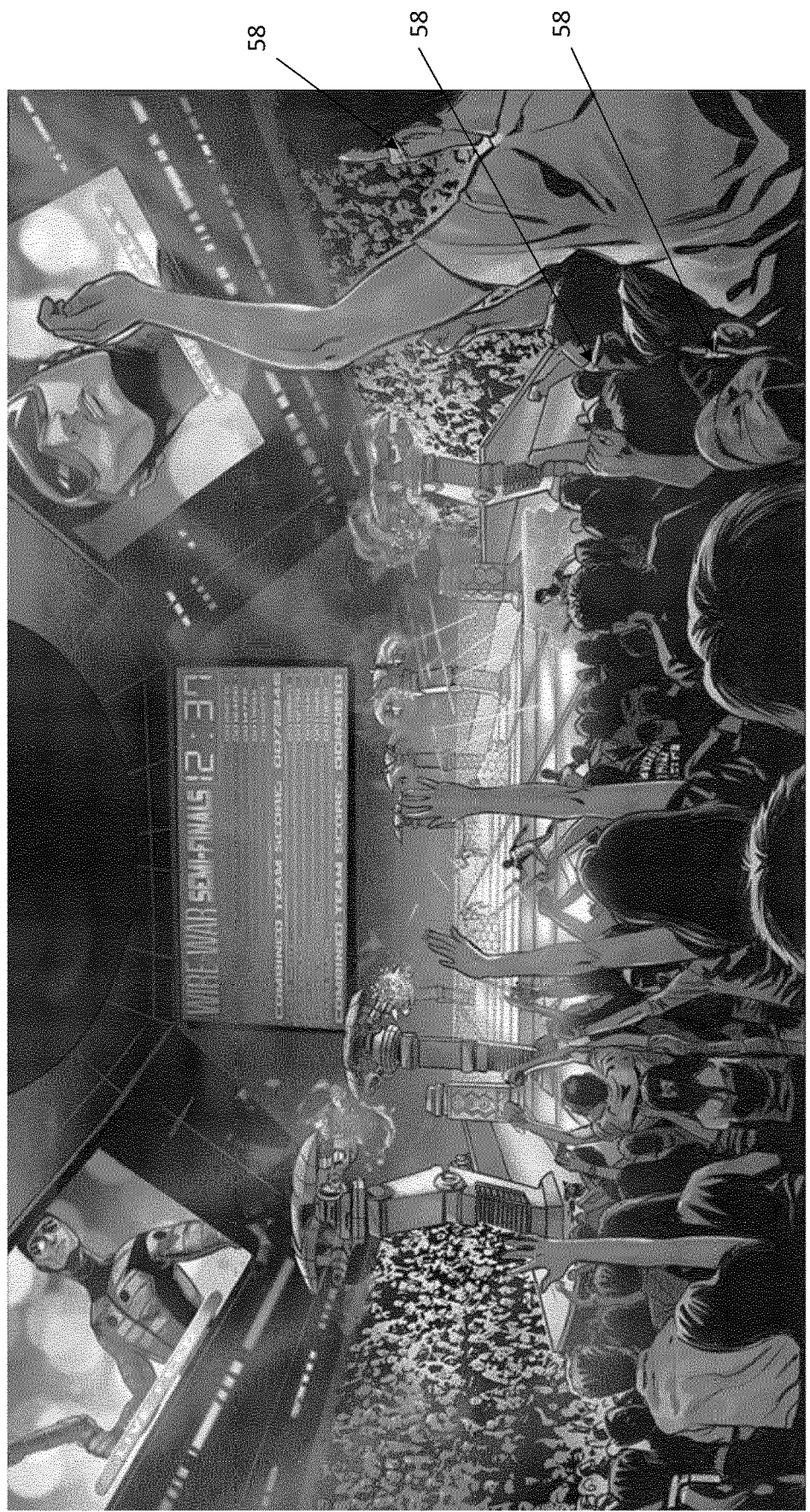
Figure 57A:
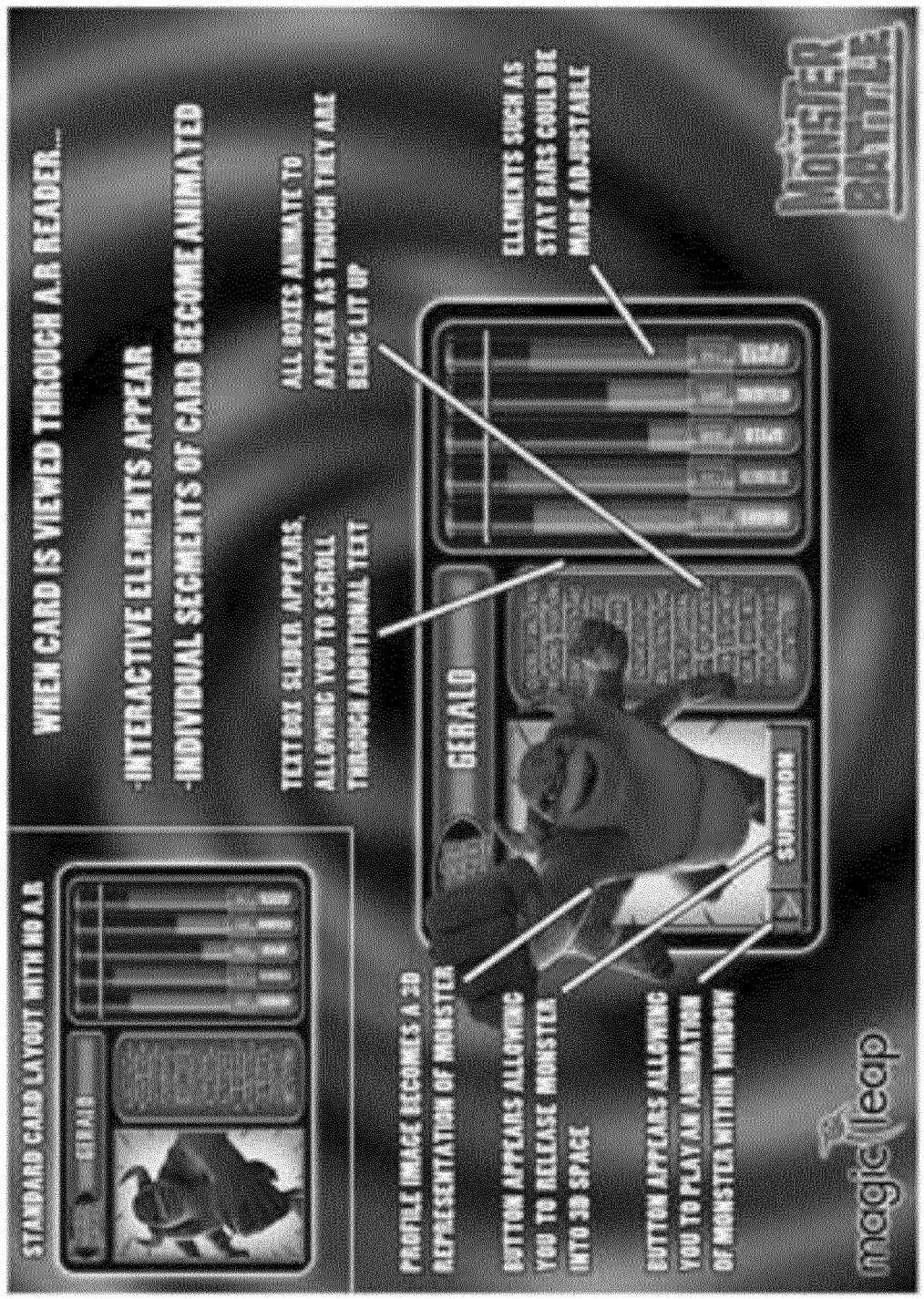
FIGS. 57A-57I illustrate an example game.
Figure 57B:
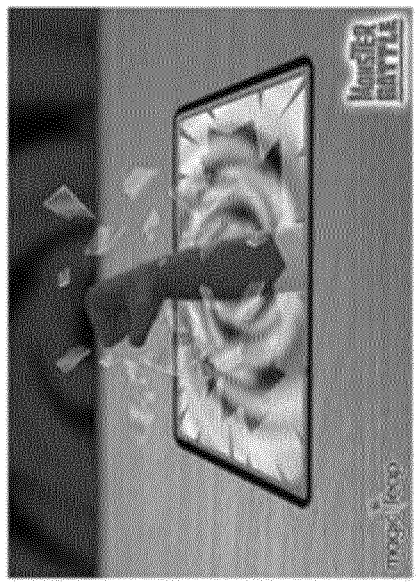
Figure 57C:
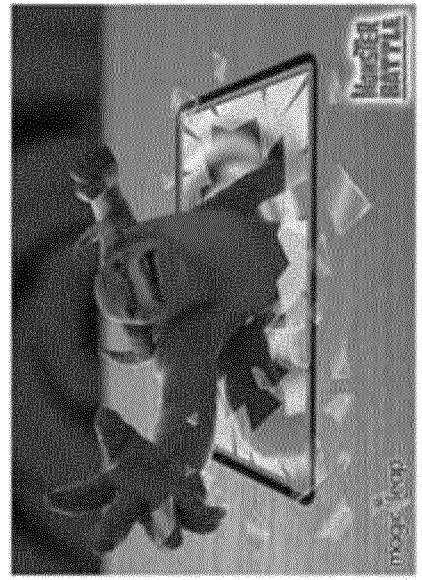
Figure 57F:
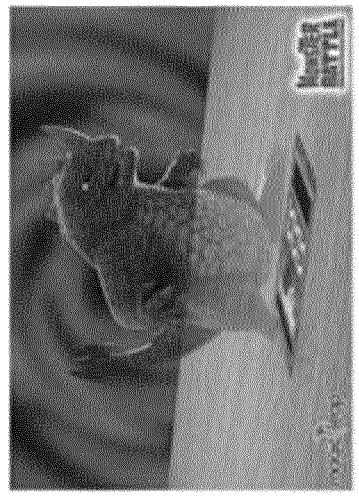
Figure 57G:
Figure 57E:
Figure 57D:
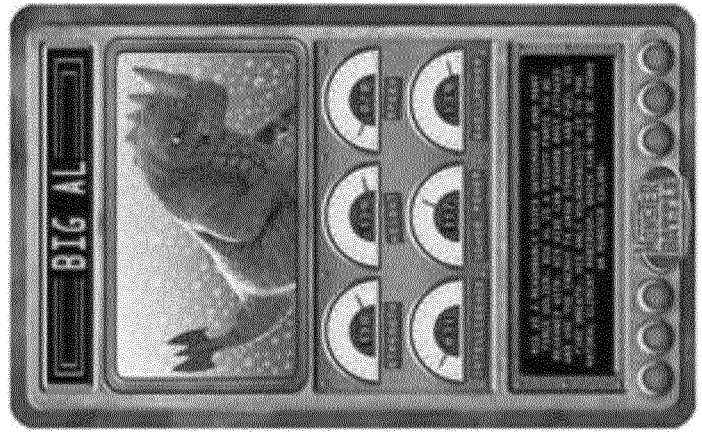
Figures 57H, 57I:
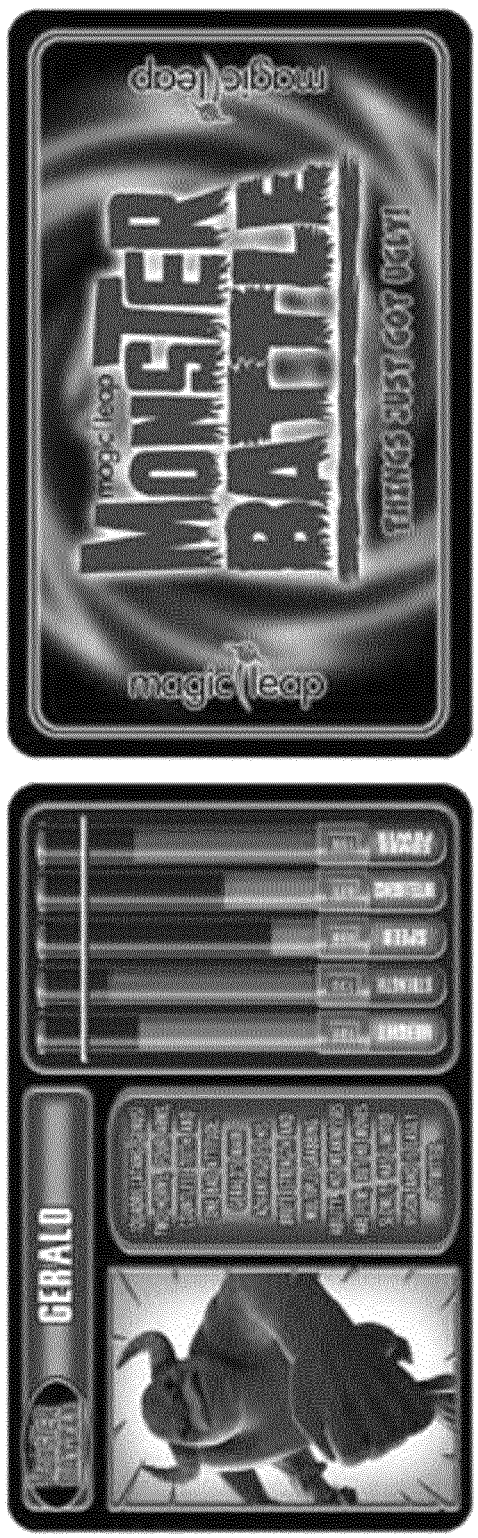

Referring to FIG. 51, a pair of users wearing their head mounted components (58) are able to experience a virtually-presented three-dimensional movie presentation, such as a birthday song for one of the users. FIGS. 52A-52E illustrate embodiments wherein users wearing head mounted components (58) are able to experience highly augmented visual presentations, such as in tabletop gaming, theme park, roller coaster, and many other environments for entertainment, learning, and other types of information-rich experiences. FIG. 53 illustrates a theme park configuration wherein head mounted components (58) are configured to be utilized by each user to occupies a seat on the ride, for maximum augmented reality entertainment presentation and experience. Referring to FIG. 54, a couple wearing head mounted components (58) is able to enjoy a tabletop presentation of a theater show in three dimensions. FIGS. 55A-55B illustrates a configuration wherein users with their head mounted components (58) are able to step between actual room features (such as floor mats) and experience dramatic virtual features below, as shown in FIG. 55B. FIGS. 56A-56H illustrate various gaming instantiations, with users able to observe virtual features in three dimensions, and remote spectators also able to experience certain aspects of the scenario, depending upon the connectivity and capture capabilities of the local scenario. For example, in one embodiment, the persons shown in FIG. 56G are able to virtually observe and participate in certain aspects of the game being played in three dimensions in FIG. 56F.

Referring to FIGS. 57A-57I, a game, such as "Monster Battle"® may be configured and played, in a two dimensional and/or three dimensional presentation to the user with the subject configurations.

Figure 58A:
FIGS. 58A-58C illustrate a user scenario wherein a person utilizing a head mounted component may read and configure presentation of a book.
Figure 58B:
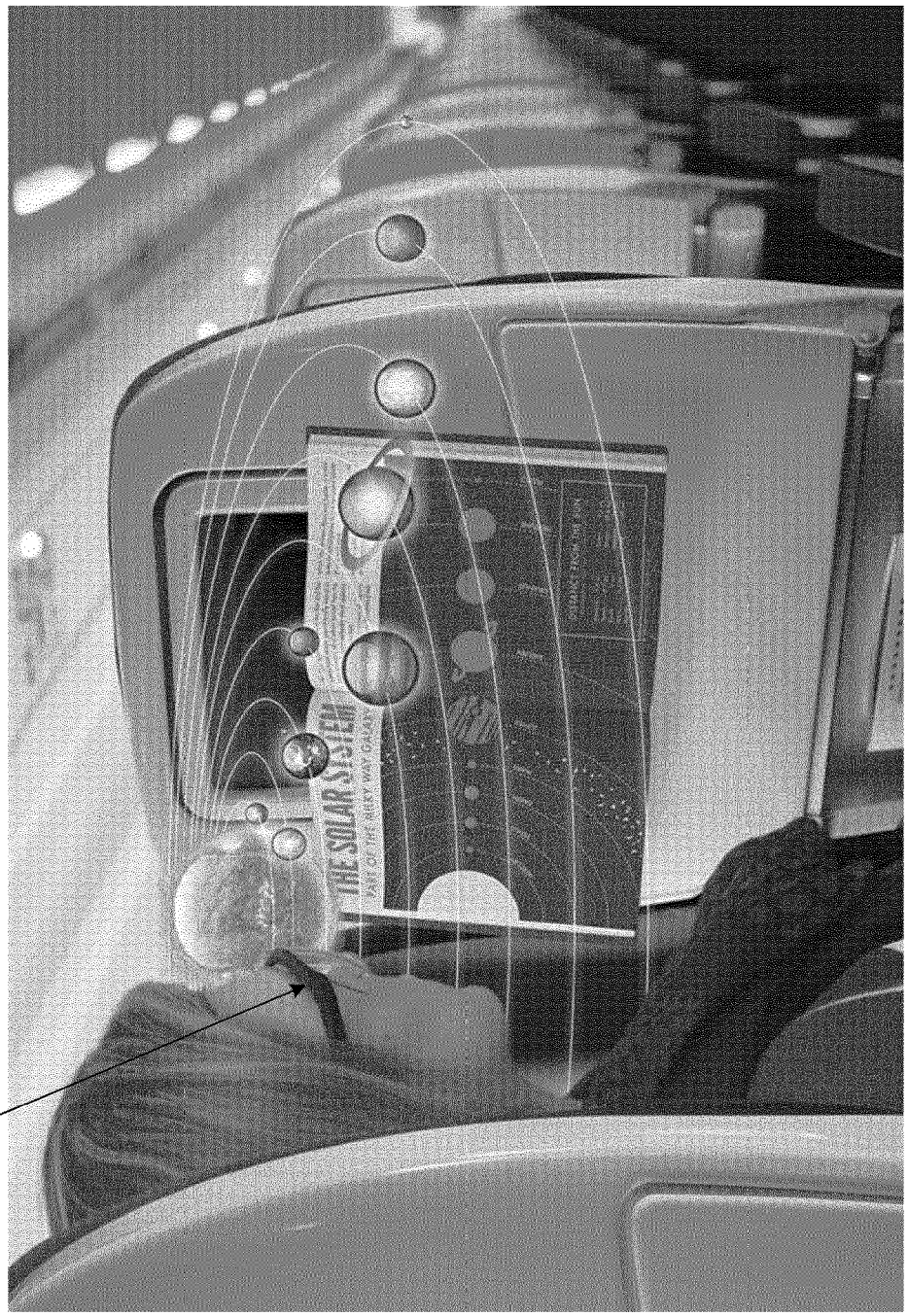
Figure 58C:
Figure 59:
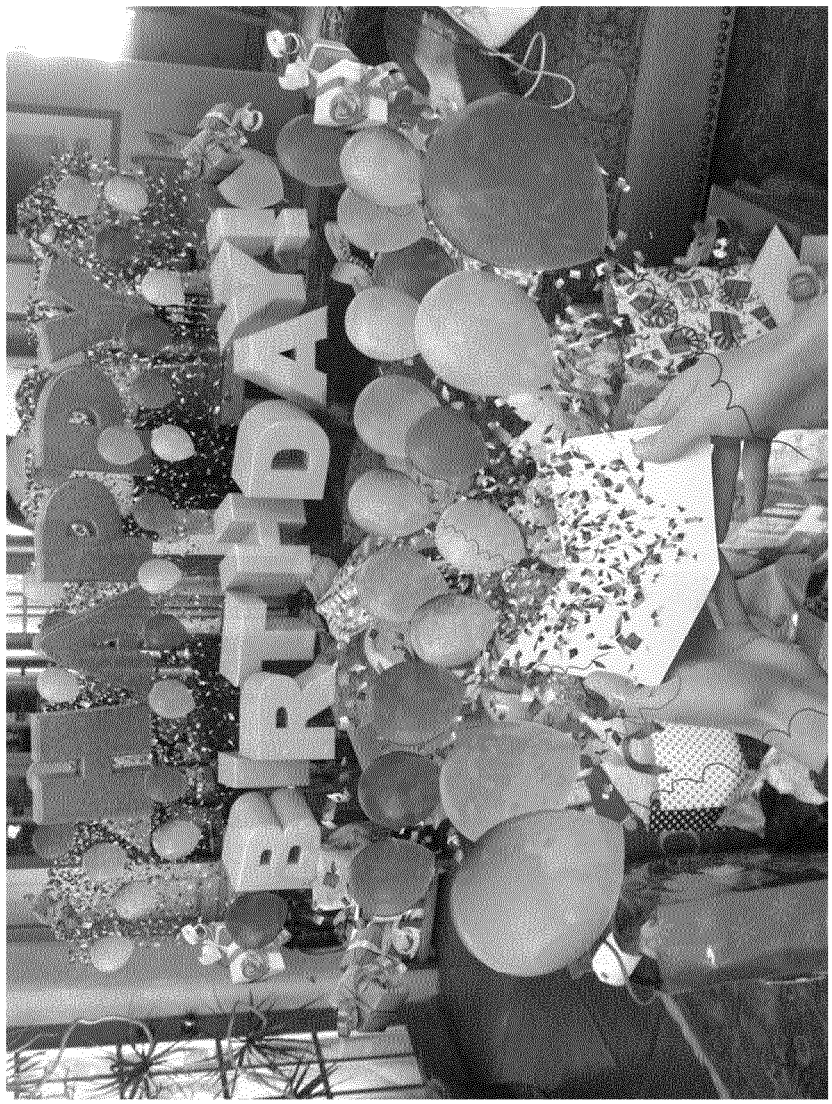
FIG. 59 illustrates an augmented birthday card configuration.
Figure 61A:
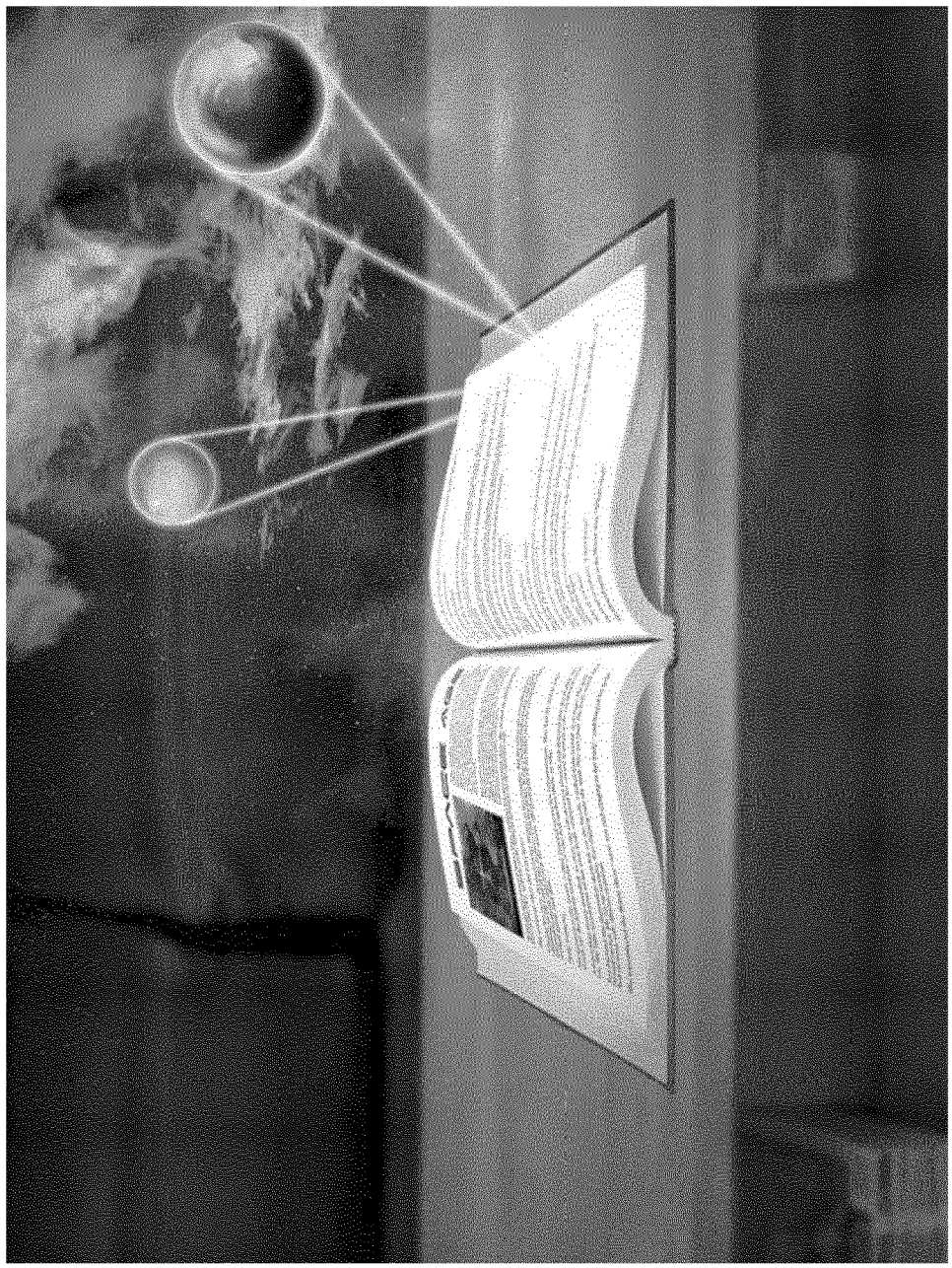
FIGS. 61A-62B illustrate various aspects of tabletop or desktop presentation of augmented reality.
Figure 61B:
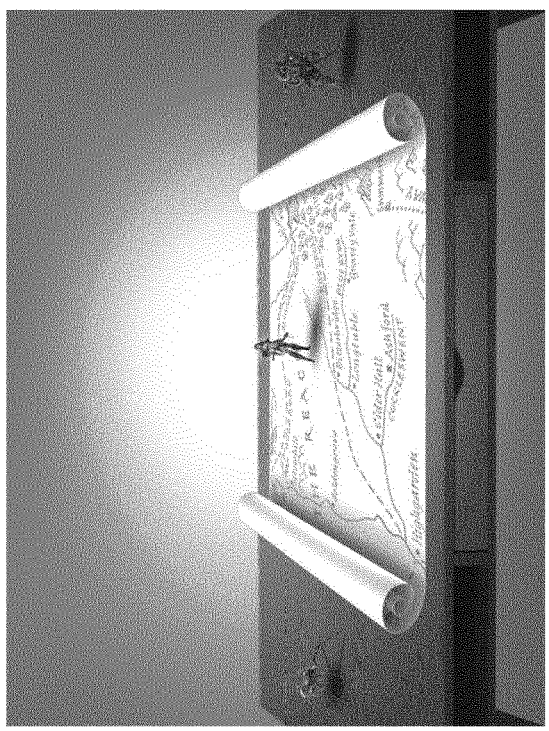
Figure 61C:
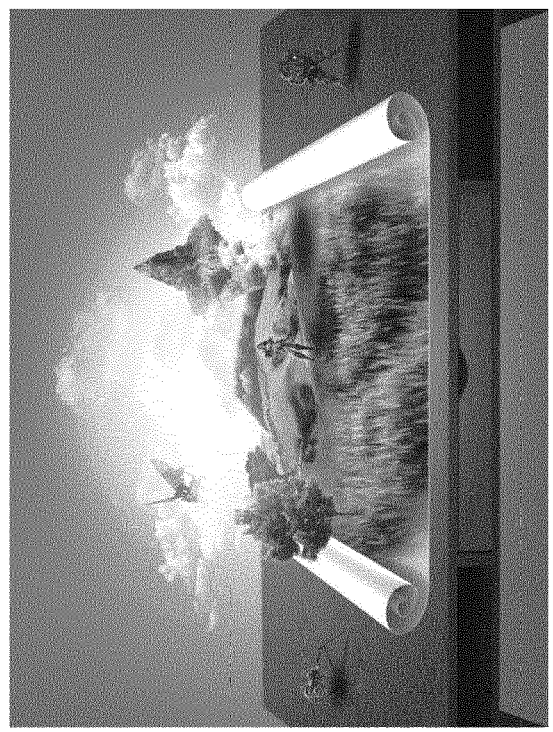
Figure 62B:
Figure 62A:
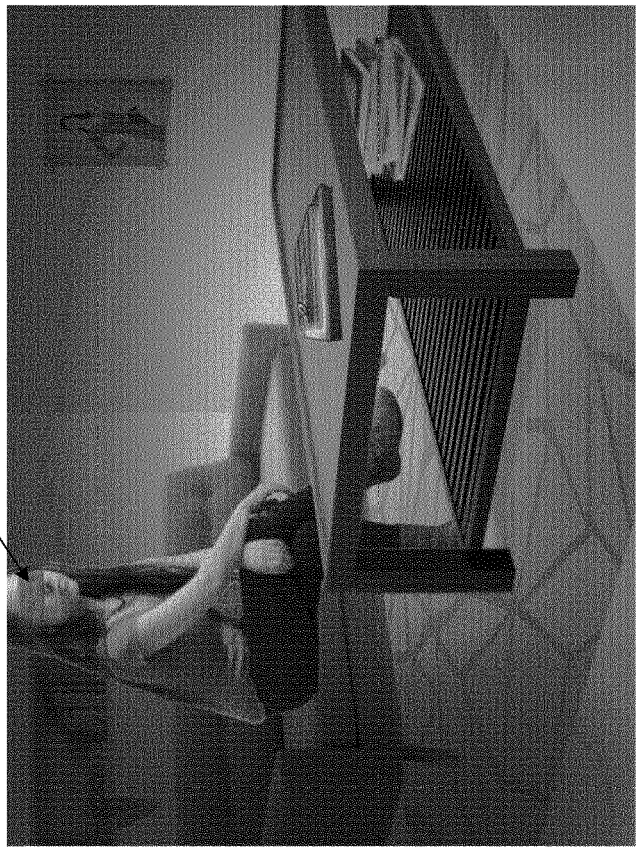
Figure 63C:
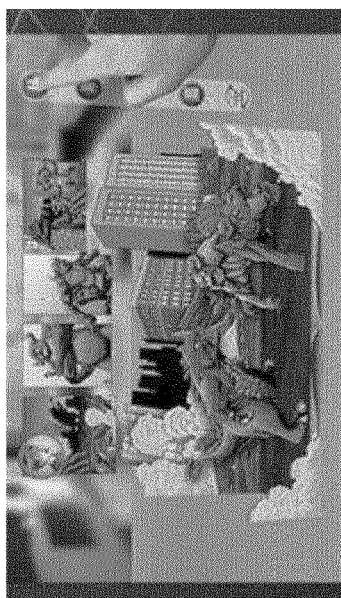
FIGS. 63A-63F and 64A-64C illustrate various aspects of an example augmented reality document examination and/or gaming scenario.
Figure 63B:
Figure 63A:
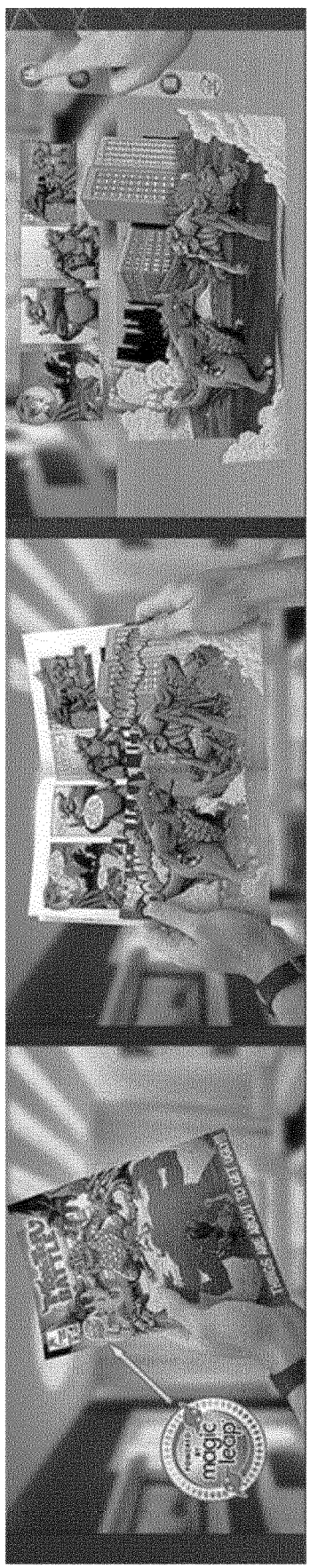
Figure 63F:
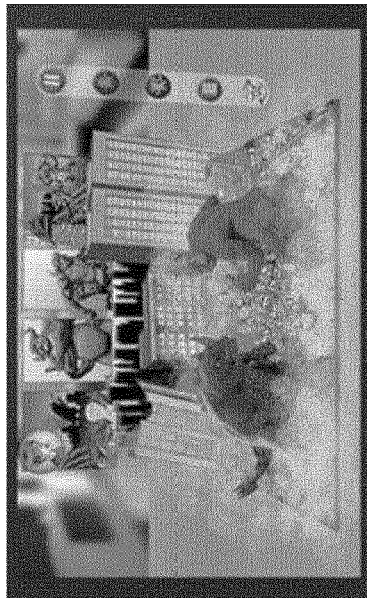
Figure 63E:
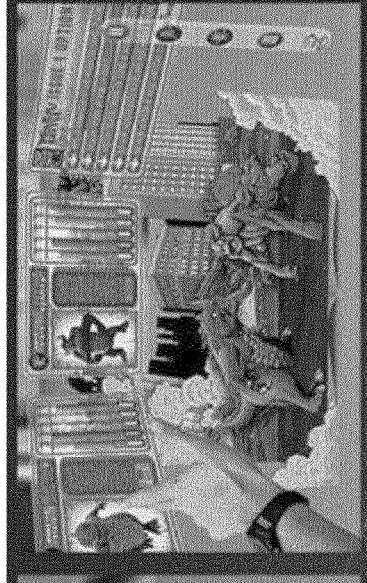
Figure 63D:
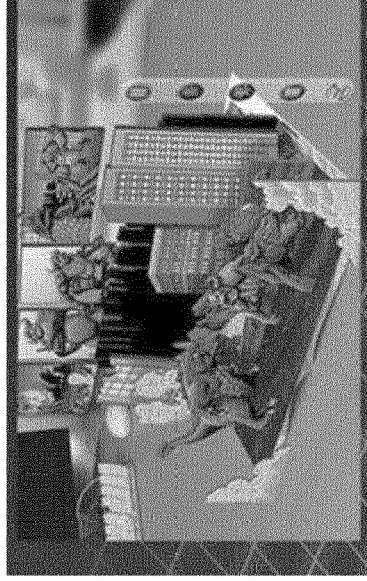
Figure 64C:
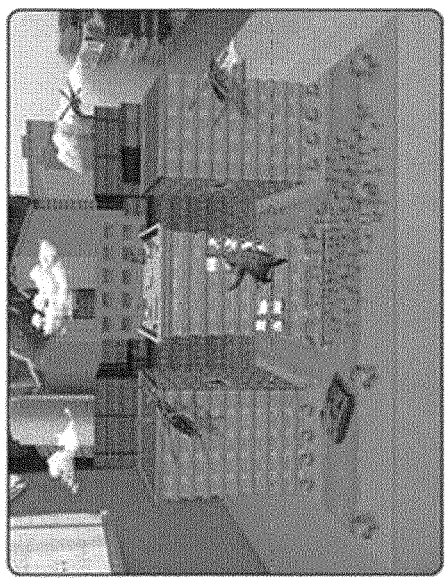
Figure 64B:
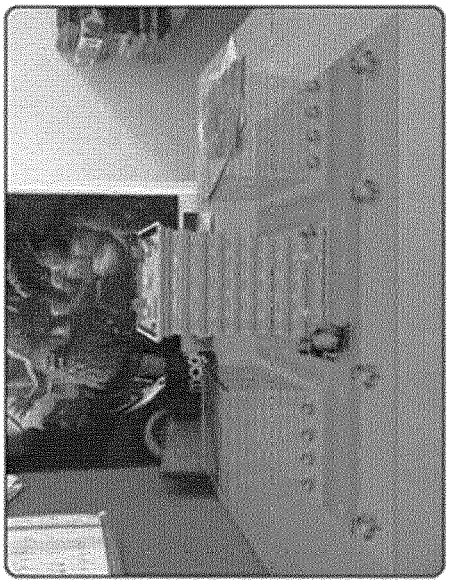
Figure 64A:
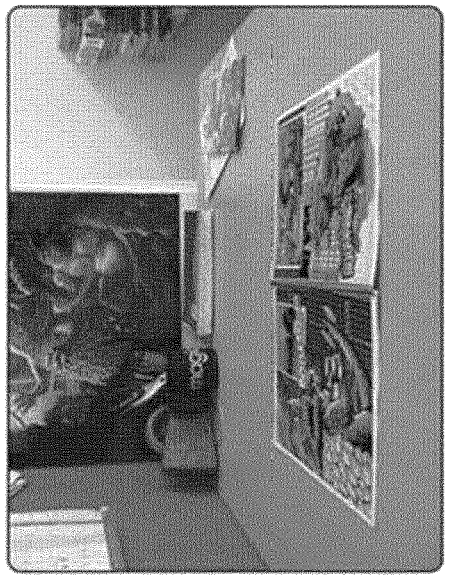
Figure 65A:
FIGS. 65A-66C and 69A-69B illustrate various views of embodiments of the subject system wherein users wearing head mounted components are able to engage in activities.
Figure 65B:
Figure 66A:
Figure 66B:
Figure 66C:
Figure 67A:
Figure 67B:
Figure 68A:
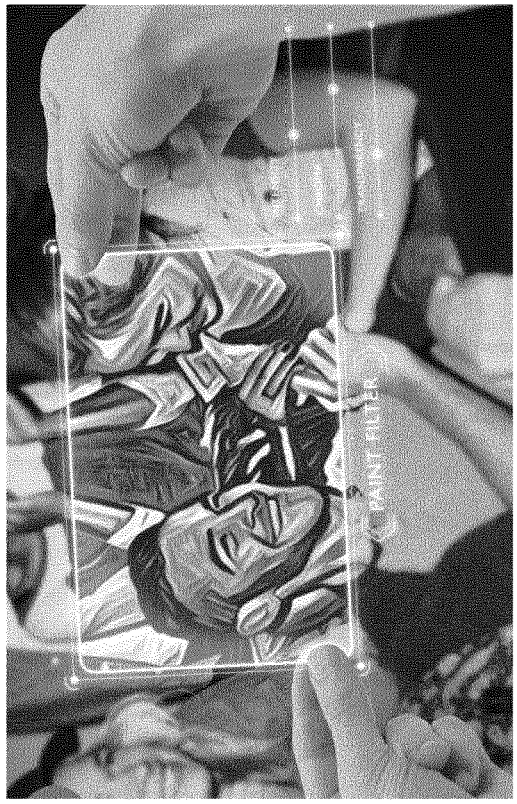
FIGS. 68A-68B illustrate that various filters or overlays may be utilized to customize the presentation of virtual objects or images.
Figure 68B:
Figure 69A:
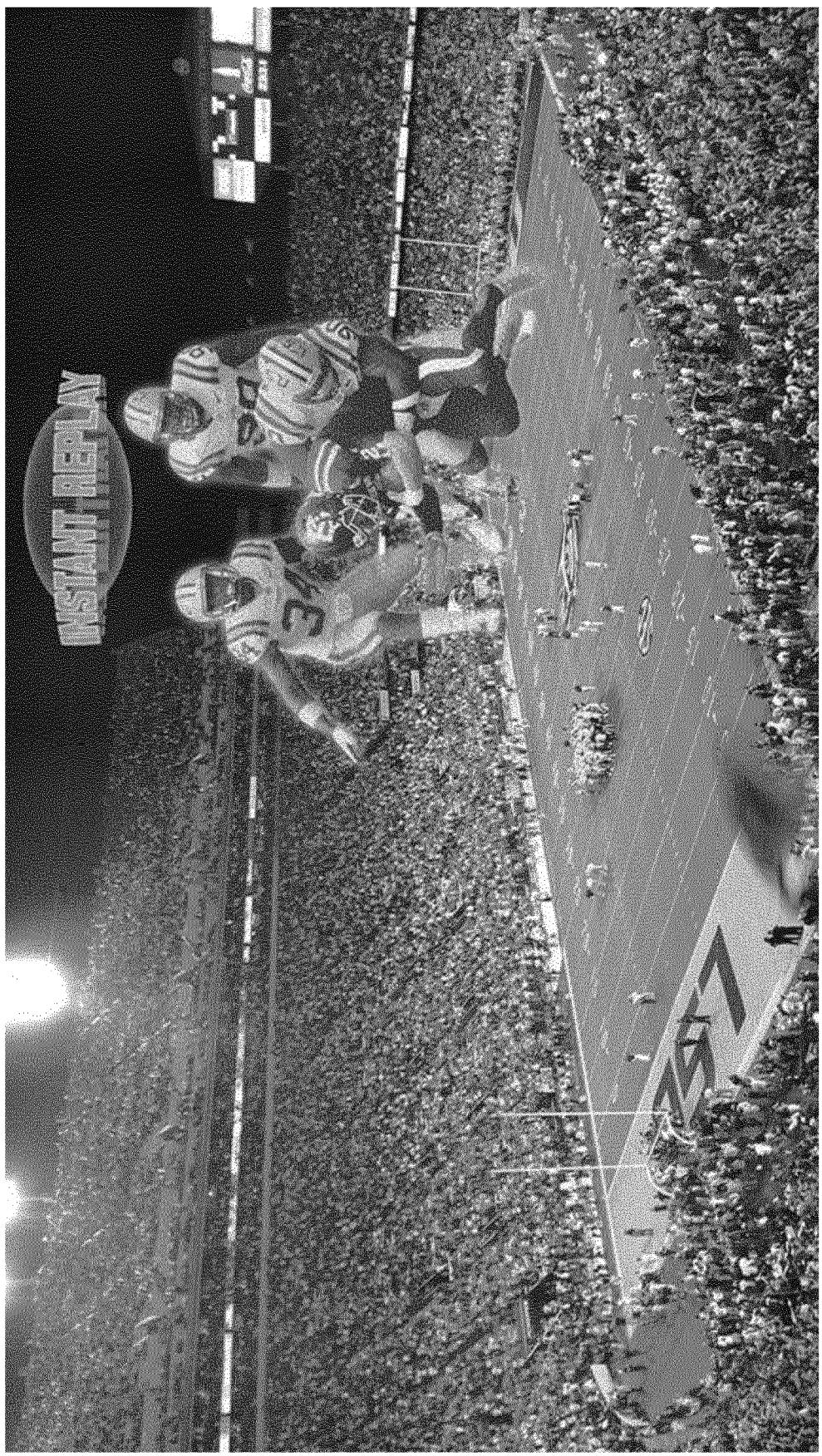
Figure 69B:
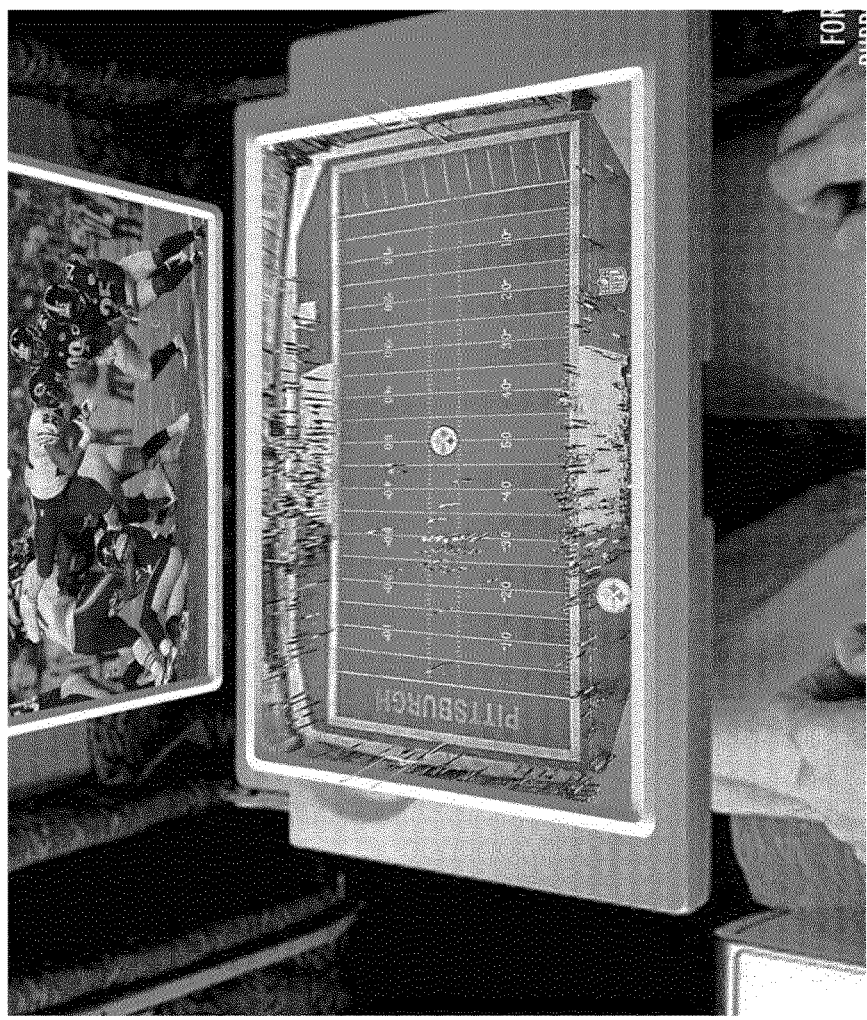
Figure 70A:
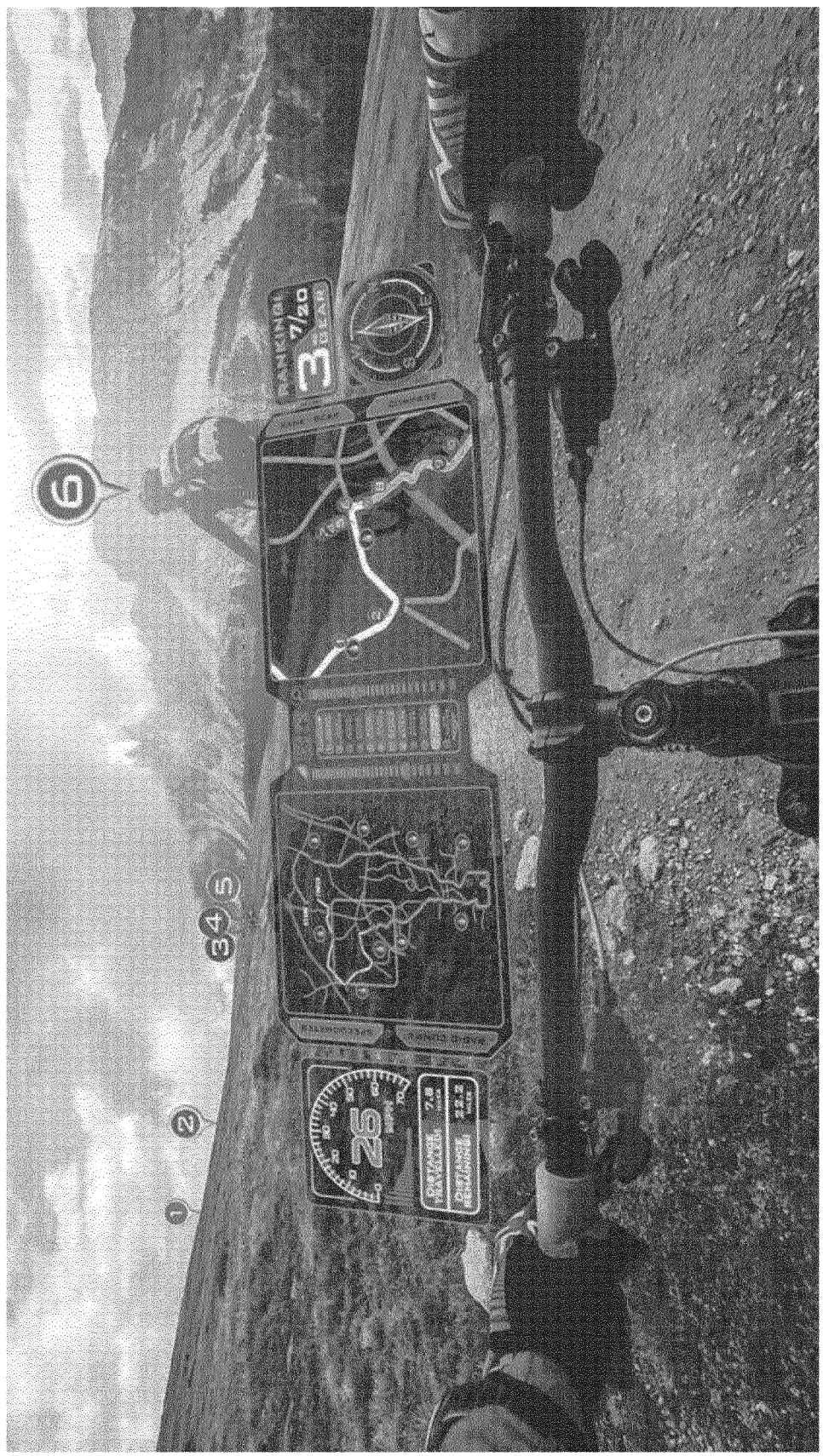
FIGS. 70A-71 illustrate participation in sports.
Figure 70B:
Figure 71:
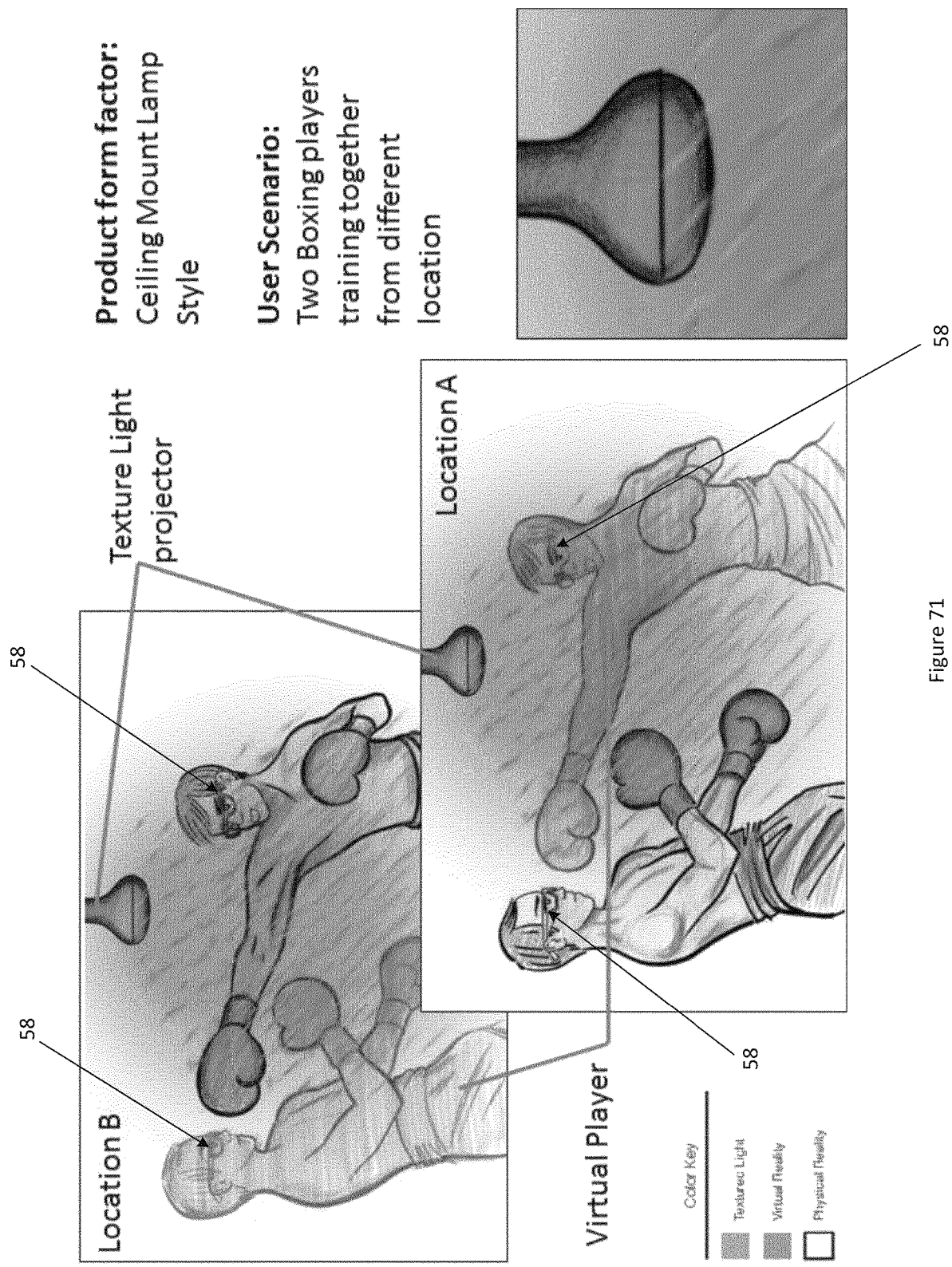
Figure 72B:
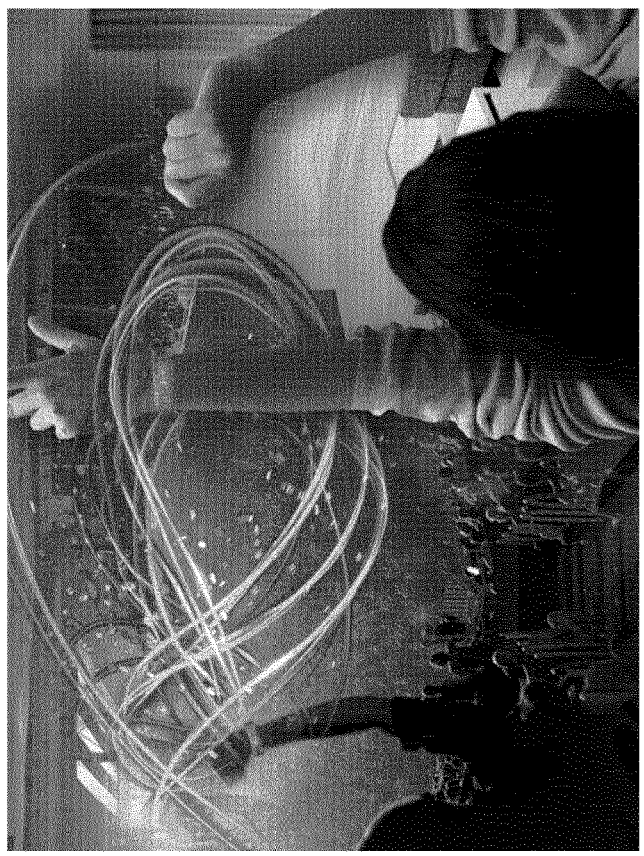
FIGS. 72A-75 illustrate users with head mounted components participating in artistic activities.
Figure 72A:
Figure 73B:
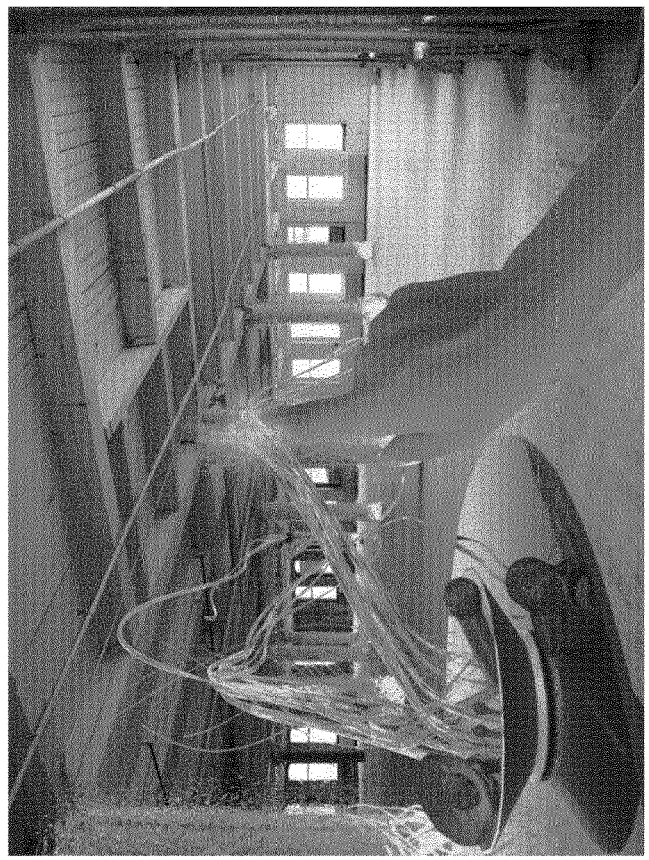
Figure 73A:
Figure 74:
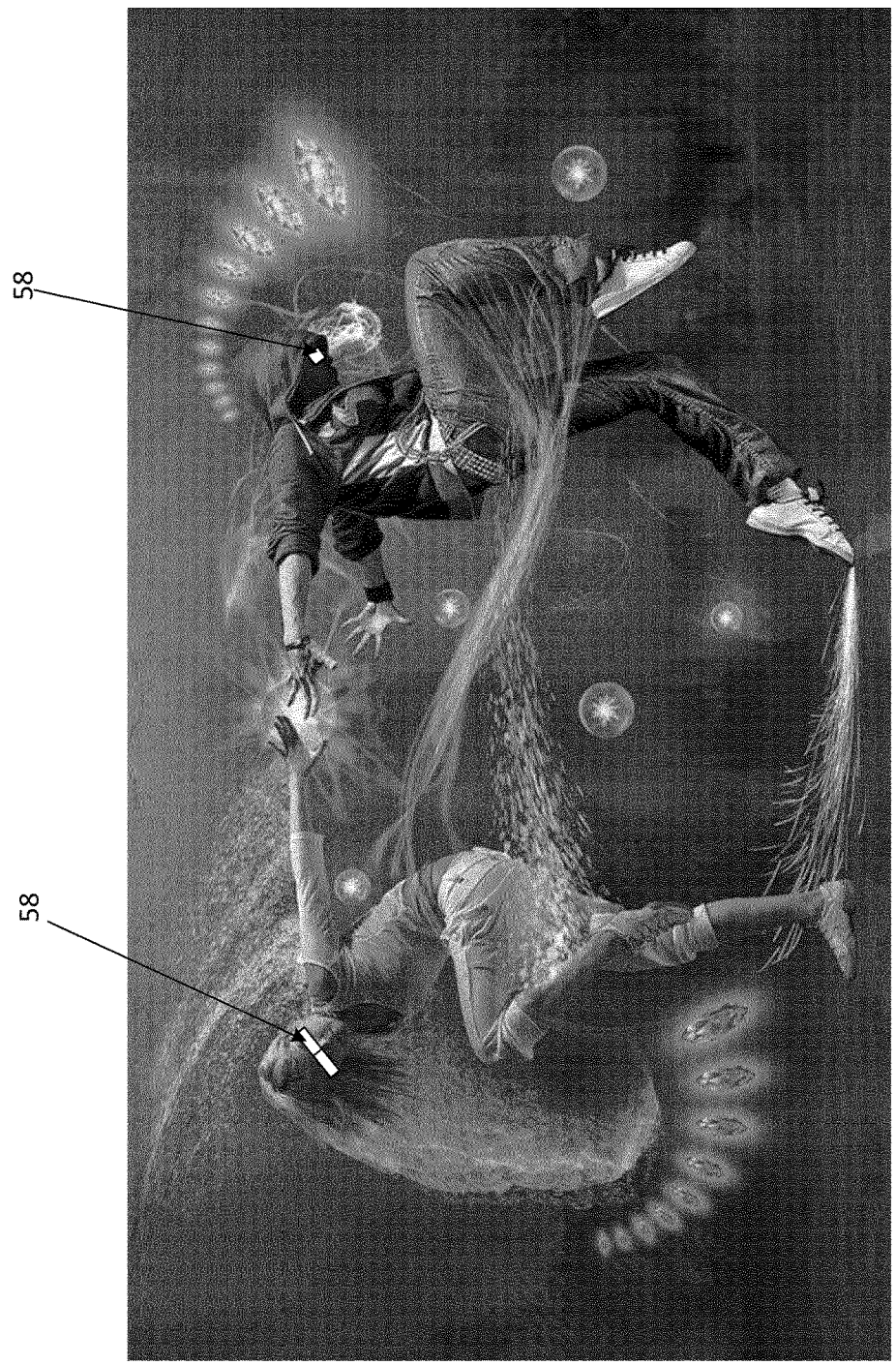
Figure 75:
Figure 76A:
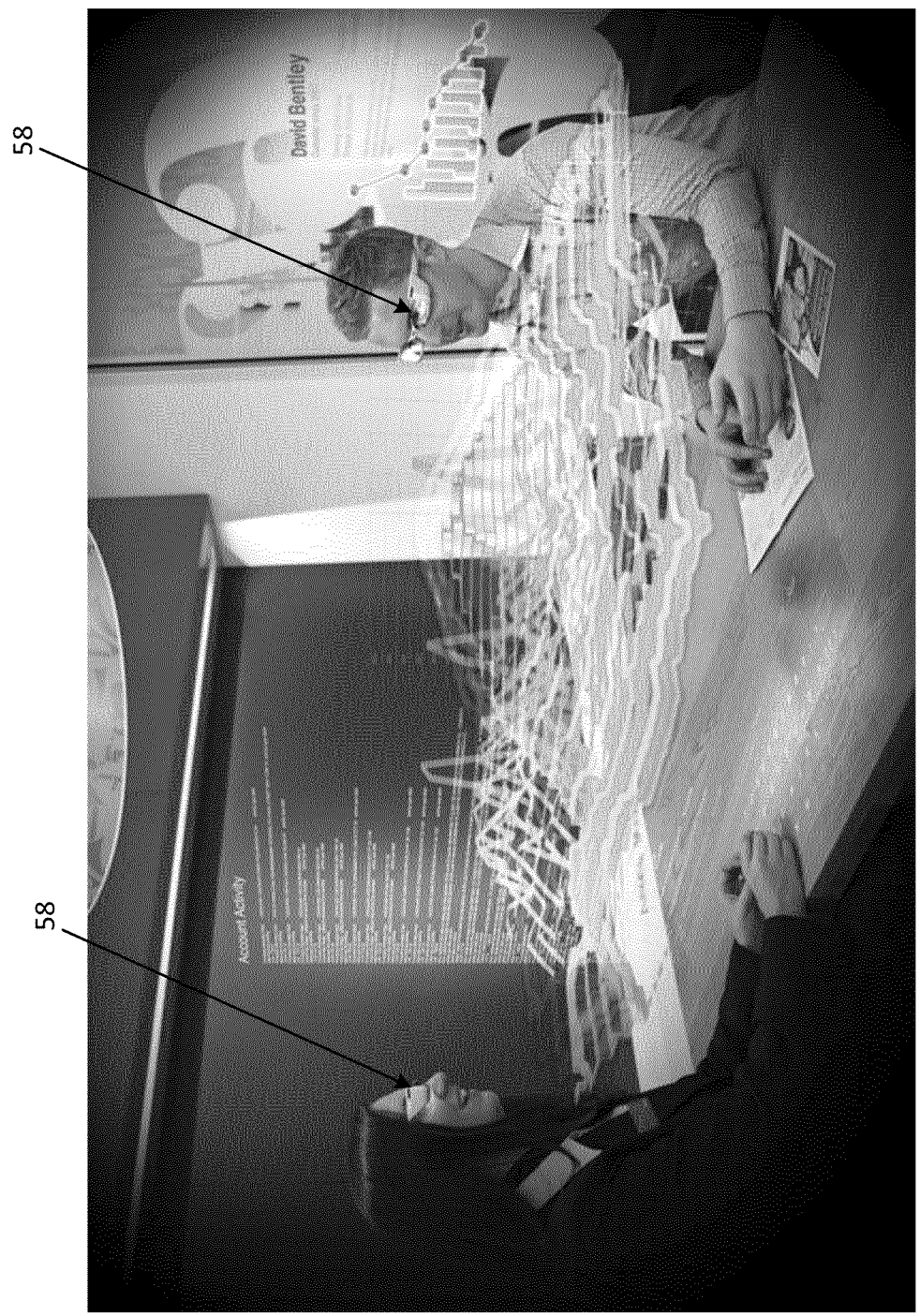
FIGS. 76A-76C and 78A-78C illustrate augmented reality or workers in various work environments.
Figure 76B:
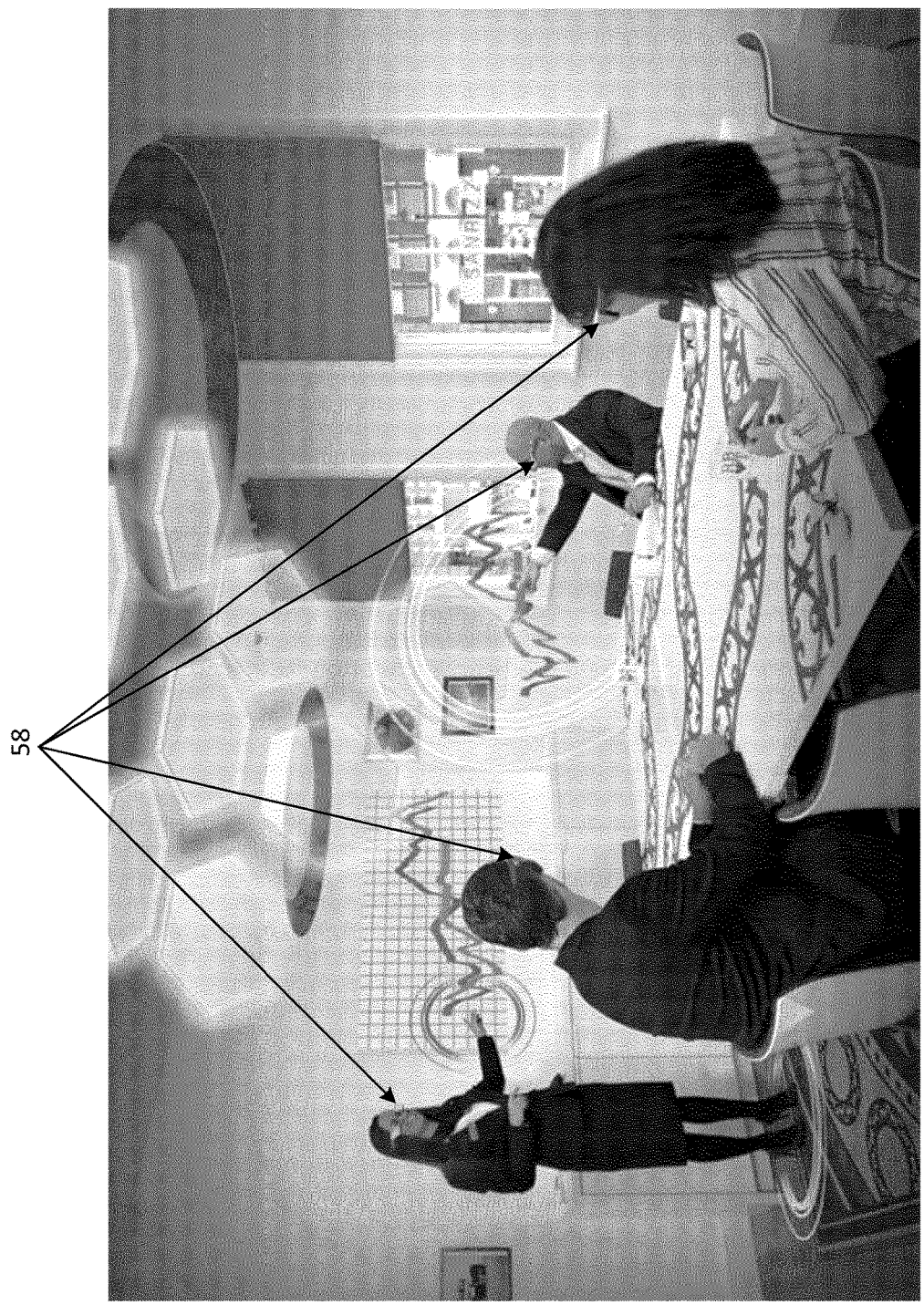
Figure 76C:
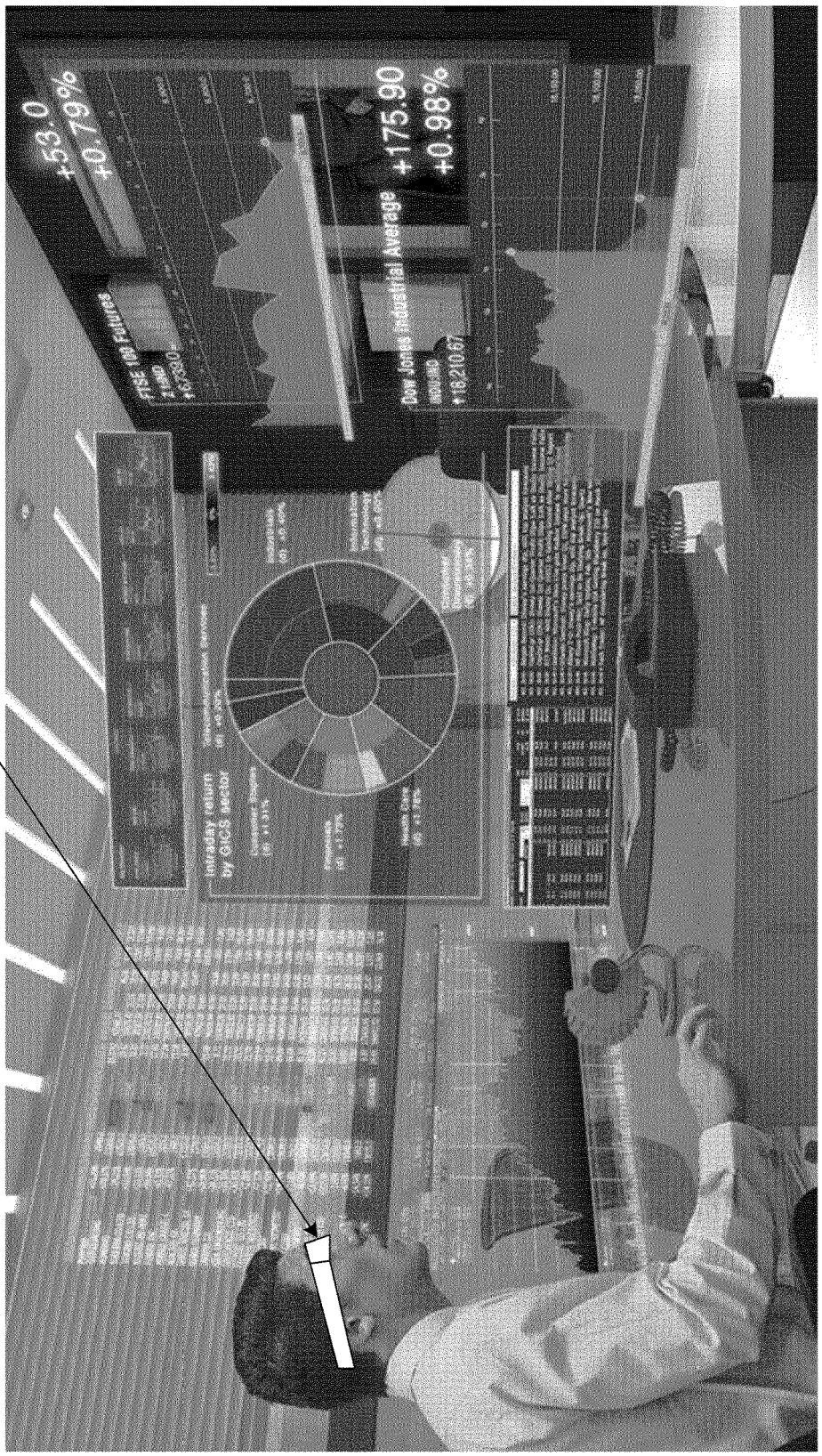

FIGS. 58A-58C illustrate a user scenario wherein a person utilizing a head mounted component (58) (FIG. 8) may read and configure presentation of a book on an airplane through a virtual presentation in two and/or three dimensions (e.g., certain aspects may desirably be presented within a plane, while other features may or may not be presented in the same plane). FIG. 59 illustrates an augmented birthday card configuration wherein upon opening an actual birthday card, a user wearing his or her head mounted component (58) may experience additional virtual presentation. FIGS. 60A-60B and 67A-67B illustrate various aspects of a configuration wherein a user may customize presentation of images within an actual (e.g., it may actually be an empty frame mounted on the wall in reality) picture frame for persons in the vicinity of the frame who are wearing head mounted components (58). FIGS. 68A-68B illustrate that various filters or overlays may be utilized to customize the presentation of virtual objects or images. FIGS. 61A-62B illustrate various aspects of tabletop or desktop presentation of augmented reality to users wearing head mounted components (58) who may be reading a book, examining a tabletop item, etc. FIGS. 63A-63F and 64A-64C illustrate various aspects of an example augmented reality document examination and/or gaming scenario featuring three dimensional virtual presentation of objects to a user. FIGS. 65A-66C and 69A-69B illustrate various views of embodiments of the subject system wherein users wearing head mounted components (58) are able to engage with music, television, movies, sports viewing, and other activities in highly enhanced ways from their environments. FIGS. 70A-71 illustrate that embodiments of the subject technology may be utilized to assist with and enhance the participation in sports, such as mountain biking, tennis, or boxing (FIG. 71 illustrates an embodiment featuring texture projection to monitor the dynamics/movement of each player in their environment, location A and location B). FIGS. 72A-75 illustrate that users with head mounted components (58) may participate in artistic activities using virtual components, such as art observation and creation functionality features. Such users may also experience the creations of others, such as in museums, rock concerts (FIGS. 72A-72B), and other presentations live or virtual, using the enhanced presentation through their head mounted components (58).

Figure 77:
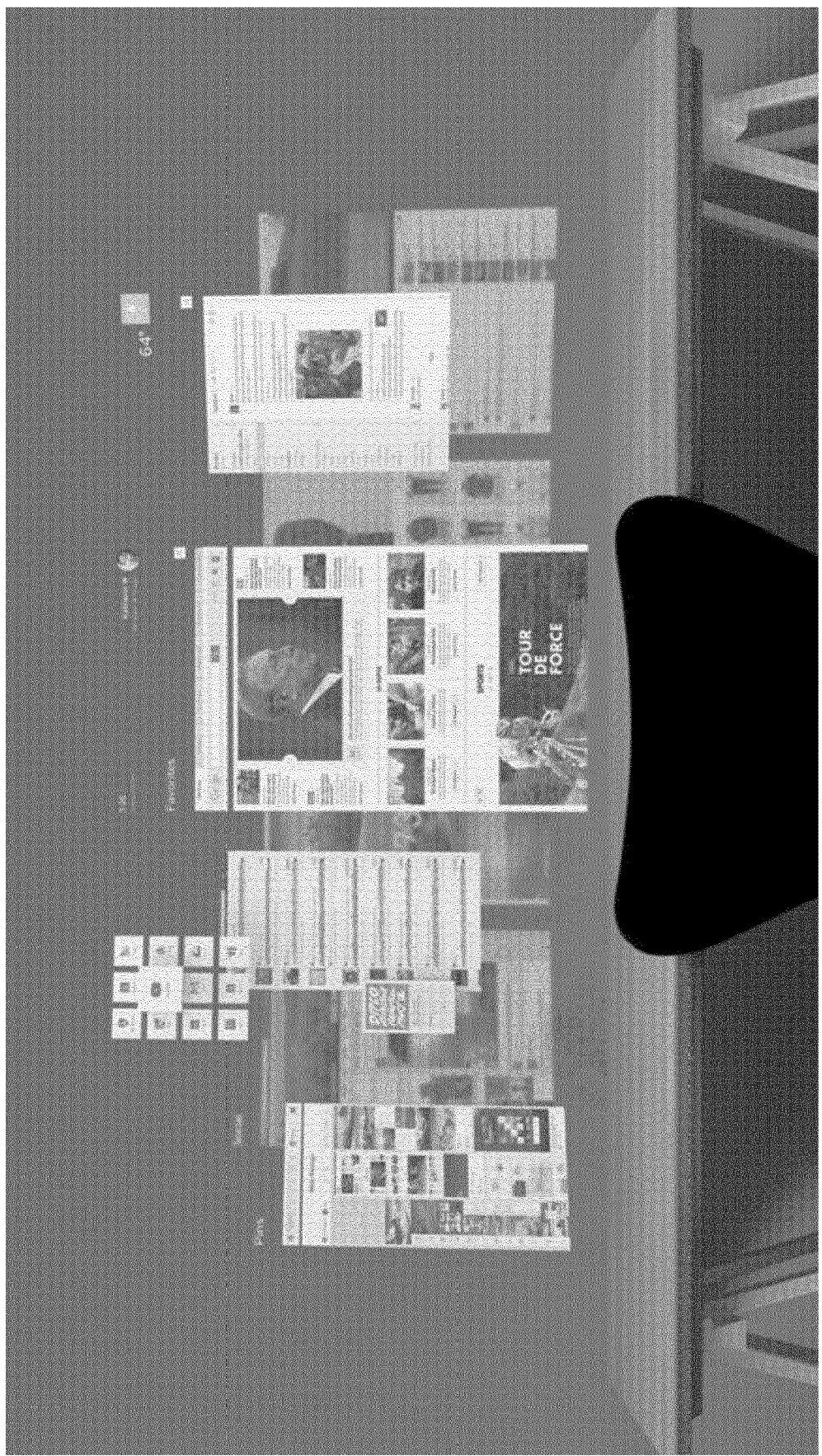
FIG. 77 illustrates an augmented view of one embodiment of a particular user's computing desktop.
Figure 78A:
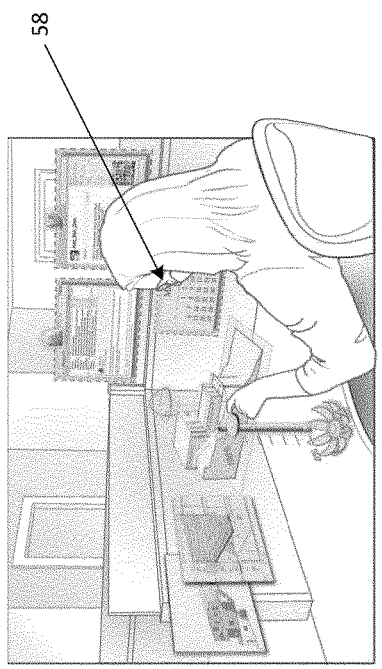
Figure 78B:
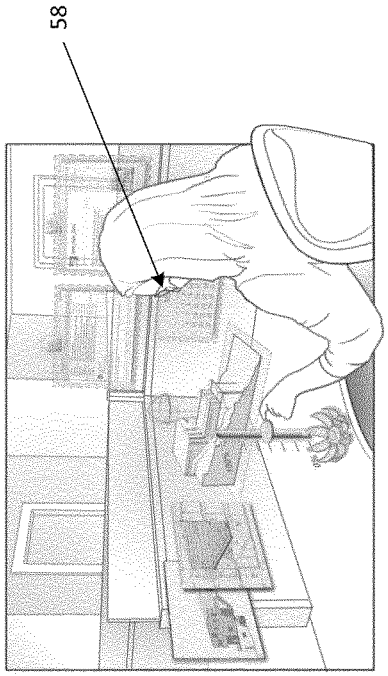
Figure 78C:
Figure 79B:
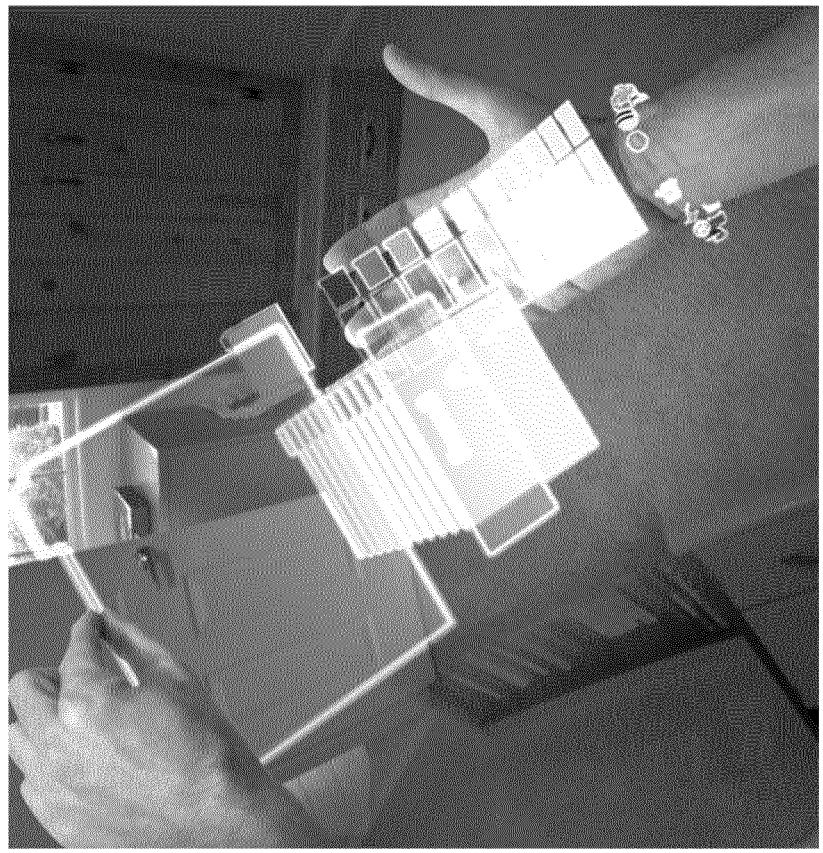
FIGS. 79A-79B illustrate one embodiment of a file manipulation configuration.
Figure 79A:
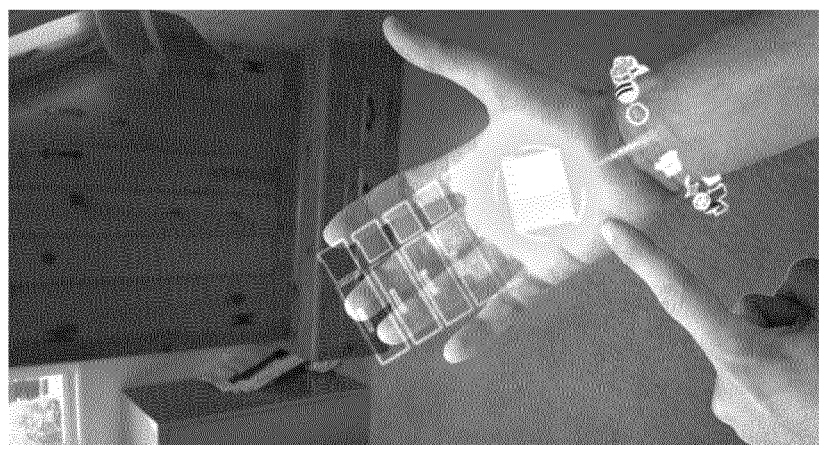
Figure 80:
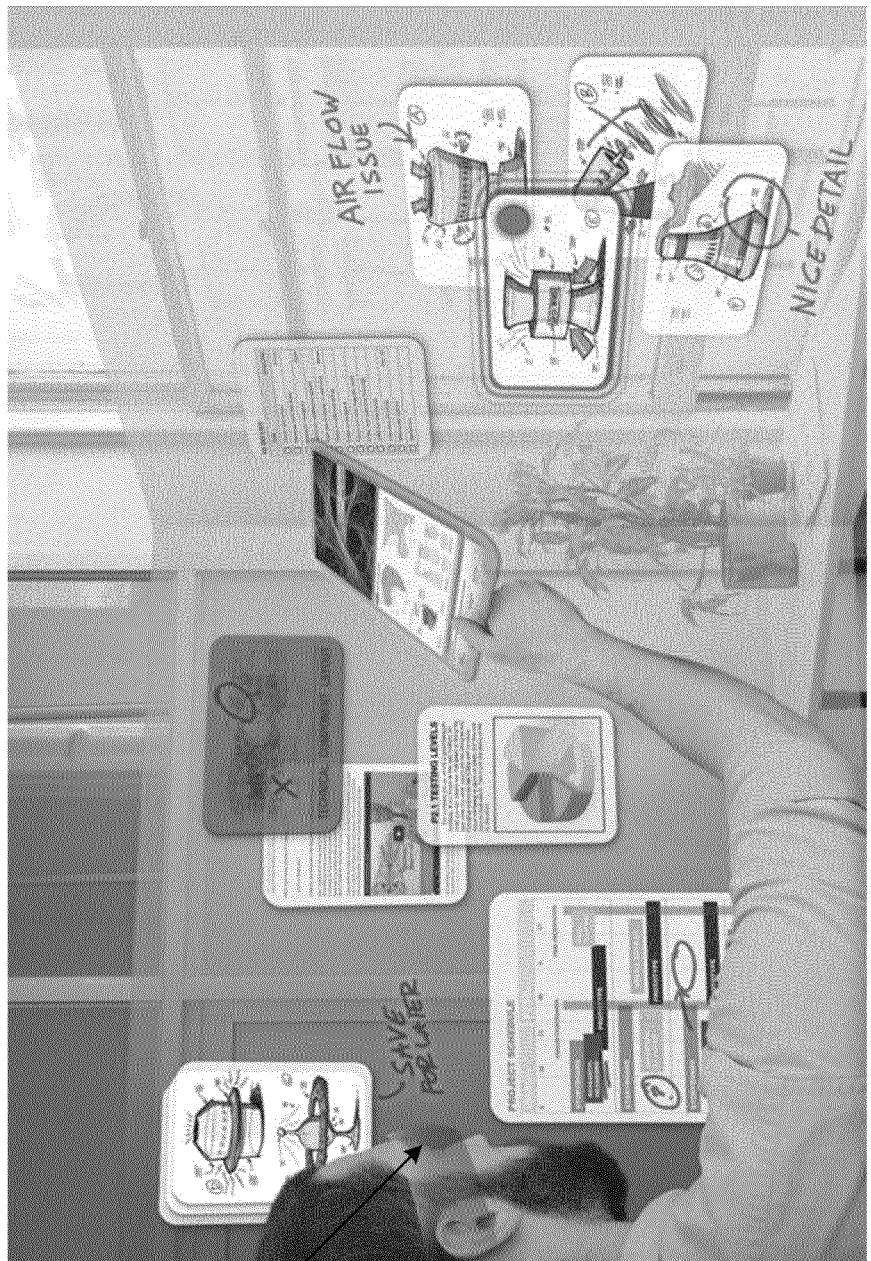
FIG. 80 illustrates one embodiment of an augmented reality whiteboard configuration which may be shared.
Figure 81:
FIG. 81 illustrates virtual objects augmenting an example tablet computer.
Figure 82:
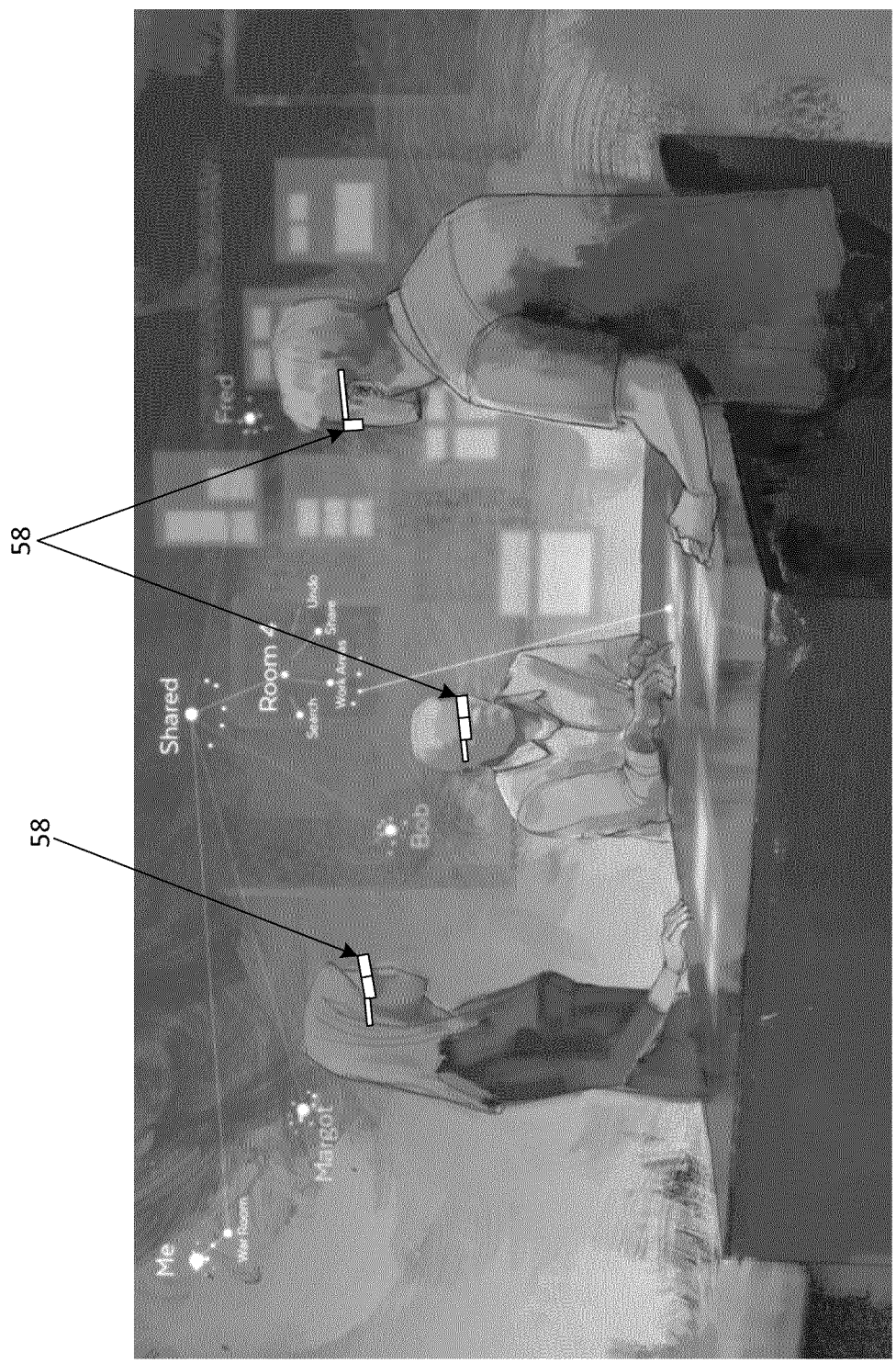
FIG. 82 illustrates collaborators visualizing certain aspects of a challenge virtually through their head mounted components.
Figure 83A:
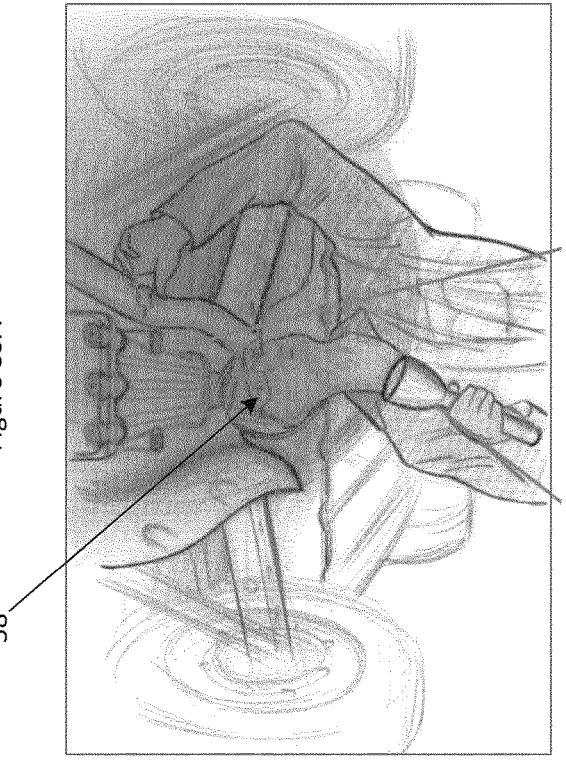
FIGS. 83A-84B illustrate further embodiments of augmented reality configurations for the workplace.
Figure 83B:
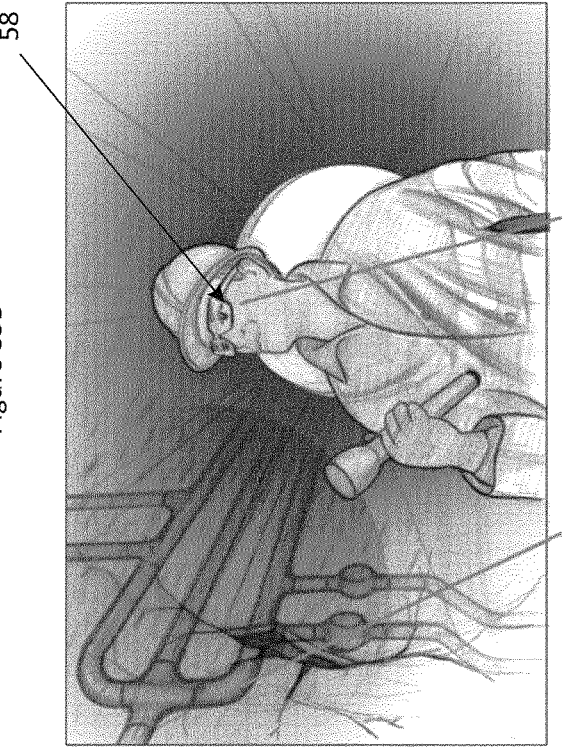
Figure 83C:
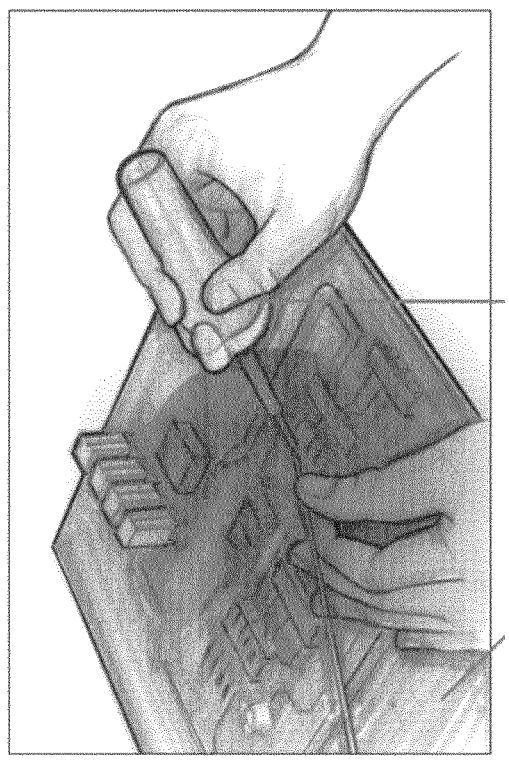
Figure 83D:
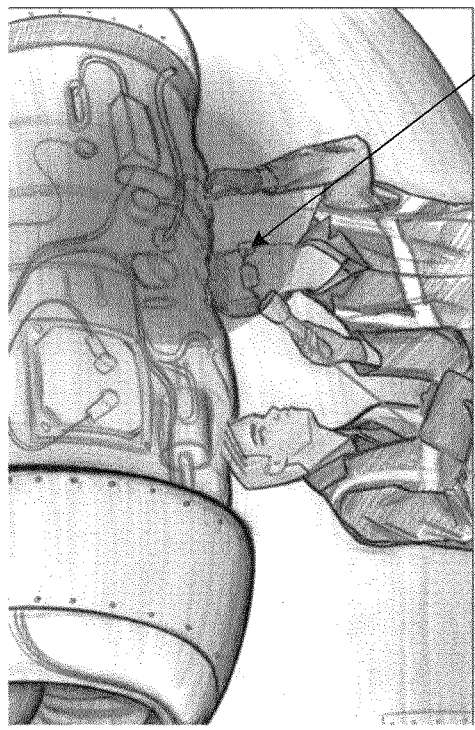
Figure 84A:
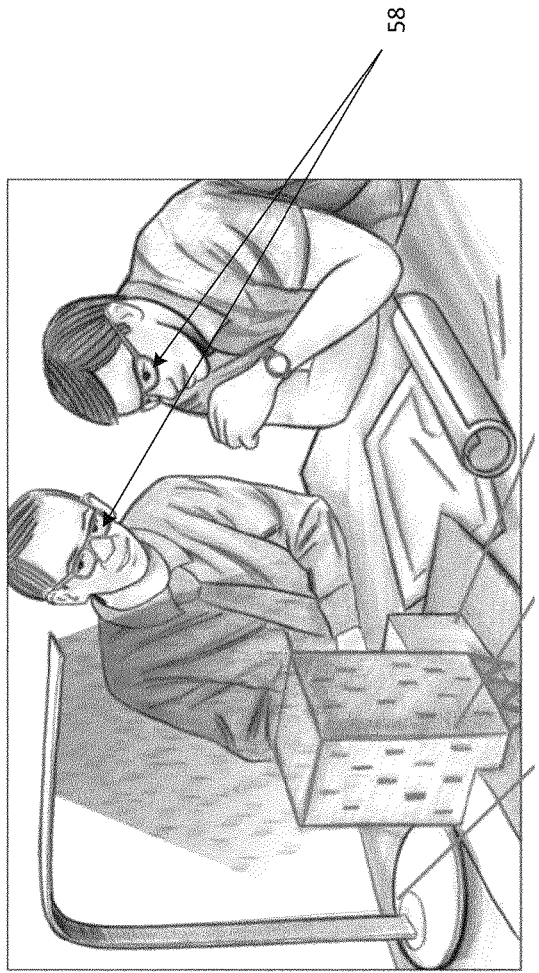
Figure 84B:
Figure 85C:
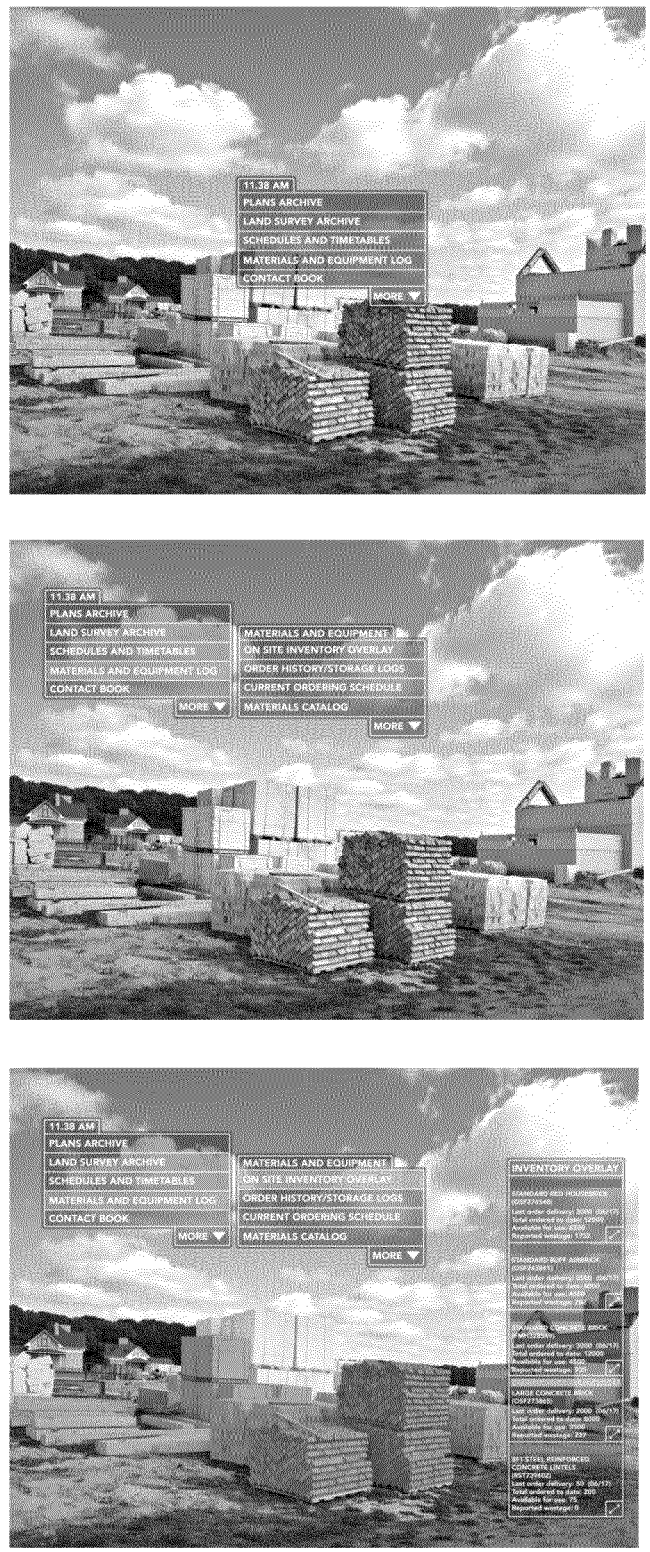

Referring to FIGS. 76A-76C and 78A-78C, virtual presentation with an augmented reality system for users with head mounted components (58) (FIG. 8) may be very helpful for workers in various work environments who are examining data of various types, objects, images, etc—whether such presentation is planar and/or nonplanar. FIG. 77 illustrates an augmented view of one embodiment of a particular user's computing desktop. FIGS. 79A-79B illustrate one embodiment of a file manipulation configuration; FIG. 80 illustrates one embodiment of an augmented reality whiteboard configuration which may be shared. Referring to FIG. 81, certain two or three dimensional virtual objects may be augmented to presentation of information through a conventional means, such as through the display of a tablet computer. FIG. 82 illustrates collaborators visualizing certain aspects of a challenge virtually through their head mounted components (58) from the same room. FIGS. 83A-84B illustrate further embodiments of augmented reality configurations for the workplace to enhance visualization and problem solving through the user of head mounted components (58) and connected computing resources. FIGS. 85A-85D illustrate various embodiments of displaying virtual content overlaid upon a real world setting through a head mounted component (58) (FIG. 8). As depicted in FIG. 85A, a user may view a construction site in progress, recall a virtual interface locally (such as from remote data repository (74) of FIG. 2A) or from external sources through network (110) as depicted in FIG. 3. Interaction with the virtual interface permits subsequent overlays and visual depictions of information based on virtual interface selections. As depicted in FIG. 85A, a selection of a 3D Model View from the virtual interface overlays an outline of the intended finished product of the construction project onto the site in progress.

Similarly, in FIG. 85B, a virtual interface permits various overlay options onto the real world scene as viewed by a user through the head mounted component (58). Further illustrated in FIG. 85B is ancillary information, such as a materials list based on depicted overlaid structures.

Similarly, in FIG. 85C, object recognizers coupled to the head mounted component (58) may receive images captured from the head mounted component (58), such as from cameras (124), and identify materials within the captured image and prompt virtual interface options based on the detected objects.

In yet another embodiment, FIG. 85D illustrates a work in progress with physical dimensions overlaid on the real world scene. For example, a depth sensor array, such as those described above with reference to FIGS. 15 and 16 may determine measurements of the viewed space, and processors coupled to the head mounted component (58) determine geometries of components to be built into the space based on the intended design. For example, the system may calculate the dimensions for a countertop to fit in the space based on the measurements of the depth sensor, or access a database through network (110) to suggest appliances conforming to measured geometries.

Figure 86A:
FIG. 86A illustrates an example security checkpoint engagement.
Figure 86B:
FIG. 86B illustrates an enhanced security checkpoint engagement.
Figure 86C:
FIGS. 86C-86I illustrate various aspects of augmented reality shopping configurations.
Figure 86D:
Figure 86E:
Figure 86F:
Figure 86G:
Figure 86H:
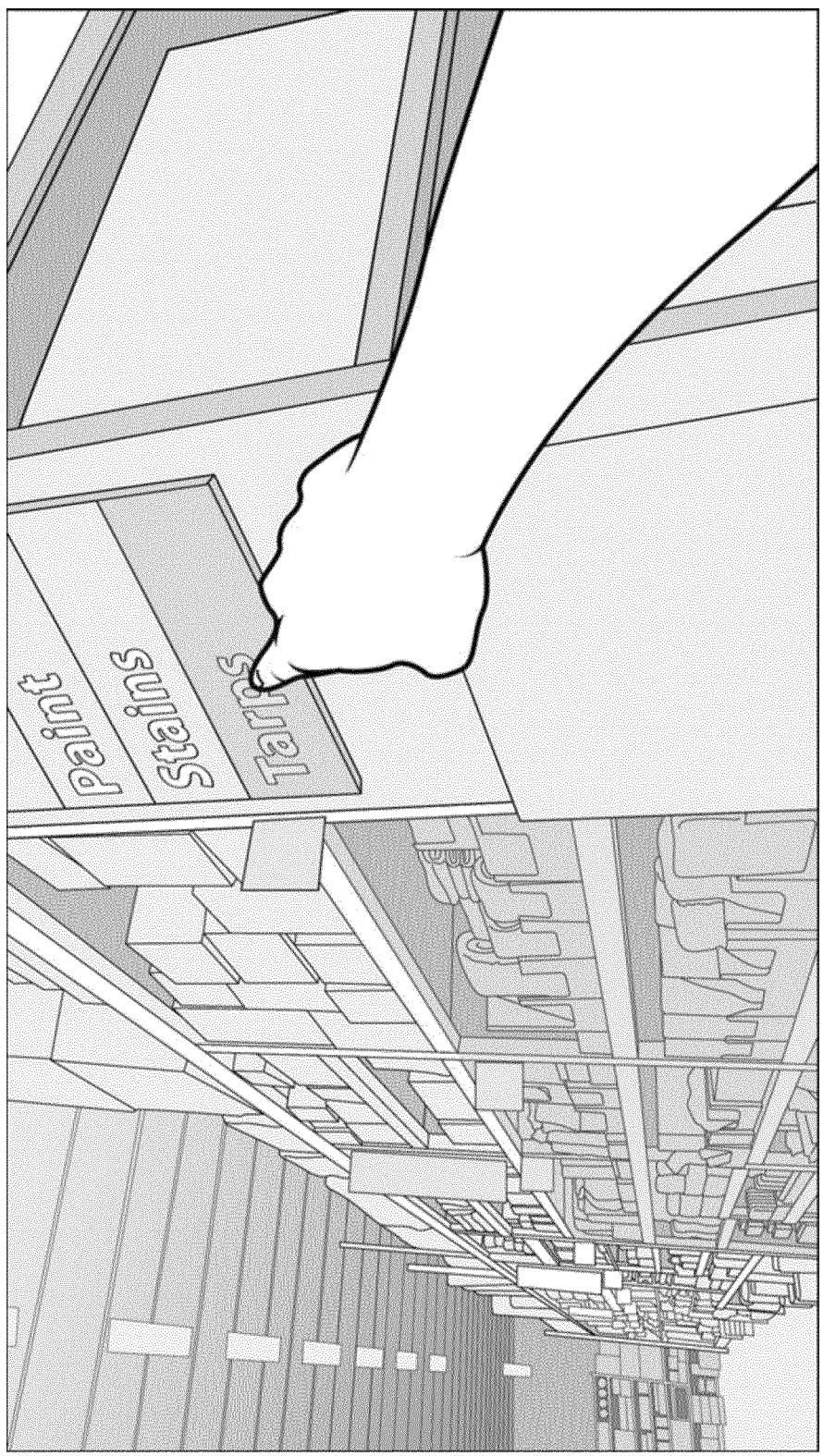
Figure 86I:
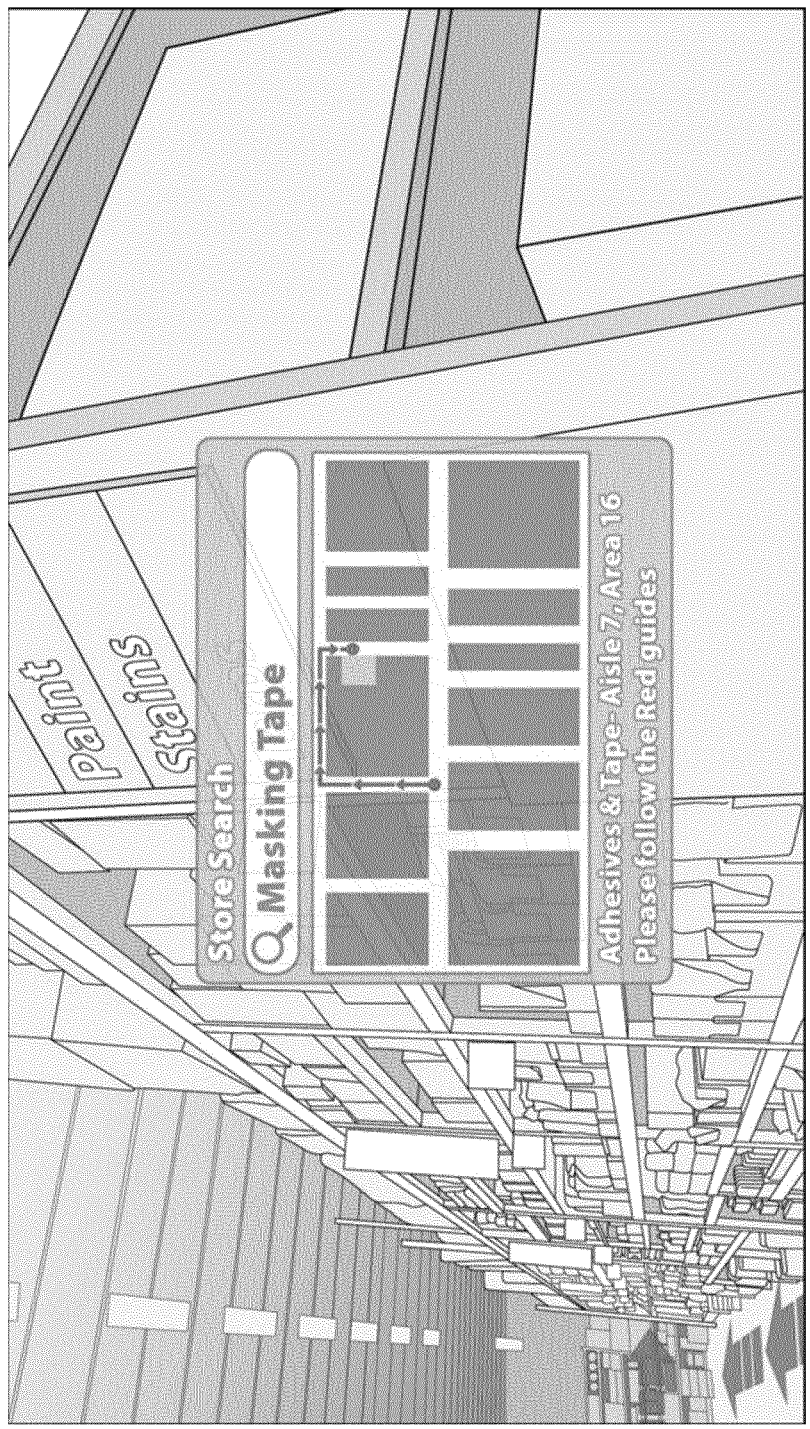

FIG. 86A illustrates a conventional security checkpoint engagement, while FIG. 86B illustrates that a user may gain significant advantage through the user of augmented reality display of connected information using a head mounted component (58).

Figure 87B:
FIGS. 87A-87B illustrate a subject system being utilized to visualize the interior of buildings.
Figure 87A:
Figure 88A:
FIGS. 88A-88J illustrate further embodiments of shopping related configurations.
Figure 88B:
Figure 88C:
Figure 88D:
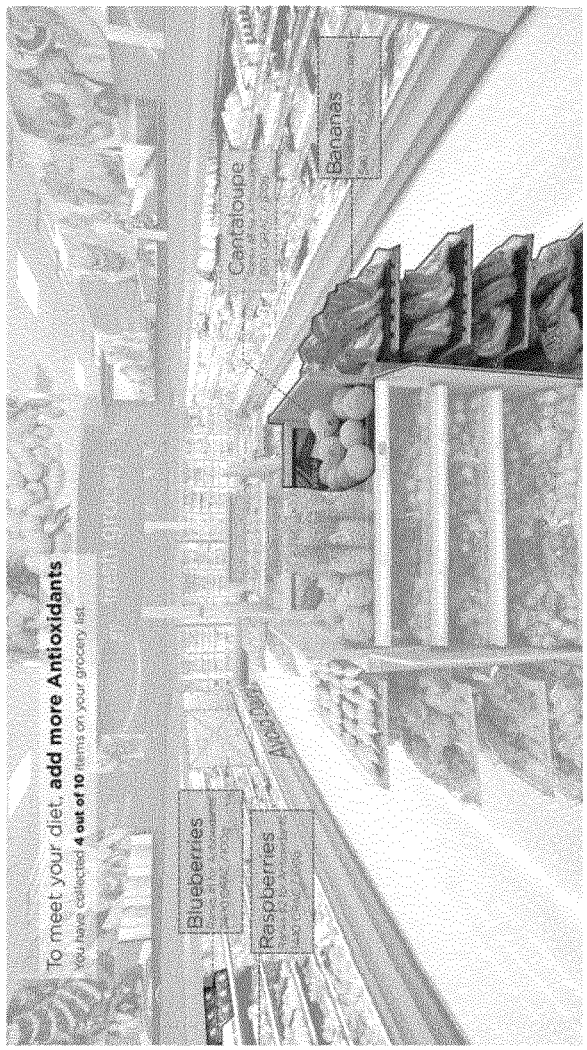
Figure 88E:
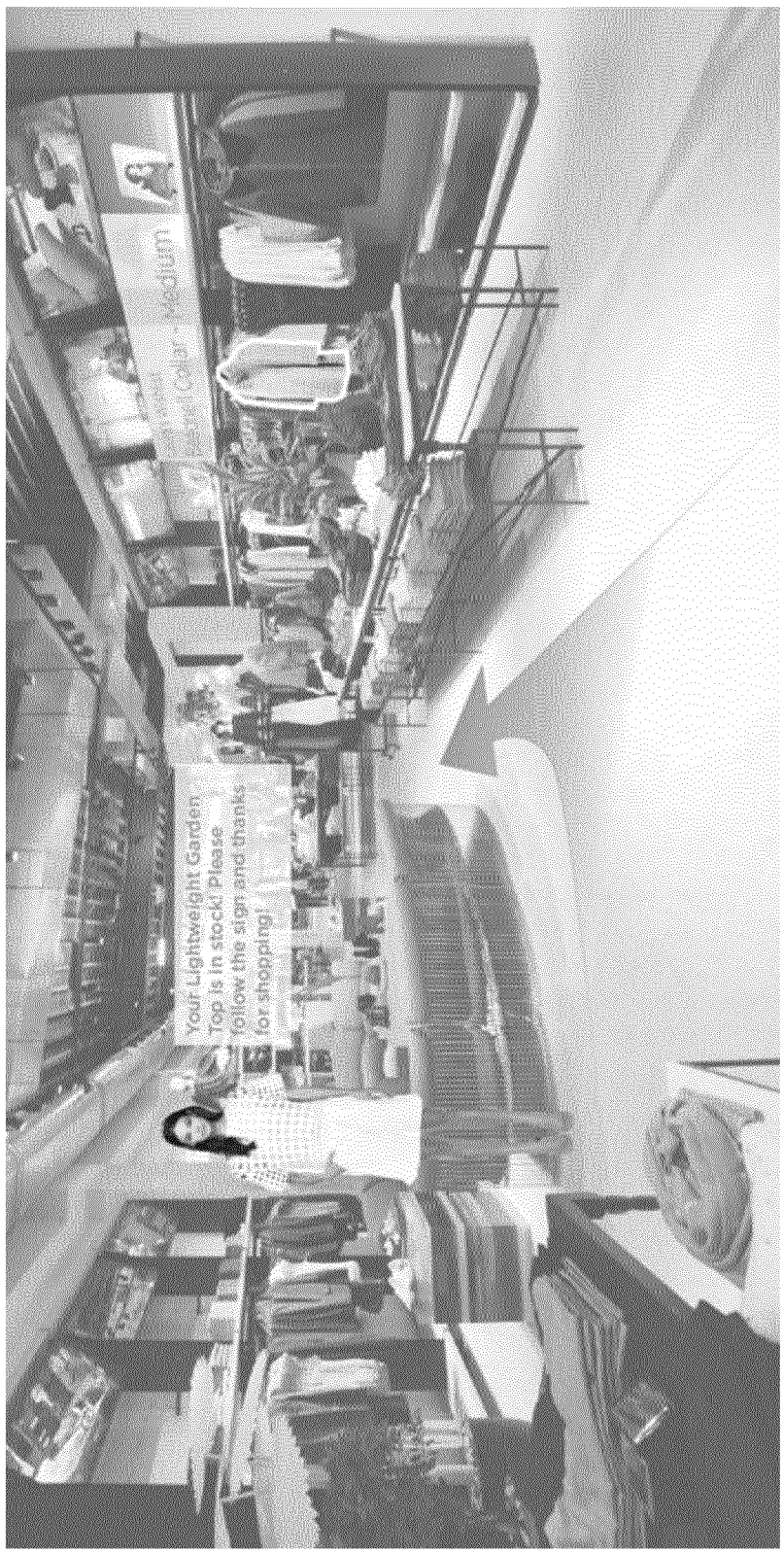
Figure 88F:
Figure 88G:
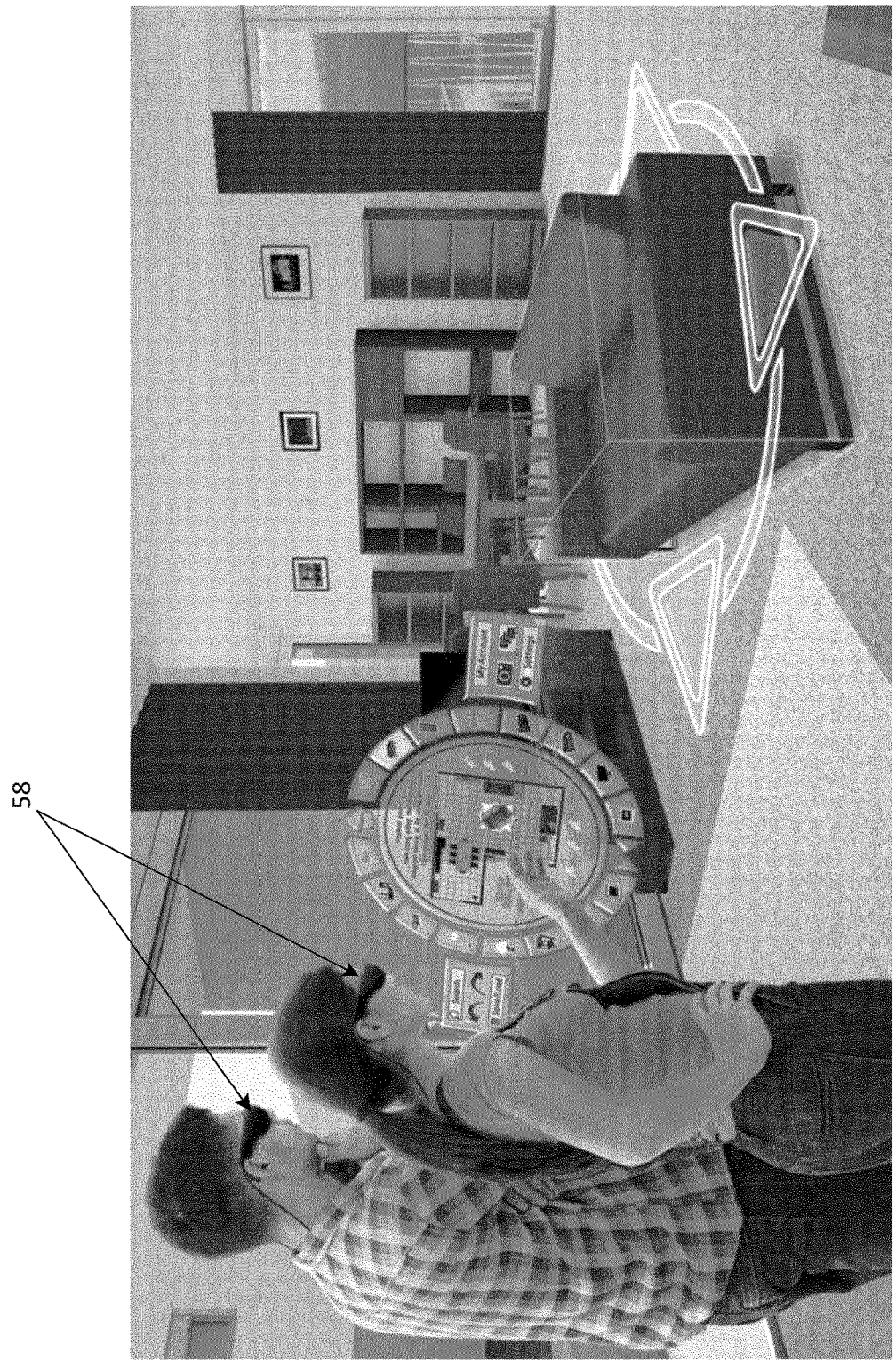
Figure 88H:
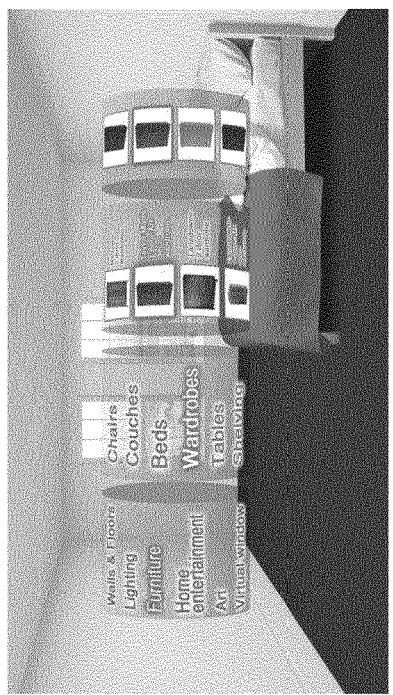
Figure 88I:
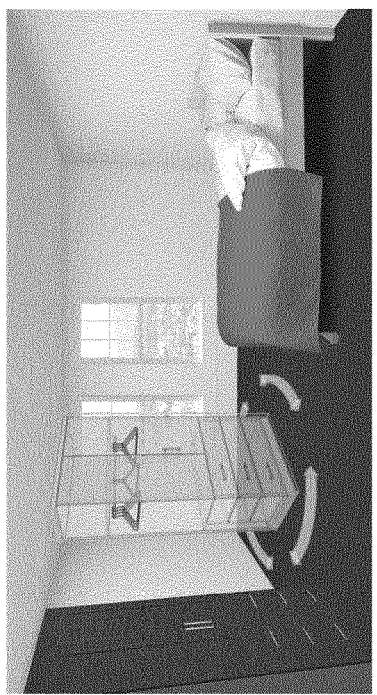
Figure 88J:
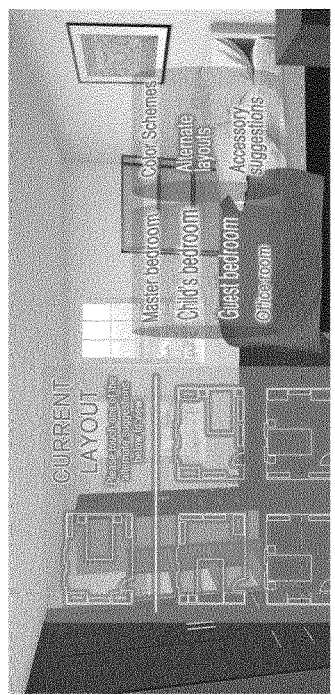

FIGS. 86C-86I illustrate various aspects of augmented reality shopping configurations. Referring to FIGS. 87A-

87B, in one embodiment, a subject system may be utilized to visualize the interior of buildings that may be of interest to a buyer, for example. FIGS. 88A-88J illustrate further embodiments of shopping related configurations wherein users wearing head mounted components (58) may visualize key virtually-presented information to navigate various aspects of their daily life and associated tasks.

Figure 89A:
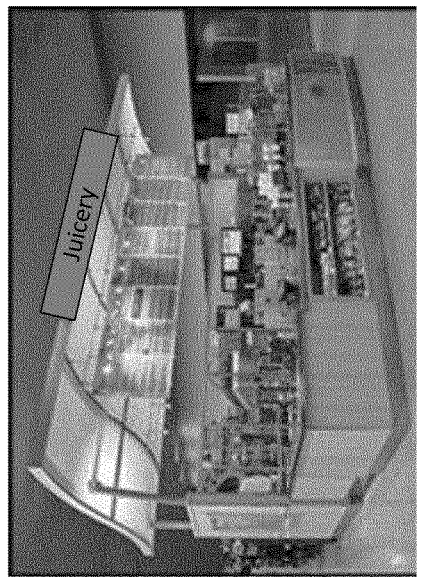
FIGS. 89A-89B illustrate a subject augmented reality system being utilized to customize the presentation of a particular object or objects for a given user.
Figure 89B:
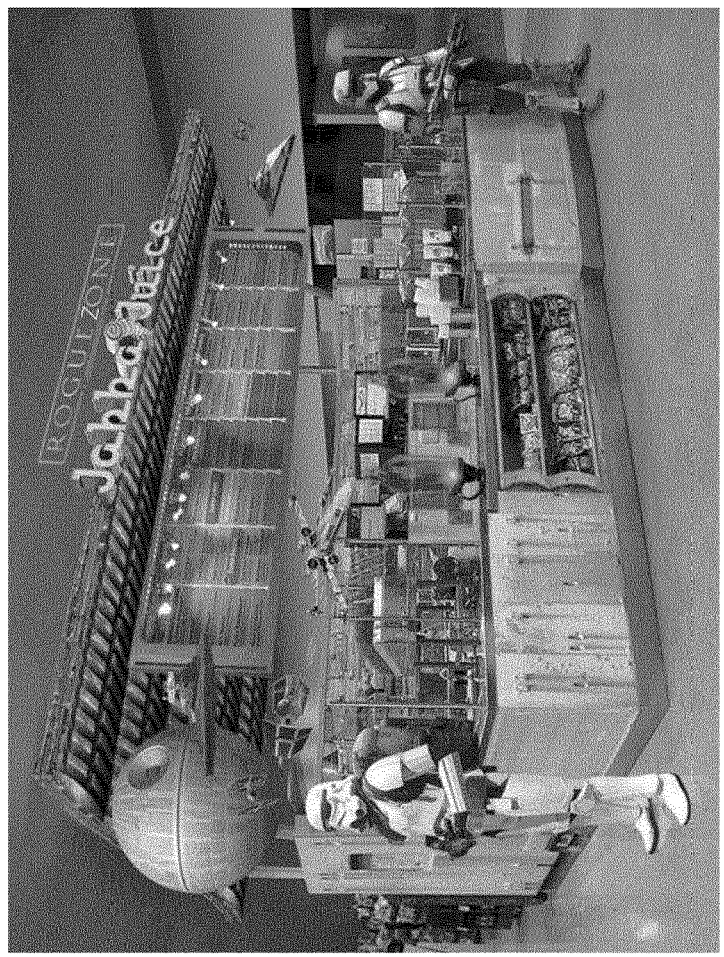
Figure 90A:
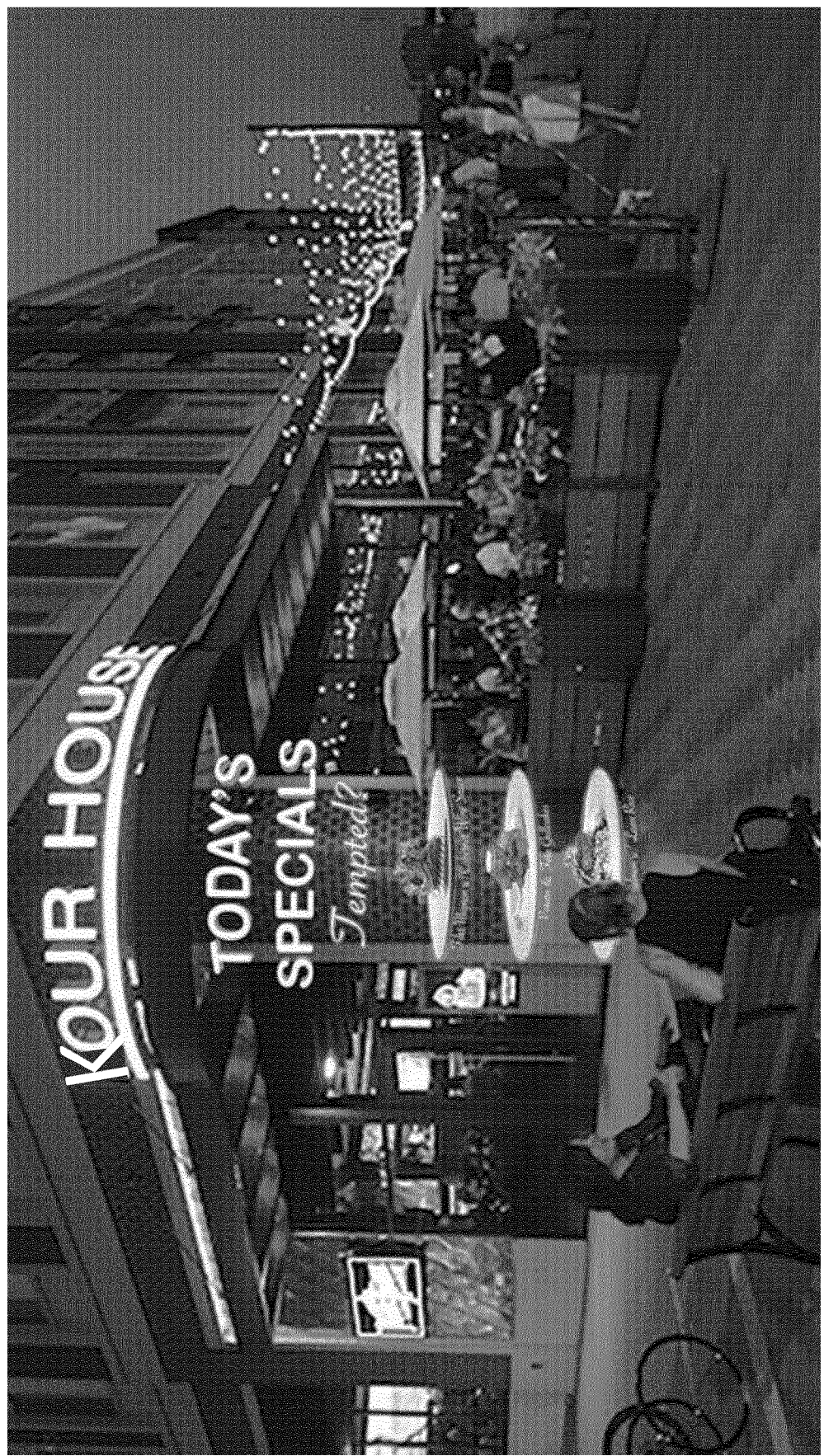
FIGS. 90A-90B illustrate augmented reality presentation being utilized in a restaurant environment.
Figure 90B:
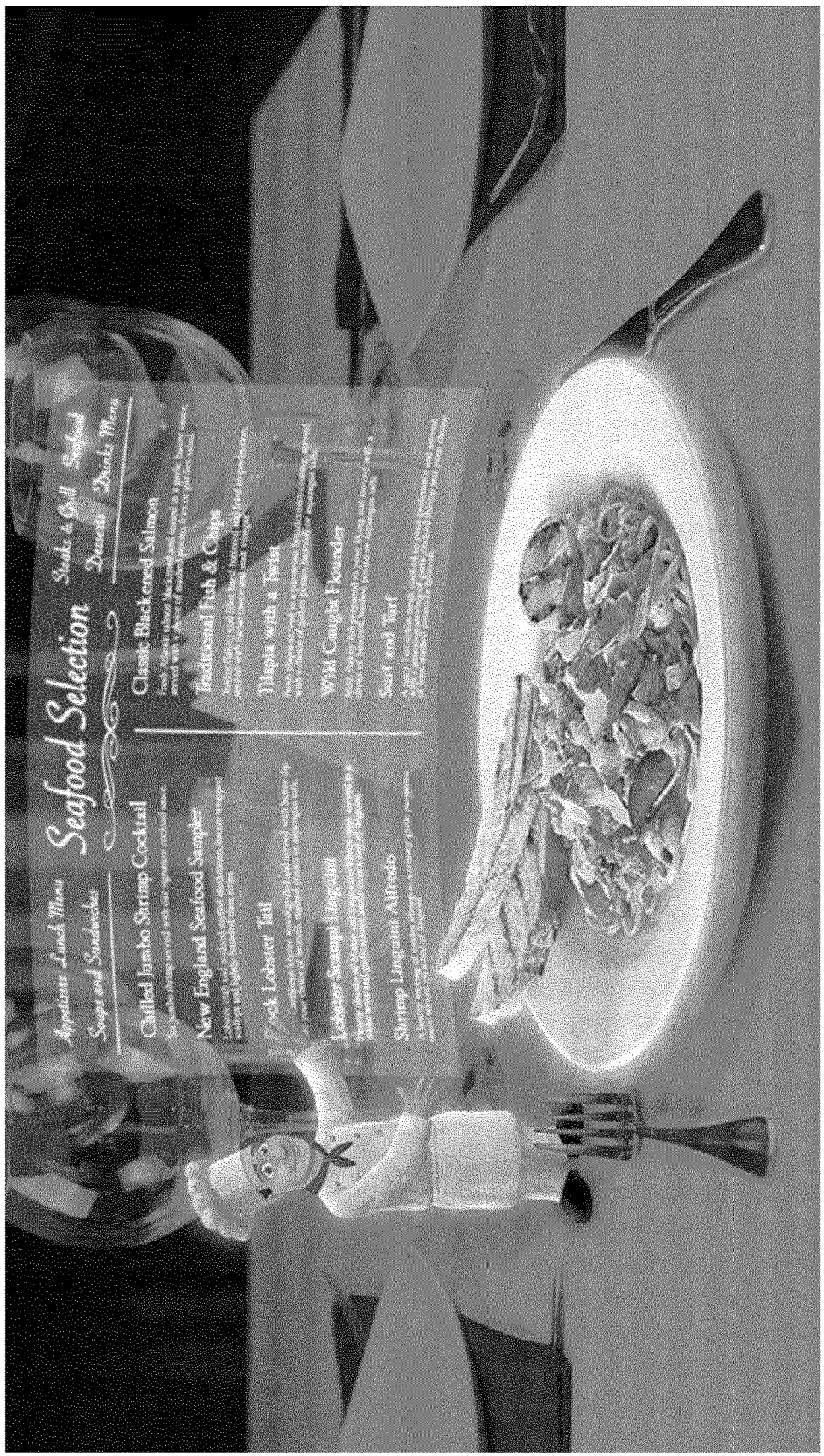
Figure 91A:
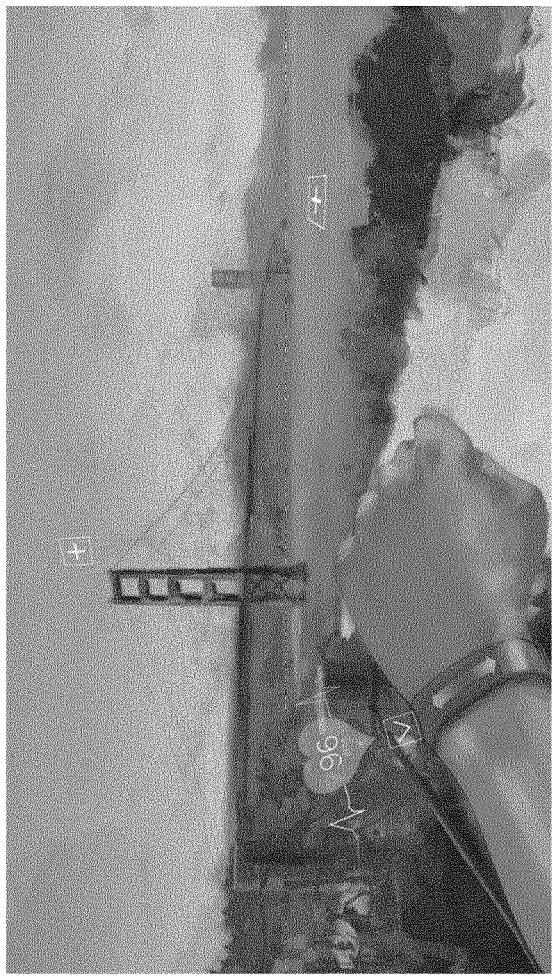
FIGS. 91A-91B illustrate a user wearing a band on her wrist.
Figure 91B:
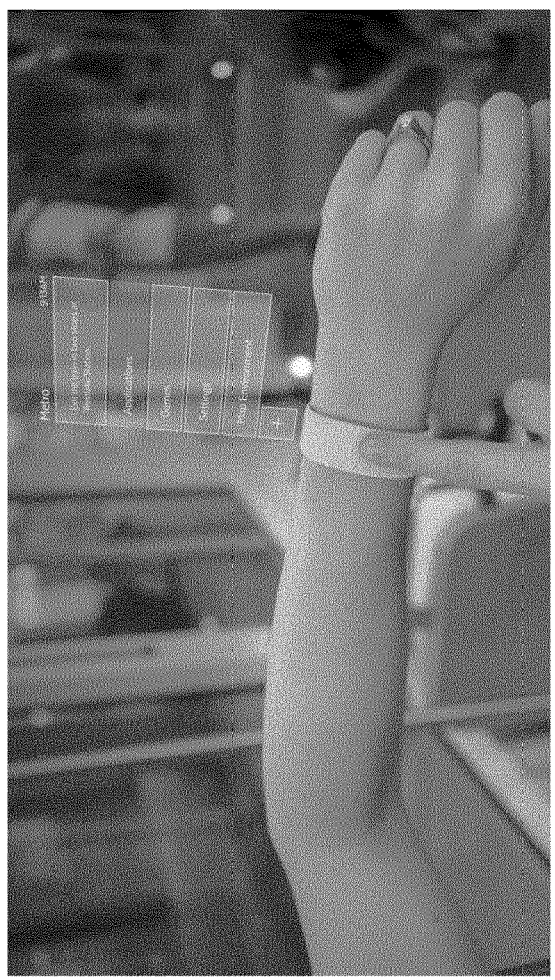
Figure 92:
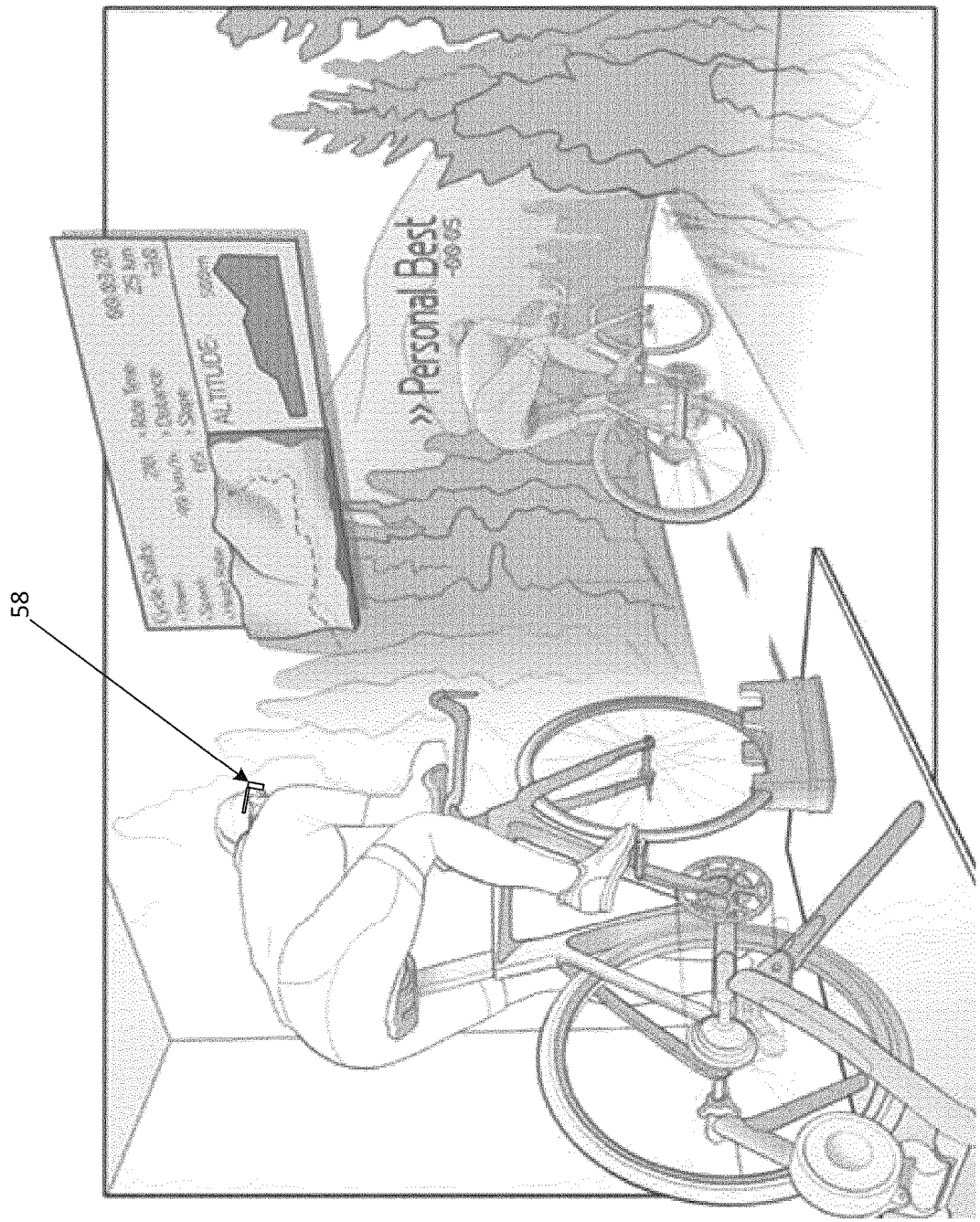
FIG. 92 illustrates a user operating an exercise bike.

Referring to FIGS. 89A-89B, in one embodiment, a subject augmented reality system may be utilized to customize the presentation of a particular object or objects for a given user—such as by virtually "skinning" a particular storefront with a theme, as in FIG. 89B. FIGS. 90A-90B illustrate that augmented reality presentation may be very desirable in a restaurant environment, to gain customers and work with them once they are in the restaurant. FIGS. 91A-91B illustrate a user wearing a band on her wrist, and a system configured to utilize engagement with the wrist band to present various augmented objects, such as menus, heart rate, mapped locations, and the like. FIG. 92 illustrates a user operating an actual exercise bike, but wearing a connected head mounted component (58) to experience an augmented reality presentation of environmental factors (such as virtual reality scenery, a presentation of herself in front of her clocked at her personal best time so that she can try to keep up or pass that performance, etc).

Figure 93:
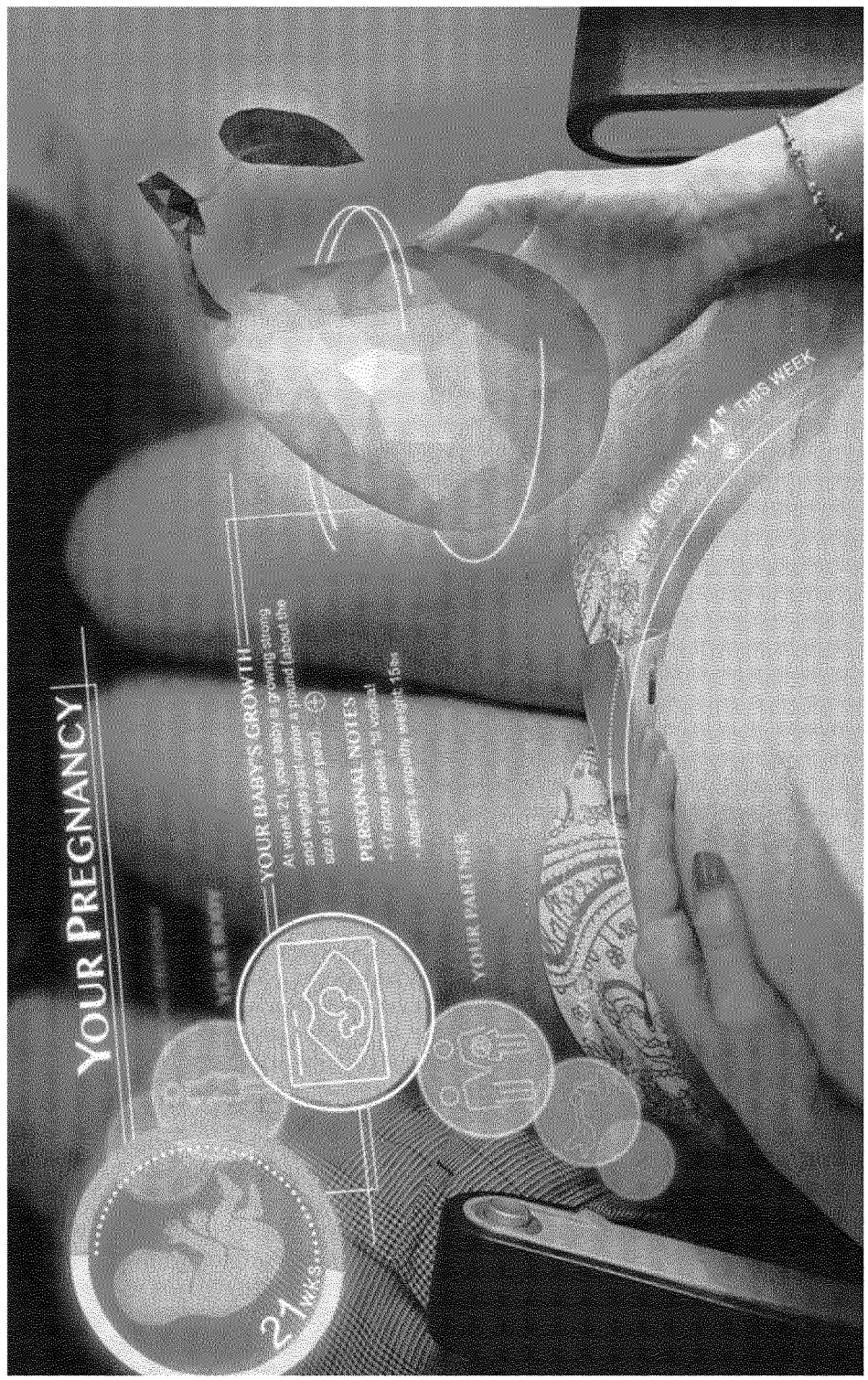
Figure 94:
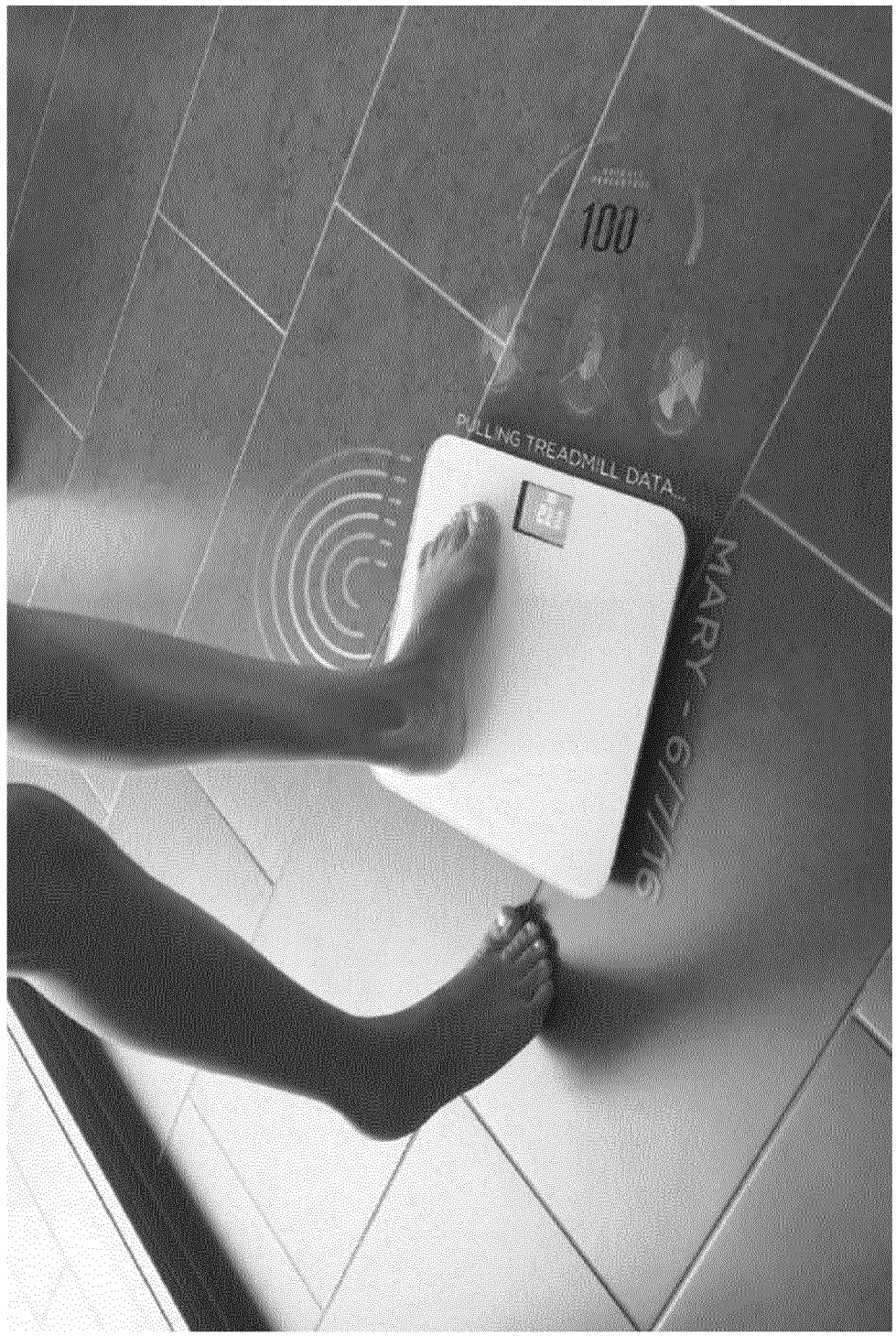
Figure 95:
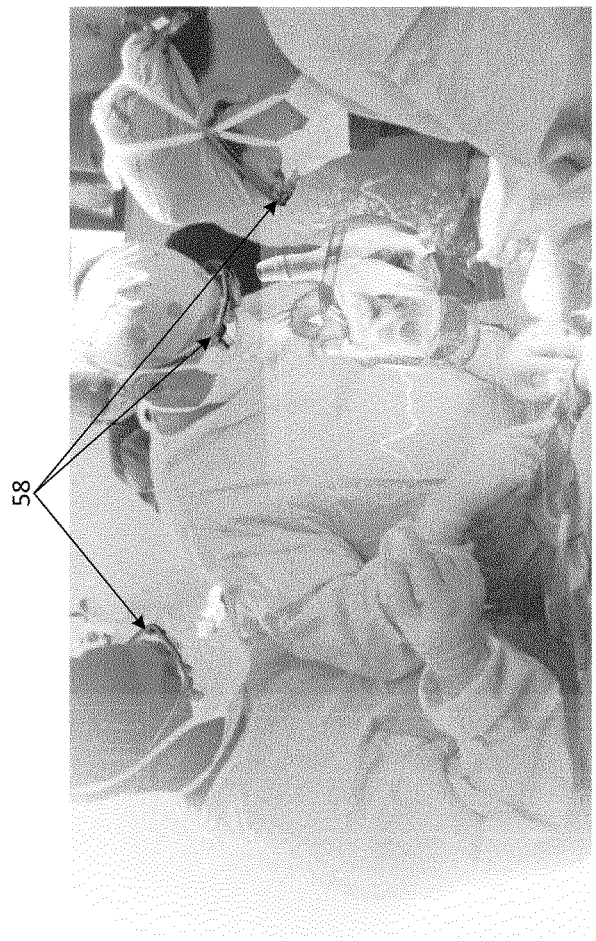
Figure 96:
Figure 97A:
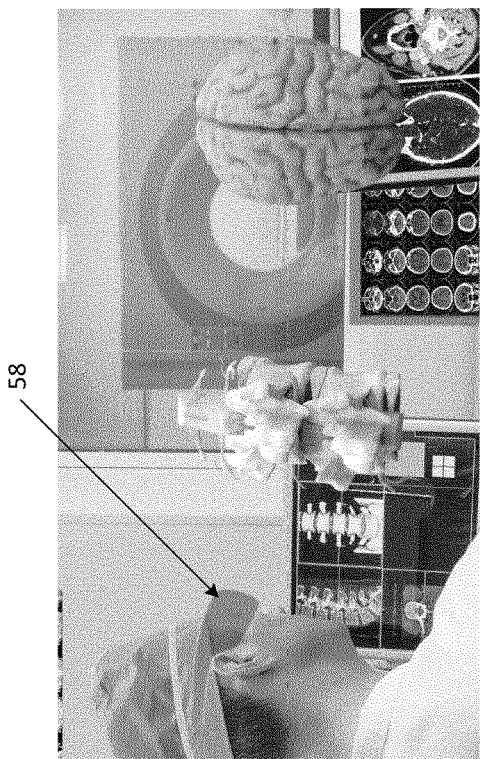
Figure 97B:
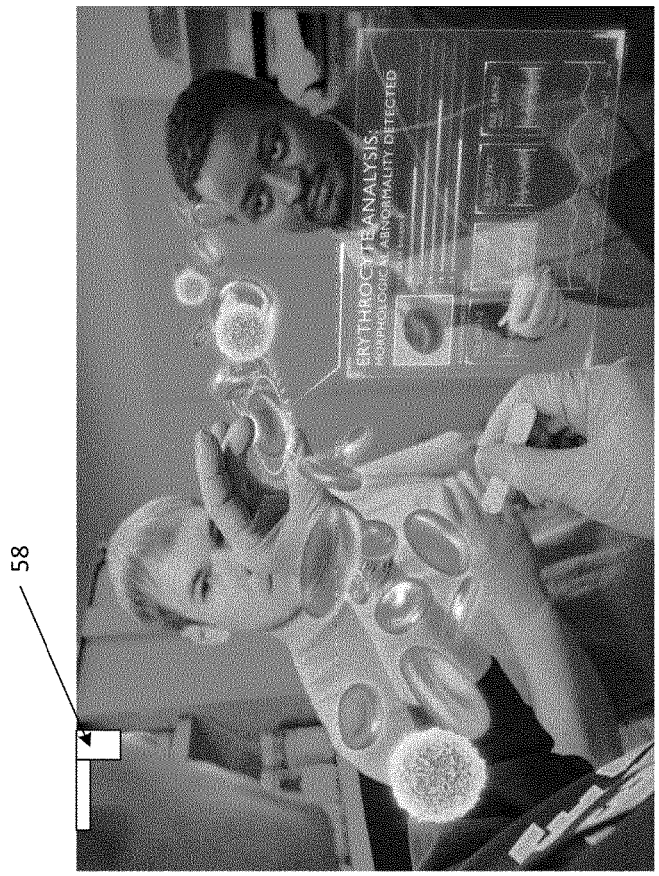
Figure 98:
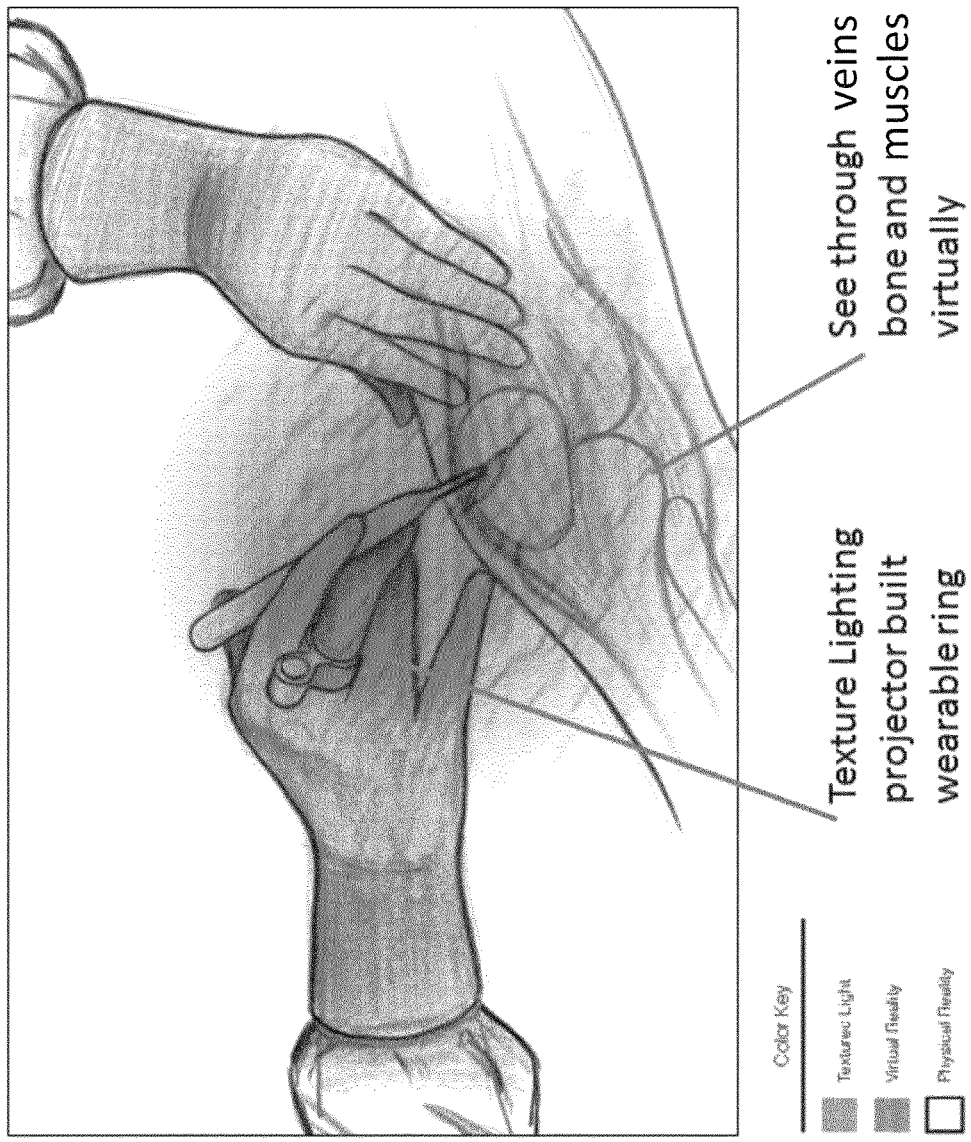

FIGS. 93-98 illustrate various healthcare-related configurations wherein augmented reality embodiments may enhance a user's experiences. FIG. 93 illustrates a pregnant user visualizing information regarding her fetus and other related information. FIG. 94 illustrates presentation of virtual information in association with an actual scale in the room of the user. FIGS. 95, 97A-97B, and 98 illustrate healthcare participants using an augmented reality head mounted component (58) to visualize certain aspects of anatomy or other information pertinent to care of a patient. FIG. 96 illustrates a configuration wherein a surgeon uses an augmented reality system to conduct remotely-located manipulations (e.g., remotely manipulated by a robot or other remote actuation system) on a remote patient by visualizing the patient's anatomy and the surgical tools and manipulation locally.

Figure 99:
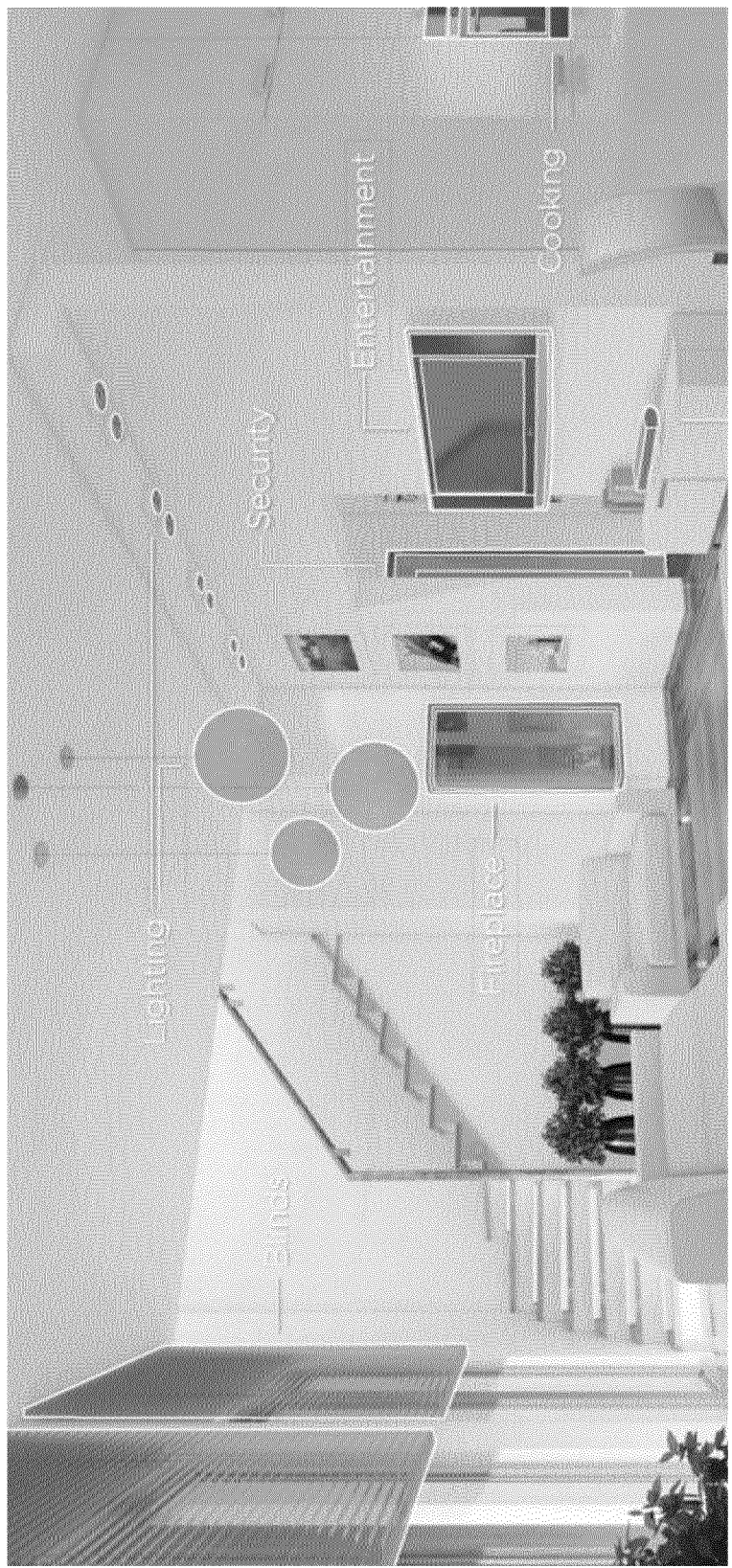
FIG. 99 illustrates presentation of virtual features configured to allow the user to efficiently control and operate aspects of his or her home.
Figure 100:
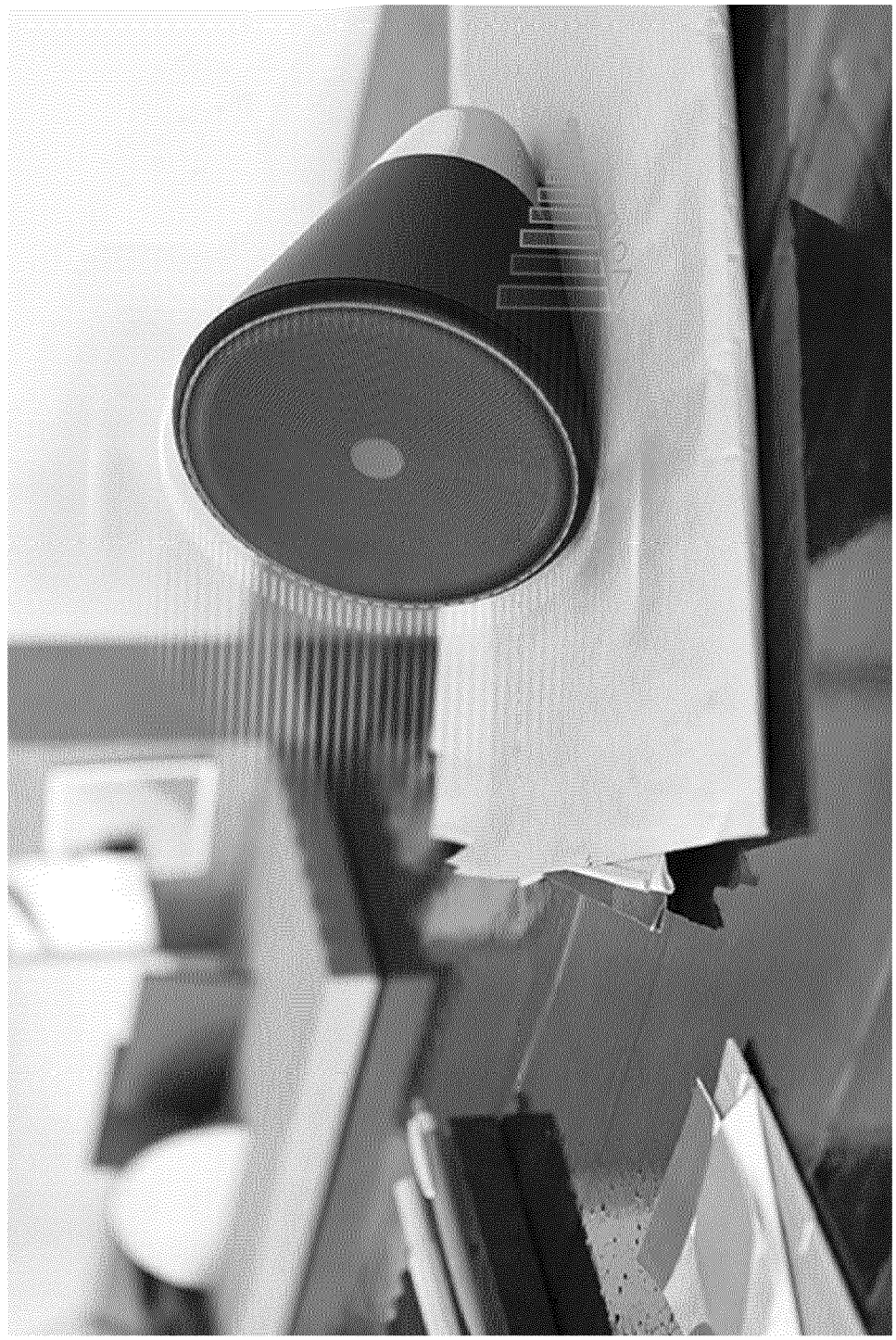
FIG. 100 illustrates an embodiment wherein a virtual representation of the volume of an actual speaker is presented alongside the speaker.
Figure 101A:
FIGS. 101A-105 illustrate various embodiments of augmented reality presentation.
Figure 101B:
Figure 102A:
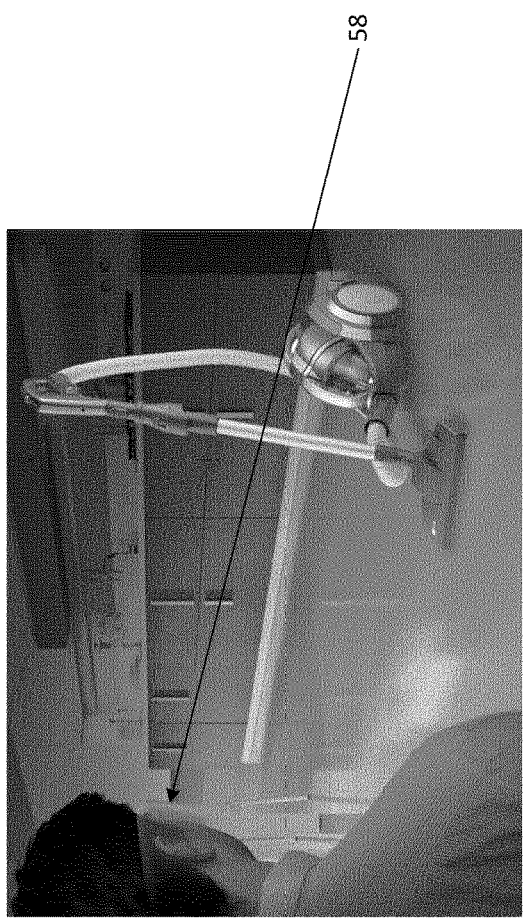
Figure 102B:
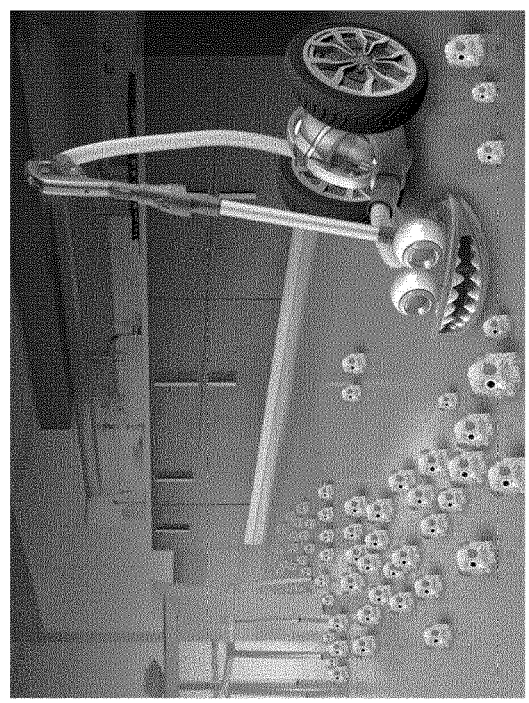
Figure 103A:
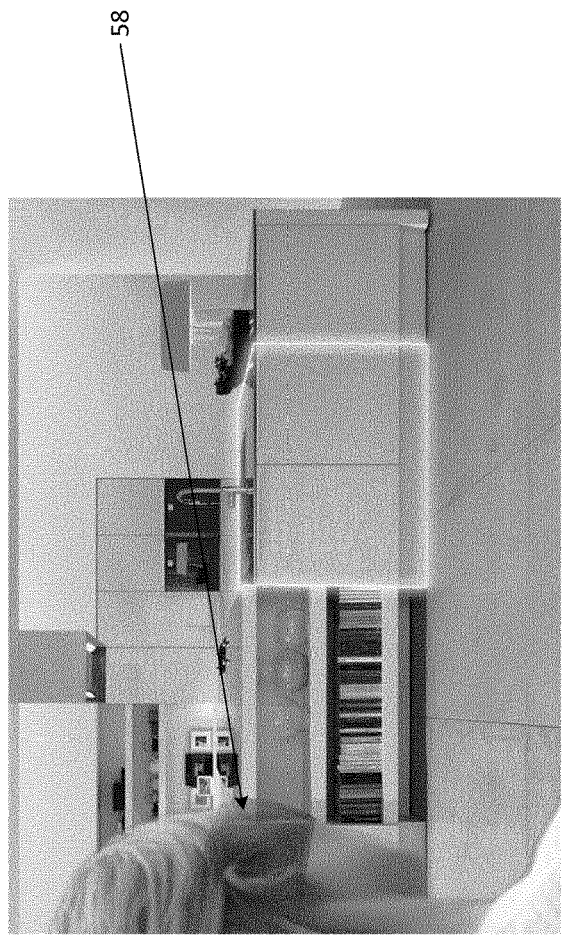
Figure 103B:
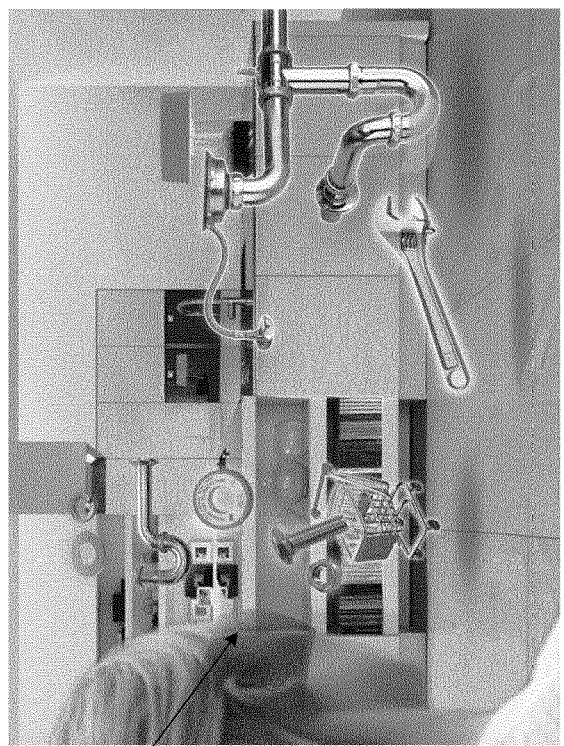
Figure 104A:
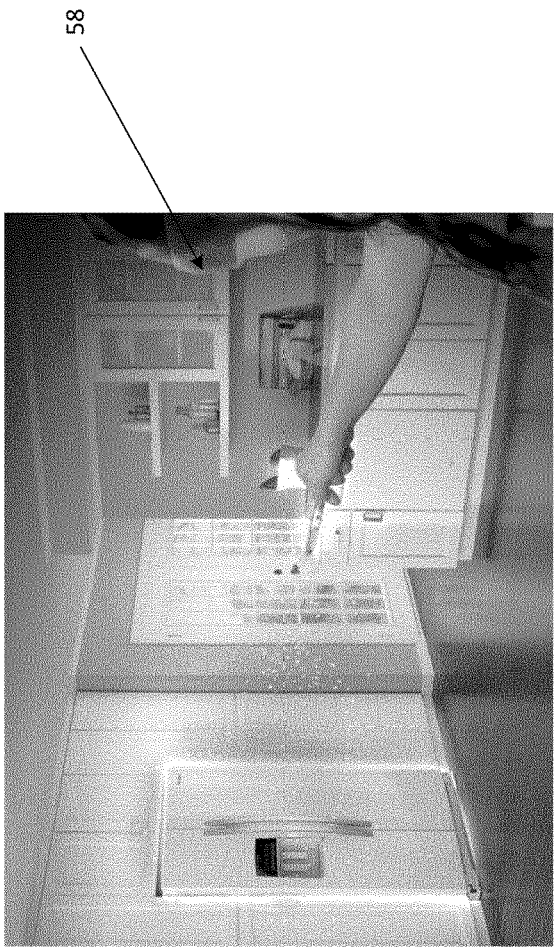
Figure 104B:
Figure 105:
Figure 106:
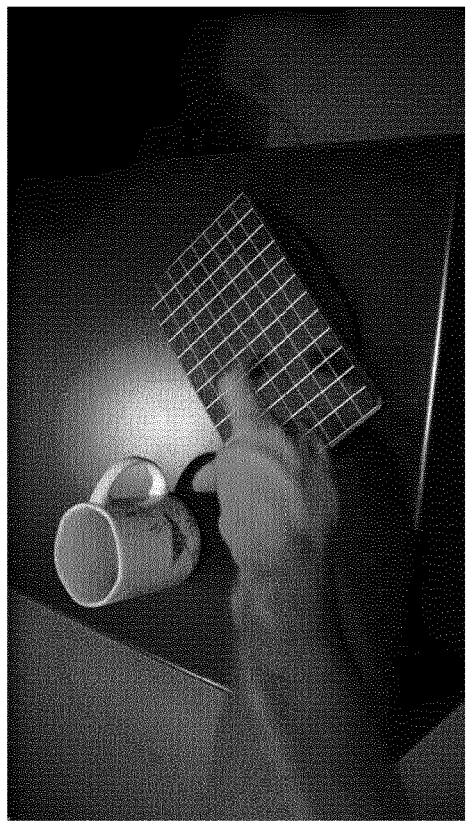
FIGS. 106 and 107 illustrate presentation of virtual measurement grids or tools.
Figure 107:
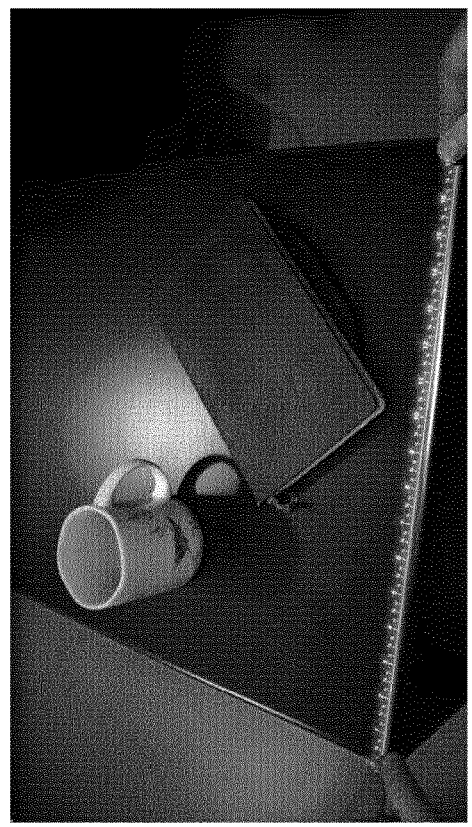

FIG. 99 illustrates presentation of virtual features in an augmented reality viewing system environment that are configured to allow the user to efficiently control and operate aspects of his or her home, such as lighting, security, blinds, entertainment, and cooking systems which may be connected through the internet. FIG. 100 illustrates an embodiment wherein a virtual representation of the volume of an actual speaker is presented alongside the speaker, along with a virtual control interface so that the user may turn up or turn down the volume, for example, using such virtual visualization and control features. FIGS. 101A-105 illustrate various embodiments of augmented reality presentation to the user through variations of the subject system to visualize and utilize various types of information through the portable computing capability of the subject system. FIGS. 106 and 107 illustrate that virtual measurement grids or tools may be presented to assist the user in measuring position, orientation, or geometry of various actual items.

Figure 108A:
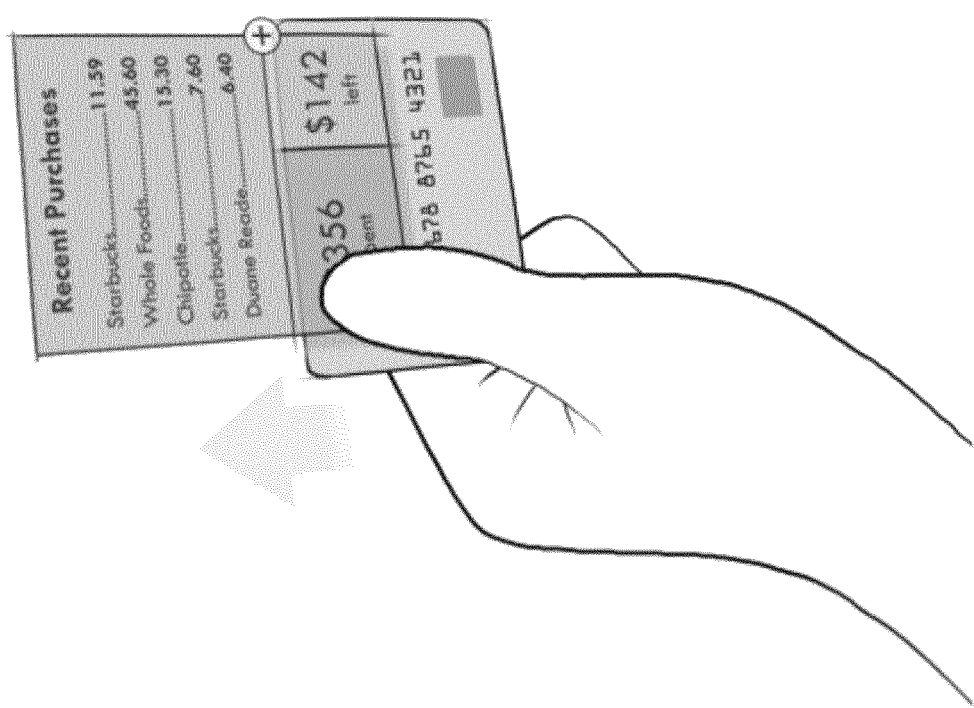
FIGS. 108A-108B illustrate virtual presentation of credit card information.
Figure 108B:
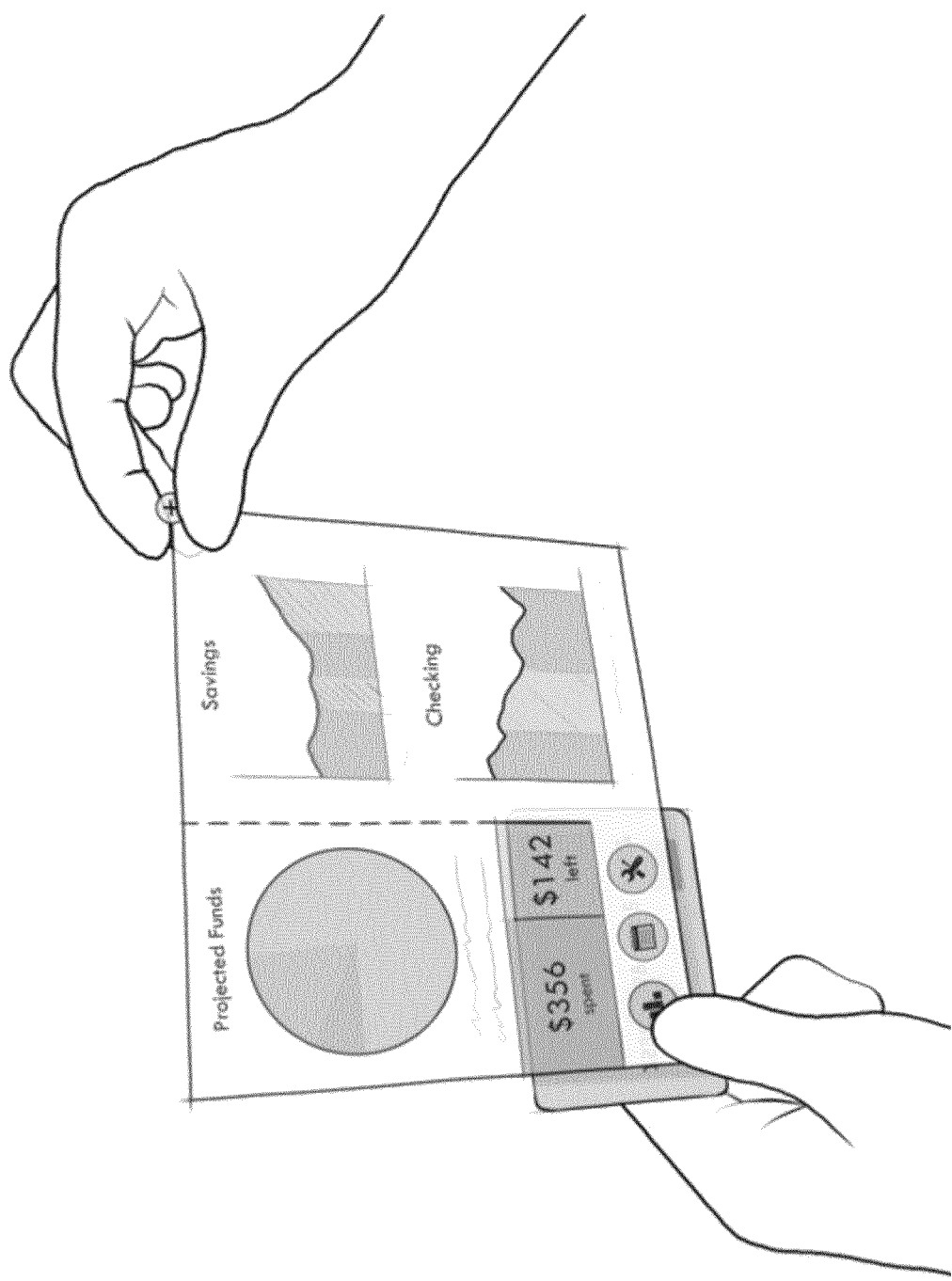
Figure 109A:
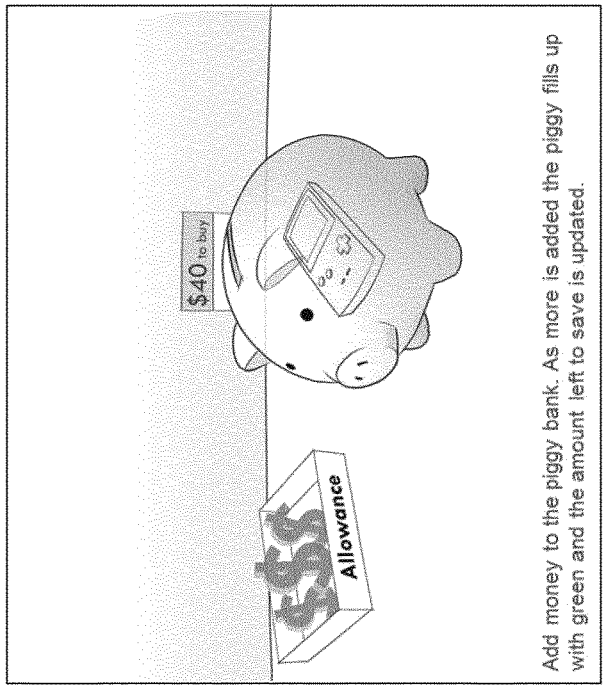
FIGS. 109A-109B illustrate an embodiment of a virtual reality assisted savings system configured to automatically order something.
Figure 109B:
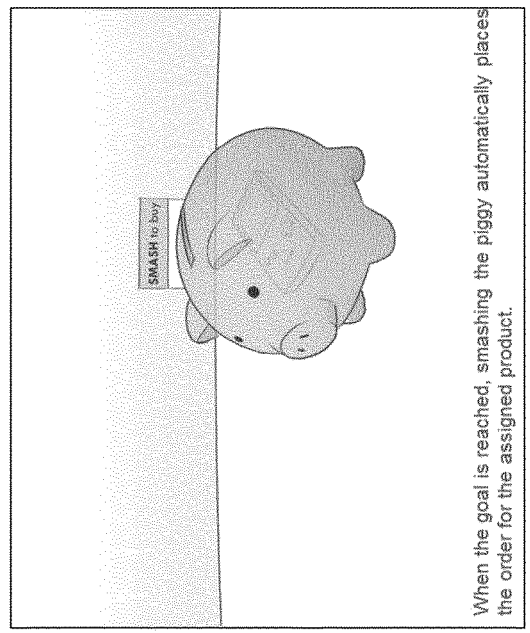
Figure 110A:
FIGS. 110A-110B illustrate another translational use.
Figure 110B:
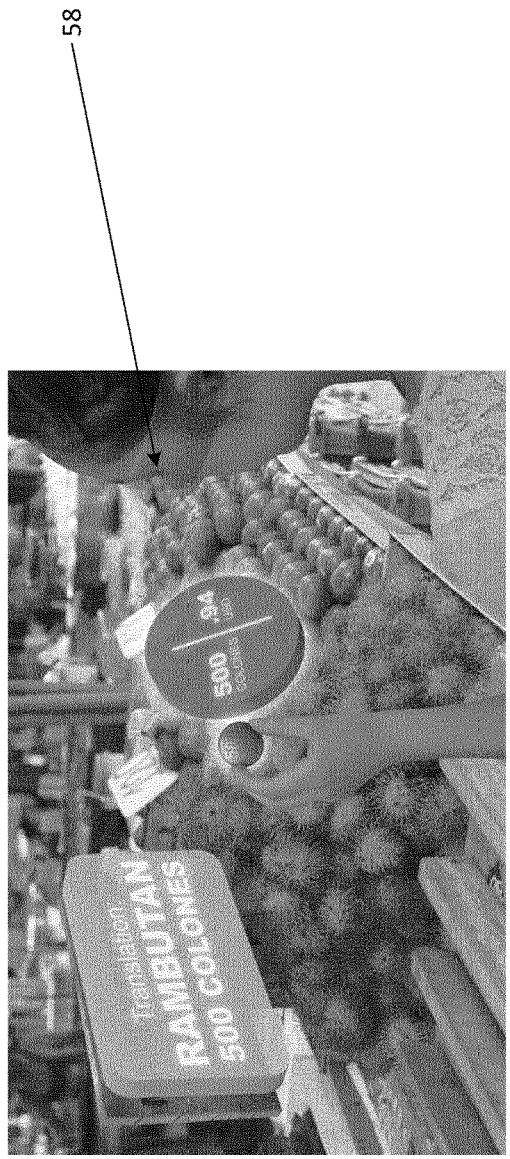
Figure 111A:
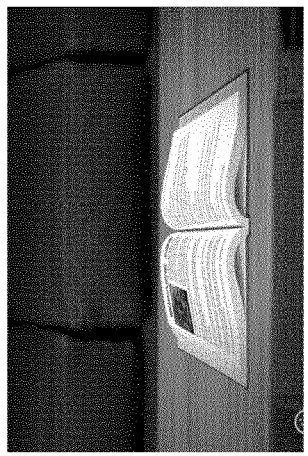
Figure 111B:
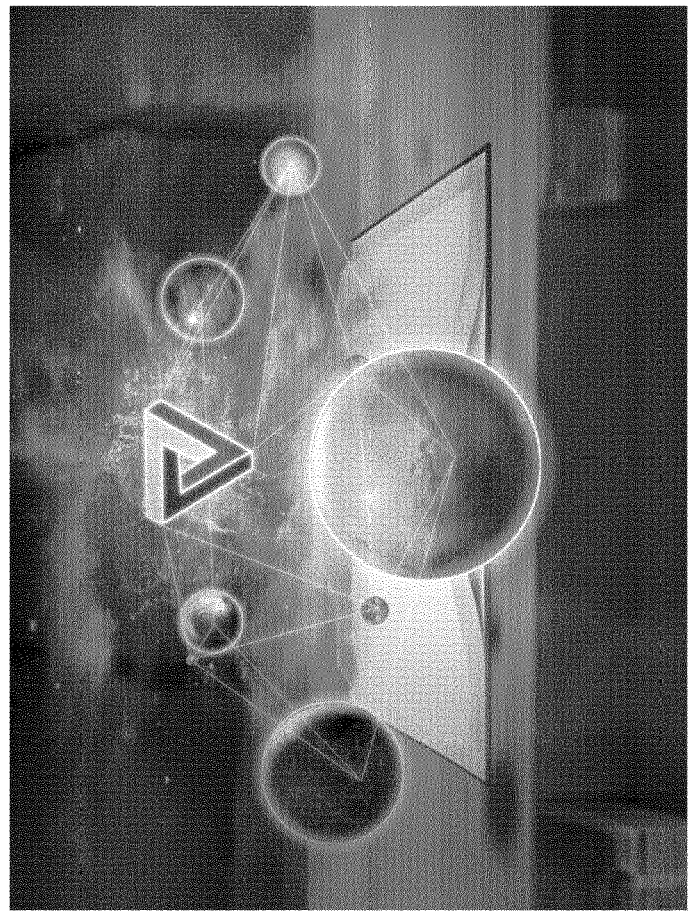
Figure 112A:
Figure 112B:
Figure 113:
Figure 114:
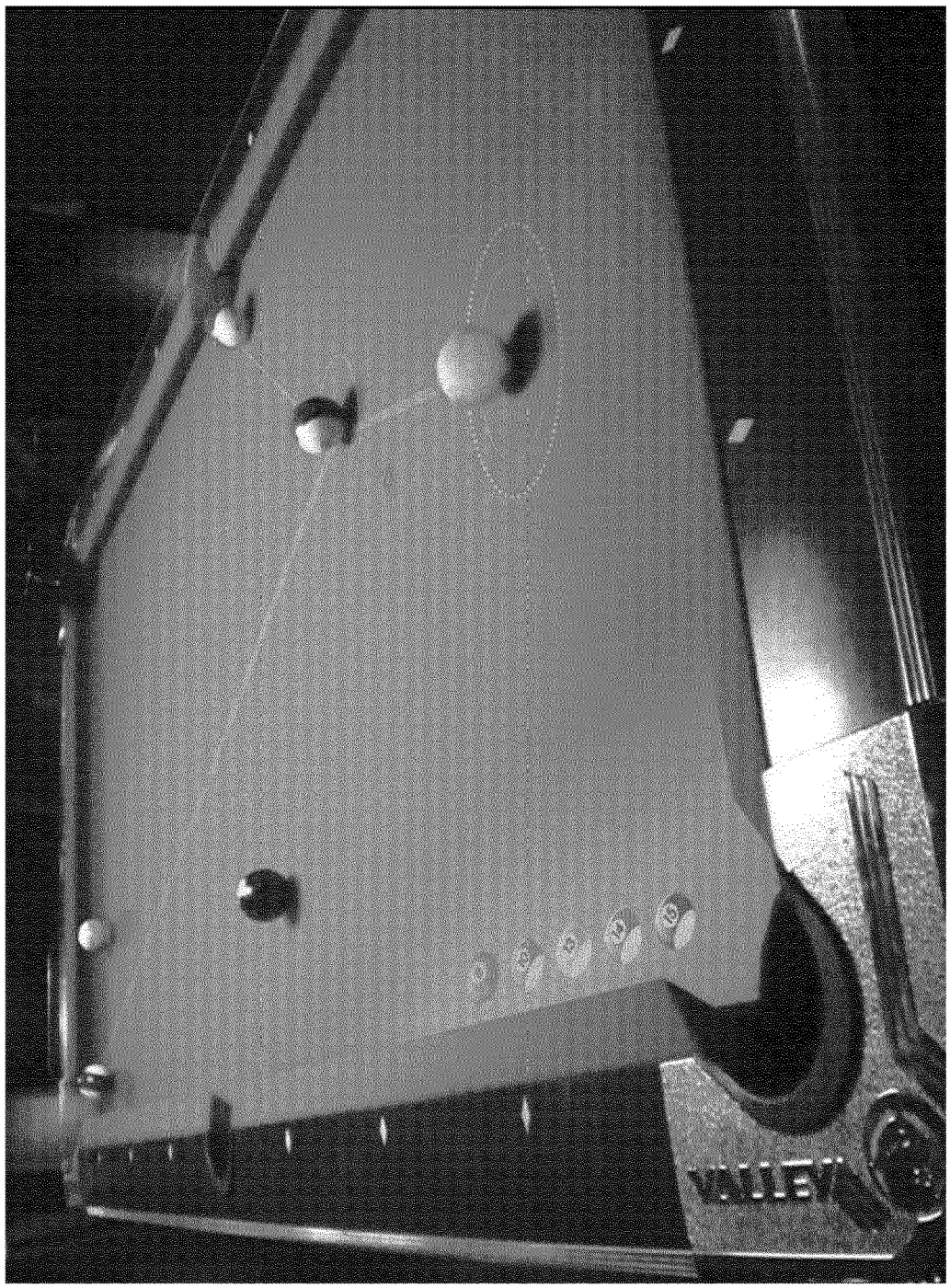
Figure 115:
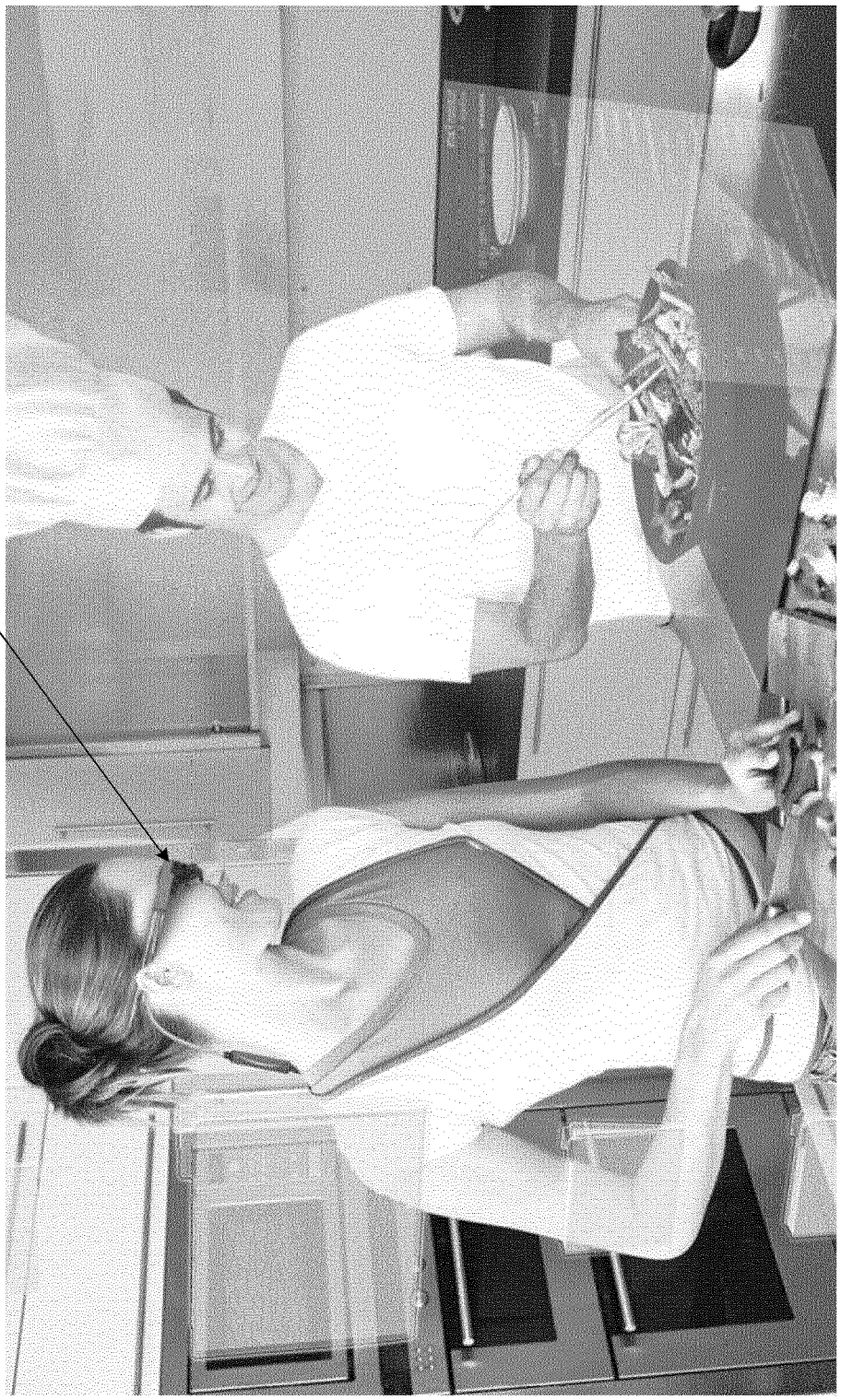
Figure 117:
Figure 118:
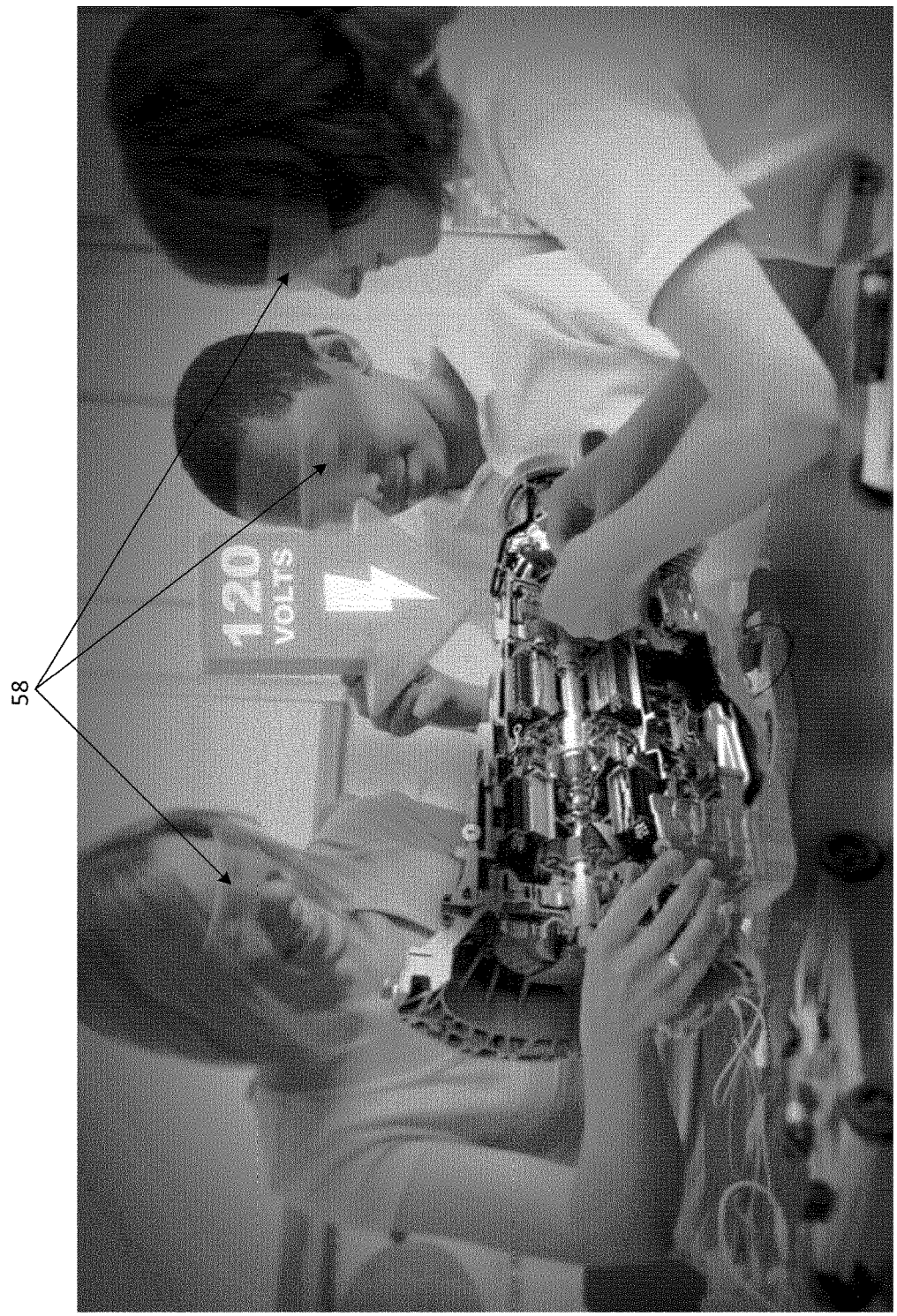
Figure 119A:
Figure 119B:
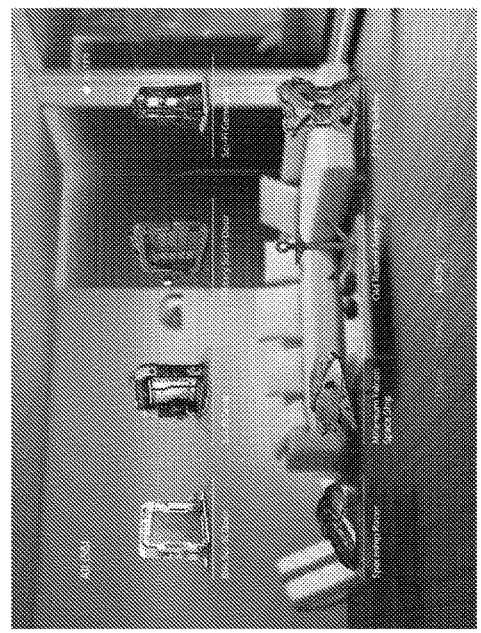

FIGS. 108A-108B illustrate that virtual presentation of information may enhance the use of actual objects such as credit cards. FIGS. 109A-109B illustrate an embodiment of an virtual reality assisted savings system configured to automatically order something that a user wants once enough money has been saved, with visual presentation of status and success with a piggy bank type of object. FIGS. 110A-110B illustrate another translational use of the subject technology, with monetary conversion being presented to the user. FIGS. 111A-112B illustrate yet further embodiments of augmented presentation to users enhancing their information presentation. FIGS. 111A-111B illustrate a conventional versus enhanced book reading presentation. FIGS. 112A-112B illustrate a conventional versus enhanced story telling presentation. FIG. 113 illustrates an embodiment wherein virtual presentation may be utilized to highlight keys to press during a piano lesson; FIG. 137 shows a similar interface configuration for learning and interacting with a guitar. FIGS. 114-118 illustrate other teaching embodiments wherein augmented reality may be utilized in teaching and experiential environments.

Figure 120:
Figure 121A:
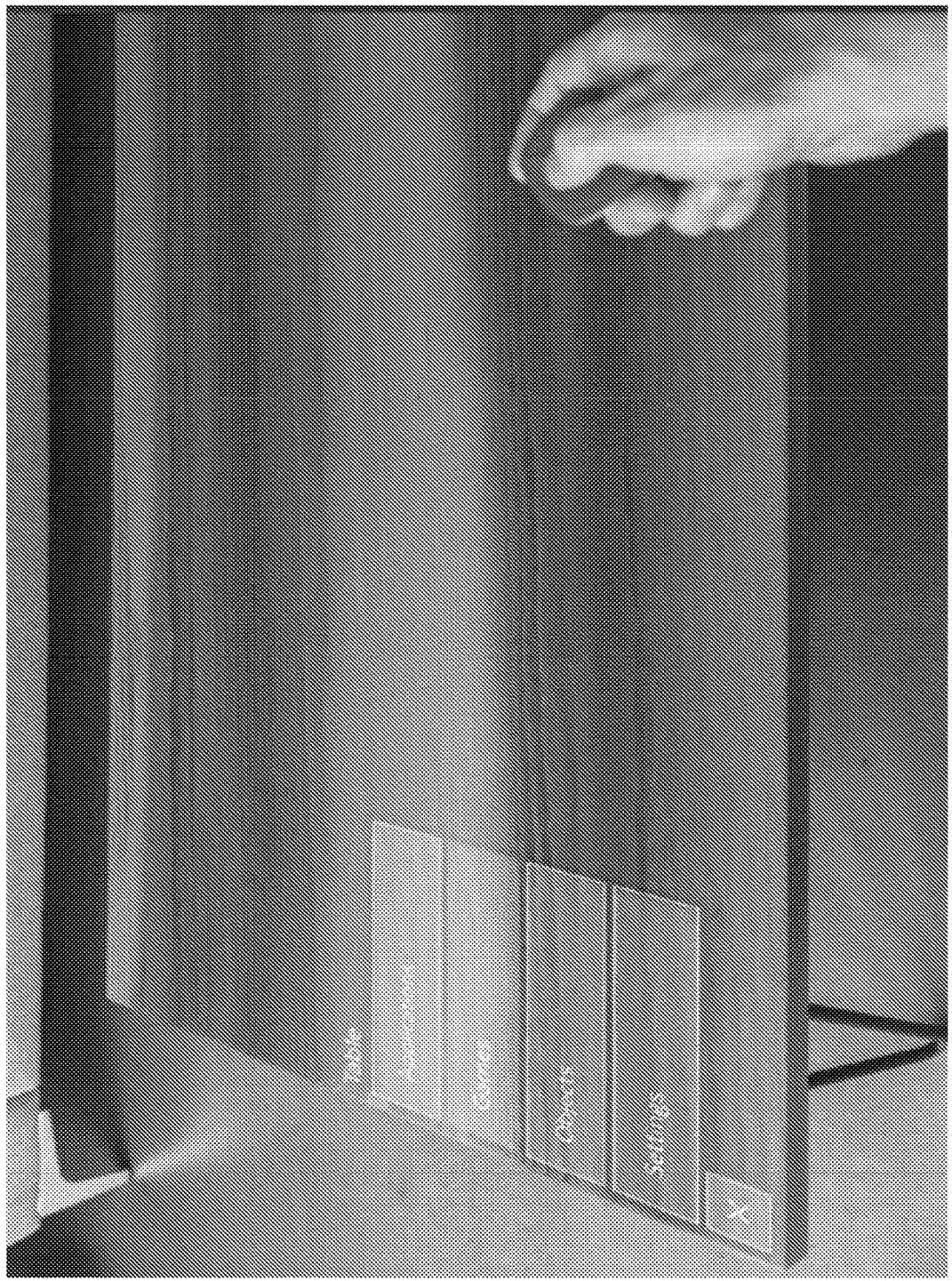
Figure 121B:
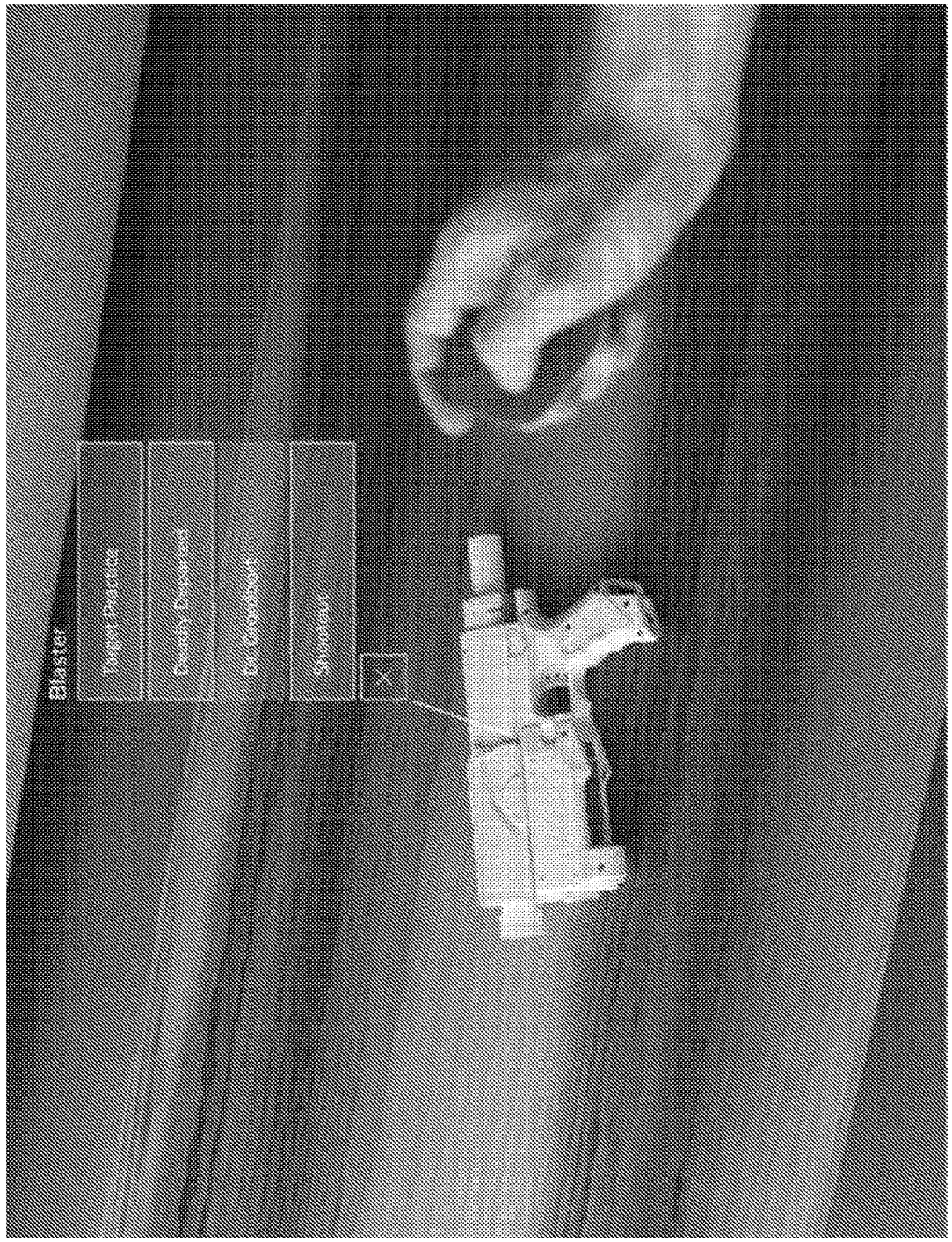
Figure 122C:
Figure 122B:
Figure 122A:
Figures 123A, 123B, 123C, 123D:
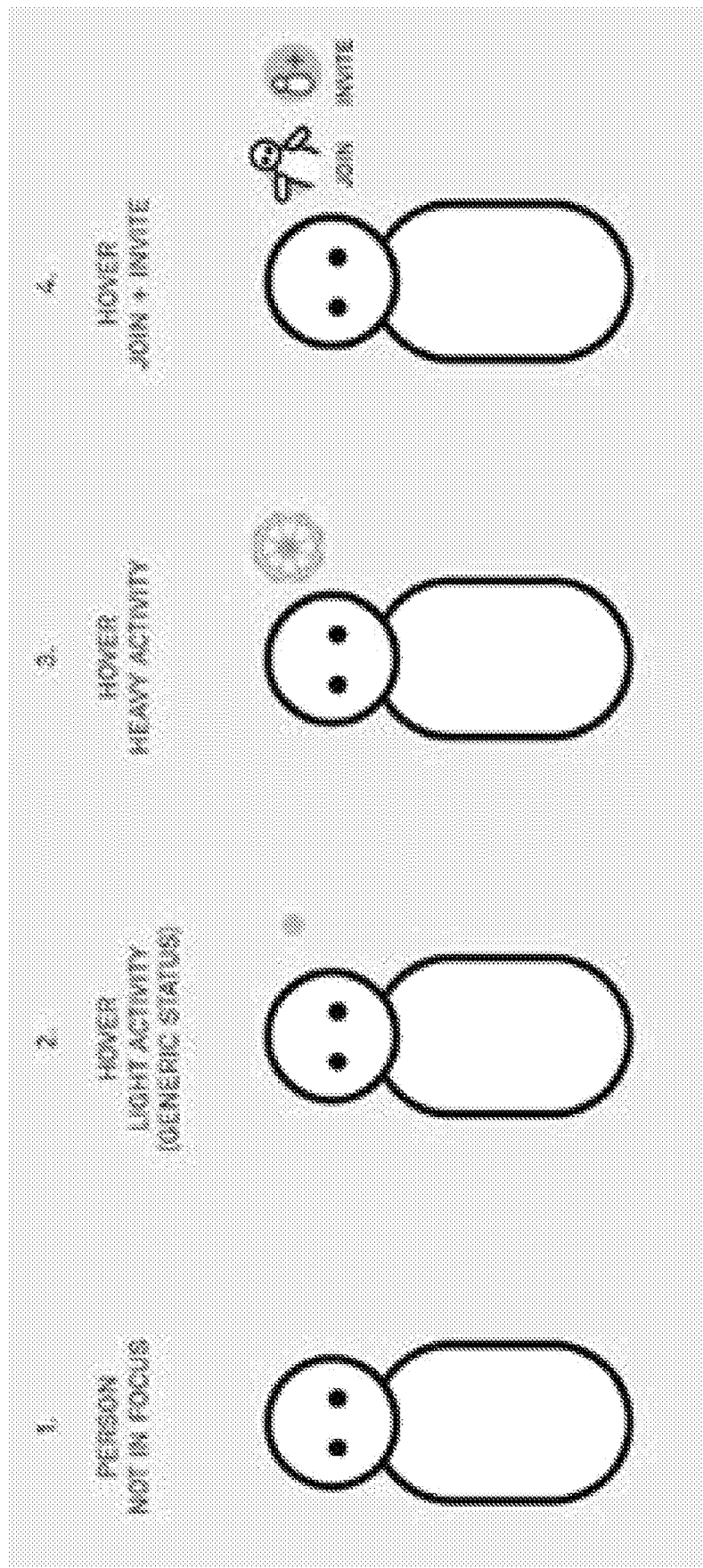

Referring to FIGS. 119A-122C, various embodiments may be utilized to facilitate control over the presentation and visualization of a user's actual space. For example, in the embodiment of FIG. 119A-119B, the user may select the style of virtual overlay to be presented over his otherwise conventional door. FIG. 120 shows a configuration wherein a user has configured one side of his living room to fade to ocean paradise. FIGS. 121A and 121B illustrate that certain menus may be geometrically tied to certain elements (for example, a toy gun gaming menu may be tied to the physical location of a toy gun; or certain home-control or media related menus may be configured to be tied to a certain coffee table location). FIGS. 122A-122C illustrate the presentation of various weather patterns within a user's kitchen (sunny, raining, snowing); these may be tied to the weather at a particular location, such as at the user's second home location.

Figure 124:
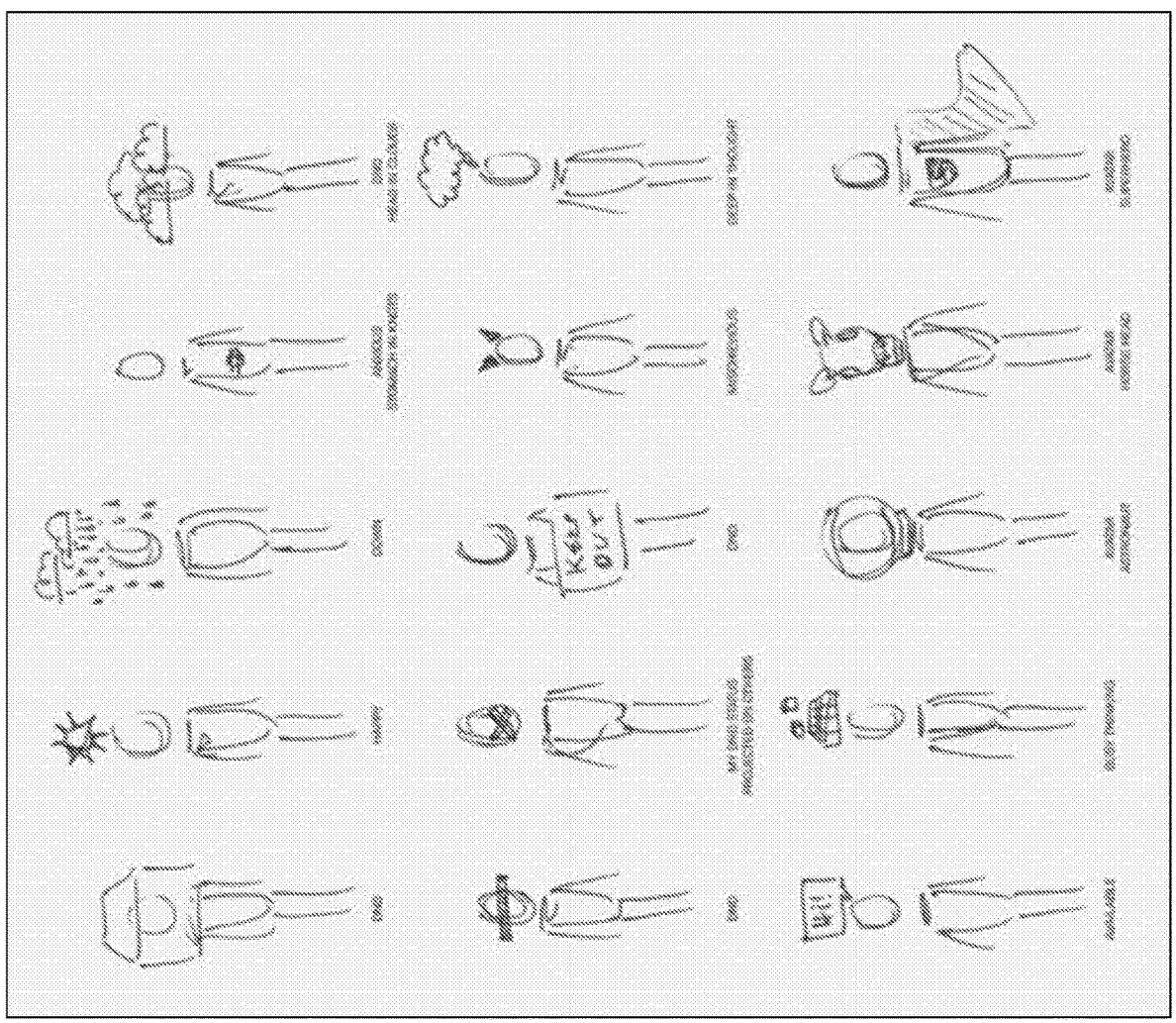
Figure 125A:
Figure 125B:
Figure 126:
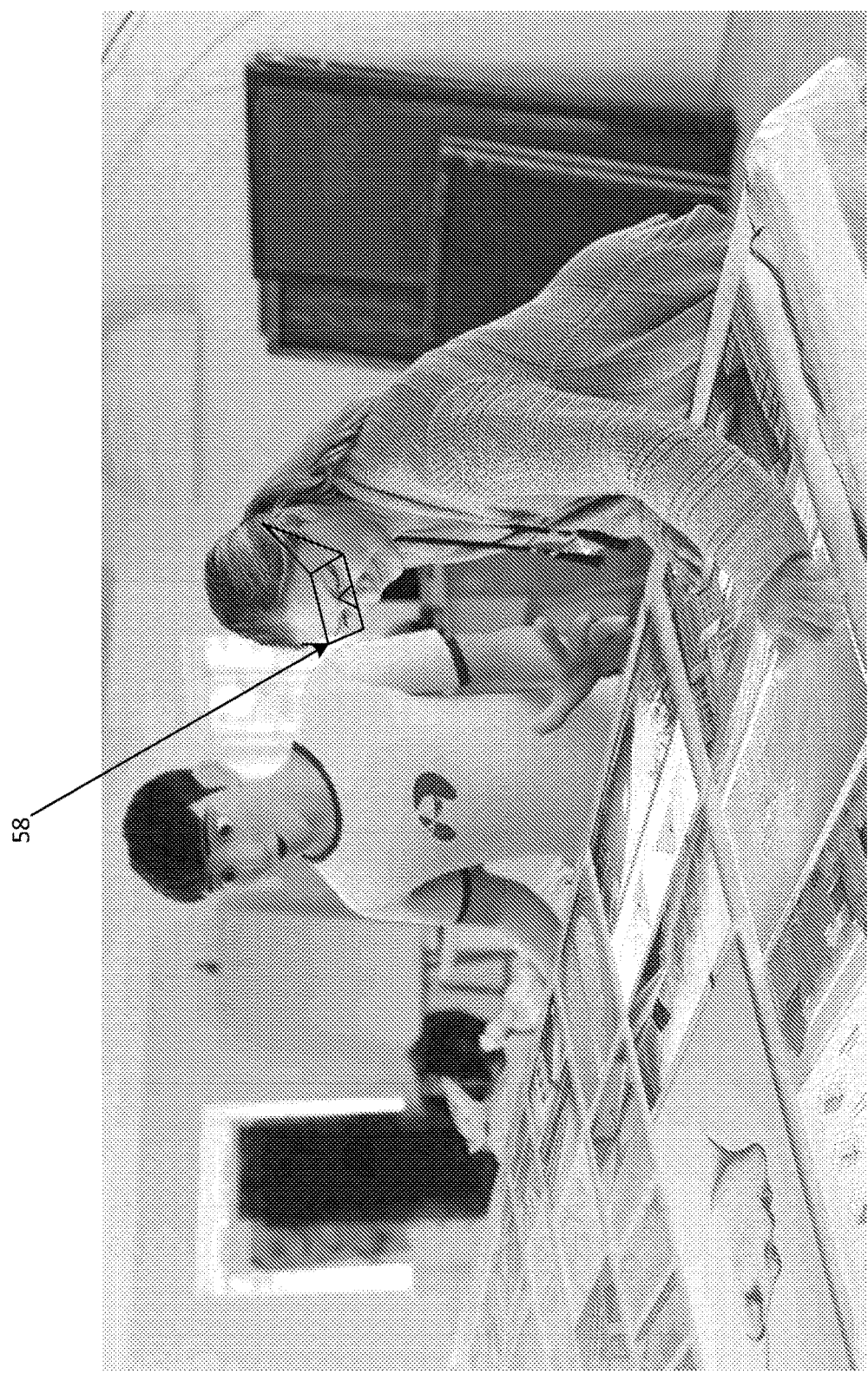
Figure 127B:
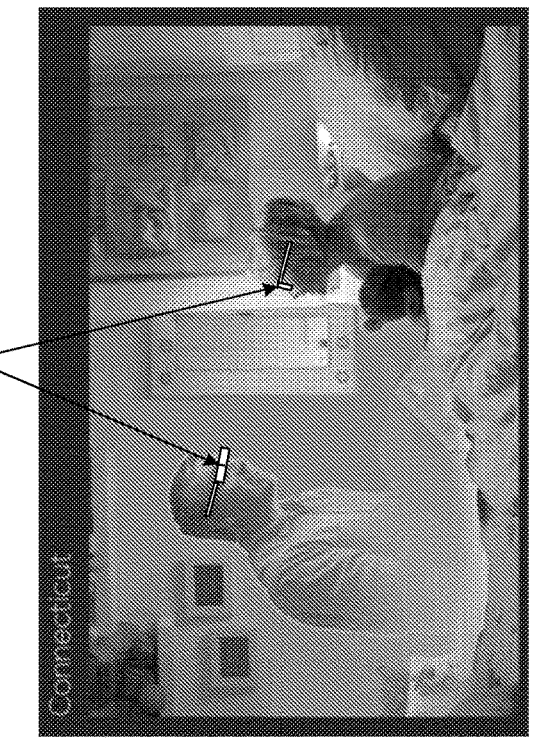
Figure 127A:
Figure 128B:
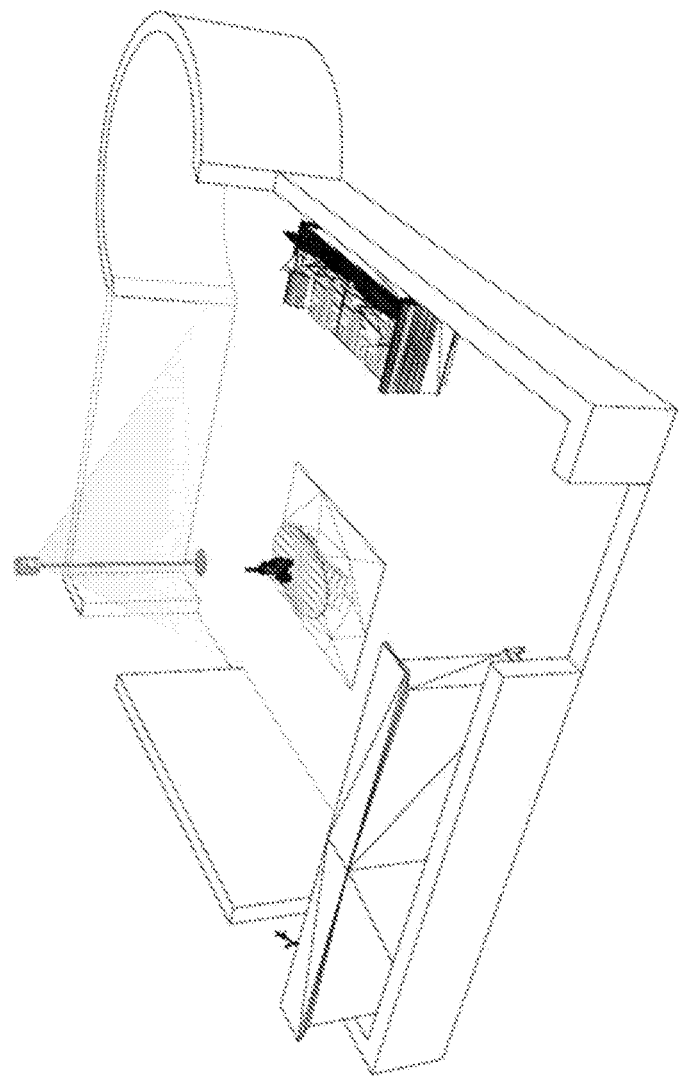
Figure 128A:
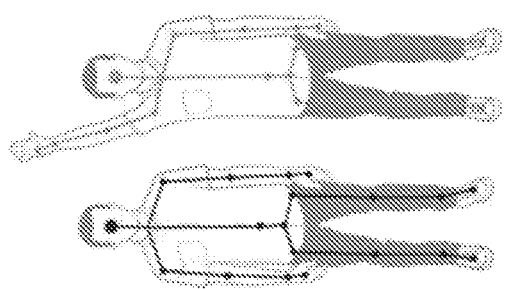
Figure 129C:
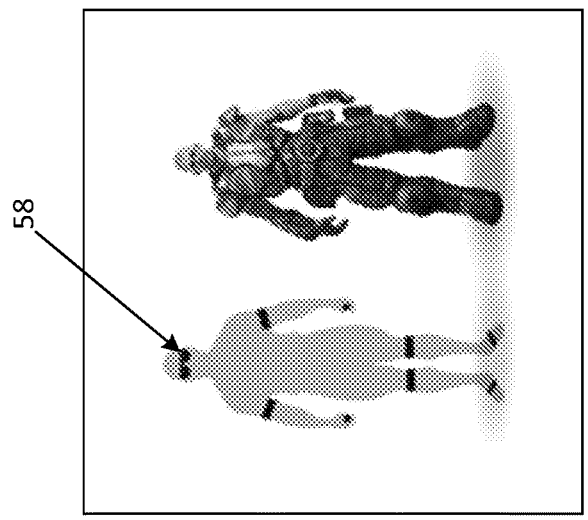
Figure 129B:
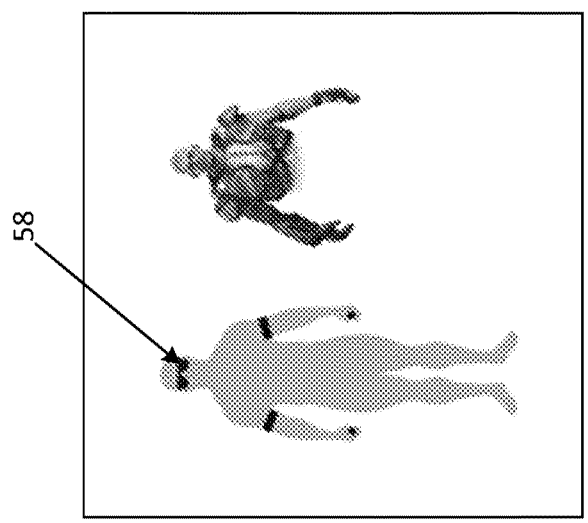
Figure 129A:
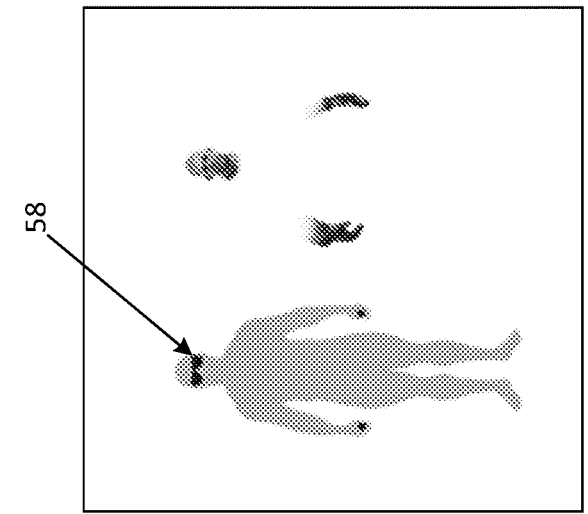

FIGS. 123A-123D illustrate how a system embodiment may be configured to interpret various geometric and/or temporal aspects of a user's functionality to assist in providing desired operation to the user (for example, may be configured to interpret an extended hover from the eye positioning or finger positioning as a particular type of selection or intended highlighting). FIG. 124 illustrates that a user may desire to select his or her own avatar to be presented to others based upon his mood or other factors. FIGS. 125A and 125B illustrate gaming environments which may be executed using the augmented reality aspects of certain embodiments of the subject system. FIG. 126 illustrates a collaborative work environment wherein a user is able to virtually "share" a work environment with a remote person represented locally by a selected avatar. FIGS. 127A and 127B illustrate that two remotely-located users (here a father in New Zealand and a daughter in Connecticut) may collaborate in augmented reality for various activities, such as reading a story "together" in each of their environments through the virtual presentation of the other person who is not there in nonvirtual form. FIGS. 128A-128B illustrate a room outfitted with a motion analysis system configured to track the kinematics of structures such as the main components of one or more humans in the room, to facilitate a system in monitoring the positions of such humans and presenting representations of those to others. Depending upon the level of sophistication of the tracking needed, different and more sensing capabilities may be integrated. For example, FIGS. 129A-129C illustrate that more sensors (such as those shown which may be coupled to one or more limbs or locations of the user) may be employed to monitor a user to be able to more precisely produce remotely-reproducable virtual presentation of such user. FIG. 130 illustrates how such local tracking capabilities may be utilized to assist a remote participant, such as a yoga instructor, in observing a user and assisting/coaching her while she participates in a class from a remote location using augmented reality. FIG. 131 shows a user in his local environment with his wearable computing components (58) having a band practice virtually with other members in different locations. FIG. 132 illustrates that two disparately located users may be able to collaborate, and in the instance of a basketball court and an expert giving lessons, take advantage of the fact that the court is of the same planar geometry (or at least portions thereof, such as the "key" portion) in both locations. FIG. 133 illustrates that a mother or other caregiver or supervisor may be "present" in avatar form to watch over family members and engage with them using head mounted components (58) and the subject computational and information connectivity. FIG. 134 illustrates museum visitors being presented with the avatar or a famous historical character. FIG. 135 illustrates a real or near-real time avatar visualization interface for users. FIG. 136 illustrates a virtual reality workstation environment, with some conventional information presentation items (such as a conventional planar computer monitor) and some virtual reality presentation of work related materials, such as a three-dimensional presentation of a CAD drawing of an object.

Figure 138A:
Figure 138B:
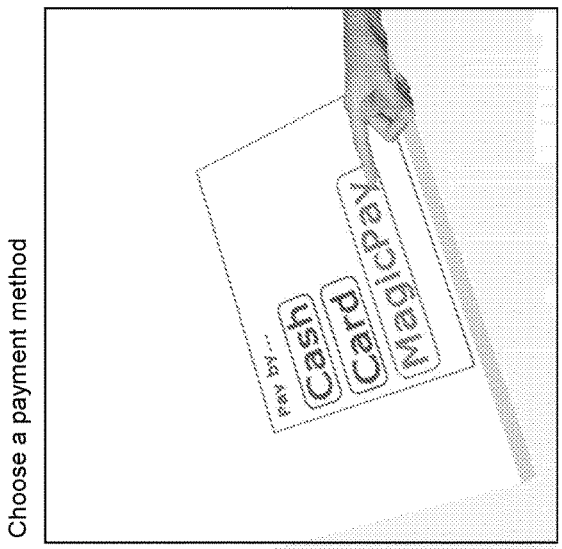
Figure 138C:
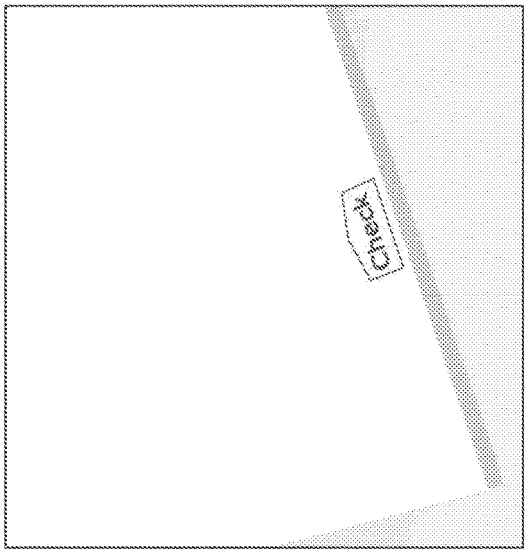
Figure 138F:
Figure 138E:
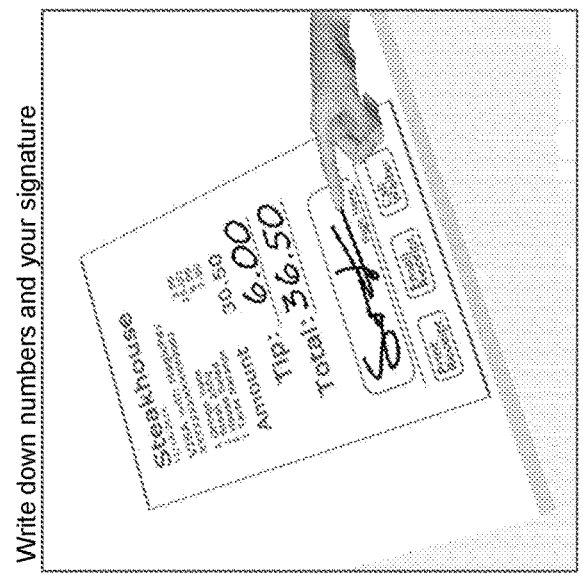
Figure 138D:
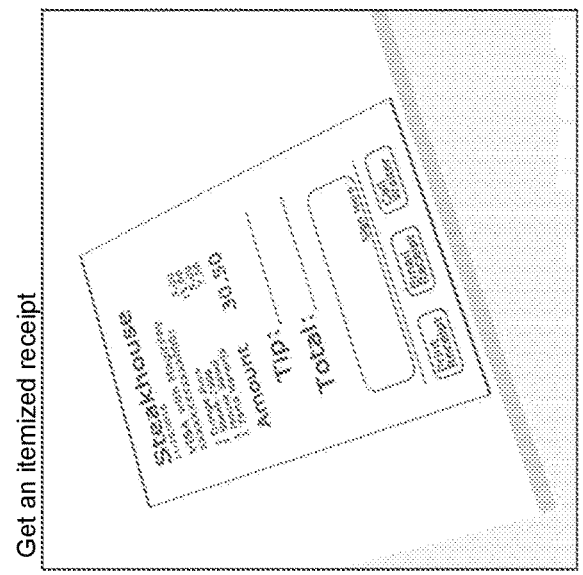

FIGS. 138A-138F illustrate various aspects of a pay configuration for users in a restaurant or other environment. As shown in FIG. 138A, the user may utilize augmented reality in selecting and experiencing his or her meal. After the meal, or whenever the user is ready to pay, the user may utilize virtually presented menus to examine the check (FIG. 138B), select a form of payment (FIG. 138C), examine an itemized receipt (FIG. 138D), input tip amounts and signature (FIG. 138E), and have a copy of the receipt printed, emailed, etc (FIG. 138F).

Referring to FIGS. 139A-140, various embodiments are depicted wherein a virtual avatar may be presented by the subject system to assist the user in various tasks of everyday life. Digital assistant functionality has been made available previously in several forms, such as by the audio product known under the tradename "Ski"®, available from Apple Computer, Inc., or in the audio product known as "Alexa"®, available from Amazon Corporation. Such products are configured to monitor sounds in the environment to detect certain keywords or inquiries, and then to function as an interface to connected computing systems, such as local or cloud based systems, to provide information back to the user, such as via audio output. For example, a user of a Siri® product can ask a smartphone operating such software a question, the Ski product can respond with a voiced attempted answer to the question. Referring again to FIGS. 139A-140 and the aforementioned embodiments as well, various configurations of the subject system are capable of having key information regarding the user's current operating scenario, such as where the user is located within a building (for example, from SLAM localization and mapping), where the user is located with regard to a global coordinate system such as a map of the earth (for example, from GPS or cell tower triangulation localization and mapping), the pose of the user's head with regard to the room and objects around the user (for example, from camera or sensor-based pose estimation), as well as where the eyes of the user are gazing (for example, using eye tracking configurations and techniques with inward-oriented cameras and sensors) and the identification of the user (for example, using biometric techniques, such as by capturing data pertinent to the iris of the user from the inward-facing cameras, microphones for voice identification, etc; further, two-factor biometric identification may be utilized for additional security, such as voice and iris biometrics). The system further may feature microphones and other devices to track the voice and speaking of the user and other persons around the user. In other words, an avatar functionality of the subject system has very pertinent and updated information regarding the user: who the user is, where the user is, how the user's head is oriented, what the user is gazing at, what the user is saying. With such information, the system may be configured to provide very sophisticated digital assistant style functionality in various embodiments, such as in a digital avatar functionality.

Figure 139B:
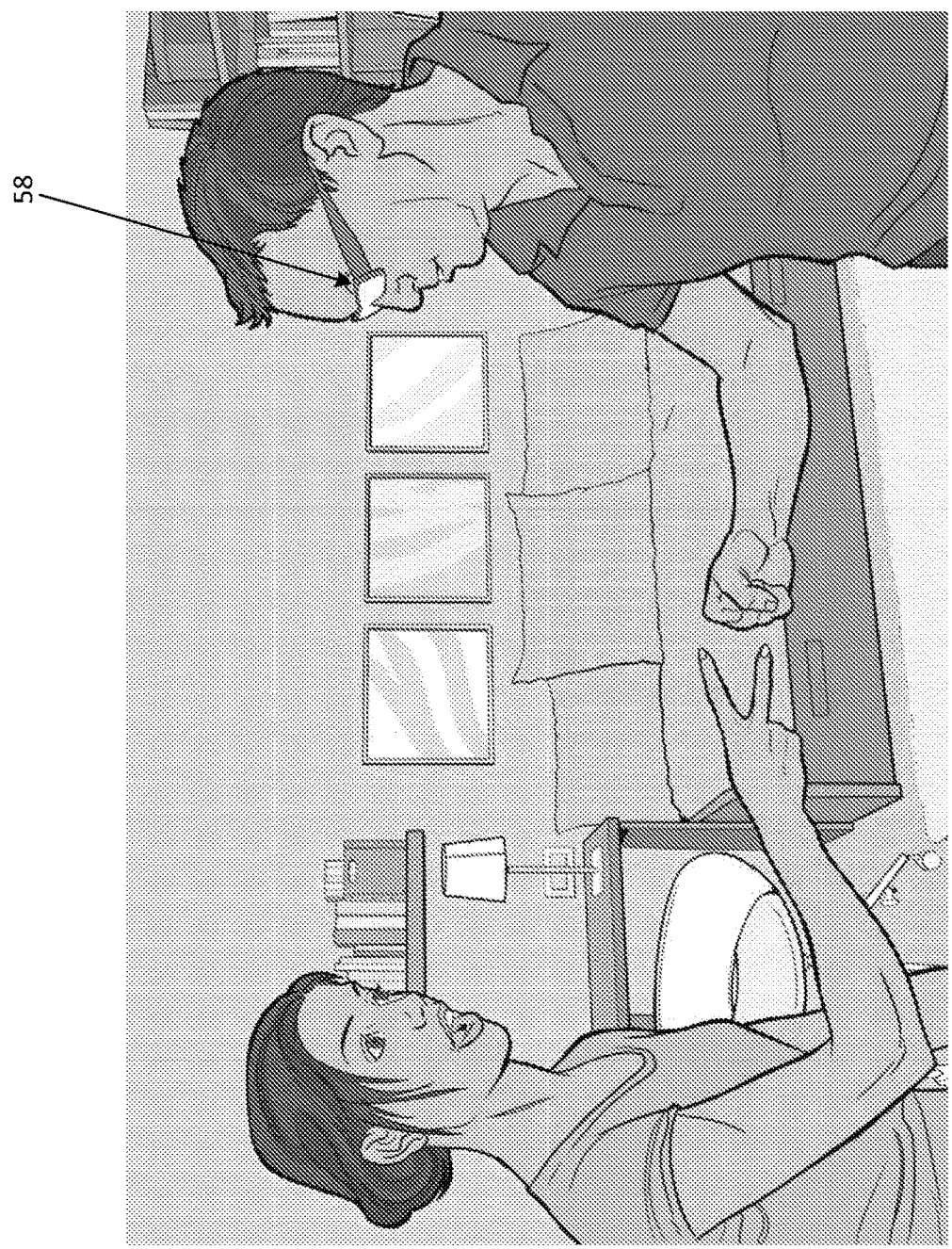
Figure 139C:
Figure 139D:
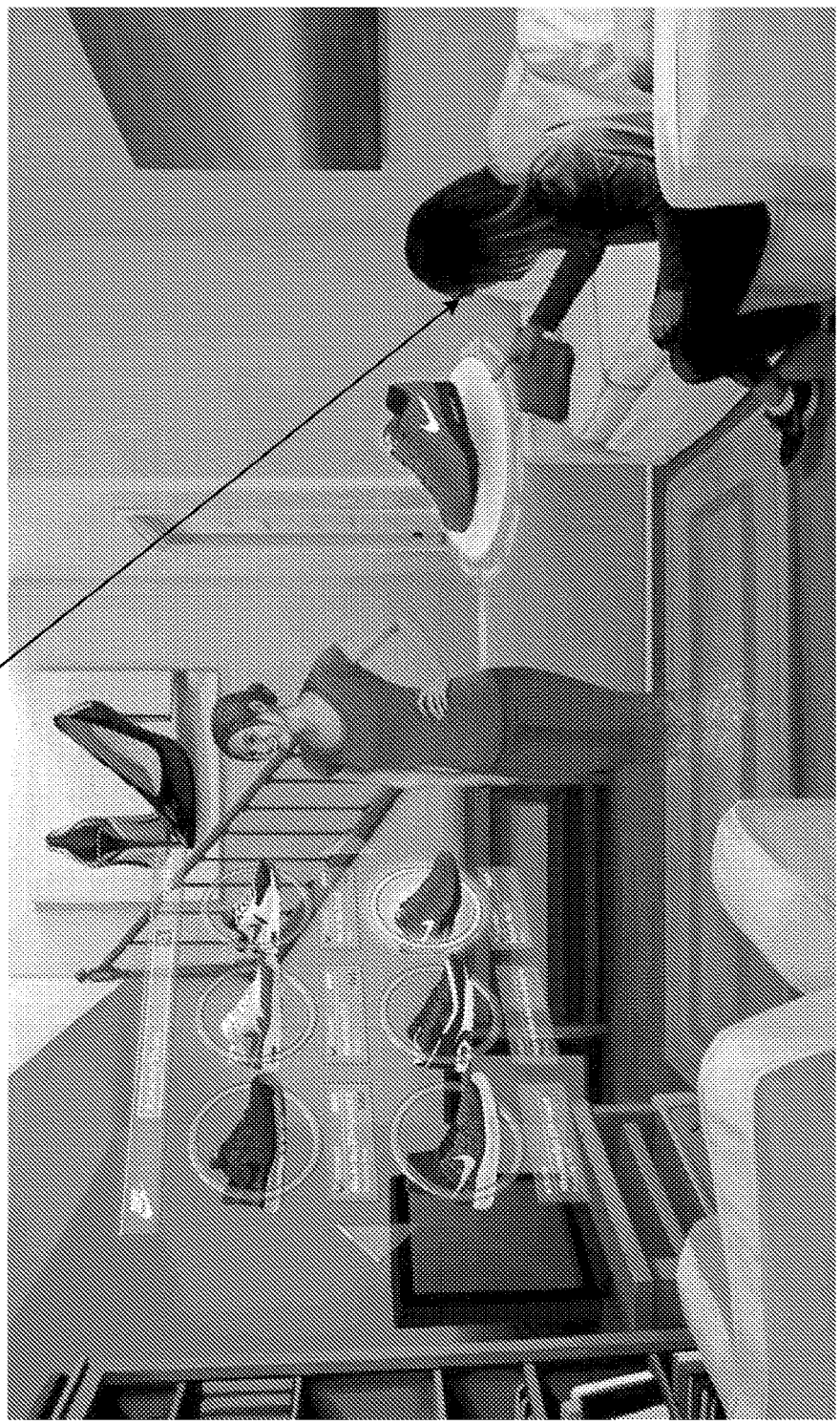
Figure 139E:
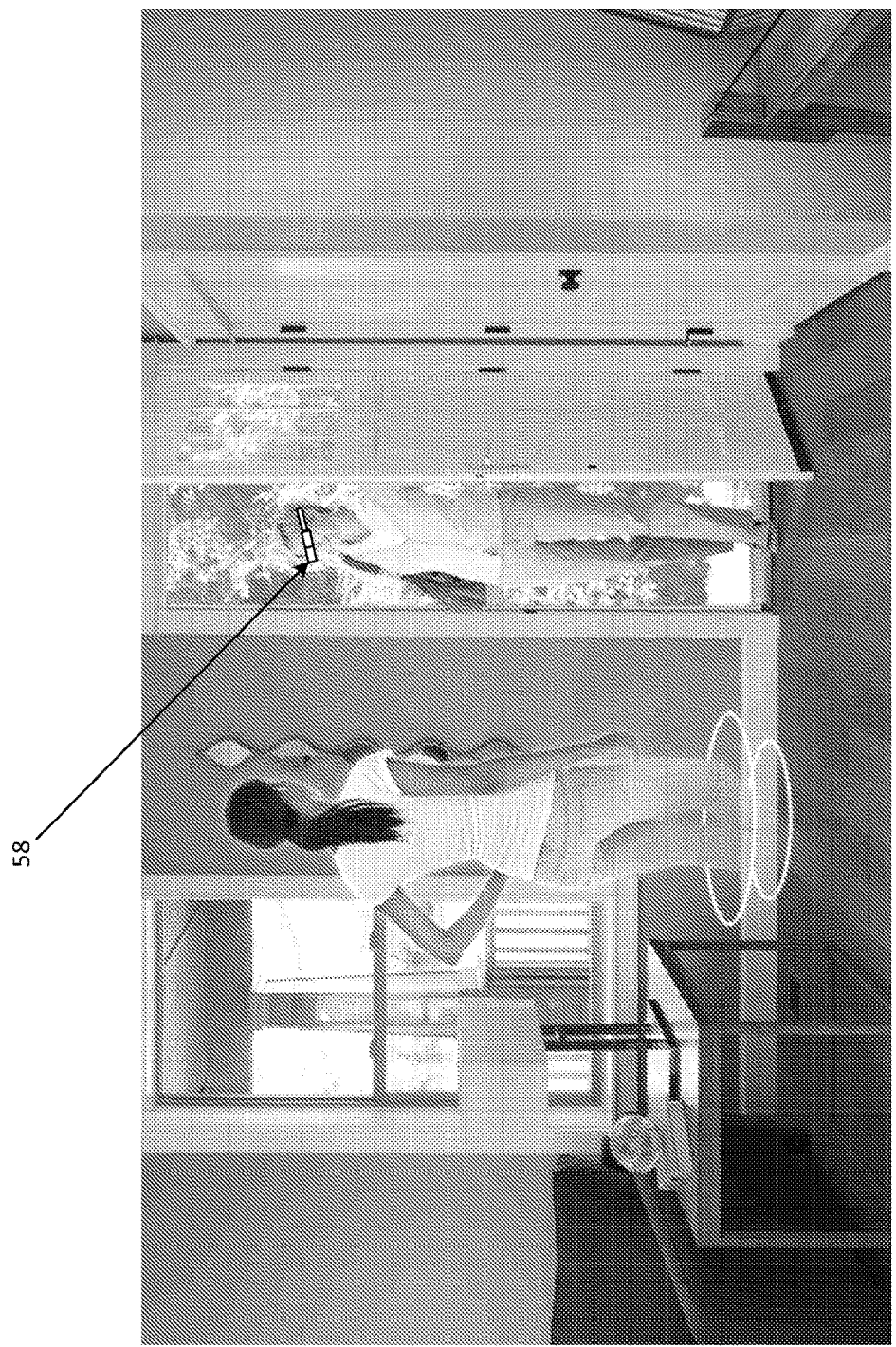
Figure 139F:
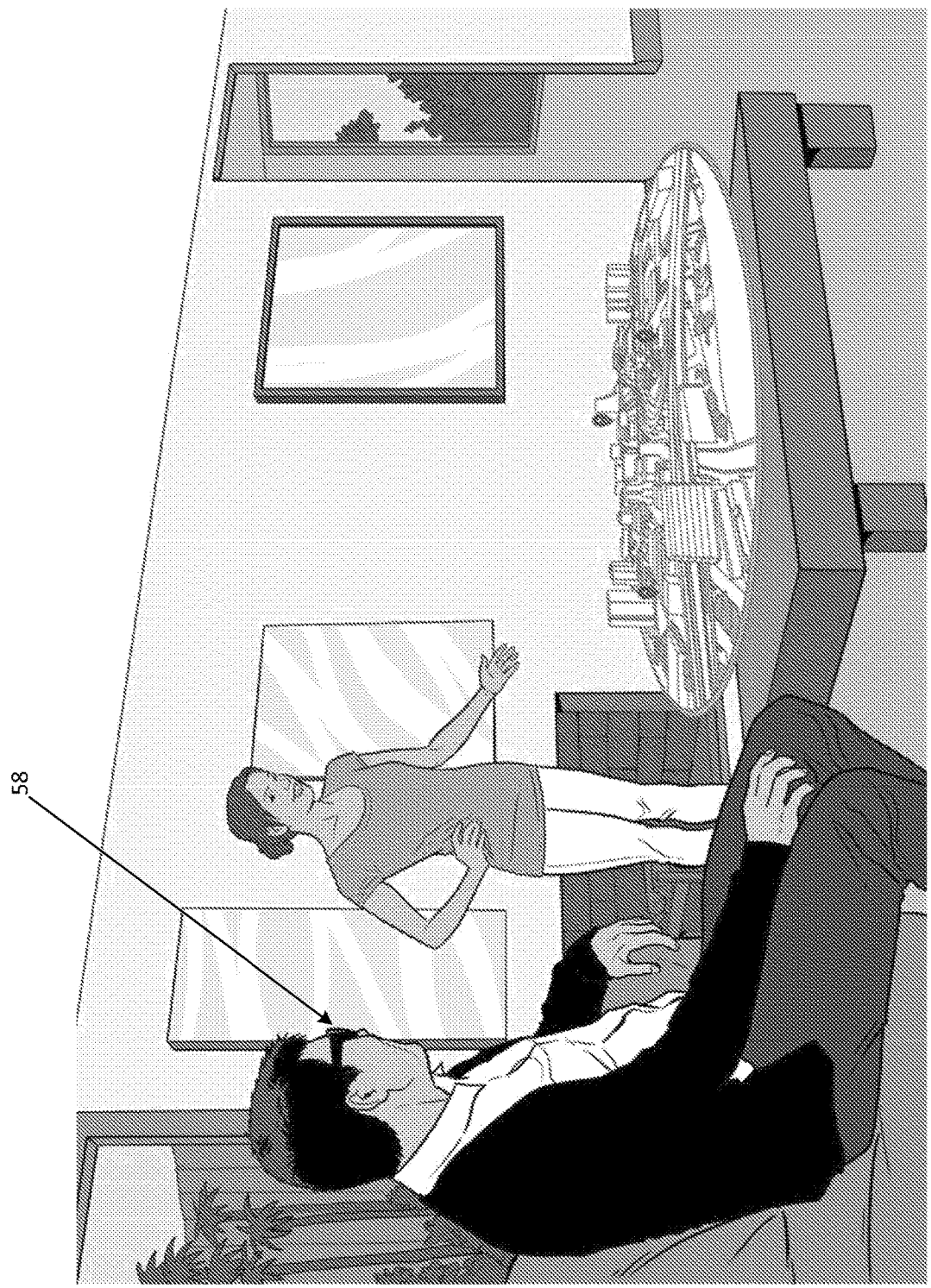
Figure 139G:
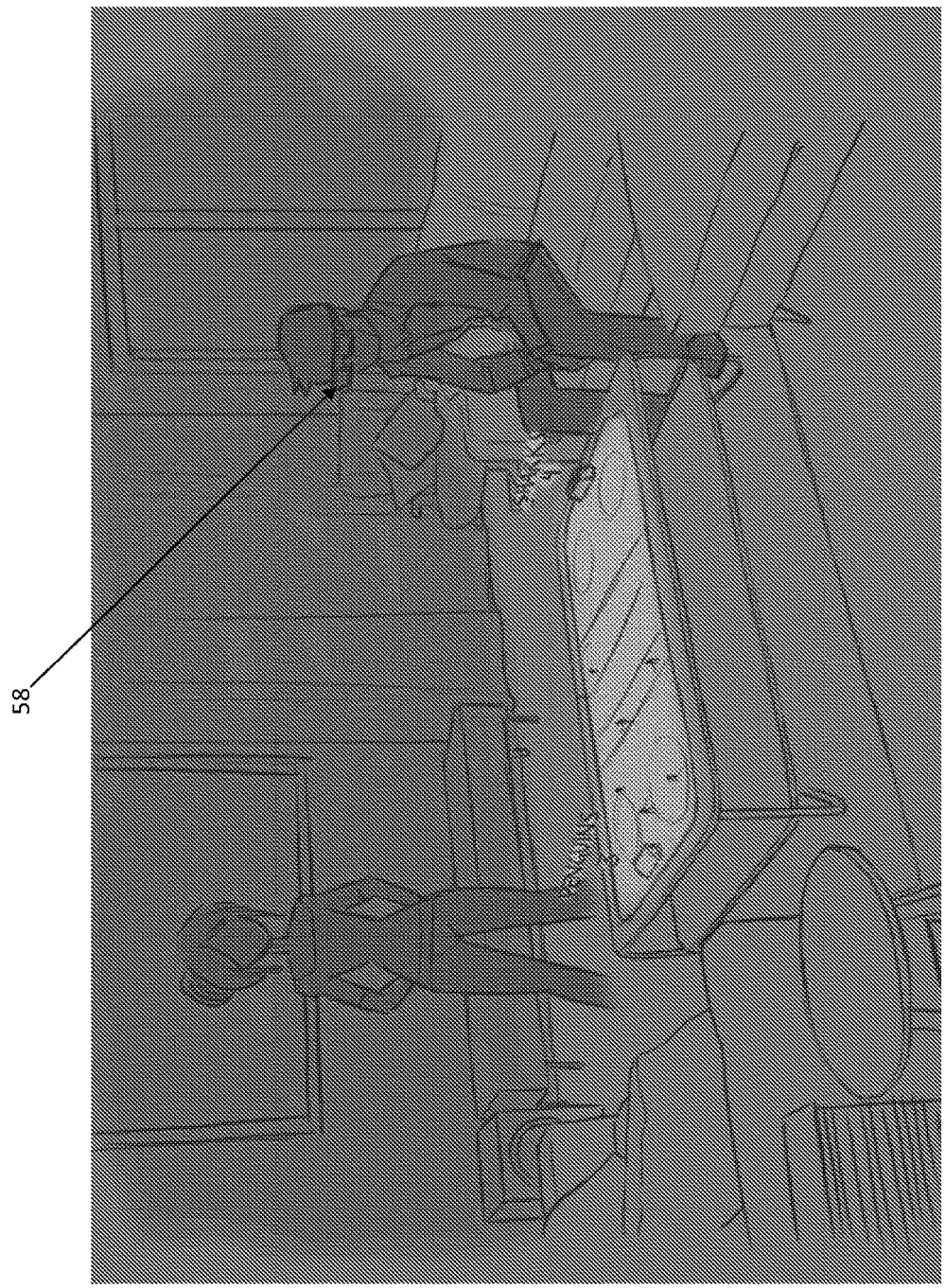

For example, referring to FIG. 139A, a user has selected a woman presentation configuration to be his or her digital assistant in virtual avatar form. The avatar may be configured to assist the user when in an environment with foreign language postings on signs, etc—such as by translating the signs and/or using the available information (such as information that the user is travelling, in an airport, trying to find an airline gate) to assist in successfully and efficiently navigating such a scenario; the feedback to the user from the avatar may be provided with or without audio, and in various visual configurations (for example, in various sizes, in various relative amounts of virtual screen "real estate", etc). Referring to FIG. 139B, a user wearing a head mounted system component (58) is shown engaging with his digital avatar to play a game. The user may decide through the system controls as to whether anyone else can see his avatar (e.g., if he wants to include certain information from his avatar as part of a "passable world" that is passable to one or more other users, or only him. Referring to FIG. 139C, in one embodiment, a family of users is seated in their living room observing their shared digital avatar presenting weather information pertinent to their day. Referring to FIG. 139D, in one embodiment, a user wearing a head mounted system component (58) is shown engaging with her digital avatar to shop online for running shoes. In such a configuration, the digital avatar may be configured to not only have a digital presence in the engagement with the user, but to also utilize connected resources (e.g., such as local or cloud based data resources regarding running shoes, application thereof, pricing thereof, local weather and terrain, known intentions of the user, etc) to assist the user in selecting the shoes. Referring to FIG. 139E, in one embodiment, a user wearing a head mounted system component (58) is shown engaging with her digital avatar as she arrives at her home. The avatar may be configured to appear when the user enters are particular room, and also to take into account various emotional cues from the user in configuring the presentation of the avatar for the user (for example, in one embodiment, the avatar system may be configured to note that the user's entire day has been over-scheduled, that the user has noted in other associated digital communications that it has been a "rough day" and that the user is "tired"; that it's raining and dark out, and that the user appears to have a frown on the user's face based upon sensor captures, such as via inward-facing cameras which observe various aspects of the user's face; in such embodiment, the system may be configured to present an avatar that welcomes the user home in a more attentive and sensitive way, with less affirmative chat, less presentation of problems as the initial communications, an initial statement of "sorry it's been a rough day", etc). Referring to FIG. 139F, in one embodiment, a user wearing a head mounted system component (58) is shown engaging with his digital avatar to find a place to eat dinner. The digital avatar has located several options and is presenting them to the user on a virtual map. In one embodiment, if the user does not want to go out for food, the avatar may be configured to order food to be delivered from the desired vendor, electronically pay for it, and have it presented at the user's front door. Referring to FIG. 139G, in one embodiment, a user wearing a head mounted system component (58) is shown engaging with his digital avatar to watch a hockey game that is being virtually presented in the form of an augmented overlay to the user's coffee table. The avatar may be configured to cheer for the user's side, for the other side, to simply be in the room and digitally accompany the user, to assist the user by ordering food, accomplish various tasks while the user watches the game (such as by only interrupting during commercial breaks or after a score), etc.

As noted above, system configurations such as those known as neural networks, deep networks, deep learning systems, and/or "artificial intelligence" systems may be utilized to assist in facilitating various functionalities of computing systems such as those described herein. Deep neural networks are universal function approximators. As such, the can be incorporated into any functional framework for visual environment understanding, perception, decision making, etc. In the framework of augmented or mixed reality, we may define a very sophisticated paradigm of computing interaction. Referring to FIG. 140, in one paradigm a system embodiment may be envisioned as comprising six parts, each of which in turn in implemented with various implementations and formulations of deep neural networks, ranging from simpler convolutional neural networks, to recurrent networks capturing the dynamics of processes, to deep reinforcement learning to help train and guide intelligent virtual avatars or agents. The six components of the illustrated paradigm may be termed:

1. MRRE—mixed reality ready environment
2. AC_V1—intro to avatar computing
3. AC_V2—intelligent avatars
4. AC_V3—Touring-complete avatar
5. ICP—immersive co-presence
6. VI—visualization of invisible (visualization of signals within the brain, such as during unconscious periods of sleep, that may pertain to thoughts/dreams of the user)

In the following sections we will describe these components in further detail.

1. MRRE—Mixed Reality Ready Environment:

The mixed reality ready environment consists of the 3-dimensional semantic world understanding as well as the environment illumination estimation. This may be referred to as "hydra" type functionality, as noted in the descriptions above.

1.1 Semantic World
Object Detection
Semantic Segmentation
DSLAM
Dense Mesh/3d Reconstruction
Eye Tracking/Iris ID/User Emotions
People Context
Location Context
1.2 Environment Illumination In one embodiment, all of these tasks may be solved in a unifying model to realize computational, power, and speed constraints. For example, by solving all tasks jointly, the required resources may be amortized and an efficient (such as from computational and power perspectives) solution may be achieved. Furthermore, by sharing features, e.g. intermediate representations, the model may achieve robustness and be able to generalize to novel and unseen contexts. Such a model may be implemented using variations of recurrent convolutional neural networks.

2. AC_V1—Intro to Avatar Computing.

Upon completion of MRRE, the subject system embodiment is able to integrate knowledge of the visual world (MRRE), state of the user (MRRE), and universal knowledge (for example, information from sources such as Google®, Facebook®, etc). First the state of the user and associated avatar may be defined.

User state: What/how are you (user) feeling?
Avatar definition:
Avatar Personality: Who is my avatar?
Avatar Kinetics: How do we map the avatar personality into the MR world representation?
Avatar reactions: How does the avatar answer your questions and assists your productivity?
Avatar Interaction:
a. Interaction by attention: How do you interact with the avatar in the MR world? (touching, looking, speaking, moving . . . )
Programmatic interaction: How do applications/content interact with avatars in the MR world?

The above 3 formulations facilitate integrating the physical environment with its semantic attributes with the users reaction and/or intent to provide the foundations of avatar computing. This may be achieved with both deep recurrent neural networks and deep reinforcement learning.

3. AC_V2—Intelligent Avatars.

Enhanced V1 avatar.

Avatar Duplication: How Avatars May Copy Themselves with Different Attributes and Interact with Each Other In one embodiment there may be physics-based interactions between a visually coherent virtual avatar and the real world. Through deep reinforcement learning and game theory, the avatar may be configured to navigate the environment it is in. Avatar may interact with the user or other avatars.

4. AC_V3—Touring-Complete Avatar.

An avatar may be configured to learn by example. In one embodiment it may be preferred to have many users, such as over 10 million.

Using Generative models, the avatar may be configured to learn enough of the physical world that it is able to adjust its appearance and behavior such that it becomes indistinguishable from other humans in the real world, in one embodiment without haptic feedback (in other embodiments, various haptics may be presented, such as through hand-held device components).

5. ICP—Immersive Co-Presence

Telepresence and Environment Mapping

Via remote sensors and deep generative models, even more sophisticated models of information transmission may be configured to provide deeper functionalities. For example, in one embodiment, recorded signals in a remote location may be the input to a generative model. The output may be a virtual representation of the remote physical content in the physical world of the user.

6. VI—Immersive Co-Presence.

Visualize and Interact with the Invisible. Replay Thoughts and Dreams.

In one embodiment, the ability to record and visualize thoughts, conscious and not (dreams), may be configured to greatly affect a user's cognitive abilities (both intelligence and creativity). Using both generative and discriminative deep learning models, activations of the human brain may be recorded with wearable sensors (EEG, MEG, wearable MRI), interpreted with discriminative models, and finally visualized by generative processes. Visual representation of various aspects of thoughts and dreams may be used to understand, share, and interact with a user's own thoughts and ideas.

We now provide some applications and and examples of applying such a paradigm to the world; these may be applied to the aforementioned embodiments and configurations, such as those featured in FIGS. 33-139G.

1. Navigation (Inputs May Include MRRE, GPS)

Global mapping and "Street View"® types of functionalities, driving functionalities, location marker functionalities, people marker functionalities 2. Communication (Inputs May Include MRRE, ICP, VI)

Telepresence, Translation (including but not limited to gesture-based sign language), Messaging, Emojis in mixed reality, Personal recognition, virtually "sticking" or anchoring things to people (such as virtual masks, sticky notes, comments, artwork, etc), Avatar chat functionalities 3. Entertainment (Inputs May Include MRRE, AC_V1, AC_V2)

Art, Media, Games, Theme Park, Theater, Music, 2d/3d mix

Sports

4. Work Environments (Inputs May Include MRRE, AC_V2, VI)

Mixed reality functionalities, such as those described above, pertinent to various work environments such as Architecture, Office, Engineering, Biology, Medicine, Techical (firefighters and other emergency responders, etc)

5. Shopping Functionalities (Inputs May Include MRRE, AC_V1)

Shopping functionalities for users at home, at the store, on the street (look-buy), Real Estate 6. Advertising Functionalities (Inputs May Include MRRE, AC_V1)

In-Home advertising, Billboard (Street), Kiosk, Restaurant (advertising specials etc), in stores, (all contextual).

7. Health-related functionalities (inputs may include MRRE, AC_V1, AC_V3)

Wellbeing, Medical, Preventative

8. Efficiency Functionalities for Daily Life of the User (Inputs May Include MRRE, AC_V1)

Home Management, Task Management, Finance

9. Education Related Functionalities (Inputs May Include MRRE, AC_V2, VI)

MR books, Music tuition, Game instruction, Cooking, Astronomy/Science/Art, etc.

10. Additional avatar-related functionalities (inputs may include MRRE, AC_V3, VI)—as noted above and described in relation to FIGS. 139A-140 and others.

11. Visualizing things that previously were invisible, such as signals detectable within the central nervous system of the user: (inputs may include MRRE, AC_V1, AC_V2, AV_V3, VI).

Referring to FIGS. 141 to 145, various additional embodiments of systems and configurations thereof involved in consumer purchasing are illustrated. In FIGS. 141-145, virtual content (e.g., AR or VR content) is triggered for presentation to users, such as children or parents. As will be described, sensors accessible to an augmented or mixed reality system (e.g., camera 124 described in FIG. 8) can trigger presentation of the virtual content. For example, FIG. 141 describes a camera reading a code, e.g., a QR code, and the system presenting virtual content associated with the code. As another example, FIGS. 142-145 describe wireless beacons, such as Bluetooth® beacons, that may trigger presentation of virtual content. For example, wireless receivers accessible to the augmented or mixed reality system can receive information from the Bluetooth® beacons, and present virtual content in response. As will be described, the received information can indicate network locations at which virtual content can be obtained. For example, the network locations can include a web address, such as an address of a server from which virtual content can be obtained, or the network location can indicate address, or identifying, information associated with the Bluetooth® beacon. In this way, the Bluetooth® beacon can push information to the system, for example network packets, or the system can request information from the Bluetooth® beacon. The sensors of the augmented or mixed reality system can thus monitor for QR codes or wireless beacons, and present virtual content to a wearer (e.g., a child, a parent, and so on). The features described below, with respect to FIGS. 141-145, can be applied to any of the Figures herein. For example, interactions of the child with respect to virtual content described in FIG. 141 can be applied to FIGS. 142-145, and so on. Also, while QR codes are described herein as an example of a code for triggering or unlocking virtual content, it will be appreciated that various embodiments may utilize other codes, which may be unique and identifiable by imaging the code or receiving the code via electromagnetic radiation. Consequently, the references herein to QR codes and Bluetooth® beacons will be understood to apply to other visible codes and other schemes for wireless transmitting information.

Referring to FIG. 141, an example flowchart for presenting virtual content is illustrated. The flowchart describes that a head mounted component, operatively coupled to other components of a subject augmented or mixed reality system, may be utilized in an enhanced scenario for unlocking content, e.g., in a gifting scenario. In one variation, a child, or other person, receives a packaged item (e.g., a toy), which may be a gift. The packaging may be colorful and detailed as with conventional toy packaging, but also may comprise or contain a QR code not visible to the child's head mounted component in the unopened package configuration. The child may open the packaging (plastic "blister" type of toy packaging, for example) to retrieve the toy, thereby visually exposing the QR code to the head mounted component worn by the child. The augmented or mixed reality system may read the QR code, for example utilizing one or cameras (e.g., camera 124 as described above in FIG. 8). Based on reading the QR code, the augmented or mixed reality system can present virtual content. Optionally, the augmented or mixed reality system may obtain images of an ambient environment periodically, for example after a threshold amount of time. The system can then analyze each image for indicia of QR codes. For example, the system can analyze pixel blocks for quick indicia of a QR code, such as alternating black and white colors, or indications of specific elements included in a QR code (e.g., position, alignment information). Advantageously, by detecting specific indicia that may form only part of the QR code, the system can determine whether a QR code is present in any image using reduced processing power.

Upon detecting indicia of a QR code, the system can process the QR code to decode included information. As an example of virtual content, the virtual content can comprise various virtual or augmented reality objects, and can be presented into the child's field of view as the child continues to wear the head mounted component. The virtual content may be tied to a particular theme of the toy, opportunities to engage in games related to the toy, opportunities to share aspects of the child's or some other user's passable world, and so on.

For example, the QR code can include (e.g., encode) information indicative of locations (e.g., network locations) at which AR or VR content can be obtained. The information may further indicate particular identifiers associated with AR or VR content stored at the network locations. A network location can indicate, for example, a server storing AR or VR content that can be obtained and presented via the augmented or mixed reality system. The augmented or mixed reality system may access the network location, for example through the Internet, and obtain the AR or VR content from one or more servers. The augmented or mixed reality system may connect to a local or wide area network, and obtain the AR or VR content via the network connection. Optionally, the augmented or mixed reality system may access a cellular modem (e.g., an LTE or 4G modem), and obtain the AR or VR content over a cellular content. Optionally, the augmented or mixed reality system may be in communication with a user device, such as a smart phone or tablet, and may obtain the AR or VR content through the user device. For example, the user device may have a network connection (e.g., a local area network connection, cellular connection, and so on), and the user device may obtain the AR or VR content. The augmented or mixed reality system may then obtain the AR or VR content from the user device, for example over a Bluetooth® connection, Near Field Communication connection, and so on. In some embodiments, the AR or VR content is stored locally on the AR or VR system (e.g., the local processing and data module 70, FIG. 2A).

Optionally, the augmented or mixed reality system can provide identifying information associated with the augmented or mixed reality system in a request to the network location. Example identifying information may include user account information, a private key or authentication code, and so on. With respect to the example of user account information, a server accessible at the network location may verify whether a user account has been created, and if not, may cause presentation via the system of virtual content associated with creating an account. As an example, a particular toy may be a toy rocket. Upon verification of the user account, user profile information may be updated to reflect access to the VR or AR content. As will be described, the VR or AR content may include other rockets flying in a real-world environment. The child, or other person, operating the toy rocket may be required to create user account information such that his/her gameplay information may be stored. For example, particular goals or achievements obtained by the child may be recorded in the user account information. With respect to the example of a private key or authentication code, a server accessible at the network location can confirm an authenticity of the augmented or mixed reality system. Optionally, the server at the network location may be operated by a third party, for example a company associated with the toy. In this case, the server may provide information to an authentication system which can respond to the server indicating whether the augmented or mixed reality system is authorized to receive VR or AR content. In this way, access to the VR or AR content may be constrained to authorized devices, such that other user devices (e.g., smart phones, tablets, laptops, and so on) may be unable to access the VR or AR content.

In one embodiment, upon opening a rocket toy, the child user may be able to see other virtual rockets in AR or VR space around his environment, and may be able to use his handheld rocket to control certain features of the AR or VR-presented images. For example, the actual rocket held in the hand of the child user may be configured to function along with the mixed reality system as a master input device for guiding one or more aspects of the presentation of other AR or VR rockets being presented. That is, the child user may be able to steer such other AR or VR rockets by steering the rocket in his hand.

The AR or VR presented virtual content may be presented in focus at discrete depths from the child. For example, and as described at least in FIG. 146 below, the augmented or mixed reality system may comprise a plurality of waveguides each configured to present virtual content to the child. Each waveguide may present virtual content with particular wavefront divergence associated with a particular focus distance (e.g., a particular depth from the child). In this way, the virtual content may appear to be located at discrete depths from the child. Thus, with respect to the AR or VR rocket content described above, the rockets may appear to be realistically moving in an ambient environment and realistically being adjusted in depth from the child. Optionally, the augmented or mixed reality system can identify, or determine, a depth at which the child is fixating prior to the QR code being read. For example, the system can identify, or determine that the child is fixating at a plane extending along the X and Y directions, with the plane being at a particular depth from the child. The augmented or mixed reality system can then select a waveguide associated with the depth. For example, the waveguide can present virtual content with wavefront divergence corresponding to the depth. The virtual content can then be presented via the selected waveguide. As the child adjusts fixation, for example adjusts a depth at which the child is looking, the selection of a waveguide can be updated to correspond to the depth. Examples of determination where a user is fixating (e.g., a child, parent, and so on) are described below.

Optionally, the AR or VR content obtained in response to reading the QR code may include metadata associated with its presentation. As an example, the metadata can include information describing presentation of virtual content. For example, the metadata can indicate that virtual content is to be presented in focus at a specific depth from the child. The metadata can further indicate triggers associated with presentation of the virtual content. For example, particular virtual content can be presented to the child upon satisfaction of a trigger. Example triggers can include the child viewing a particular visual feature, such as a door, open space, dark hallway, table, and so on. The virtual content can then be presented on, within, or adjacent, to the visual feature. Example triggers can further include particular actions of the child. For example, virtual content can be triggered based on the child moving his/her body, hands, or arms, in a particular way. The system can utilize one or more cameras to obtain images or video of the ambient environment, and can detect movement of the child within the field of view of the cameras. Additionally, the child can utilize input devices, and virtual content can be triggered based on specific input to the input devices. As an example, the system can read the QR code and obtain virtual content (e.g., as described above). The system can then determine a time at which the child performs an action, such as picking up a printed manual from the toy box, looking away from the toy box, moving his/her hands within the field of view of a camera (e.g., a rocket, as described above, can be presented upon the system identifying the child's hands), and so on. Based on the determination, the system can present at least a portion of the presented virtual content. In this way, virtual content may be tied to a real-world ambient environment of the child.

Optionally, a QR code may be printed, or otherwise visible, on a toy box or other surface (e.g., a wall, poster, and so on). In this embodiment, the augmented or mixed reality system can detect the QR code, for example at a distance, and obtain virtual content for presentation. Based on a distance from the system to the QR code (e.g., a distance along a Z direction, such as the depth of the system from the QR code), the augmented or mixed reality system can select a particular waveguide (e.g., as illustrated in FIG. 146) to output the virtual content. For example, the virtual content can be presented in focus at a depth associated with the distance to the QR code. To determine the distance to the QR code, the system can access information indicating a size of the QR code. For example, QR codes can be of a same size, or of a threshold number of sizes with each size being visually identifiable (e.g., each size may be a particular color). As another example, the QR code itself can indicate dimensions of the QR code. As another example, the system can utilize stereo cameras to estimate a size of the QR code. The system can thus identify a size of the QR code as imaged by one or more cameras of the system, and determine a distance based on the identified size. In this way, as the child moves closer to the QR code, the presentation of the virtual content can be output by differing waveguides to keep the virtual content in focus. That is, accommodation and vergence cues associated with the presented virtual content can be adjusted as the child moves closer to, or away from, the QR code. Additionally, a size of the virtual content can increase as the child moves closer to the QR code. As an example, a child may be in a store wearing the augmented or mixed reality system. The child can view a QR code next to a particular product of interest. In response, the system can present virtual content related to the particular product (e.g., a bear or other animal peeking out from behind a shelf, and so on). As the child moves closer to the QR code, the virtual content can increase accordingly (e.g., linearly).

Referring to FIG. 142, in another embodiment, rather than having a QR code as an activation gateway for certain AR, VR, or mixed/augmented reality system functionality, a wireless transmitter (e.g., a Bluetooth® transmitter, such as a Bluetooth® low-energy transmitter, a Near Field Communication transmitter) may be utilized. In this embodiment, the wireless transmitter may be configured to initiate transmitting according to one or more triggers. An example trigger may include a child, or other person, facilitating power input to the wireless transmitter. For example, the child, or other person, may pull a tensile element within product packaging which may then cause a battery to form an electrical connection with the wireless transmitter. The wireless transmitter can then transmit information to the augmented or mixed reality system, such as stored virtual content to be presented by the system. For example, the wireless transmitter can provide wireless information to the system. As another example, the wireless transmitter can establish a wireless connection with the system (e.g., with a wireless receiver of the system). Additionally, the wireless transmitter can provide one or more network locations at which virtual content is accessible. The system can request virtual content from these network locations.

Referring to FIG. 143A, in one embodiment, a child or other head mounted component/mixed reality system user may be moving through a toy store that has toys on shelves. Toy packaging for a particular product may be colorful and detailed as would be conventional, but the packaging may also contain a wireless transmitter, such as a Bluetooth® low-energy transmitter, configured to be operatively coupled to a power supply (such as a battery) which gives the transmitter a relatively long transmission life—such as two years or more. While the child/user is far enough away from the transmitter/beacon, there is no specific activity of the augmented or mixed reality system, but as soon as the child/user comes into range (e.g., within a threshold distance, for example based on a signal strength being greater than a threshold), the child/user's proximity to the transmitter/beacon exposes transmissions to the head mounted component and operatively coupled mixed reality system components. In this way, the mixed reality system may be configured to identify the transmitter and be configured to present various virtual content (such as AR or VR content tied to the theme of the toy, opportunities to engage in games or share augmented/passable worlds or components thereof with other players, and the like) into the child/user's field of view as the child/user continues to wear the head mounted component.

The augmented or mixed reality system can determine a strength (e.g., a signal strength) associated with the wireless transmitter, and estimate a depth of the system from the wireless transmitter. For example, the depth can indicate that the wireless transmitter is located on a plane extending along the X and Y directions, with the plane being set at the depth from the system. Based on the depth, the augmented or mixed reality system can select a waveguide at which to output virtual content. That is, the system can identify a depth from the user at which the virtual content is to appear in focus. The system can then present the virtual content with wavefront divergence corresponding to the estimated depth. Additionally, a size of the virtual content can be adjusted based on the estimated depth. Optionally, the augmented or mixed reality system can identify, or determine, a depth at which the user is fixating. The augmented or mixed reality system can then select a waveguide associated with the depth. For example, the waveguide can present virtual content with wavefront divergence corresponding to the depth. Examples of determination where a user is fixating (e.g., a child, parent, and so on) are described below.

In the scenario of a shopping child, a nearby parent, also wearing a connected wearable component in range of the transmitting toy packaging, may also receive transmitted information and be able to receive product information and/or pay to purchase the toy, thereby enabling the child to walk away from the toy store with the toy—or to receive the toy at a shipping address. For example, the parent can be presented with interactive virtual content associated with checking out, and paying for the toy. The parent can accept payment, and the parent's credit card or otherwise payment instrument can be automatically charged. Upon payment, optionally the child can be presented with virtual content indicating the child can take the toy. In this way, a required number of interactions to obtain the toy can be reduced. Thus, efficiency associated with user interfaces, and user input, to check out can be increased. That is, the parent can move his/her hand in a particular way to indicate that payment is to be processed. For example, the parent can point at virtual content indicating payment. This sole step can optionally cause payment to be automatically processed, thus improving the checkout process and interfaces associated with payment. As illustrated in FIG. 108A-108B, the parent can further view virtual content associated with their payment instrument. For example, a list of recent purchases, an amount spent, and so on, can be easily viewed during this checking out process described above.

With such embodiments wherein storefronts become more showroom than inventorying/transferring facility, inventory may be centralized in other locations and the logistics and fulfillment may become much more efficient. For example, less goods inventory may be present for purchase or transfer at each storefront. As another example, users can shop at the storefront and receive the goods through the mail.

In another illustrative example of information sharing of virtual content based on activation gateway recognition, FIGS. 143B-C illustrate a method of interacting between multiple users upon a first user viewing certain content. In many content consumption scenarios, certain users are drawn to fewer aspects than the entire content production may put forth. For example, some users prefer certain celebrities, news stories, sporting events, etc. Entire companies and markets are dedicated to curating content based on users' subjective interests.

In some embodiments, the system described herein further distills specific content for individual consumption. In some embodiments, the content that a first user is viewing or interacting with may be shared with a second user that shares an interest in that content. Similar to the method described above with reference to FIG. 143A, some embodiments share content upon an activation gateway protocol with a sharing interface. Such a sharing interface may act as an intermediary to prevent direct user-to-user interaction, but still allow multiple users to view one another's contact. Security of personally identifiable information or other benefits may be realized in this setting.

In some embodiments, an activation gateway, or cue for eligible shared content, is sent to a content sharing interface. Prompts to initiate an activation gateway may include a QR code as described above or some other fiducial marker, or be an audio stream by the content (for example, an announcement in a virtual sports game may indicate that a certain athlete is performing), or a timestamp in an image frame that when viewed by a user embeds metadata containing an activation code. These may be described as passive activation gateways, in that the camera's (124) mounted to head mounted wearable (58) may detect the presence of the activation gateways without the user being aware. In some embodiments, the first user may send an activation gateway irrespective of an observed cue. For example, a user may be at the Grand Canyon and transmit an activation code for other users to share the view.

The content sharing interface receives the activation gateway and may transmit the same to a plurality of second users. Transmission may be active, such as sending notice to users that have specifically indicating interest in the content related to the activation gateway (i.e. a subscription type service to curate for certain content). Transmission may also be passive, such as simply posting the activation gateway status to a messaging board or similar forum, permitting viewers to browse and select activation gateways.

Upon acceptance of an activation by at least one second user, the content sharing interface may, as illustrated in FIG. 143B, begin receiving virtual content as viewed by the first user and in turn transmit that content to the second user for consumption. In such embodiments, the content sharing interface may be thought of as a relay or repeater station for virtual content viewed by the first user to a plurality of second users. In some embodiments, as illustrated in FIG. 143C, the content sharing interface may simply provide credentials, such as an IP address or similar telecommunications address otherwise, for connecting the second user and the first user directly to enable the second user to view the first user's content.

Embodiments described with reference to FIGS. 143B-C may permit a first video game player that is reaching a certain portion of a game and wants to play with additional players to send a notice that the first player is at a certain level and the content sharing interface may invite others to join to play if they want to play the game at that instance; alternatively, a first player that is advancing to a particular difficult stage of a game or approaching certain scores may send activation gateways out to invite second user (i.e. second players) to view the first player's progress.

Embodiments in sporting events are similar. A first user viewing a game may send an activation gateway when certain athletes are playing, or when certain milestones are occurring (such as a football team being "in the red zone," or a basketball player scoring a succession of points).

FIGS. 143D-E illustrate embodiments performing the initial steps in reverse protocol to FIGS. 143B-C. In these embodiments, a first user requests activation gateways related to certain content (a content "pull" as opposed to the content "push" of FIGS. 143B-C). A first user may want to see particular content and request an activation gateway among at least one second users that may have access to such content. For example, a first user may want to see a street level view of Times Square on New Years Eve, or skydiving in progress, the user can request a relevant activation gateway to the content sharing interface, which can then aggregate available activation gateways from second users associated with that content. The pairing protocols may then follow that of FIG. 143B or 143C.

Referring to FIG. 144, in another embodiment, a parent may be able to purchase a gift experience for a child who has a connected head mounted component such that when the child puts on or engages his/her mixed reality system after the purchase has been completed, the child will receive a notification (such as by an AR or VR notification, such as a textual feature, a thematic AR or VR feature such as a flying rocket or flashing alarm, by an audio notification, and so on) of this gift experience, and be able to engage in it. The parent may be notified automatically that the child has received the gift, such as by email or by the parent's mixed reality system, and may be invited via passable world to join in the gift experience, rank the experience, pay for upgrades, etc.

Referring to FIG. 145, in another embodiment, a consumer moving through a store environment wearing a connected head mounted component may encounter packaging or a product itself which comprises a transmitter or beacon, such as a Bluetooth® low-energy transmitter or beacon, or an NFC transmitter, and an associated marketing infrastructure may be configured to present virtual content regarding particular products based upon configurable settings which may be designed to direct and prioritize attention to specific products. For example, one manufacturer may choose to pay additional consideration into a vending infrastructure so that AR or VR features and/or audio will become visible to shoppers who are anywhere within 50 feet of the object. For example, in such scenario it's likely that consumers wearing connected head mounted systems may become distracted away from what they are examining and toward the object associated with the AR or VR presentation through the wearable computing infrastructure. In another embodiment, users may be able to pay additional consideration themselves to make sure that certain vendor presentations do not enter their field of view, that certain audio functions become muted, that objects beyond a certain geometric proximity to the user not be highlighted, that advertising information not be presented, etc. Thus markets may be created for not only showing additional information, but also shunting, filtering, or blocking various aspects of such information.

In the embodiments of FIGS. 141-145, a child or parent utilizing the augmented or mixed reality system may have associated user profile information. The user profile information can include customized settings associated with presenting virtual content. For example, a setting can specify that only particular types of virtual content are to be presented based on the system reading a QR code or receiving information from a wireless transmitter. Thus, the parent can specify that the child is not to be presented with virtual content from toys, specific types of toys, or other virtual content that may not be appropriate for an age of the child. Additionally, a customized setting can indicate a preference as to obtrusiveness of the virtual content. For example, the setting can constrain a size associated with the presented virtual content in the child or parent's field of view. As another example, the setting can constrain a number of virtual objects presented. As a child or parent walks about a store, virtual content associated with a single QR code or wireless beacon can be presented to the child or parent. For example, the augmented or mixed reality system can determine a depth at which the child or parent is fixating (e.g., based on sensors, such as cameras, pointed at the child or parent's eyes, the system can identify where vectors extending from a center, or foveal region, of the eyes would intersect in three-dimensional space and identify a depth, from the system, to the intersection; based on an outward facing sensor or camera pointing at a particular QR code, or based on a signal strength associated with a particular wireless transmitter in a line of site of the system being highest). The augmented or mixed reality system can present virtual content associated with the QR code or wireless transmitter associated with the depth.

Additionally, virtual content may be stored on, or locally accessible to (e.g., over a wired or wireless connection), the augmented or mixed reality system. For example, the system can read a QR code (e.g., as described above), and the QR code can indicate virtual content. For example, the QR code can specify a name, code, hash value, and so on, that identifies virtual content. The system can identify whether it has stored (e.g., in local memory, such as in non-volatile memory), or whether it has local access to, the indicated virtual content. Similarly, a wireless transmitter can provide information identifying particular virtual content, and the system can identify whether it has stored, or has local access to, the indicated virtual content. In this way, the augmented or mixed reality system can present indicated virtual content without requiring network access. If the augmented or mixed reality system does not have the virtual content stored, the system can request (e.g., from one or more network locations as described above) access to the virtual content.

Optionally, the augmented or mixed reality system can pre-load virtual content, such that based on reading a QR code, or being proximate to a wireless transmitter, the system can present the pre-loaded virtual content. For example, user account information can indicate content preferences, and/or interests, of a child or parent. Thus, the system can pre-load virtual content relevant to the child ore parent, such that the system can advantageously present virtual content without requiring bandwidth usage, and increased latency, of accessing network locations. As an example, a toy may be indicated as being relevant to a child (e.g., relevant to the interests of the child, relevant to previously purchased toys, relevant to toys for which the child has viewed or requested virtual content, and so on).

The augmented or mixed reality system can thus pre-load virtual content associated with the toy. Additionally, if a parent has already purchased a toy for a child, or if a parent expresses interest in the toy (e.g., searches for the toy on a search engine, reads reviews related to the toy, views virtual content for the toy, and so on), the child's or parent's system can pre-load virtual content associated with the toy. Virtual content can be periodically pre-loaded onto the augmented or mixed reality system. For example, one or more outside systems (e.g., content servers) may push (e.g., via a network request, such as an HTTP request) virtual content for storage onto the augmented or mixed reality systems (e.g., based on user account information as described above). As another example, the augmented or mixed reality systems can periodically request virtual content to be pre-loaded from the outside systems). Optionally, the augmented or mixed reality system can store the user account information, and identify virtual content of interest to a child or parent. The augmented or mixed reality system can then request the identified virtual content from the outside systems. The augmented or mixed reality system can discard virtual content from local storage to free up space for new virtual content. For example, the system can discard stored virtual content according to an age of the virtual content, whether the parent or child has already purchased a toy or product associated with the virtual content (e.g., based on user account information as described above), and so on.

Example Augmented or Mixed Reality System

As described above, the augmented or mixed reality system may present virtual content at different depths from a user wearing the system. For example, accommodation and vergence cues associated with the presented virtual content may correspond to particular depths from the user. In some embodiments, the augmented or mixed reality system may comprise one or more waveguides that output virtual content to the user. An example waveguide assembly 4678 will be described below, which is further described in U.S. patent application Ser. No. 14/555,585 and which, as described above, is incorporated herein by reference in its entirety.

FIG. 146 illustrates a stacked waveguide assembly (4678) that may be utilized to provide three-dimensional perception to the eye/brain by having a plurality of waveguides (4682, 4684, 4686, 4688, 4690) and a plurality of weak lenses (4698, 4696, 4694, 4692). Optionally, in combination or in addition to the weak lenses, diffractive elements may be utilized. The augmented or mixed reality system described above may include the stacked waveguide assembly 4678, and the assembly 4678 may be configured to send image information to the eye 4658 with various levels of wavefront curvature for each waveguide level indicative of focal distance to be perceived for that waveguide level. A plurality of displays (4602, 4604, 4606, 4608, 4610), or in another embodiment a single multiplexed display, may be utilized to inject collimated image information into the waveguides (4682, 4684, 4686, 4688, 4690), each of which may be configured, as described above, to distribute incoming light substantially equally across the length of each waveguide, for exit down toward the eye.

The waveguide (4682) nearest the eye is configured to deliver collimated light, as injected into such waveguide (4682), to the eye, which may be representative of the optical infinity focal plane. The next waveguide up (4684) is configured to send out collimated light which passes through the first weak lens (4692; e.g., a weak negative lens) before it can reach the eye (4658); such first weak lens (4692) may be configured to create a slight convex wavefront curvature so that the eye/brain interprets light coming from that next waveguide up (4684) as coming from a first focal plane closer inward toward the person from optical infinity. Similarly, the third up waveguide (4686) passes its output light through both the first (4692) and second (4694) lenses before reaching the eye (4658); the combined optical power of the first (4692) and second (4694) lenses may be configured to create another incremental amount of wavefront divergence so that the eye/brain interprets light coming from that third waveguide up (4686) as coming from a second focal plane even closer inward toward the person from optical infinity than was light from the next waveguide up (4684).

The other waveguide layers (4688, 4690) and weak lenses (4696, 4698) are similarly configured, with the highest waveguide (4690) in the stack sending its output through all of the weak lenses between it and the eye for an aggregate focal power representative of the closest focal plane to the person. To compensate for the stack of lenses (4698, 4696, 4694, 4692) when viewing/interpreting light coming from the world (4600) on the other side of the stacked waveguide assembly (4678), a compensating lens layer (4680) is disposed at the top of the lens stack to compensate for the aggregate power of the lens stack (4698, 4696, 4694, 4692) below. Such a configuration provides as many perceived focal planes as there are available waveguide/lens pairings, again with a relatively large exit pupil configuration as described above. Both the reflective aspects of the waveguides and the focusing aspects of the lenses may be static (e.g., not dynamic or electro-active). In an alternative embodiment they may be dynamic using electro-active features as described above, enabling a small number of waveguides to be multiplexed in a time sequential fashion to produce a larger number of effective focal planes.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A display system comprising:
    a head-mounted augmented reality display device configured to be worn by a user, and configured to present virtual content to the user;
    one or more sensors; and
    one or more processors, and computer storage media storing instructions that when executed by the display system, cause the display system to perform operations comprising:
        obtaining information, detected via the sensors of the system, identifying an optical code within a field of view of display system or a wireless transmitter proximate to the display system, wherein the optical code or wireless transmitter trigger access to virtual content;
        accessing user profile information associated with the user, the user profile information including customized settings associated with presentation of virtual content, wherein the customized settings are set by the user, and wherein the customized settings include: one or more types of virtual content which are disallowed for presentation to the user; a maximum size associated with presented virtual content; and a maximum number of virtual objects presented at a same time to the user;

estimating a depth of the optical code or the wireless transmitter, the depth representing an estimated distance of the display system to the optical code or wireless transmitter;

obtaining, via the triggered access, virtual content to be presented via the system, the virtual content being presented as augmented reality content visible within an ambient environment, wherein the ambient environment includes a real-world object which is detectable by the processors via the sensors and is associated with the virtual content, and wherein the obtained virtual content is indicated as being allowable for presentation based on the customized settings;

selecting a depth plane of a plurality of depth planes at which to present the virtual content, the depth plane selected based on the estimated depth of the optical code or the wireless transmitter, and the depth plane corresponding to the estimated depth; and presenting, via the augmented reality display device, the virtual content at the selected depth plane in accordance with the customized settings, wherein the real-world object is configured as an input device, and wherein movement of the real-world object causes corresponding movement of the virtual content as presented at the selected depth plane.

2. The display system of claim 1, wherein a particular sensor of the one or more sensors is a camera.

3. The display system of claim 2, wherein the optical code is a QR code, and wherein triggering access to virtual content comprises:

identifying, based on images obtained via the camera, the QR code; and determining identifications of one or more network locations encoded in the QR code, wherein the network locations store the virtual content.

4. The display system of claim 2, wherein the optical code is a QR code, and wherein the estimated depth is based on a size associated with the QR code as included in one or more images obtained by the camera.

5. The display system of claim 1, wherein a particular sensor of the one or more sensors is a wireless receiver.

6. The display system of claim 5, wherein triggering access to virtual content comprises:

identifying, based on the wireless receiver, wireless information being provided via the wireless transmitter; and determining one or more network locations specified in the wireless information, wherein the network locations store the virtual content.

7. The display system of claim 1, wherein triggering access to the virtual content comprises triggering access to a network location, and wherein the network location indicates a server at which the virtual content is stored, or wherein the network location indicates access to the wireless transmitter, and wherein the wireless transmitter stores the virtual content.

8. The display system of claim 1, wherein triggering access comprises:

obtaining identifying information associated with virtual content; and accessing internal memory, and identifying storage of the virtual content.

9. The display system of claim 8, wherein virtual content is pre-loaded onto the display system based on user account information associated with the user, the user account information indicating virtual content of interest to the user.

10. The display system of claim 9, wherein virtual content is periodically pre-loaded onto the display system, and wherein the display system is pushed virtual content, from one or more outside systems, for storage, or the display system requests virtual content, from the one or more outside systems, to be pre-loaded.

11. The display system of claim 1, wherein the display device comprises:

a plurality of stacked waveguides forming a display area and providing a view of an ambient environment through the display area, wherein at least some waveguides of the plurality of waveguides are configured to output light with different wavefront divergence than other waveguides, each waveguide being associated with a depth plane at which virtual content appears in focus.

12. The display system of claim 11, wherein presenting the virtual content comprises:

selecting a waveguide to output the virtual content; and
presenting, via the selected waveguide, the virtual content.

13. The display system of claim 12, wherein selecting a waveguide comprises selecting the waveguide associated with the selected depth plane.

14. The display system of claim 1, wherein presenting the virtual content comprises:

identifying satisfaction of a trigger, and presenting the virtual content, wherein a trigger comprises a particular action performed by a user.

15. The display system of claim 14, wherein identifying satisfaction of a trigger comprises one or more of:

identifying that a particular visual feature is within a field of view of the display system, obtaining particular input via an input device in communication with the display system, or identifying particular movement of the user.

16. The display system of claim 15, wherein identifying satisfaction of a particular trigger comprises identifying that an arm or hand of a user has performed particular movement.

17. The display system of claim 1, wherein the operations further comprise:

updating the estimated depth of the optical code or the wireless transmitter; and updating selection of a depth plane of the plurality of depth planes at which to present the virtual content.

18. An augmented reality display device configured to be worn by a user and present virtual content in an ambient environment of the user, the augmented reality display device comprising:

a plurality of stacked waveguides forming a display area and providing a view of the ambient environment through the display area, wherein at least some waveguides of the plurality of waveguides are configured to output light with different wavefront divergence than other waveguides, each waveguide being associated with a depth at which virtual content appears in focus;

one or more cameras configured to obtain images of the ambient environment; and one or more processors configured to:
- obtain at least one image of the ambient environment, the at least one image being determined to include a QR code, wherein the ambient environment includes a real-world object which is detectable by the processors via the cameras;
- access user profile information associated with the user, the user profile information including customized settings associated with presentation of virtual content, wherein the customized settings are set by the user, and wherein the customized settings include: one or more types of virtual content which are disallowed for presentation to the user; a maximum size associated with presented virtual content; and a maximum number of virtual objects presented at a same time to the user;
- estimate a depth of the QR code, the depth representing an estimated distance of the augmented reality display device to the QR code;
- decode the QR code, and obtain an indication of a network location;
- provide a request to the network location for virtual content, wherein the virtual content is indicated as being allowable for presentation based on the customized settings;
- select a waveguide of the plurality of waveguides at which to present virtual content, the selected waveguide being associated with the estimated depth; and
- present, via the selected waveguide, virtual content received in response to the request in accordance with the customized settings, wherein the real-world object is configured as an input device, and wherein movement of the real-world object causes corresponding movement of the virtual content as presented at the selected depth plane.

19. The augmented reality display device of claim 18, wherein the processors are further configured to:
- detect indicia of the QR code in images obtained via the one or more cameras, and
- in response to detecting indicia of the QR code in the at least one image, decode the QR code.

20. The augmented reality display device of claim 18, wherein presentation of the virtual content causes presentation of a second user as virtual content to the user, such that the second user can appear to be in the ambient environment.

21. The augmented reality display device of claim 18, wherein the one or more processors are configured to:
- update the estimated depth of the QR code; and
- update selection of the waveguide based on the updated estimated depth.

22. The augmented reality display device of claim 18, wherein the estimated depth is based on a size associated with the QR code included in the at least one image.

* * * * *